(12) United States Patent
Silverbrook

(10) Patent No.: US 9,131,083 B2
(45) Date of Patent: *Sep. 8, 2015

(54) PORTABLE IMAGING DEVICE WITH MULTI-CORE PROCESSOR

(75) Inventor: Kia Silverbrook, Balmain (AU)

(73) Assignee: Google Inc., Mountain View, CA (US)

( * ) Notice: Subject to any disclaimer, the term of this patent is extended or adjusted under 35 U.S.C. 154(b) by 282 days.

This patent is subject to a terminal disclaimer.

(21) Appl. No.: 13/620,901

(22) Filed: Sep. 15, 2012

(65) Prior Publication Data

US 2013/0010148 A1 Jan. 10, 2013

Related U.S. Application Data

(63) Continuation of application No. 13/104,021, filed on May 10, 2011, now abandoned, which is a continuation of application No. 12/758,730, filed on Apr. 12, 2010, now Pat. No. 7,961,249, which is a
(Continued)

(30) Foreign Application Priority Data

| Jul. 15, 1997 | (AU) | .................................. PO7991 |
| Aug. 11, 1997 | (AU) | .................................. PO8504 |

(51) Int. Cl.
H04N 5/232 (2006.01)
H04N 1/00 (2006.01)
(Continued)

(52) U.S. Cl.
CPC ......... *H04N 1/00278* (2013.01); *B41J 2/14314* (2013.01); *B41J 2/14427* (2013.01); *B41J 2/17513* (2013.01); *B41J 3/445* (2013.01); *B41J 11/005* (2013.01); *B41J 11/70* (2013.01); *B41J 15/04* (2013.01); *B82Y 30/00* (2013.01);
(Continued)

(58) Field of Classification Search
CPC ....... H04N 5/232; H04N 5/772; H04N 5/335; H04N 5/378
USPC ........... 348/207.99, 207.2, 222.1, 207.1, 294, 348/302
See application file for complete search history.

(56) References Cited

U.S. PATENT DOCUMENTS

| 1,960,667 A | 5/1934 | Hutt et al. |
| 2,506,035 A | 5/1950 | Parker |

(Continued)

FOREIGN PATENT DOCUMENTS

| AU | 96-44491 A | 8/1996 |
| AU | 55414/98 A | 8/1998 |

(Continued)

OTHER PUBLICATIONS

Biemond et al., "A Fast Kalman Filter for Images Degraded by Both Blur and Noise," *SPIE Milestone Series: Selected Papers on Digital Image Restoration* 74: 167-165 (Oct. 1983).

(Continued)

*Primary Examiner* — Nicholas Giles
(74) *Attorney, Agent, or Firm* — Leydig, Voit & Mayer, Ltd.

(57) ABSTRACT

A portable imaging device that has a CMOS image sensor, a color display for displaying an image sensed by the CMOS image sensor and a central processor. The central processor has an image sensor interface for receiving data from the CMOS image sensor, multiple processing units for parallel operation to simultaneously process the data, and an image display interface for sending processed data to the color display. The central processor is integrated onto a single chip.

19 Claims, 77 Drawing Sheets

Related U.S. Application Data continuation of application No. 11/045,442, filed on Jan. 31, 2005, now Pat. No. 7,701,506, which is a continuation of application No. 09/112,786, filed on Jul. 10, 1998, now Pat. No. 6,879,341.

(51) Int. Cl.

| | | |
|---|---|---|
| *H04N 5/378* | (2011.01) | |
| *B41J 2/14* | (2006.01) | |
| *B41J 2/175* | (2006.01) | |
| *B41J 3/44* | (2006.01) | |
| *B41J 11/00* | (2006.01) | |
| *B41J 11/70* | (2006.01) | |
| *B41J 15/04* | (2006.01) | |
| *B82Y 30/00* | (2011.01) | |
| *G06F 9/22* | (2006.01) | |
| *G06F 9/26* | (2006.01) | |
| *G06F 9/30* | (2006.01) | |
| *G06F 9/38* | (2006.01) | |
| *G06F 21/79* | (2013.01) | |
| *G06F 21/86* | (2013.01) | |
| *G06K 1/12* | (2006.01) | |
| *G06K 7/10* | (2006.01) | |
| *G06K 7/14* | (2006.01) | |
| *G06K 19/06* | (2006.01) | |
| *G06K 19/073* | (2006.01) | |
| *G11C 11/56* | (2006.01) | |
| *H01L 23/00* | (2006.01) | |
| *H04N 1/21* | (2006.01) | |
| *H04N 1/32* | (2006.01) | |
| *H04N 5/225* | (2006.01) | |
| *H04N 5/262* | (2006.01) | |
| *B41J 2/165* | (2006.01) | |
| *B41J 2/04* | (2006.01) | |
| *G06F 7/57* | (2006.01) | |
| *H04N 101/00* | (2006.01) | |

(52) U.S. Cl.
CPC ............... *G06F9/226* (2013.01); *G06F 9/265* (2013.01); *G06F 9/30094* (2013.01); *G06F 9/30101* (2013.01); *G06F 9/3885* (2013.01); *G06F 21/79* (2013.01); *G06F 21/86* (2013.01); *G06K 1/121* (2013.01); *G06K 7/10762* (2013.01); *G06K 7/14* (2013.01); *G06K 7/1417* (2013.01); *G06K 19/06037* (2013.01); *G06K 19/073* (2013.01); *G11C 11/56* (2013.01); *H01L 23/576* (2013.01); *H04N 1/0044* (2013.01); *H04N 1/00326* (2013.01); *H04N 1/00965* (2013.01); *H04N 1/00968* (2013.01); *H04N 1/2112* (2013.01); *H04N 1/2154* (2013.01); *H04N 1/32101* (2013.01); *H04N 1/32133* (2013.01); *H04N 1/32561* (2013.01); *H04N 1/32587* (2013.01); *H04N 1/32593* (2013.01); *H04N 1/32603* (2013.01); *H04N 5/225* (2013.01); *H04N 5/23229* (2013.01); *H04N 5/2628* (2013.01); *H04N 5/378* (2013.01); *B41J 2/16585* (2013.01); *B41J 2/17596* (2013.01); *B41J 2002/041* (2013.01); *B41J 2202/21* (2013.01); *G06F 7/57* (2013.01); *G06F 2221/2129* (2013.01); *H01L 2924/0002* (2013.01); *H04N 1/00127* (2013.01); *H04N 2101/00* (2013.01); *H04N 2201/0008* (2013.01); *H04N 2201/0084* (2013.01); *H04N 2201/328* (2013.01); *H04N 2201/3222* (2013.01); *H04N 2201/3261* (2013.01); *H04N 2201/3264* (2013.01); *H04N 2201/3269* (2013.01); *H04N 2201/3276* (2013.01)

(56) References Cited

U.S. PATENT DOCUMENTS

| | | |
|---|---|---|
| 3,223,409 A | 12/1965 | Erich et al. |
| 3,518,417 A | 6/1970 | Bertrams |
| 3,573,437 A | 4/1971 | Scuitto et al. |
| 3,663,801 A | 5/1972 | Wahli et al. |
| 3,701,098 A | 10/1972 | Acker |
| 3,731,062 A | 5/1973 | Reilly, Jr. |
| 3,735,350 A | 5/1973 | Lemelson |
| 3,737,629 A | 6/1973 | See |
| 3,748,939 A | 7/1973 | Feinstein et al. |
| 3,760,162 A | 9/1973 | Holter |
| 3,774,014 A | 11/1973 | Berler |
| 3,778,541 A | 12/1973 | Bowker |
| 3,843,132 A | 10/1974 | Ferguson |
| 3,852,572 A | 12/1974 | Nicould |
| 3,857,019 A | 12/1974 | Holtey |
| 3,866,217 A | 2/1975 | Bennett, Jr. |
| 3,893,173 A | 7/1975 | Taggart et al. |
| 3,896,691 A | 7/1975 | Granger et al. |
| 3,914,877 A | 10/1975 | Hines |
| 3,916,420 A | 10/1975 | Brown et al. |
| 3,943,563 A | 3/1976 | Lemelson |
| 3,946,398 A | 3/1976 | Kyser et al. |
| 3,956,756 A | 5/1976 | Paton |
| 3,967,286 A | 6/1976 | Anderson et al. |
| 3,970,803 A | 7/1976 | Kinzie, Jr. et al. |
| 3,971,065 A | 7/1976 | Bayer |
| 4,000,239 A | 12/1976 | Hamana et al. |
| 4,034,845 A | 7/1977 | Honegger |
| 4,045,802 A | 8/1977 | Fukazawa et al. |
| 4,048,617 A | 9/1977 | Neff |
| 4,074,324 A | 2/1978 | Barrett et al. |
| 4,088,981 A | 5/1978 | Gott |
| 4,092,654 A | 5/1978 | Alasia |
| 4,161,749 A | 7/1979 | Erlichman |
| 4,172,641 A | 10/1979 | Zoike et al. |
| 4,173,401 A | 11/1979 | Harvey |
| 4,177,514 A | 12/1979 | Rupp |
| 4,181,940 A | 1/1980 | Underwood et al. |
| 4,200,867 A | 4/1980 | Hill |
| 4,213,694 A | 7/1980 | Kuseski |
| 4,224,628 A | 9/1980 | Murray |
| 4,234,214 A | 11/1980 | Lee |
| 4,244,006 A | 1/1981 | Kitahara et al. |
| 4,253,476 A | 3/1981 | Sato |
| 4,258,387 A | 3/1981 | Lemelson et al. |
| 4,262,284 A | 4/1981 | Stieff et al. |
| 4,262,301 A | 4/1981 | Erlichman |
| 4,270,853 A | 6/1981 | Hatada et al. |
| 4,275,413 A | 6/1981 | Sakamoto et al. |
| 4,282,535 A | 8/1981 | Kern et al. |
| 4,317,138 A | 2/1982 | Bryan et al. |
| 4,342,051 A | 7/1982 | Suzuki et al. |
| 4,372,694 A | 2/1983 | Bovio et al. |
| 4,383,458 A | 5/1983 | Kitai et al. |
| 4,384,272 A | 5/1983 | Tanaka et al. |
| 4,394,730 A | 7/1983 | Suzuki et al. |
| 4,402,150 A | 9/1983 | Sullivan |
| 4,414,316 A | 11/1983 | Conley |
| 4,429,320 A | 1/1984 | Hattori et al. |
| 4,429,938 A | 2/1984 | Flor |
| 4,434,503 A | 2/1984 | Tanaka et al. |
| 4,436,439 A | 3/1984 | Koto |
| 4,454,517 A | 6/1984 | Kagaya |
| 4,455,609 A | 6/1984 | Inamura et al. |
| 4,463,359 A | 7/1984 | Ayata et al. |
| 4,463,362 A | 7/1984 | Thomas |
| 4,472,038 A | 9/1984 | Muramatsu et al. |
| 4,488,563 A | 12/1984 | Morifuji et al. |
| 4,494,862 A | 1/1985 | Tanaka |
| 4,494,864 A | 1/1985 | Smith et al. |

(56) References Cited

U.S. PATENT DOCUMENTS

| | | | |
|---|---|---|---|
| 4,500,183 A | 2/1985 | Tanikawa | |
| 4,500,919 A | 2/1985 | Shreiber | |
| 4,511,907 A | 4/1985 | Fukuchi | |
| 4,518,235 A | 5/1985 | Reed et al. | |
| 4,521,014 A | 6/1985 | Sitrick | |
| 4,523,235 A | 6/1985 | Rajchman | |
| 4,528,575 A | 7/1985 | Matsuda et al. | |
| 4,531,740 A | 7/1985 | Green et al. | |
| 4,534,142 A | 8/1985 | Drefahl | |
| 4,544,184 A | 10/1985 | Freund et al. | |
| 4,546,434 A | 10/1985 | Gioello | |
| 4,550,967 A | 11/1985 | Riches et al. | |
| 4,558,326 A | 12/1985 | Kimura et al. | |
| 4,567,529 A | 1/1986 | Yamaguchi et al. | |
| 4,574,351 A | 3/1986 | Dang et al. | |
| 4,580,721 A | 4/1986 | Coffee et al. | |
| 4,581,710 A | 4/1986 | Hasslemeier | |
| 4,591,900 A | 5/1986 | Heeb et al. | |
| 4,592,938 A | 6/1986 | Benoit | |
| 4,596,039 A | 6/1986 | Mitchell et al. | |
| 4,632,585 A | 12/1986 | Oyamatsu et al. | |
| 4,639,738 A | 1/1987 | Young et al. | |
| 4,639,769 A | 1/1987 | Rubin et al. | |
| 4,640,529 A | 2/1987 | Katz | |
| 4,641,980 A | 2/1987 | Matsumoto et al. | |
| 4,652,935 A | 3/1987 | Endoh et al. | |
| 4,665,556 A | 5/1987 | Fukushima et al. | |
| 4,667,208 A | 5/1987 | Shiraki et al. | |
| 4,672,453 A | 6/1987 | Sakamoto | |
| 4,681,430 A | 7/1987 | Goel et al. | |
| 4,683,477 A | 7/1987 | Braun et al. | |
| 4,688,105 A | 8/1987 | Bloch et al. | |
| 4,689,642 A | 8/1987 | Sugitani | |
| 4,689,683 A | 8/1987 | Efron | |
| 4,692,394 A | 9/1987 | Drexler | |
| 4,703,332 A | 10/1987 | Crotti et al. | |
| 4,706,130 A | 11/1987 | Yamakawa | |
| 4,707,713 A | 11/1987 | Ayata et al. | |
| 4,710,873 A | 12/1987 | Breslow et al. | |
| 4,724,307 A | 2/1988 | Dutton et al. | |
| 4,724,395 A | 2/1988 | Freeman | |
| 4,727,245 A | 2/1988 | Dobbins et al. | |
| 4,728,978 A | 3/1988 | Inoue et al. | |
| 4,734,565 A | 3/1988 | Pierce et al. | |
| 4,734,713 A | 3/1988 | Sato et al. | |
| 4,740,269 A | 4/1988 | Berger et al. | |
| 4,741,327 A | 5/1988 | Yabe | |
| 4,745,544 A | 5/1988 | Renner et al. | |
| 4,746,920 A | 5/1988 | Nellen et al. | |
| 4,754,487 A | 6/1988 | Newmuis | |
| 4,762,986 A | 8/1988 | Suda et al. | |
| 4,763,153 A | 8/1988 | Ishimura et al. | |
| 4,769,764 A | 9/1988 | Levanon | |
| 4,771,295 A | 9/1988 | Baker et al. | |
| 4,771,342 A | 9/1988 | Beesley | |
| 4,783,700 A | 11/1988 | Nagane | |
| 4,783,823 A | 11/1988 | Tasaki et al. | |
| 4,786,820 A | 11/1988 | Ogino et al. | |
| 4,788,563 A | 11/1988 | Omo et al. | |
| 4,791,443 A | 12/1988 | Foley et al. | |
| 4,796,038 A | 1/1989 | Allen et al. | |
| 4,796,087 A | 1/1989 | Guichard et al. | |
| 4,804,831 A | 2/1989 | Baba | |
| 4,809,345 A | 2/1989 | Tabata et al. | |
| 4,819,395 A | 4/1989 | Sugita et al. | |
| 4,821,208 A | 4/1989 | Ryan et al. | |
| 4,829,324 A | 5/1989 | Drake et al. | |
| 4,833,599 A | 5/1989 | Colwell et al. | |
| 4,835,388 A | 5/1989 | Bruml et al. | |
| 4,837,628 A | 6/1989 | Sasaki | |
| 4,841,375 A | 6/1989 | Nakajima et al. | |
| 4,845,767 A * | 7/1989 | Mori et al. | 382/282 |
| 4,845,770 A | 7/1989 | Koshida | |
| 4,853,967 A | 8/1989 | Mandeville | |
| 4,860,375 A | 8/1989 | McCubbrey et al. | |
| 4,861,031 A | 8/1989 | Simms | |
| 4,862,208 A | 8/1989 | Yamada et al. | |
| 4,864,494 A | 9/1989 | Kobus, Jr. | |
| 4,868,676 A | 9/1989 | Matsuura et al. | |
| 4,875,048 A | 10/1989 | Shimizu et al. | |
| 4,875,074 A | 10/1989 | Sangyoji et al. | |
| 4,875,173 A | 10/1989 | Nakajima | |
| 4,882,702 A | 11/1989 | Struger et al. | |
| 4,887,161 A | 12/1989 | Nishi et al. | |
| 4,890,832 A | 1/1990 | Komaki | |
| 4,896,029 A | 1/1990 | Chandler et al. | |
| 4,897,719 A | 1/1990 | Griffin | |
| 4,897,724 A | 1/1990 | Veldhuis | |
| 4,902,880 A | 2/1990 | Garczynski et al. | |
| 4,903,132 A | 2/1990 | Yamawaki et al. | |
| 4,904,100 A | 2/1990 | Enix | |
| 4,905,029 A | 2/1990 | Kelley | |
| 4,914,452 A | 4/1990 | Fukawa | |
| 4,937,676 A | 6/1990 | Finelli et al. | |
| 4,942,470 A * | 7/1990 | Nishitani et al. | 348/721 |
| 4,943,820 A | 7/1990 | Larock | |
| 4,947,262 A | 8/1990 | Yajima et al. | |
| 4,949,189 A | 8/1990 | Ohmori | |
| 4,949,391 A | 8/1990 | Faulkerson et al. | |
| 4,952,967 A | 8/1990 | Kazumi et al. | |
| 4,954,910 A | 9/1990 | Ueno | |
| 4,956,656 A | 9/1990 | Yamamoto et al. | |
| 4,961,088 A | 10/1990 | Gilliland et al. | |
| 4,964,066 A | 10/1990 | Yamane et al. | |
| 4,965,596 A | 10/1990 | Nagoshi et al. | |
| RE33,425 E | 11/1990 | Nihei | |
| 4,975,969 A | 12/1990 | Tal | |
| 4,977,459 A | 12/1990 | Ebinuma et al. | |
| 4,979,838 A | 12/1990 | Yokota et al. | |
| 4,980,856 A | 12/1990 | Ueno | |
| 4,983,996 A | 1/1991 | Kinoshita | |
| 4,985,848 A | 1/1991 | Pfeiffer et al. | |
| 4,987,030 A | 1/1991 | Saito et al. | |
| 4,990,005 A | 2/1991 | Karakawa | |
| 4,991,205 A | 2/1991 | Lemelson | |
| 4,993,405 A | 2/1991 | Takamura et al. | |
| 4,999,647 A | 3/1991 | Wood et al. | |
| 5,005,998 A | 4/1991 | Takanashi et al. | |
| 5,006,929 A | 4/1991 | Barbero et al. | |
| 5,009,626 A | 4/1991 | Katz | |
| 5,012,349 A | 4/1991 | De Fay | |
| 5,016,037 A | 5/1991 | Taniguchi et al. | |
| 5,016,112 A | 5/1991 | Nakajima et al. | |
| 5,018,072 A | 5/1991 | Ibamoto et al. | |
| 5,020,926 A | 6/1991 | Wilhelm | |
| 5,021,892 A | 6/1991 | Kita et al. | |
| 5,026,042 A | 6/1991 | Miller | |
| 5,028,997 A | 7/1991 | Elberbaum | |
| 5,031,049 A | 7/1991 | Toyama et al. | |
| 5,032,922 A | 7/1991 | Stemmle | |
| 5,035,325 A | 7/1991 | Kitsuki | |
| 5,035,929 A | 7/1991 | Myers | |
| 5,036,472 A | 7/1991 | Buckley et al. | |
| 5,040,006 A | 8/1991 | Matsumura et al. | |
| 5,043,561 A | 8/1991 | Kimata | |
| 5,043,748 A | 8/1991 | Katayama et al. | |
| 5,049,898 A | 9/1991 | Arthur et al. | |
| 5,051,838 A | 9/1991 | Cho et al. | |
| 5,053,814 A | 10/1991 | Takano et al. | |
| 5,055,997 A | 10/1991 | Sluijter et al. | |
| 5,058,856 A | 10/1991 | Gordon et al. | |
| 5,065,170 A | 11/1991 | Rezanka et al. | |
| 5,067,713 A | 11/1991 | Soules et al. | |
| 5,081,575 A | 1/1992 | Hiller et al. | |
| 5,091,966 A | 2/1992 | Bloomberg et al. | |
| 5,097,282 A | 3/1992 | Itoh et al. | |
| 5,097,285 A | 3/1992 | Wakabayashi et al. | |
| 5,101,096 A | 3/1992 | Ohyama et al. | |
| 5,103,311 A | 4/1992 | Sluijter et al. | |
| 5,107,100 A | 4/1992 | Shepard et al. | |
| 5,107,276 A | 4/1992 | Kneezel et al. | |
| 5,107,290 A | 4/1992 | Ohsawa | |
| 5,111,288 A | 5/1992 | Blackshear | |
| 5,111,419 A | 5/1992 | Morley | |

(56) References Cited

U.S. PATENT DOCUMENTS

| | | |
|---|---|---|
| 5,115,888 A | 5/1992 | Schneider |
| 5,119,115 A | 6/1992 | Buat et al. |
| 5,119,179 A | 6/1992 | Hagino |
| 5,121,139 A | 6/1992 | Burke |
| 5,121,209 A | 6/1992 | Smith et al. |
| 5,121,349 A | 6/1992 | Naito |
| 5,124,692 A | 6/1992 | Sasson |
| 5,132,798 A | 7/1992 | Yoshimura et al. |
| 5,134,495 A | 7/1992 | Frazier et al. |
| 5,135,095 A | 8/1992 | Kocznar et al. |
| 5,138,459 A | 8/1992 | Roberts et al. |
| D329,862 S | 9/1992 | Watanabe et al. |
| 5,144,340 A | 9/1992 | Hotomi et al. |
| 5,144,423 A | 9/1992 | Knauer et al. |
| 5,146,328 A | 9/1992 | Yamasaki et al. |
| 5,146,592 A | 9/1992 | Pfeiffer et al. |
| 5,148,288 A | 9/1992 | Hannah |
| 5,148,534 A | 9/1992 | Comerford |
| 5,151,726 A | 9/1992 | Iwashita et al. |
| 5,153,532 A | 10/1992 | Albers et al. |
| 5,153,738 A | 10/1992 | Stemmle |
| 5,154,956 A | 10/1992 | Fradrich |
| 5,155,502 A | 10/1992 | Kimura et al. |
| 5,160,577 A | 11/1992 | Deshpande |
| 5,160,943 A | 11/1992 | Pettigre et al. |
| 5,160,945 A | 11/1992 | Drake |
| 5,161,037 A | 11/1992 | Saito |
| 5,163,762 A | 11/1992 | Murakami |
| 5,164,827 A | 11/1992 | Paff |
| 5,164,831 A | 11/1992 | Kuchta et al. |
| 5,172,423 A | 12/1992 | France |
| 5,175,808 A | 12/1992 | Sayre |
| 5,179,389 A | 1/1993 | Arai et al. |
| 5,179,936 A | 1/1993 | O'Hara et al. |
| 5,181,254 A | 1/1993 | Schweizer et al. |
| 5,182,548 A | 1/1993 | Haeberli |
| 5,184,169 A | 2/1993 | Nishitani |
| 5,184,907 A | 2/1993 | Hamada et al. |
| 5,189,520 A | 2/1993 | Okayasu et al. |
| 5,189,529 A | 2/1993 | Ishiwata et al. |
| 5,191,640 A | 3/1993 | Plass |
| 5,191,647 A | 3/1993 | Masaki |
| 5,200,598 A | 4/1993 | Recontre |
| 5,204,944 A | 4/1993 | Wolberg et al. |
| 5,206,919 A | 4/1993 | Keating |
| 5,208,610 A | 5/1993 | Su et al. |
| 5,212,021 A | 5/1993 | Smith et al. |
| 5,216,490 A | 6/1993 | Greiff et al. |
| 5,220,352 A | 6/1993 | Yamamoto et al. |
| 5,220,400 A | 6/1993 | Anderson et al. |
| 5,221,833 A | 6/1993 | Hecht |
| 5,222,229 A | 6/1993 | Fukuda et al. |
| 5,224,179 A | 6/1993 | Denker et al. |
| 5,225,294 A | 7/1993 | Schifrin |
| 5,226,125 A | 7/1993 | Balmer et al. |
| 5,230,027 A | 7/1993 | Kikuchi |
| 5,231,455 A | 7/1993 | Day |
| 5,235,428 A | 8/1993 | Hirota et al. |
| 5,235,686 A | 8/1993 | Bosshart |
| 5,237,402 A | 8/1993 | Deshon et al. |
| 5,237,686 A | 8/1993 | Asano et al. |
| 5,239,292 A | 8/1993 | Willan |
| 5,240,238 A | 8/1993 | Lee |
| 5,241,165 A | 8/1993 | Drexler |
| 5,241,372 A | 8/1993 | Ohba |
| 5,243,174 A | 9/1993 | Veeneman et al. |
| 5,243,370 A | 9/1993 | Slater |
| 5,243,381 A | 9/1993 | Hube |
| 5,245,365 A | 9/1993 | Woodard et al. |
| 5,247,611 A | 9/1993 | Norden-Paul et al. |
| 5,260,735 A | 11/1993 | Ishikawa et al. |
| 5,265,033 A | 11/1993 | Vajik et al. |
| 5,266,781 A | 11/1993 | Warwick et al. |
| 5,267,021 A | 11/1993 | Ramchandran et al. |
| 5,267,334 A | 11/1993 | Normille et al. |
| 5,270,808 A | 12/1993 | Tanioka |
| 5,275,877 A | 1/1994 | Isayev |
| 5,276,472 A | 1/1994 | Bell et al. |
| 5,276,521 A | 1/1994 | Mori |
| 5,278,608 A | 1/1994 | Taylor et al. |
| 5,278,657 A | 1/1994 | Tamura |
| 5,280,160 A | 1/1994 | Yamamoto et al. |
| 5,280,620 A | 1/1994 | Sluijter et al. |
| 5,282,044 A | 1/1994 | Misawa et al. |
| 5,282,051 A | 1/1994 | Walker |
| 5,288,980 A | 2/1994 | Patel et al. |
| 5,288,986 A | 2/1994 | Pine et al. |
| 5,291,227 A | 3/1994 | Suzuki |
| 5,291,243 A | 3/1994 | Heckman et al. |
| 5,294,782 A | 3/1994 | Kumar |
| 5,297,217 A | 3/1994 | Hamilton, Jr. et al. |
| 5,297,289 A | 3/1994 | Mintzer |
| 5,300,958 A | 4/1994 | Burke et al. |
| 5,300,976 A | 4/1994 | Lim et al. |
| 5,301,043 A | 4/1994 | Ichikawa |
| 5,307,470 A | 4/1994 | Kataoka et al. |
| 5,315,316 A | 5/1994 | Khormaee |
| 5,317,146 A | 5/1994 | Isobe |
| 5,318,370 A | 6/1994 | Nehowig |
| 5,319,462 A | 6/1994 | Haruki |
| 5,322,594 A | 6/1994 | Bol |
| 5,323,203 A | 6/1994 | Maruyama et al. |
| 5,325,493 A | 6/1994 | Herrell et al. |
| 5,327,260 A | 7/1994 | Shimomae |
| 5,328,281 A | 7/1994 | Narita et al. |
| 5,334,920 A | 8/1994 | Ito et al. |
| 5,335,170 A | 8/1994 | Petteruti et al. |
| 5,336,004 A | 8/1994 | Harada et al. |
| 5,336,874 A | 8/1994 | Hasegawa |
| 5,337,361 A | 8/1994 | Wang et al. |
| 5,339,102 A | 8/1994 | Carlotta |
| 5,339,170 A | 8/1994 | Fan |
| 5,339,396 A | 8/1994 | Muramatsu |
| 5,343,031 A | 8/1994 | Yoshida |
| 5,343,309 A | 8/1994 | Roetling |
| 5,343,386 A | 8/1994 | Barber |
| 5,344,248 A | 9/1994 | Schoon et al. |
| 5,345,288 A | 9/1994 | Kobayashit et al. |
| 5,345,505 A | 9/1994 | Pires |
| 5,347,403 A | 9/1994 | Uekusa |
| 5,351,071 A | 9/1994 | Matsuda et al. |
| 5,351,095 A | 9/1994 | Kerdranvat |
| D351,144 S | 10/1994 | Fishbine et al. |
| 5,356,971 A | 10/1994 | Sagawa et al. |
| 5,359,387 A | 10/1994 | Hicks |
| 5,361,366 A | 11/1994 | Kawano et al. |
| 5,363,134 A | 11/1994 | Barbehenn et al. |
| 5,363,209 A | 11/1994 | Eschbach et al. |
| 5,363,212 A | 11/1994 | Taniuchi et al. |
| 5,365,312 A | 11/1994 | Hillmann et al. |
| 5,369,261 A | 11/1994 | Shamir |
| 5,373,322 A | 12/1994 | Laroche et al. |
| 5,374,995 A | 12/1994 | Loveridge et al. |
| 5,376,561 A | 12/1994 | Vu et al. |
| 5,381,172 A | 1/1995 | Ujita et al. |
| 5,384,609 A | 1/1995 | Ogawa et al. |
| 5,384,899 A | 1/1995 | Amit |
| 5,392,365 A | 2/1995 | Steinkirchner |
| 5,393,152 A | 2/1995 | Hattori et al. |
| 5,396,286 A | 3/1995 | Ishizuka |
| 5,398,063 A | 3/1995 | Yamana |
| 5,398,131 A | 3/1995 | Hall et al. |
| 5,398,315 A | 3/1995 | Johnson et al. |
| 5,399,850 A | 3/1995 | Nagatani et al. |
| 5,402,527 A | 3/1995 | Bigby et al. |
| 5,404,460 A | 4/1995 | Thomsen et al. |
| 5,408,669 A | 4/1995 | Stewart et al. |
| 5,408,746 A | 4/1995 | Thoman et al. |
| 5,410,620 A | 4/1995 | Yoshida |
| 5,412,197 A | 5/1995 | Smith |
| 5,412,402 A | 5/1995 | Searby et al. |
| 5,412,410 A | 5/1995 | Rezanka |
| 5,414,529 A | 5/1995 | Terada et al. |
| 5,418,565 A | 5/1995 | Smith |

(56) References Cited

U.S. PATENT DOCUMENTS

| | | |
|---|---|---|
| 5,418,585 A | 5/1995 | Petruchik |
| 5,419,543 A | 5/1995 | Nakamura et al. |
| 5,420,409 A | 5/1995 | Longacre et al. |
| 5,420,607 A | 5/1995 | Miller et al. |
| 5,420,635 A | 5/1995 | Konishi et al. |
| 5,420,697 A | 5/1995 | Tuli |
| 5,420,940 A | 5/1995 | Sedlar et al. |
| 5,426,762 A | 6/1995 | Nakagawa |
| 5,428,423 A | 6/1995 | Clark |
| 5,430,518 A | 7/1995 | Tabata et al. |
| 5,430,525 A | 7/1995 | Ohta et al. |
| 5,430,861 A | 7/1995 | Finn |
| 5,432,577 A | 7/1995 | Kobayshi et al. |
| 5,432,896 A | 7/1995 | Hwong et al. |
| 5,432,914 A | 7/1995 | Cho |
| 5,434,618 A | 7/1995 | Hayashi et al. |
| 5,434,621 A | 7/1995 | Yu et al. |
| 5,436,657 A | 7/1995 | Fukuoka |
| 5,438,359 A | 8/1995 | Aoki et al. |
| 5,438,430 A | 8/1995 | Mackinlay et al. |
| 5,438,431 A | 8/1995 | Ostromoukhov |
| 5,441,251 A | 8/1995 | Ohta |
| 5,442,188 A | 8/1995 | Brimbal et al. |
| 5,442,387 A | 8/1995 | Loofbourow et al. |
| 5,442,567 A | 8/1995 | Small |
| 5,443,320 A | 8/1995 | Agata et al. |
| 5,444,230 A | 8/1995 | Baldwin et al. |
| 5,444,468 A | 8/1995 | Fukushima et al. |
| 5,444,543 A | 8/1995 | Sakano |
| 5,448,280 A | 9/1995 | Matsuda et al. |
| 5,450,365 A | 9/1995 | Adachi et al. |
| 5,452,033 A | 9/1995 | Balling et al. |
| 5,456,539 A | 10/1995 | Wright et al. |
| 5,457,515 A | 10/1995 | Quadracci et al. |
| 5,457,554 A | 10/1995 | Faris |
| 5,459,819 A | 10/1995 | Watkins et al. |
| 5,461,440 A | 10/1995 | Toyoda et al. |
| 5,462,375 A | 10/1995 | Isobe et al. |
| 5,463,470 A | 10/1995 | Terashita et al. |
| 5,465,163 A | 11/1995 | Yoshihara et al. |
| 5,465,213 A | 11/1995 | Ross |
| 5,466,918 A | 11/1995 | Ray et al. |
| 5,467,118 A | 11/1995 | Gragg et al. |
| 5,469,211 A | 11/1995 | Maruichi et al. |
| 5,471,324 A | 11/1995 | Rolleston |
| 5,471,592 A | 11/1995 | Gove et al. |
| 5,472,143 A | 12/1995 | Bartels et al. |
| 5,473,352 A | 12/1995 | Ishida |
| 5,475,279 A | 12/1995 | Takeuchi et al. |
| 5,475,318 A | 12/1995 | Marcus et al. |
| 5,477,012 A | 12/1995 | Sekendur |
| 5,477,042 A | 12/1995 | Wang |
| 5,477,264 A | 12/1995 | Sarbadhikari et al. |
| 5,477,546 A | 12/1995 | Shibata et al. |
| 5,479,015 A | 12/1995 | Rudman et al. |
| 5,479,515 A | 12/1995 | Longacre |
| 5,482,375 A | 1/1996 | Richardson et al. |
| 5,482,389 A | 1/1996 | Bickoff et al. |
| 5,483,335 A | 1/1996 | Tobias |
| 5,483,379 A | 1/1996 | Svanberg et al. |
| 5,485,504 A | 1/1996 | Ohnsorge |
| 5,488,223 A | 1/1996 | Austin et al. |
| 5,489,935 A | 2/1996 | Dornier |
| 5,489,945 A | 2/1996 | Kannegundla et al. |
| 5,489,995 A | 2/1996 | Iso et al. |
| 5,493,332 A | 2/1996 | Dalton et al. |
| 5,493,335 A | 2/1996 | Parulski et al. |
| 5,493,409 A | 2/1996 | Maeda et al. |
| 5,493,684 A | 2/1996 | Gephardt et al. |
| 5,495,097 A | 2/1996 | Katz et al. |
| 5,495,568 A | 2/1996 | Beavin |
| 5,497,498 A | 3/1996 | Taylor |
| 5,502,485 A | 3/1996 | Suzuki |
| 5,502,529 A | 3/1996 | Zander |
| 5,502,577 A | 3/1996 | Mackinlay et al. |
| 5,504,821 A | 4/1996 | Kanamori et al. |
| 5,506,603 A | 4/1996 | Kawano et al. |
| 5,506,620 A | 4/1996 | Ozawa |
| 5,510,820 A | 4/1996 | Aulick et al. |
| 5,510,857 A | 4/1996 | Kopet et al. |
| 5,512,924 A | 4/1996 | Takada et al. |
| 5,512,951 A | 4/1996 | Torii |
| 5,512,962 A | 4/1996 | Homma |
| 5,513,117 A | 4/1996 | Small |
| 5,513,922 A | 5/1996 | Umbach |
| 5,514,860 A | 5/1996 | Berson et al. |
| 5,515,101 A | 5/1996 | Yoshida |
| 5,515,104 A | 5/1996 | Okada |
| 5,517,222 A | 5/1996 | Sugiyama et al. |
| 5,517,241 A | 5/1996 | Adachi et al. |
| 5,517,265 A | 5/1996 | Zander et al. |
| 5,520,470 A | 5/1996 | Willet |
| 5,521,372 A | 5/1996 | Hecht et al. |
| 5,521,663 A | 5/1996 | Norris, III |
| 5,521,710 A | 5/1996 | Strossman |
| 5,523,780 A | 6/1996 | Hirosawa et al. |
| 5,524,194 A | 6/1996 | Chida et al. |
| 5,528,339 A | 6/1996 | Buhr et al. |
| 5,529,279 A | 6/1996 | Beatty et al. |
| 5,531,431 A | 7/1996 | Saito et al. |
| 5,533,170 A | 7/1996 | Teitzel et al. |
| 5,533,172 A | 7/1996 | Hurtz et al. |
| 5,534,864 A | 7/1996 | Ono et al. |
| 5,534,900 A | 7/1996 | Ohno et al. |
| 5,534,923 A | 7/1996 | Suda |
| 5,534,962 A | 7/1996 | Zander |
| 5,535,371 A | 7/1996 | Stewart et al. |
| 5,537,075 A | 7/1996 | Miyazaki |
| 5,537,144 A | 7/1996 | Faris |
| 5,537,294 A | 7/1996 | Siwinski |
| 5,539,194 A | 7/1996 | Miller et al. |
| 5,539,456 A | 7/1996 | Ishii |
| 5,541,653 A | 7/1996 | Peters et al. |
| 5,541,654 A | 7/1996 | Roberts |
| 5,542,487 A | 8/1996 | Schultz et al. |
| 5,543,941 A | 8/1996 | Parker et al. |
| 5,547,501 A | 8/1996 | Maruyama et al. |
| 5,549,740 A | 8/1996 | Takahashi et al. |
| 5,550,935 A | 8/1996 | Erdem et al. |
| 5,550,938 A | 8/1996 | Hayakawa et al. |
| 5,552,837 A | 9/1996 | Mankovitz |
| 5,553,172 A | 9/1996 | Kimura et al. |
| 5,553,220 A | 9/1996 | Keene |
| 5,553,864 A | 9/1996 | Sitrick |
| 5,554,432 A | 9/1996 | Sandor et al. |
| 5,555,061 A | 9/1996 | Soshi et al. |
| 5,555,428 A | 9/1996 | Radigan et al. |
| 5,555,496 A | 9/1996 | Tackbary et al. |
| 5,557,310 A | 9/1996 | Kurata et al. |
| 5,557,324 A | 9/1996 | Wolff |
| 5,557,332 A * | 9/1996 | Koyanagi et al. ........ 375/240.16 |
| 5,559,714 A | 9/1996 | Banks et al. |
| 5,559,932 A | 9/1996 | Machida et al. |
| 5,561,604 A | 10/1996 | Buckley et al. |
| 5,563,643 A | 10/1996 | Carlotta et al. |
| 5,563,722 A | 10/1996 | Norris |
| 5,565,900 A | 10/1996 | Cowger et al. |
| 5,566,290 A | 10/1996 | Silverbrook |
| 5,566,906 A | 10/1996 | Kamada et al. |
| 5,570,130 A | 10/1996 | Horii et al. |
| 5,570,435 A | 10/1996 | Bloomberg et al. |
| 5,572,310 A | 11/1996 | Hoberock et al. |
| 5,572,596 A | 11/1996 | Wildes et al. |
| 5,572,632 A | 11/1996 | Laumeyer et al. |
| 5,572,635 A | 11/1996 | Takizawa et al. |
| 5,574,485 A | 11/1996 | Anderson et al. |
| 5,576,783 A | 11/1996 | Lee |
| 5,579,116 A | 11/1996 | Sugiyama et al. |
| 5,579,445 A | 11/1996 | Loce et al. |
| 5,581,773 A | 12/1996 | Glover |
| 5,583,971 A | 12/1996 | Lo |
| 5,586,166 A | 12/1996 | Turban |
| 5,586,207 A | 12/1996 | Goodwin |
| 5,587,740 A | 12/1996 | Brennan |

(56) References Cited

U.S. PATENT DOCUMENTS

| | | |
|---|---|---|
| 5,591,192 A | 1/1997 | Privitera et al. |
| 5,591,956 A | 1/1997 | Longacre, Jr. et al. |
| 5,592,237 A * | 1/1997 | Greenway et al. ............ 348/716 |
| 5,592,312 A | 1/1997 | Noguchi |
| 5,592,597 A | 1/1997 | Kiss |
| 5,593,236 A | 1/1997 | Bobry |
| 5,594,500 A | 1/1997 | Tanaka et al. |
| 5,598,202 A | 1/1997 | Peterson |
| 5,598,242 A | 1/1997 | Omi et al. |
| 5,599,231 A | 2/1997 | Hibino et al. |
| 5,600,402 A | 2/1997 | Kainen |
| 5,600,563 A | 2/1997 | Cannon et al. |
| 5,602,377 A | 2/1997 | Beller et al. |
| 5,602,412 A | 2/1997 | Suzuki et al. |
| 5,602,574 A | 2/1997 | Williams |
| 5,604,537 A | 2/1997 | Yamazaki et al. |
| 5,606,420 A | 2/1997 | Maeda et al. |
| 5,608,437 A | 3/1997 | Iwata et al. |
| 5,610,761 A | 3/1997 | Ishibashi et al. |
| 5,613,146 A | 3/1997 | Gove et al. |
| 5,613,175 A | 3/1997 | Frankel |
| 5,613,415 A | 3/1997 | Sanpei |
| 5,615,123 A | 3/1997 | Davidson et al. |
| 5,615,384 A | 3/1997 | Allard |
| 5,615,393 A | 3/1997 | Kikinis et al. |
| 5,619,030 A | 4/1997 | Shiomi |
| 5,619,590 A | 4/1997 | Moore, Jr. |
| 5,619,622 A | 4/1997 | Audi et al. |
| 5,619,737 A | 4/1997 | Horning et al. |
| 5,620,269 A | 4/1997 | Gustafson |
| 5,621,445 A | 4/1997 | Fong et al. |
| 5,621,524 A | 4/1997 | Mitani |
| 5,621,545 A | 4/1997 | Motta et al. |
| 5,621,864 A | 4/1997 | Benabe et al. |
| 5,621,868 A | 4/1997 | Mizutani et al. |
| 5,623,581 A | 4/1997 | Attenberg |
| 5,624,732 A | 4/1997 | Oshima et al. |
| 5,625,669 A | 4/1997 | McGregor et al. |
| 5,625,770 A | 4/1997 | Nomura |
| 5,633,667 A | 5/1997 | Miyazawa |
| 5,633,678 A | 5/1997 | Parulski et al. |
| 5,634,730 A | 6/1997 | Bobry |
| 5,638,103 A | 6/1997 | Obata et al. |
| 5,640,002 A | 6/1997 | Ruppert et al. |
| 5,640,203 A | 6/1997 | Wakui |
| 5,640,627 A | 6/1997 | Nakano et al. |
| 5,642,226 A | 6/1997 | Rosenthal |
| 5,644,341 A | 7/1997 | Fuji et al. |
| 5,644,410 A | 7/1997 | Suzuki et al. |
| 5,644,431 A | 7/1997 | Magee |
| 5,644,557 A | 7/1997 | Akamine et al. |
| 5,644,647 A | 7/1997 | Cosgrove et al. |
| 5,646,658 A | 7/1997 | Thiel et al. |
| 5,646,752 A | 7/1997 | Kohler et al. |
| 5,647,484 A | 7/1997 | Fleming |
| 5,649,031 A | 7/1997 | Nakamure et al. |
| 5,652,618 A * | 7/1997 | Nanba ............................ 348/96 |
| 5,652,918 A | 7/1997 | Usui |
| 5,655,164 A | 8/1997 | Tsai |
| 5,657,237 A | 8/1997 | Mazzoni |
| 5,661,506 A | 8/1997 | Lazzouni et al. |
| 5,663,552 A | 9/1997 | Komizo |
| 5,664,013 A | 9/1997 | Rossi |
| 5,665,249 A | 9/1997 | Burke et al. |
| 5,666,141 A | 9/1997 | Matoba et al. |
| 5,666,226 A | 9/1997 | Ezra et al. |
| 5,666,411 A | 9/1997 | McCarty |
| 5,666,516 A | 9/1997 | Combs |
| 5,670,935 A * | 9/1997 | Schofield et al. ............ 340/461 |
| 5,673,073 A | 9/1997 | Childers et al. |
| 5,677,715 A | 10/1997 | Beck |
| 5,677,716 A | 10/1997 | Cleveland |
| 5,678,001 A | 10/1997 | Nagel et al. |
| 5,678,081 A | 10/1997 | Tanaka |
| 5,679,456 A | 10/1997 | Sakai et al. |
| 5,679,943 A | 10/1997 | Schultz et al. |
| 5,680,533 A | 10/1997 | Yamato et al. |
| 5,682,191 A | 10/1997 | Barrett et al. |
| 5,687,304 A | 11/1997 | Kiss |
| 5,688,056 A | 11/1997 | Peyret |
| 5,689,740 A | 11/1997 | Uchiyama |
| 5,691,768 A | 11/1997 | Civanlar et al. |
| 5,692,225 A | 11/1997 | Bernardi et al. |
| 5,696,892 A | 12/1997 | Redmann et al. |
| 5,696,913 A | 12/1997 | Gove et al. |
| 5,697,006 A | 12/1997 | Toguchi et al. |
| 5,699,102 A | 12/1997 | Ng et al. |
| 5,699,491 A | 12/1997 | Barzel |
| 5,703,961 A | 12/1997 | Rogina et al. |
| 5,706,049 A | 1/1998 | Moghadam et al. |
| 5,706,870 A | 1/1998 | Maerzke |
| 5,708,518 A | 1/1998 | Parker et al. |
| 5,708,900 A | 1/1998 | Yokoyama et al. |
| 5,709,253 A | 1/1998 | Maerzke |
| 5,710,582 A | 1/1998 | Hawkins et al. |
| 5,710,948 A | 1/1998 | Takagi |
| 5,713,678 A | 2/1998 | Smith et al. |
| 5,715,228 A | 2/1998 | Takiguchi |
| 5,715,234 A | 2/1998 | Stephenson et al. |
| 5,715,325 A | 2/1998 | Bang et al. |
| 5,715,493 A | 2/1998 | Stephenson |
| 5,717,197 A | 2/1998 | Petrie |
| 5,717,776 A | 2/1998 | Watanabe |
| 5,719,602 A | 2/1998 | Hackleman et al. |
| 5,719,621 A | 2/1998 | Tsunefuji |
| 5,719,936 A | 2/1998 | Hillenmayer |
| 5,719,970 A | 2/1998 | Aoki et al. |
| 5,722,055 A | 2/1998 | Kobayashi et al. |
| 5,722,893 A | 3/1998 | Hill et al. |
| 5,726,435 A | 3/1998 | Hara et al. |
| 5,726,693 A | 3/1998 | Sharma et al. |
| 5,726,772 A | 3/1998 | Parker et al. |
| 5,729,252 A | 3/1998 | Fraser |
| 5,729,471 A | 3/1998 | Jain et al. |
| 5,731,062 A | 3/1998 | Kim et al. |
| 5,731,829 A | 3/1998 | Saito et al. |
| 5,734,154 A | 3/1998 | Jachimowicz et al. |
| 5,734,414 A | 3/1998 | Nishimura et al. |
| 5,734,425 A | 3/1998 | Takizawa et al. |
| 5,737,729 A | 4/1998 | Denman |
| 5,740,480 A | 4/1998 | Kuhn et al. |
| 5,741,155 A | 4/1998 | Herman |
| 5,742,296 A | 4/1998 | Yamada et al. |
| 5,742,305 A | 4/1998 | Hackleman |
| 5,742,333 A | 4/1998 | Faris |
| 5,742,861 A | 4/1998 | Stephenson |
| 5,743,746 A | 4/1998 | Ho et al. |
| 5,745,175 A | 4/1998 | Anderson et al. |
| 5,748,202 A | 5/1998 | Nakatsuka et al. |
| 5,748,228 A | 5/1998 | Kobayashi et al. |
| 5,748,326 A | 5/1998 | Thompson-Bell et al. |
| 5,748,448 A | 5/1998 | Hokari |
| 5,748,764 A | 5/1998 | Benati et al. |
| 5,748,856 A | 5/1998 | Cariffe et al. |
| 5,749,551 A | 5/1998 | Torres et al. |
| 5,750,974 A | 5/1998 | Sasaki et al. |
| 5,751,303 A | 5/1998 | Erickson et al. |
| 5,751,318 A | 5/1998 | Granzow |
| 5,751,590 A | 5/1998 | Cannon et al. |
| 5,752,114 A | 5/1998 | Saito et al. |
| 5,753,344 A | 5/1998 | Jacobsen |
| 5,754,227 A | 5/1998 | Fukuoka |
| 5,754,677 A | 5/1998 | Kawada |
| 5,754,682 A | 5/1998 | Katoh |
| 5,754,690 A | 5/1998 | Jackson et al. |
| 5,754,700 A | 5/1998 | Kuzma |
| 5,755,519 A | 5/1998 | Klinefelter |
| 5,756,978 A | 5/1998 | Soltesz et al. |
| 5,757,354 A | 5/1998 | Kawamura |
| 5,757,388 A * | 5/1998 | Stephenson ...................... 347/2 |
| 5,757,393 A | 5/1998 | Suzuki |
| 5,760,814 A | 6/1998 | Kang |
| 5,761,200 A | 6/1998 | Hsieh |
| 5,761,219 A | 6/1998 | Maltsev |

(56) References Cited

U.S. PATENT DOCUMENTS

| | | |
|---|---|---|
| 5,761,698 A | 6/1998 | Combs |
| 5,761,726 A | 6/1998 | Guttag et al. |
| 5,764,248 A | 6/1998 | Scarpetti |
| 5,764,816 A | 6/1998 | Kohno et al. |
| 5,765,197 A | 6/1998 | Combs |
| 5,767,945 A | 6/1998 | Fields et al. |
| 5,768,382 A | 6/1998 | Schneier et al. |
| 5,768,482 A | 6/1998 | Winter et al. |
| 5,768,609 A * | 6/1998 | Gove et al. ............. 712/11 |
| 5,771,012 A | 6/1998 | Shu et al. |
| 5,771,245 A | 6/1998 | Zhang |
| 5,774,760 A | 6/1998 | Nagashima |
| 5,777,626 A | 7/1998 | Takashima et al. |
| 5,781,202 A | 7/1998 | Silverbrook |
| 5,781,708 A | 7/1998 | Austin et al. |
| 5,781,924 A | 7/1998 | Zaitzeva et al. |
| 5,784,076 A * | 7/1998 | Crump et al. ............. 345/519 |
| 5,784,088 A | 7/1998 | Ujita et al. |
| 5,784,434 A | 7/1998 | Shieh |
| 5,784,521 A | 7/1998 | Nakatani et al. |
| 5,784,959 A | 7/1998 | Larios |
| 5,787,193 A | 7/1998 | Balasubramanian |
| 5,788,387 A | 8/1998 | Takayama et al. |
| 5,788,388 A | 8/1998 | Cowger et al. |
| 5,790,158 A | 8/1998 | Shinada et al. |
| 5,790,193 A | 8/1998 | Ohmori |
| 5,790,699 A | 8/1998 | Jackson et al. |
| 5,792,249 A | 8/1998 | Shirota et al. |
| 5,793,423 A | 8/1998 | Hamasaki |
| 5,793,885 A | 8/1998 | Kasson |
| 5,793,900 A | 8/1998 | Nourbakhsh |
| 5,796,288 A | 8/1998 | Krech et al. |
| 5,796,429 A | 8/1998 | Suzuki et al. |
| 5,796,928 A | 8/1998 | Toyomura et al. |
| 5,801,657 A | 9/1998 | Fowler et al. |
| 5,801,736 A | 9/1998 | Ikkaitai et al. |
| 5,801,854 A | 9/1998 | Naylor, Jr. |
| 5,802,413 A | 9/1998 | Stephenson |
| 5,805,213 A | 9/1998 | Spaulding et al. |
| 5,805,296 A | 9/1998 | Hattori et al. |
| 5,805,550 A | 9/1998 | Ohmori |
| 5,805,883 A | 9/1998 | Saitoh |
| 5,805,936 A | 9/1998 | Matsuzaki et al. |
| 5,806,997 A | 9/1998 | Kawanabe |
| 5,808,631 A | 9/1998 | Silverbrook |
| 5,808,672 A | 9/1998 | Wakabayashi et al. |
| 5,809,181 A | 9/1998 | Metcalfe |
| 5,809,288 A | 9/1998 | Balmer |
| 5,809,292 A | 9/1998 | Wilkinson et al. |
| 5,809,331 A | 9/1998 | Staats et al. |
| 5,812,071 A | 9/1998 | Kairouz |
| 5,812,156 A | 9/1998 | Bullock et al. |
| 5,814,809 A | 9/1998 | Han |
| 5,815,186 A | 9/1998 | Lewis et al. |
| 5,815,211 A | 9/1998 | Umei |
| 5,816,918 A | 10/1998 | Kelly et al. |
| 5,818,023 A | 10/1998 | Meyerson et al. |
| 5,818,032 A | 10/1998 | Sun et al. |
| 5,819,240 A | 10/1998 | Kara |
| 5,819,662 A | 10/1998 | Koyabu |
| 5,821,886 A | 10/1998 | Son |
| 5,822,465 A | 10/1998 | Normile et al. |
| 5,822,606 A | 10/1998 | Morton |
| 5,822,608 A | 10/1998 | Dieffenderfer et al. |
| 5,822,623 A | 10/1998 | Urata et al. |
| 5,824,410 A | 10/1998 | Sakai et al. |
| 5,825,006 A | 10/1998 | Longacre et al. |
| 5,825,383 A | 10/1998 | Abe et al. |
| 5,825,882 A | 10/1998 | Kowalski et al. |
| 5,825,947 A | 10/1998 | Sasaki et al. |
| 5,826,263 A | 10/1998 | Nakabayashi |
| 5,826,333 A | 10/1998 | Iketani et al. |
| 5,828,578 A | 10/1998 | Blomgren |
| 5,828,911 A | 10/1998 | Miyazawa |
| 5,829,745 A | 11/1998 | Houle |
| 5,831,644 A | 11/1998 | Kato |
| 5,835,136 A | 11/1998 | Watanabe et al. |
| 5,835,616 A | 11/1998 | Lobo et al. |
| 5,835,641 A | 11/1998 | Sotoda et al. |
| 5,835,817 A | 11/1998 | Bullock et al. |
| 5,838,331 A | 11/1998 | Debry |
| 5,838,458 A | 11/1998 | Tsai |
| 5,841,126 A | 11/1998 | Fossum et al. |
| 5,841,441 A | 11/1998 | Smith |
| 5,841,513 A | 11/1998 | Yoshimura et al. |
| 5,841,885 A | 11/1998 | Neff et al. |
| 5,845,166 A | 12/1998 | Fellegara et al. |
| 5,847,698 A | 12/1998 | Reavey et al. |
| 5,847,836 A | 12/1998 | Suzuki |
| 5,848,255 A | 12/1998 | Kondo |
| 5,848,264 A | 12/1998 | Baird et al. |
| 5,848,307 A | 12/1998 | Uchiyama et al. |
| 5,848,420 A | 12/1998 | Xu |
| 5,850,234 A | 12/1998 | Kneezel et al. |
| 5,852,502 A | 12/1998 | Beckett |
| 5,852,673 A | 12/1998 | Young et al. |
| 5,854,648 A | 12/1998 | Hanabusa |
| 5,854,882 A | 12/1998 | Wang |
| 5,859,657 A | 1/1999 | Donahue et al. |
| 5,859,921 A | 1/1999 | Suzuki |
| 5,860,036 A | 1/1999 | Stephenson |
| 5,860,363 A | 1/1999 | Childers et al. |
| 5,861,897 A | 1/1999 | Ide et al. |
| 5,864,309 A | 1/1999 | Hung |
| 5,864,630 A | 1/1999 | Cosatto et al. |
| 5,866,253 A | 2/1999 | Philipps et al. |
| 5,866,895 A | 2/1999 | Fukuda et al. |
| 5,867,213 A | 2/1999 | Ouchi |
| 5,867,394 A | 2/1999 | LaDue et al. |
| 5,867,704 A | 2/1999 | Tanaka et al. |
| 5,869,595 A | 2/1999 | Fuller et al. |
| 5,870,102 A | 2/1999 | Tarolli et al. |
| 5,872,594 A | 2/1999 | Thompon |
| 5,874,718 A | 2/1999 | Matsui |
| 5,874,836 A | 2/1999 | Nowak et al. |
| 5,875,034 A | 2/1999 | Shintani et al. |
| 5,877,715 A | 3/1999 | Gowda et al. |
| 5,878,292 A | 3/1999 | Bell et al. |
| 5,881,211 A | 3/1999 | Matsumura |
| 5,882,128 A | 3/1999 | Hinojoas |
| 5,883,653 A | 3/1999 | Sasaki et al. |
| 5,883,663 A | 3/1999 | Siwko |
| 5,883,830 A | 3/1999 | Hirt et al. |
| 5,884,013 A | 3/1999 | Bosschaerts et al. |
| 5,884,118 A | 3/1999 | Mestha et al. |
| 5,886,371 A | 3/1999 | Shinagawa |
| 5,886,659 A | 3/1999 | Pain et al. |
| 5,887,992 A | 3/1999 | Yamanashi |
| 5,889,597 A | 3/1999 | Ara et al. |
| 5,892,540 A | 4/1999 | Kozlowski et al. |
| 5,893,037 A | 4/1999 | Reele et al. |
| 5,893,132 A | 4/1999 | Huffman et al. |
| 5,893,662 A | 4/1999 | Ito |
| 5,894,309 A | 4/1999 | Freeman et al. |
| 5,894,326 A | 4/1999 | McIntyre et al. |
| 5,896,122 A | 4/1999 | MacDonald et al. |
| 5,896,155 A | 4/1999 | Lebens et al. |
| 5,896,169 A | 4/1999 | Boelart |
| 5,896,176 A | 4/1999 | Das et al. |
| 5,896,403 A | 4/1999 | Nagasaki et al. |
| 5,900,909 A | 5/1999 | Parulski et al. |
| 5,901,242 A | 5/1999 | Crane et al. |
| 5,903,706 A | 5/1999 | Wakabayashi et al. |
| 5,905,529 A | 5/1999 | Inuiya et al. |
| 5,907,149 A | 5/1999 | Marckini |
| 5,907,354 A | 5/1999 | Cama et al. |
| 5,907,415 A | 5/1999 | Yabe |
| 5,907,434 A | 5/1999 | Sekine et al. |
| 5,909,227 A | 6/1999 | Silverbrook |
| 5,909,248 A | 6/1999 | Stephenson |
| 5,909,562 A | 6/1999 | Faget et al. |
| 5,911,056 A | 6/1999 | Faget et al. |
| 5,913,542 A | 6/1999 | Belucci et al. |
| 5,914,737 A | 6/1999 | Silverbrook |

(56) References Cited

U.S. PATENT DOCUMENTS

| | | |
|---|---|---|
| 5,914,748 A | 6/1999 | Parulksi et al. |
| 5,914,801 A | 6/1999 | Dhuler et al. |
| 5,914,996 A | 6/1999 | Huang |
| 5,915,027 A | 6/1999 | Cox et al. |
| 5,916,358 A | 6/1999 | Bagchi et al. |
| 5,917,542 A | 6/1999 | Moghadam et al. |
| 5,917,545 A | 6/1999 | Kowno et al. |
| 5,917,937 A | 6/1999 | Szeliski et al. |
| 5,917,963 A | 6/1999 | Miyake |
| 5,920,062 A | 7/1999 | Williams |
| 5,920,923 A | 7/1999 | Jillette |
| 5,921,686 A | 7/1999 | Baird et al. |
| 5,923,406 A | 7/1999 | Brasington et al. |
| 5,923,882 A | 7/1999 | Ho et al. |
| 5,924,737 A | 7/1999 | Schrupp |
| 5,929,946 A | 7/1999 | Sharp et al. |
| 5,930,528 A | 7/1999 | Ito et al. |
| 5,931,467 A | 8/1999 | Kamille |
| 5,933,137 A | 8/1999 | Anderson et al. |
| 5,933,179 A | 8/1999 | Fogle et al. |
| 5,937,063 A | 8/1999 | Davis |
| 5,937,089 A | 8/1999 | Kobayashi |
| 5,937,202 A | 8/1999 | Crosetto |
| 5,938,742 A | 8/1999 | Faddell et al. |
| 5,938,766 A | 8/1999 | Anderson et al. |
| 5,939,742 A | 8/1999 | Yiannoulos |
| 5,940,095 A | 8/1999 | Parish et al. |
| 5,946,007 A | 8/1999 | Otsuka et al. |
| 5,946,473 A | 8/1999 | Lotspiech et al. |
| 5,949,426 A | 9/1999 | Rich |
| 5,949,439 A | 9/1999 | Ben-Yoseph et al. |
| 5,949,458 A | 9/1999 | Studholme |
| 5,949,459 A | 9/1999 | Gasvoda et al. |
| 5,949,467 A | 9/1999 | Gunther et al. |
| 5,949,967 A | 9/1999 | Spaulding et al. |
| 5,955,817 A | 9/1999 | Dhuler et al. |
| 5,956,163 A | 9/1999 | Clarke et al. |
| 5,959,943 A | 9/1999 | Yonezawa |
| 5,960,412 A | 9/1999 | Tackbary et al. |
| RE36,338 E | 10/1999 | Fukuoka |
| 5,963,104 A | 10/1999 | Buer |
| 5,964,156 A | 10/1999 | Smith et al. |
| 5,965,871 A | 10/1999 | Zhou et al. |
| 5,966,134 A | 10/1999 | Arias |
| 5,966,553 A | 10/1999 | Nishitani et al. |
| 5,969,322 A | 10/1999 | Mori et al. |
| 5,971,533 A | 10/1999 | Kinoshita et al. |
| 5,971,641 A | 10/1999 | Looney |
| 5,973,664 A | 10/1999 | Badger |
| 5,973,733 A * | 10/1999 | Gove ........................ 348/208.13 |
| 5,973,751 A | 10/1999 | Ishida et al. |
| 5,974,168 A | 10/1999 | Rushmeier et al. |
| 5,974,190 A | 10/1999 | Maeda et al. |
| 5,974,234 A | 10/1999 | Levine et al. |
| 5,974,238 A | 10/1999 | Chase, Jr. |
| 5,977,982 A | 11/1999 | Lauzon |
| 5,978,100 A | 11/1999 | Kinjo |
| 5,978,511 A | 11/1999 | Horiuchi et al. |
| 5,978,609 A | 11/1999 | Aoki |
| 5,978,838 A | 11/1999 | Mohamed et al. |
| 5,980,010 A | 11/1999 | Stephenson |
| 5,982,378 A | 11/1999 | Kato |
| 5,982,424 A | 11/1999 | Simerly et al. |
| 5,982,853 A | 11/1999 | Liebermann |
| 5,984,193 A | 11/1999 | Uhling |
| 5,986,634 A | 11/1999 | Alioshin et al. |
| 5,986,671 A | 11/1999 | Fredlund et al. |
| 5,986,698 A | 11/1999 | Nobuoka |
| 5,986,706 A | 11/1999 | Hirasawa |
| 5,986,718 A | 11/1999 | Barwacz et al. |
| 5,988,900 A | 11/1999 | Bobry |
| 5,989,678 A | 11/1999 | Jacobson |
| 5,990,469 A | 11/1999 | Bechtel et al. |
| 5,990,948 A | 11/1999 | Sugiki |
| 5,990,973 A | 11/1999 | Sakamoto |
| 5,991,429 A | 11/1999 | Coffin et al. |
| 5,991,865 A | 11/1999 | Longhenry et al. |
| 5,992,994 A | 11/1999 | Rasmussen et al. |
| 5,995,193 A | 11/1999 | Stephany et al. |
| 5,995,772 A | 11/1999 | Barry et al. |
| 5,996,893 A | 12/1999 | Soscia |
| 5,997,124 A | 12/1999 | Capps et al. |
| 5,999,190 A | 12/1999 | Sheasby et al. |
| 5,999,203 A | 12/1999 | Cane et al. |
| 5,999,697 A | 12/1999 | Murase et al. |
| 6,000,614 A | 12/1999 | Yang et al. |
| 6,000,621 A | 12/1999 | Hecht et al. |
| 6,000,773 A | 12/1999 | Murray et al. |
| 6,000,791 A | 12/1999 | Scheffelin et al. |
| 6,005,582 A | 12/1999 | Gabriel et al. |
| 6,005,613 A | 12/1999 | Endsley et al. |
| 6,006,020 A | 12/1999 | Cutter |
| 6,006,039 A | 12/1999 | Steinberg et al. |
| 6,007,195 A | 12/1999 | Kokubo |
| 6,009,188 A | 12/1999 | Cohen et al. |
| 6,010,065 A | 1/2000 | Ramachandran et al. |
| 6,011,536 A | 1/2000 | Hertzmann et al. |
| 6,011,585 A | 1/2000 | Anderson |
| 6,011,923 A | 1/2000 | Solomon et al. |
| 6,011,937 A | 1/2000 | Chaussade et al. |
| 6,014,165 A | 1/2000 | McIntyre et al. |
| 6,014,170 A | 1/2000 | Pont et al. |
| 6,014,457 A | 1/2000 | Kubo et al. |
| 6,015,211 A | 1/2000 | Kinoshita et al. |
| 6,016,184 A | 1/2000 | Haneda |
| RE36,589 E | 2/2000 | Akamine et al. |
| 6,019,449 A | 2/2000 | Bullock et al. |
| 6,019,461 A | 2/2000 | Yoshiumura et al. |
| 6,019,466 A | 2/2000 | Hermanson |
| 6,020,898 A | 2/2000 | Saito et al. |
| 6,020,920 A | 2/2000 | Anderson |
| 6,020,931 A | 2/2000 | Bilbrey et al. |
| 6,022,099 A | 2/2000 | Chwalek et al. |
| 6,022,274 A | 2/2000 | Takeda et al. |
| 6,023,524 A | 2/2000 | Yamaguchi |
| 6,023,757 A | 2/2000 | Nishimoto et al. |
| 6,028,611 A | 2/2000 | Anderson et al. |
| 6,032,861 A | 3/2000 | Lemelson et al. |
| 6,033,137 A | 3/2000 | Ito |
| 6,034,740 A | 3/2000 | Mitsui et al. |
| 6,035,214 A | 3/2000 | Henderson |
| 6,037,915 A | 3/2000 | Matsueda et al. |
| 6,038,491 A | 3/2000 | McGarry et al. |
| 6,039,430 A | 3/2000 | Helterline et al. |
| 6,040,849 A | 3/2000 | McIntyre et al. |
| 6,042,213 A | 3/2000 | Hayasaki et al. |
| 6,043,821 A | 3/2000 | Sprague et al. |
| 6,044,428 A | 3/2000 | Rayabhari |
| 6,046,768 A | 4/2000 | Kaneda et al. |
| 6,047,130 A | 4/2000 | Oles |
| 6,048,269 A | 4/2000 | Burns et al. |
| 6,049,450 A | 4/2000 | Cho et al. |
| 6,050,669 A | 4/2000 | Yano et al. |
| 6,052,648 A | 4/2000 | Burfeind et al. |
| 6,053,407 A | 4/2000 | Wang et al. |
| 6,056,286 A | 5/2000 | Koga |
| 6,057,850 A | 5/2000 | Kichury |
| 6,058,498 A | 5/2000 | Nagasaki et al. |
| 6,061,179 A | 5/2000 | Inoguchi et al. |
| 6,062,667 A | 5/2000 | Matsui et al. |
| 6,062,681 A | 5/2000 | Field et al. |
| 6,064,492 A | 5/2000 | Eldridge et al. |
| 6,067,088 A | 5/2000 | Tanioka et al. |
| 6,069,642 A | 5/2000 | Isobe |
| 6,069,711 A | 5/2000 | Iwata |
| 6,070,013 A | 5/2000 | Cosgrove et al. |
| 6,072,586 A | 6/2000 | Bhargava et al. |
| 6,073,034 A | 6/2000 | Jacobsen |
| 6,074,042 A | 6/2000 | Gasvoda et al. |
| 6,074,111 A | 6/2000 | Kasahara et al. |
| 6,075,882 A | 6/2000 | Mullins et al. |
| 6,076,913 A | 6/2000 | Garcia et al. |
| 6,078,307 A | 6/2000 | Daly |
| 6,078,758 A | 6/2000 | Patton et al. |

(56) References Cited

U.S. PATENT DOCUMENTS

| | | |
|---|---|---|
| 6,081,284 A | 6/2000 | Tosaka et al. |
| 6,081,422 A | 6/2000 | Ganthier et al. |
| 6,082,581 A | 7/2000 | Anderson et al. |
| 6,084,713 A | 7/2000 | Rosenthal |
| 6,085,037 A | 7/2000 | Zawodny et al. |
| 6,087,638 A | 7/2000 | Silverbrook |
| 6,088,025 A | 7/2000 | Akamine et al. |
| 6,088,530 A | 7/2000 | Rydelek et al. |
| 6,091,514 A | 7/2000 | Hasegawa et al. |
| 6,091,909 A | 7/2000 | McIntyre et al. |
| 6,094,221 A | 7/2000 | Anderson |
| 6,094,223 A | 7/2000 | Kobayashi |
| 6,094,279 A | 7/2000 | Soscia |
| 6,094,280 A | 7/2000 | Hayasaki et al. |
| 6,094,282 A | 7/2000 | Hoda et al. |
| 6,095,418 A | 8/2000 | Swartz et al. |
| 6,095,566 A | 8/2000 | Yamamoto et al. |
| 6,095,633 A | 8/2000 | Harshbarger et al. |
| 6,097,431 A | 8/2000 | Anderson et al. |
| 6,102,289 A | 8/2000 | Gabrielson |
| 6,102,505 A | 8/2000 | McIntyre et al. |
| 6,104,430 A | 8/2000 | Fukuoka |
| 6,106,147 A | 8/2000 | Silverbrook |
| 6,107,988 A | 8/2000 | Phillipps |
| 6,111,598 A | 8/2000 | Faris |
| 6,111,605 A | 8/2000 | Suzuki |
| 6,115,131 A | 9/2000 | Payne |
| 6,115,137 A | 9/2000 | Ozawa et al. |
| 6,115,837 A | 9/2000 | Nguyen et al. |
| 6,116,510 A | 9/2000 | Nishino |
| 6,116,715 A | 9/2000 | Lefebvre et al. |
| 6,118,484 A | 9/2000 | Yokota et al. |
| 6,118,485 A | 9/2000 | Hinoue et al. |
| 6,118,554 A | 9/2000 | Horaguchi |
| 6,119,931 A | 9/2000 | Novogrod |
| 6,119,944 A | 9/2000 | Mulla et al. |
| 6,120,379 A | 9/2000 | Tanaka et al. |
| 6,121,990 A | 9/2000 | Fujiwara |
| 6,122,403 A | 9/2000 | Rhoads |
| 6,122,526 A | 9/2000 | Parulski et al. |
| 6,123,263 A | 9/2000 | Feng |
| 6,124,892 A | 9/2000 | Nakano |
| 6,126,268 A | 10/2000 | Askeland et al. |
| 6,128,035 A | 10/2000 | Kai et al. |
| 6,128,446 A | 10/2000 | Schrock et al. |
| 6,131,807 A | 10/2000 | Fukuda et al. |
| 6,133,951 A | 10/2000 | Miyadera |
| 6,133,954 A | 10/2000 | Jie et al. |
| 6,134,030 A | 10/2000 | Kaneko et al. |
| 6,134,339 A | 10/2000 | Luo |
| 6,134,353 A | 10/2000 | Makram-Ebeid |
| 6,135,586 A | 10/2000 | McClelland et al. |
| 6,136,212 A | 10/2000 | Mastrangelo et al. |
| 6,137,495 A | 10/2000 | Gondek |
| 6,137,509 A | 10/2000 | Hayasaki |
| 6,137,521 A | 10/2000 | Matsui |
| 6,137,525 A | 10/2000 | Lee et al. |
| 6,141,036 A | 10/2000 | Katayama et al. |
| 6,141,431 A | 10/2000 | Munetsugu et al. |
| 6,144,414 A | 11/2000 | Toba |
| 6,145,025 A | 11/2000 | Lim |
| 6,147,682 A | 11/2000 | Kim |
| 6,147,704 A | 11/2000 | Ito et al. |
| 6,149,256 A | 11/2000 | McIntyre et al. |
| 6,151,049 A | 11/2000 | Karita et al. |
| 6,151,073 A | 11/2000 | Steinberg et al. |
| 6,152,374 A | 11/2000 | Moriyama et al. |
| 6,152,619 A | 11/2000 | Silverbrook |
| 6,154,254 A | 11/2000 | Hawkins et al. |
| 6,157,394 A | 12/2000 | Anderson et al. |
| 6,158,907 A | 12/2000 | Silverbrook et al. |
| 6,160,633 A | 12/2000 | Mori |
| 6,160,642 A | 12/2000 | Mui et al. |
| 6,161,203 A | 12/2000 | Zuranski et al. |
| 6,161,915 A | 12/2000 | Bolash et al. |
| 6,163,338 A | 12/2000 | Johnson et al. |
| 6,163,340 A | 12/2000 | Yasuda |
| 6,163,361 A | 12/2000 | McIntyre et al. |
| 6,166,826 A | 12/2000 | Yokoyama |
| 6,166,832 A | 12/2000 | Fujimoto |
| 6,167,551 A | 12/2000 | Nguyen et al. |
| 6,167,806 B1 | 1/2001 | Chretinat et al. |
| 6,169,854 B1 | 1/2001 | Hasegawa et al. |
| 6,170,943 B1 | 1/2001 | Wen et al. |
| 6,172,688 B1 | 1/2001 | Iwasaki |
| 6,172,706 B1 | 1/2001 | Tasumi |
| 6,177,683 B1 | 1/2001 | Kolesar et al. |
| 6,178,271 B1 | 1/2001 | Maas, III |
| 6,178,883 B1 | 1/2001 | Satoh et al. |
| 6,180,312 B1 | 1/2001 | Edwards |
| 6,181,361 B1 | 1/2001 | Bluteau et al. |
| 6,181,377 B1 | 1/2001 | Kobayashi |
| 6,181,379 B1 | 1/2001 | Kingetsu et al. |
| 6,182,901 B1 | 2/2001 | Hecht et al. |
| 6,188,430 B1 | 2/2001 | Motai |
| 6,188,431 B1 | 2/2001 | Oie |
| 6,191,406 B1 | 2/2001 | Nelson et al. |
| 6,195,513 B1 | 2/2001 | Nihei et al. |
| 6,196,541 B1 | 3/2001 | Silverbrook |
| 6,196,739 B1 | 3/2001 | Silverbrook |
| 6,198,489 B1 | 3/2001 | Salesin et al. |
| 6,199,874 B1 | 3/2001 | Galvin et al. |
| 6,199,969 B1 | 3/2001 | Haflinger et al. |
| 6,200,216 B1 | 3/2001 | Peppel |
| 6,201,571 B1 | 3/2001 | Ota |
| 6,203,147 B1 | 3/2001 | Battey et al. |
| 6,204,877 B1 | 3/2001 | Kiyokawa |
| 6,205,245 B1 | 3/2001 | Yuan et al. |
| 6,211,909 B1 * | 4/2001 | Maeshima et al. ....... 348/207.99 |
| 6,211,911 B1 | 4/2001 | Komiya et al. |
| 6,213,588 B1 | 4/2001 | Silverbrook |
| 6,215,561 B1 | 4/2001 | Kakutani |
| 6,217,165 B1 | 4/2001 | Silverbrook |
| 6,219,227 B1 | 4/2001 | Trane |
| 6,219,229 B1 | 4/2001 | Lee |
| 6,222,452 B1 | 4/2001 | Ahlstrom et al. |
| 6,222,637 B1 | 4/2001 | Ito et al. |
| 6,226,015 B1 | 5/2001 | Danneels |
| 6,227,643 B1 | 5/2001 | Purcell et al. |
| 6,229,565 B1 | 5/2001 | Bobry |
| 6,229,621 B1 | 5/2001 | Kulakowski et al. |
| 6,231,148 B1 | 5/2001 | Silverbrook |
| 6,232,996 B1 | 5/2001 | Takahashi et al. |
| 6,233,014 B1 | 5/2001 | Ochi et al. |
| 6,234,389 B1 | 5/2001 | Valliani et al. |
| 6,234,392 B1 | 5/2001 | Murakami |
| 6,234,608 B1 | 5/2001 | Genovese et al. |
| 6,236,431 B1 | 5/2001 | Hirasawa et al. |
| 6,236,433 B1 | 5/2001 | Acharya et al. |
| 6,238,033 B1 | 5/2001 | Silverbrook |
| 6,238,043 B1 | 5/2001 | Silverbrook |
| 6,238,044 B1 | 5/2001 | Silverbrook |
| 6,238,111 B1 | 5/2001 | Silverbrook |
| 6,241,350 B1 | 6/2001 | Otsuka et al. |
| 6,241,530 B1 | 6/2001 | Eddy et al. |
| 6,243,131 B1 | 6/2001 | Martin |
| 6,246,827 B1 | 6/2001 | Strolle et al. |
| 6,252,971 B1 | 6/2001 | Wang |
| 6,252,976 B1 | 6/2001 | Schildkraut et al. |
| 6,254,477 B1 | 7/2001 | Sasaki et al. |
| 6,256,666 B1 | 7/2001 | Singhal |
| 6,259,469 B1 | 7/2001 | Ejima et al. |
| 6,260,137 B1 | 7/2001 | Fleck et al. |
| 6,262,769 B1 | 7/2001 | Anderson et al. |
| 6,267,520 B1 | 7/2001 | Unno et al. |
| 6,268,882 B1 | 7/2001 | Elberbaum |
| 6,269,217 B1 | 7/2001 | Rodriguez |
| 6,270,177 B1 | 8/2001 | King et al. |
| 6,270,271 B1 | 8/2001 | Fujiwara |
| 6,273,340 B1 | 8/2001 | Rivailler |
| 6,273,535 B1 | 8/2001 | Inoue et al. |
| 6,275,239 B1 | 8/2001 | Ezer et al. |
| 6,276,850 B1 | 8/2001 | Silverbrook et al. |
| 6,278,481 B1 | 8/2001 | Schmidt |

(56) References Cited

U.S. PATENT DOCUMENTS

| | | | |
|---|---|---|---|
| 6,278,486 B1 | 8/2001 | Hieda et al. |
| 6,278,491 B1 | 8/2001 | Wang et al. |
| 6,280,106 B1 | 8/2001 | Juan et al. |
| 6,282,082 B1 | 8/2001 | Armitage et al. |
| 6,285,410 B1 | 9/2001 | Marai |
| 6,290,334 B1 | 9/2001 | Ishinaga et al. |
| 6,290,349 B1 | 9/2001 | Silverbrook et al. |
| 6,292,272 B1 | 9/2001 | Okauchi et al. |
| 6,292,574 B1 | 9/2001 | Schildkraut et al. |
| 6,293,469 B1 | 9/2001 | Masson et al. |
| 6,293,658 B1 | 9/2001 | Silverbrook |
| 6,294,101 B1 | 9/2001 | Silverbrook |
| 6,297,872 B1 | 10/2001 | Inamura et al. |
| 6,300,976 B1 | 10/2001 | Fukuoka |
| 6,302,329 B1 | 10/2001 | Iwai et al. |
| 6,304,291 B1 | 10/2001 | Silverbrook |
| 6,304,345 B1 | 10/2001 | Patton et al. |
| 6,304,684 B1 | 10/2001 | Niczyporuk et al. |
| 6,304,825 B1 | 10/2001 | Nowak et al. |
| 6,305,775 B1 | 10/2001 | Ohtsuka et al. |
| 6,312,070 B1 | 11/2001 | Silverbrook |
| 6,312,114 B1 | 11/2001 | Silverbrook |
| 6,315,200 B1 | 11/2001 | Silverbrook |
| 6,315,384 B1 | 11/2001 | Kamaswami et al. |
| 6,317,156 B1 | 11/2001 | Nagasaki et al. |
| 6,317,192 B1 | 11/2001 | Silverbrook et al. |
| 6,318,826 B1 | 11/2001 | Frager et al. |
| 6,320,591 B1 | 11/2001 | Griencewic |
| 6,320,617 B1 | 11/2001 | Gee et al. |
| 6,322,181 B1 | 11/2001 | Silverbrook |
| 6,323,912 B1 | 11/2001 | McIntyre |
| 6,325,380 B1 | 12/2001 | Feigl et al. |
| 6,325,488 B1 | 12/2001 | Beerling et al. |
| 6,328,395 B1 | 12/2001 | Kitahara et al. |
| 6,331,867 B1 | 12/2001 | Eberhard et al. |
| 6,334,587 B1 | 1/2002 | Roder |
| 6,337,712 B1 | 1/2002 | Shiota et al. |
| 6,341,845 B1 | 1/2002 | Scheffelin et al. |
| 6,344,904 B1 | 2/2002 | Mercer |
| 6,353,680 B1 * | 3/2002 | Hazra et al. ............... 382/232 |
| 6,356,276 B1 | 3/2002 | Acharya |
| 6,356,308 B1 | 3/2002 | Havanky |
| 6,356,357 B1 | 3/2002 | Anderson et al. |
| 6,357,865 B1 | 3/2002 | Kubby et al. |
| 6,359,650 B1 | 3/2002 | Murakami |
| 6,362,868 B1 | 3/2002 | Silverbrook |
| 6,363,239 B1 | 3/2002 | Tutt et al. |
| 6,366,319 B1 | 4/2002 | Bills |
| 6,366,694 B1 | 4/2002 | Acharya |
| 6,370,558 B1 | 4/2002 | Guttag et al. |
| 6,375,301 B1 | 4/2002 | Childers et al. |
| 6,375,314 B1 | 4/2002 | Reed et al. |
| 6,377,715 B1 | 4/2002 | Fujieda et al. |
| 6,378,997 B1 | 4/2002 | Nitta |
| 6,381,418 B1 | 4/2002 | Spurr et al. |
| 6,386,675 B2 | 5/2002 | Wilson et al. |
| 6,386,772 B1 | 5/2002 | Klinefelter et al. |
| 6,389,183 B1 | 5/2002 | Han |
| 6,390,368 B1 | 5/2002 | Edwards |
| 6,390,589 B1 | 5/2002 | Imanaka et al. |
| 6,392,699 B1 | 5/2002 | Acharya |
| 6,402,308 B1 | 6/2002 | Hattori et al. |
| 6,404,511 B1 | 6/2002 | Lin et al. |
| 6,405,055 B1 | 6/2002 | Silverbrook et al. |
| 6,407,777 B1 | 6/2002 | DeLuca |
| 6,416,152 B1 | 7/2002 | Matsuzaki et al. |
| 6,421,050 B1 | 7/2002 | Ruml et al. |
| 6,425,661 B1 | 7/2002 | Silverbrook et al. |
| 6,431,669 B1 | 8/2002 | Silverbrook |
| 6,431,703 B2 | 8/2002 | Rousseau et al. |
| 6,437,849 B1 | 8/2002 | DeClerck et al. |
| 6,441,921 B1 | 8/2002 | Soscia |
| 6,442,336 B1 | 8/2002 | Lemelson |
| 6,442,525 B1 | 8/2002 | Silverbrook et al. |
| 6,445,417 B1 | 9/2002 | Yoshida et al. |
| 6,454,375 B2 | 9/2002 | Wilson et al. |
| 6,462,835 B1 | 10/2002 | Loushin et al. |
| 6,466,618 B1 | 10/2002 | Messing et al. |
| 6,472,052 B1 | 10/2002 | Silverbrook |
| 6,473,123 B1 | 10/2002 | Anderson |
| 6,473,728 B1 | 10/2002 | Tognazzini |
| 6,489,990 B1 | 12/2002 | Popovich |
| 6,493,029 B1 | 12/2002 | Denyer et al. |
| 6,493,031 B1 | 12/2002 | Washizawa |
| 6,496,654 B1 | 12/2002 | Silverbrook |
| 6,515,761 B2 | 2/2003 | Aoto et al. |
| 6,522,767 B1 | 2/2003 | Moskowitz et al. |
| 6,525,763 B1 | 2/2003 | Maeda |
| 6,526,181 B1 | 2/2003 | Smith et al. |
| 6,529,287 B1 | 3/2003 | Wang et al. |
| 6,529,522 B1 | 3/2003 | Ito et al. |
| 6,530,519 B1 | 3/2003 | Suzuki |
| 6,533,181 B1 | 3/2003 | Roxby et al. |
| 6,539,180 B1 | 3/2003 | King |
| 6,542,622 B1 | 4/2003 | Nelson et al. |
| 6,543,880 B1 | 4/2003 | Akhavain et al. |
| 6,546,187 B1 | 4/2003 | Miyazaki et al. |
| 6,547,364 B2 | 4/2003 | Silverbrook |
| 6,549,575 B1 | 4/2003 | Butter et al. |
| 6,552,743 B1 | 4/2003 | Rissman |
| 6,552,821 B2 | 4/2003 | Suzuki |
| 6,553,459 B1 | 4/2003 | Silverbrook et al. |
| 6,556,245 B1 | 4/2003 | Holmberg |
| 6,563,538 B1 | 5/2003 | Utagawa |
| 6,565,196 B2 | 5/2003 | Matsuo et al. |
| 6,570,616 B1 | 5/2003 | Chen |
| 6,571,021 B1 | 5/2003 | Braudaway |
| 6,573,927 B2 | 6/2003 | Parulski et al. |
| 6,573,932 B1 | 6/2003 | Adams et al. |
| 6,573,936 B2 | 6/2003 | Morris et al. |
| 6,573,939 B1 | 6/2003 | Yokoyama |
| 6,574,363 B1 | 6/2003 | Classen et al. |
| 6,577,818 B2 | 6/2003 | Hirano |
| 6,583,820 B1 | 6/2003 | Hung |
| 6,587,140 B2 | 7/2003 | No |
| 6,593,938 B1 | 7/2003 | Sakata et al. |
| 6,597,384 B1 | 7/2003 | Harrison |
| 6,597,394 B1 | 7/2003 | Duncan et al. |
| 6,597,468 B1 | 7/2003 | Inuiya |
| 6,597,817 B1 | 7/2003 | Silverbrook |
| 6,599,196 B2 | 7/2003 | Kikukawa et al. |
| 6,600,930 B1 | 7/2003 | Sakurai et al. |
| 6,603,864 B1 | 8/2003 | Matsunoshita |
| 6,606,171 B1 | 8/2003 | Renk et al. |
| 6,607,267 B2 | 8/2003 | Testardi et al. |
| 6,608,297 B2 | 8/2003 | Neukermans et al. |
| 6,611,631 B1 | 8/2003 | Blair et al. |
| 6,614,560 B1 | 9/2003 | Silverbrook |
| 6,614,914 B1 | 9/2003 | Rhoads et al. |
| 6,618,091 B1 | 9/2003 | Tamura |
| 6,618,117 B2 | 9/2003 | Silverbrook |
| 6,618,553 B1 | 9/2003 | Shiohara |
| 6,619,774 B1 | 9/2003 | Kawai et al. |
| 6,619,860 B1 | 9/2003 | Simon |
| 6,622,276 B2 | 9/2003 | Nagasaki et al. |
| 6,622,923 B1 | 9/2003 | Walmsley et al. |
| 6,624,848 B1 | 9/2003 | Silverbrook et al. |
| 6,626,529 B1 | 9/2003 | King et al. |
| 6,627,870 B1 | 9/2003 | Lapstun et al. |
| 6,628,326 B1 | 9/2003 | Manico et al. |
| 6,628,333 B1 | 9/2003 | Gowda et al. |
| 6,628,430 B1 | 9/2003 | Silverbrook et al. |
| 6,633,332 B1 | 10/2003 | Nay et al. |
| 6,633,667 B1 | 10/2003 | Matsuoka |
| 6,634,814 B2 | 10/2003 | Spurr et al. |
| 6,636,216 B1 | 10/2003 | Silverbrook et al. |
| 6,636,332 B1 | 10/2003 | Soscia |
| 6,640,004 B2 | 10/2003 | Katayama et al. |
| 6,642,956 B1 | 11/2003 | Safai |
| 6,644,764 B2 | 11/2003 | Stephens, Jr. |
| 6,646,757 B1 | 11/2003 | Silverbrook |
| 6,647,369 B1 | 11/2003 | Silverbrook et al. |
| 6,650,317 B1 | 11/2003 | Boone et al. |
| 6,650,365 B1 | 11/2003 | Sato |

(56) References Cited

U.S. PATENT DOCUMENTS

| | | |
|---|---|---|
| 6,650,366 B2 | 11/2003 | Parulski et al. |
| 6,650,975 B2 | 11/2003 | Ruffner |
| 6,652,089 B2 | 11/2003 | Silverbrook |
| 6,652,090 B2 | 11/2003 | Silverbrook |
| 6,654,051 B1 | 11/2003 | Fujita et al. |
| 6,654,057 B1 | 11/2003 | Rhodes |
| 6,655,776 B2 | 12/2003 | Murray |
| 6,657,657 B1 | 12/2003 | Sato |
| 6,665,454 B1 | 12/2003 | Silverbrook et al. |
| 6,667,759 B2 | 12/2003 | Gerszberg et al. |
| 6,667,771 B1 | 12/2003 | Kweon |
| 6,670,950 B1 | 12/2003 | Chin et al. |
| 6,670,985 B2 | 12/2003 | Karube et al. |
| 6,678,402 B2 | 1/2004 | Jones et al. |
| 6,680,749 B1 | 1/2004 | Anderson et al. |
| 6,681,055 B1 | 1/2004 | Sato |
| 6,683,996 B1 | 1/2004 | Walmsley |
| 6,686,970 B1 | 2/2004 | Windle |
| 6,687,383 B1 | 2/2004 | Kanevsky et al. |
| 6,688,528 B2 | 2/2004 | Silverbrook |
| 6,688,739 B2 | 2/2004 | Murray |
| 6,690,731 B1 | 2/2004 | Gough et al. |
| 6,690,881 B1 | 2/2004 | Tomita et al. |
| 6,691,922 B2 | 2/2004 | Brooks et al. |
| 6,697,107 B1 | 2/2004 | Hamilton et al. |
| 6,697,174 B2 | 2/2004 | Mercer |
| 6,700,619 B1 | 3/2004 | Hamamura |
| 6,701,361 B1 | 3/2004 | Meier |
| 6,702,417 B2 | 3/2004 | Silverbrook |
| 6,704,046 B2 | 3/2004 | Dyas et al. |
| 6,710,892 B2 | 3/2004 | Narushima |
| 6,719,415 B1 | 4/2004 | Hattori |
| 6,726,306 B2 | 4/2004 | Keyes et al. |
| 6,727,948 B1 | 4/2004 | Silverbrook |
| 6,727,951 B1 | 4/2004 | Silverbrook |
| 6,731,952 B2 | 5/2004 | Schaeffer et al. |
| 6,732,924 B2 | 5/2004 | Ishigame et al. |
| 6,736,321 B2 | 5/2004 | Tsikos et al. |
| 6,738,096 B1 | 5/2004 | Silverbrook |
| 6,738,903 B1 | 5/2004 | Haines et al. |
| 6,741,871 B1 | 5/2004 | Silverbrook |
| 6,742,887 B2 | 6/2004 | Ando |
| 6,744,526 B2 | 6/2004 | McDermott et al. |
| 6,745,331 B1 | 6/2004 | Silverbrook |
| 6,749,301 B2 | 6/2004 | Silverbrook et al. |
| 6,750,901 B1 | 6/2004 | Silverbrook |
| 6,750,944 B2 | 6/2004 | Silverbrook et al. |
| 6,760,164 B2 | 7/2004 | Togino |
| 6,771,811 B1 | 8/2004 | Walmsley et al. |
| 6,773,874 B2 | 8/2004 | Silverbrook |
| 6,788,336 B1 | 9/2004 | Silverbrook et al. |
| 6,791,605 B1 | 9/2004 | Reele et al. |
| 6,795,651 B2 | 9/2004 | Silverbrook |
| 6,803,989 B2 | 10/2004 | Silverbrook |
| 6,807,315 B1 | 10/2004 | Walmsley et al. |
| 6,812,972 B1 | 11/2004 | Silverbrook et al. |
| 6,820,968 B2 | 11/2004 | Silverbrook |
| 6,823,198 B2 | 11/2004 | Kobayashi |
| 6,824,257 B2 | 11/2004 | Silverbrook |
| 6,831,681 B1 | 12/2004 | Silverbrook |
| 6,835,135 B1 | 12/2004 | Silverbrook et al. |
| 6,837,635 B1 | 1/2005 | Juan |
| 6,847,686 B2 | 1/2005 | Morad |
| 6,847,883 B1 | 1/2005 | Walmsley et al. |
| 6,854,836 B2 | 2/2005 | Ishinaga et al. |
| 6,858,837 B2 | 2/2005 | Tabata |
| 6,859,225 B1 | 2/2005 | Silverbrook et al. |
| 6,867,882 B2 | 3/2005 | Takahashi |
| 6,870,566 B1 | 3/2005 | Koide et al. |
| 6,870,966 B1 | 3/2005 | Silverbrook et al. |
| 6,879,341 B1 | 4/2005 | Silverbrook |
| 6,882,364 B1 | 4/2005 | Inuiya et al. |
| 6,883,910 B2 | 4/2005 | King et al. |
| 6,888,649 B2 | 5/2005 | Suzuki |
| 6,894,794 B1 | 5/2005 | Patton et al. |
| 6,903,766 B1 | 6/2005 | Silverbrook et al. |
| 6,906,778 B2 | 6/2005 | Silverbrook |
| 6,909,456 B1 | 6/2005 | Sasaki |
| 6,913,875 B2 | 7/2005 | Silverbrook et al. |
| 6,914,686 B2 | 7/2005 | Silverbrook et al. |
| 6,915,140 B2 | 7/2005 | Silverbrook |
| 6,918,542 B2 | 7/2005 | Silverbrook et al. |
| 6,918,654 B2 | 7/2005 | Silverbrook |
| 6,924,835 B1 | 8/2005 | Silverbrook et al. |
| 6,942,334 B2 | 9/2005 | Silverbrook et al. |
| 6,948,661 B2 | 9/2005 | Silverbrook et al. |
| 6,951,390 B2 | 10/2005 | King et al. |
| 6,953,235 B2 | 10/2005 | Silverbrook |
| 6,954,254 B2 | 10/2005 | Silverbrook |
| 6,958,207 B1 | 10/2005 | Khusnatdinov et al. |
| RE38,896 E | 11/2005 | Anderson |
| 6,965,691 B2 | 11/2005 | Walmsley et al. |
| 6,967,741 B1 | 11/2005 | Silverbrook et al. |
| 6,967,750 B2 | 11/2005 | Silverbrook |
| 6,975,429 B1 | 12/2005 | Walmsley et al. |
| 6,977,685 B1 | 12/2005 | Acosta-Serafini et al. |
| 6,981,765 B2 | 1/2006 | King et al. |
| 6,981,769 B2 | 1/2006 | Silverbrook |
| 6,985,207 B2 | 1/2006 | Silverbrook |
| 6,995,790 B2 | 2/2006 | Higurashi et al. |
| 6,999,206 B2 | 2/2006 | Silverbrook |
| 7,006,134 B1 | 2/2006 | Arai et al. |
| 7,018,294 B2 | 3/2006 | Silverbrook et al. |
| 7,041,916 B2 | 5/2006 | Paul |
| 7,044,589 B2 | 5/2006 | Silverbrook |
| 7,050,143 B1 | 5/2006 | Silverbrook et al. |
| 7,058,219 B2 | 6/2006 | Walmsley et al. |
| 7,063,408 B2 | 6/2006 | Silverbrook et al. |
| 7,063,940 B2 | 6/2006 | Silverbrook |
| 7,068,308 B2 | 6/2006 | Feldis, III |
| 7,070,270 B2 | 7/2006 | King et al. |
| 7,075,684 B2 | 7/2006 | Silverbrook |
| 7,077,515 B2 | 7/2006 | Silverbrook |
| 7,077,748 B2 | 7/2006 | Silverbrook et al. |
| 7,079,292 B2 | 7/2006 | Silverbrook et al. |
| 7,081,974 B2 | 7/2006 | Silverbrook |
| 7,083,108 B2 | 8/2006 | Silverbrook et al. |
| 7,084,951 B2 | 8/2006 | Silverbrook |
| 7,086,724 B2 | 8/2006 | Silverbrook et al. |
| 7,092,011 B2 | 8/2006 | Silverbrook et al. |
| 7,092,130 B2 | 8/2006 | Silverbrook et al. |
| 7,095,433 B1 | 8/2006 | Touma et al. |
| 7,095,533 B2 | 8/2006 | Silverbrook et al. |
| 7,097,263 B2 | 8/2006 | Silverbrook |
| 7,099,033 B2 | 8/2006 | Silverbrook |
| 7,099,051 B2 | 8/2006 | Silverbrook |
| 7,101,034 B2 | 9/2006 | King et al. |
| 7,108,343 B2 | 9/2006 | King et al. |
| 7,110,024 B1 | 9/2006 | Silverbrook et al. |
| 7,110,139 B2 | 9/2006 | Silverbrook |
| 7,116,355 B1 | 10/2006 | Omura et al. |
| 7,118,481 B2 | 10/2006 | Silverbrook et al. |
| 7,119,836 B2 | 10/2006 | Silverbrook |
| 7,125,337 B2 | 10/2006 | Silverbrook |
| 7,125,338 B2 | 10/2006 | Silverbrook |
| 7,130,075 B2 | 10/2006 | Silverbrook |
| 7,136,186 B2 | 11/2006 | Silverbrook |
| 7,136,198 B2 | 11/2006 | Silverbrook |
| 7,139,025 B1 | 11/2006 | Berezin |
| 7,140,723 B2 | 11/2006 | Silverbrook |
| 7,140,726 B2 | 11/2006 | Silverbrook |
| 7,143,944 B2 | 12/2006 | Lapstun et al. |
| 7,145,689 B2 | 12/2006 | Silverbrook |
| 7,146,179 B2 | 12/2006 | Parulski et al. |
| 7,147,294 B2 | 12/2006 | Silverbrook |
| 7,148,993 B2 | 12/2006 | Silverbrook |
| 7,152,805 B2 | 12/2006 | Walmsley et al. |
| 7,154,580 B2 | 12/2006 | Silverbrook |
| 7,154,626 B2 | 12/2006 | Silverbrook et al. |
| 7,155,394 B2 | 12/2006 | Silverbrook et al. |
| 7,156,512 B2 | 1/2007 | Silverbrook |
| 7,158,258 B2 | 1/2007 | Silverbrook |
| 7,161,709 B2 | 1/2007 | Silverbrook |
| 7,161,715 B2 | 1/2007 | Silverbrook |

(56) References Cited

U.S. PATENT DOCUMENTS

| | | |
|---|---|---|
| 7,170,652 B2 | 1/2007 | Silverbrook |
| 7,173,729 B2 | 2/2007 | Silverbrook et al. |
| 7,175,097 B2 | 2/2007 | Walmsley et al. |
| 7,177,055 B2 | 2/2007 | Silverbrook |
| 7,185,816 B1 | 3/2007 | Shoobridge |
| 7,186,499 B2 | 3/2007 | Silverbrook |
| 7,187,404 B2 | 3/2007 | Silverbrook et al. |
| 7,193,734 B2 | 3/2007 | Silverbrook et al. |
| 7,201,319 B2 | 4/2007 | Silverbrook et al. |
| 7,227,576 B2 | 6/2007 | Umeyama |
| 7,234,645 B2 | 6/2007 | Silverbrook et al. |
| 7,234,801 B2 | 6/2007 | Silverbrook |
| 7,243,849 B2 | 7/2007 | Lapstun et al. |
| 7,248,376 B2 | 7/2007 | Walmsley et al. |
| 7,249,839 B2 | 7/2007 | King et al. |
| 7,250,975 B2 | 7/2007 | Silverbrook |
| 7,255,646 B2 | 8/2007 | Silverbrook et al. |
| 7,259,384 B2 | 8/2007 | Hariram et al. |
| 7,274,455 B2 | 9/2007 | Ok et al. |
| 7,274,485 B2 | 9/2007 | Silverbrook et al. |
| 7,278,723 B2 | 10/2007 | Silverbrook |
| 7,284,843 B2 | 10/2007 | Silverbrook |
| 7,286,182 B2 | 10/2007 | Silverbrook et al. |
| 7,286,260 B2 | 10/2007 | Silverbrook |
| 7,287,706 B2 | 10/2007 | Walmsley et al. |
| 7,291,447 B2 | 11/2007 | Silverbrook |
| 7,296,304 B2 | 11/2007 | Goldsborough |
| 7,301,567 B2 | 11/2007 | Silverbrook et al. |
| 7,310,157 B2 | 12/2007 | Walmsley et al. |
| 7,312,845 B2 | 12/2007 | Silverbrook |
| 7,341,336 B2 | 3/2008 | King et al. |
| 7,357,497 B2 | 4/2008 | Silverbrook et al. |
| 7,369,161 B2 | 5/2008 | Easwar et al. |
| 7,370,947 B2 | 5/2008 | Silverbrook et al. |
| 7,377,706 B2 | 5/2008 | Silverbrook et al. |
| 7,385,639 B2 | 6/2008 | Silverbrook |
| 7,387,573 B2 | 6/2008 | Silverbrook et al. |
| 7,404,633 B2 | 7/2008 | Silverbrook et al. |
| 7,430,067 B2 | 9/2008 | Silverbrook |
| 7,443,434 B2 | 10/2008 | Silverbrook |
| 7,452,048 B2 | 11/2008 | Silverbrook |
| 7,453,492 B2 | 11/2008 | Silverbrook |
| 7,453,586 B2 | 11/2008 | Silverbrook et al. |
| 7,458,676 B2 | 12/2008 | King et al. |
| 7,460,153 B2 | 12/2008 | King et al. |
| 7,460,882 B2 | 12/2008 | Silverbrook |
| 7,466,353 B2 | 12/2008 | Silverbrook et al. |
| 7,466,452 B2 | 12/2008 | Silverbrook et al. |
| 7,468,810 B2 | 12/2008 | Silverbrook |
| 7,483,053 B2 | 1/2009 | Silverbrook |
| 7,492,490 B2 | 2/2009 | Silverbrook |
| 7,505,068 B2 | 3/2009 | Silverbrook |
| 7,517,071 B2 | 4/2009 | Silverbrook |
| 7,518,634 B2 | 4/2009 | Silverbrook et al. |
| 7,524,045 B2 | 4/2009 | Silverbrook |
| 7,525,687 B2 | 4/2009 | Silverbrook |
| 7,556,564 B2 | 7/2009 | Silverbrook |
| 7,557,853 B2 | 7/2009 | Silverbrook |
| 7,564,580 B2 | 7/2009 | Silverbrook |
| 7,575,313 B2 | 8/2009 | Silverbrook |
| 7,576,775 B2 | 8/2009 | Silverbrook et al. |
| 7,576,794 B2 | 8/2009 | Silverbrook |
| 7,576,795 B2 | 8/2009 | Silverbrook |
| 7,581,683 B2 | 9/2009 | Walmsley et al. |
| 7,581,826 B2 | 9/2009 | Silverbrook |
| 7,585,067 B2 | 9/2009 | Walmsley |
| 7,588,323 B2 | 9/2009 | King et al. |
| 7,590,347 B2 | 9/2009 | Silverbrook |
| 7,591,547 B2 | 9/2009 | King et al. |
| 7,602,423 B2 | 10/2009 | Silverbrook |
| 7,604,345 B2 | 10/2009 | Silverbrook |
| 7,605,851 B2 | 10/2009 | Silverbrook et al. |
| 7,609,397 B2 | 10/2009 | Lapstun et al. |
| 7,609,410 B2 | 10/2009 | Lapstun et al. |
| 7,612,825 B2 | 11/2009 | Silverbrook et al. |
| 7,621,607 B2 | 11/2009 | Silverbrook |
| 7,629,999 B2 | 12/2009 | Silverbrook |
| 7,631,961 B2 | 12/2009 | Silverbrook et al. |
| 7,633,535 B2 | 12/2009 | Silverbrook |
| 7,637,594 B2 | 12/2009 | Silverbrook et al. |
| 7,646,403 B2 | 1/2010 | Silverbrook et al. |
| 7,654,626 B2 | 2/2010 | Silverbrook et al. |
| 7,654,905 B2 | 2/2010 | Silverbrook |
| 7,664,647 B2 | 2/2010 | Silverbrook et al. |
| 7,665,834 B2 | 2/2010 | Silverbrook |
| 7,688,369 B2 | 3/2010 | Silverbrook et al. |
| 7,690,765 B2 | 4/2010 | Silverbrook |
| 7,695,108 B2 | 4/2010 | Silverbrook |
| 7,701,506 B2 | 4/2010 | Silverbrook |
| 7,703,910 B2 | 4/2010 | Silverbrook |
| 7,705,891 B2 | 4/2010 | Silverbrook |
| 7,724,282 B2 | 5/2010 | Silverbrook |
| 7,742,696 B2 | 6/2010 | Silverbrook |
| 7,750,971 B2 | 7/2010 | Silverbrook |
| 7,753,508 B2 | 7/2010 | Silverbrook |
| 7,758,166 B2 | 7/2010 | Silverbrook |
| 7,773,124 B2 | 8/2010 | Silverbrook et al. |
| 7,773,125 B2 | 8/2010 | Silverbrook |
| 7,784,931 B2 | 8/2010 | King et al. |
| 7,796,166 B2 | 9/2010 | Silverbrook |
| 7,854,500 B2 | 12/2010 | King |
| 7,866,794 B2 | 1/2011 | Silverbrook et al. |
| 7,905,574 B2 | 3/2011 | Silverbrook |
| 7,907,178 B2 | 3/2011 | Silverbrook et al. |
| 7,936,395 B2 | 5/2011 | Silverbrook |
| 7,942,332 B2 | 5/2011 | Silverbrook et al. |
| 7,957,009 B2 | 6/2011 | Silverbrook |
| 7,961,249 B2 | 6/2011 | Silverbrook |
| 7,965,416 B2 | 6/2011 | Silverbrook |
| 7,970,275 B2 | 6/2011 | Silverbrook |
| 8,020,979 B2 | 9/2011 | Silverbrook |
| 8,098,285 B2 | 1/2012 | Silverbrook |
| 8,274,665 B2 | 9/2012 | Silverbrook |
| 8,328,101 B2 | 12/2012 | Silverbrook et al. |
| 8,421,869 B2 | 4/2013 | Silverbrook et al. |
| 8,823,823 B2 * | 9/2014 | Silverbrook ............... 348/222.1 |
| 2001/0000172 A1 | 4/2001 | Barrus et al. |
| 2001/0001563 A1 | 5/2001 | Tomaszewski |
| 2001/0007458 A1 | 7/2001 | Purcell et al. |
| 2001/0013890 A1 | 8/2001 | Narayanaswami |
| 2001/0015760 A1 | 8/2001 | Fellegara et al. |
| 2001/0015818 A1 | 8/2001 | Kawanabe et al. |
| 2001/0019561 A1 | 9/2001 | Staats |
| 2001/0020960 A1 | 9/2001 | Ikemoto et al. |
| 2001/0022661 A1 | 9/2001 | Fujimoto et al. |
| 2001/0023523 A1 | 9/2001 | Kubby et al. |
| 2001/0030692 A1 | 10/2001 | Yoneda |
| 2001/0033332 A1 | 10/2001 | Kato et al. |
| 2001/0035887 A1 | 11/2001 | Altfather et al. |
| 2001/0040574 A1 | 11/2001 | Prater |
| 2001/0040625 A1 | 11/2001 | Okada et al. |
| 2001/0040633 A1 | 11/2001 | Yang |
| 2001/0055121 A1 | 12/2001 | Omura et al. |
| 2001/0055983 A1 | 12/2001 | Ohmura et al. |
| 2002/0001032 A1 | 1/2002 | Ohki |
| 2002/0003578 A1 | 1/2002 | Koshiba et al. |
| 2002/0011558 A1 | 1/2002 | Neukermans et al. |
| 2002/0015592 A1 | 2/2002 | Kawamura et al. |
| 2002/0024570 A1 | 2/2002 | Childers et al. |
| 2002/0024603 A1 | 2/2002 | Nakayama et al. |
| 2002/0025079 A1 | 2/2002 | Kuwata et al. |
| 2002/0033854 A1 | 3/2002 | Silverbrook et al. |
| 2002/0047881 A1 | 4/2002 | Lewis et al. |
| 2002/0047904 A1 | 4/2002 | Okada |
| 2002/0050518 A1 | 5/2002 | Roustaei |
| 2002/0054212 A1 | 5/2002 | Fukuoka |
| 2002/0063760 A1 | 5/2002 | Dietl et al. |
| 2002/0071051 A1 | 6/2002 | Ikeda |
| 2002/0071104 A1 | 6/2002 | Silverbrook |
| 2002/0080247 A1 | 6/2002 | Takahashi et al. |
| 2002/0101524 A1 | 8/2002 | Acharya |
| 2002/0135266 A1 | 9/2002 | Boutaghou |
| 2002/0140993 A1 | 10/2002 | Silverbrook et al. |
| 2002/0141750 A1 | 10/2002 | Ludtke et al. |

(56) References Cited

U.S. PATENT DOCUMENTS

| | | |
|---|---|---|
| 2002/0158135 A1 | 10/2002 | Hsu |
| 2002/0164147 A1 | 11/2002 | Suda |
| 2002/0176009 A1 | 11/2002 | Johnson et al. |
| 2002/0180873 A1 | 12/2002 | Misawa |
| 2002/0180879 A1 | 12/2002 | Shiohara |
| 2003/0001957 A1 | 1/2003 | Kubota |
| 2003/0043273 A1 | 3/2003 | Suzuki |
| 2003/0076551 A1 | 4/2003 | Kawai et al. |
| 2004/0001608 A1 | 1/2004 | Rhoads |
| 2004/0006256 A1 | 1/2004 | Suzuki et al. |
| 2004/0018035 A1 | 1/2004 | Petteruti et al. |
| 2004/0032501 A1 | 2/2004 | Silverbrook |
| 2004/0032506 A1 | 2/2004 | Silverbrook |
| 2004/0066447 A1 | 4/2004 | Arnold |
| 2004/0070662 A1 | 4/2004 | Shimoda |
| 2004/0090505 A1 | 5/2004 | King et al. |
| 2004/0119827 A1 | 6/2004 | Silverbrook et al. |
| 2004/0125209 A1 | 7/2004 | Silverbrook |
| 2004/0141061 A1 | 7/2004 | Silverbrook |
| 2004/0196350 A1 | 10/2004 | Silverbrook |
| 2004/0201764 A1 | 10/2004 | Honda et al. |
| 2004/0207698 A1 | 10/2004 | Katayama |
| 2004/0252332 A1 | 12/2004 | McCoog et al. |
| 2004/0257446 A1 | 12/2004 | Silverbrook |
| 2005/0030554 A1 | 2/2005 | Dixon et al. |
| 2005/0030568 A1 | 2/2005 | Narushima et al. |
| 2005/0062813 A1 | 3/2005 | King et al. |
| 2005/0088527 A1 | 4/2005 | Silverbrook |
| 2005/0104941 A1 | 5/2005 | Tanaka |
| 2005/0146613 A1 | 7/2005 | Silverbrook et al. |
| 2005/0179758 A1 | 8/2005 | Campillo et al. |
| 2005/0179781 A1 | 8/2005 | Silverbrook |
| 2005/0270503 A1 | 12/2005 | Silverbrook |
| 2005/0280878 A1 | 12/2005 | Silverbrook |
| 2006/0007261 A1 | 1/2006 | Silverbrook |
| 2006/0056728 A1 | 3/2006 | Silverbrook et al. |
| 2006/0072781 A1 | 4/2006 | Harrington |
| 2006/0098232 A1 | 5/2006 | Nakano et al. |
| 2006/0126102 A1 | 6/2006 | Sakuda |
| 2006/0133738 A1 | 6/2006 | Marcinkiewicz et al. |
| 2006/0197847 A1 | 9/2006 | Johnson et al. |
| 2006/0239676 A1 | 10/2006 | Parulski et al. |
| 2006/0250433 A1 | 11/2006 | Silverbrook et al. |
| 2006/0250438 A1 | 11/2006 | Silverbrook |
| 2006/0250439 A1 | 11/2006 | Silverbrook et al. |
| 2006/0250461 A1 | 11/2006 | Silverbrook et al. |
| 2006/0250469 A1 | 11/2006 | Silverbrook et al. |
| 2006/0250470 A1 | 11/2006 | Lapstun et al. |
| 2006/0250479 A1 | 11/2006 | Silverbrook |
| 2006/0250482 A1 | 11/2006 | Silverbrook |
| 2006/0250484 A1 | 11/2006 | Silverbrook et al. |
| 2006/0250489 A1 | 11/2006 | Silverbrook |
| 2006/0252456 A1 | 11/2006 | King et al. |
| 2007/0003168 A1 | 1/2007 | Oliver |
| 2007/0013790 A1 | 1/2007 | Nakase |
| 2007/0021144 A1 | 1/2007 | Atkinson et al. |
| 2007/0024685 A1 | 2/2007 | Silverbrook |
| 2007/0040856 A1 | 2/2007 | Silverbrook |
| 2007/0046754 A1 | 3/2007 | Silverbrook |
| 2007/0070421 A1 | 3/2007 | Silverbrook et al. |
| 2007/0070453 A1 | 3/2007 | Silverbrook |
| 2007/0081187 A1 | 4/2007 | Silverbrook |
| 2007/0099675 A1 | 5/2007 | Silverbrook |
| 2007/0109611 A1 | 5/2007 | Silverbrook |
| 2007/0121177 A1 | 5/2007 | Silverbrook |
| 2008/0002215 A1 | 1/2008 | Silverbrook et al. |
| 2008/0036874 A1 | 2/2008 | Silverbrook et al. |
| 2008/0062232 A1 | 3/2008 | Silverbrook |
| 2008/0068406 A1 | 3/2008 | Silverbrook et al. |
| 2008/0098208 A1 | 4/2008 | Reid et al. |
| 2008/0152414 A1 | 6/2008 | Silverbrook |
| 2008/0204486 A1 | 8/2008 | Silverbrook |
| 2008/0252732 A1 | 10/2008 | Silverbrook |
| 2008/0300015 A1 | 12/2008 | Silverbrook |
| 2009/0015605 A1 | 1/2009 | Silverbrook |
| 2009/0027707 A1 | 1/2009 | Silverbrook et al. |
| 2009/0029731 A1 | 1/2009 | Silverbrook |
| 2009/0029732 A1 | 1/2009 | Silverbrook |
| 2009/0052879 A1 | 2/2009 | Silverbrook |
| 2009/0073231 A1 | 3/2009 | Silverbrook et al. |
| 2009/0075695 A1 | 3/2009 | Silverbrook |
| 2009/0085968 A1 | 4/2009 | Silverbrook et al. |
| 2009/0141291 A1 | 6/2009 | Yumiki et al. |
| 2009/0207208 A1 | 8/2009 | Silverbrook |
| 2009/0244292 A1 | 10/2009 | Silverbrook et al. |
| 2009/0264151 A1 | 10/2009 | Silverbrook |
| 2009/0278944 A1 | 11/2009 | Silverbrook et al. |
| 2009/0291708 A1 | 11/2009 | Silverbrook |
| 2009/0295887 A1 | 12/2009 | King et al. |
| 2010/0002062 A1 | 1/2010 | King et al. |
| 2010/0085471 A1 | 4/2010 | Craven-Bartle |
| 2010/0100706 A1 | 4/2010 | Inoue et al. |
| 2010/0157383 A1 | 6/2010 | Ichikawa et al. |
| 2010/0194923 A1 | 8/2010 | Silverbrook |
| 2011/0211048 A1 | 9/2011 | Silverbrook |
| 2011/0211080 A1 | 9/2011 | Silverbrook |
| 2013/0010076 A1* | 1/2013 | Silverbrook ............... 348/46 |
| 2013/0010082 A1* | 1/2013 | Silverbrook ............... 348/47 |
| 2013/0010083 A1* | 1/2013 | Silverbrook ............... 348/47 |
| 2013/0010122 A1* | 1/2013 | Silverbrook ............ 348/207.1 |
| 2013/0010123 A1* | 1/2013 | Silverbrook ............ 348/207.1 |
| 2013/0010126 A1* | 1/2013 | Silverbrook ............ 348/207.2 |
| 2013/0010127 A1* | 1/2013 | Silverbrook ............ 348/207.2 |
| 2013/0010130 A1* | 1/2013 | Silverbrook ............ 348/207.2 |
| 2013/0010131 A1* | 1/2013 | Silverbrook ............ 348/207.2 |
| 2013/0010132 A1* | 1/2013 | Silverbrook ............ 348/207.2 |
| 2013/0010148 A1 | 1/2013 | Silverbrook |
| 2013/0010149 A1* | 1/2013 | Silverbrook ............ 348/222.1 |
| 2013/0010152 A1* | 1/2013 | Silverbrook ............ 348/222.1 |
| 2013/0010173 A1* | 1/2013 | Silverbrook ........... 348/333.01 |
| 2013/0016227 A1* | 1/2013 | Silverbrook ............ 348/207.1 |
| 2013/0016228 A1* | 1/2013 | Silverbrook ............ 348/207.2 |
| 2013/0016229 A1* | 1/2013 | Silverbrook ............ 348/207.2 |
| 2013/0016230 A1* | 1/2013 | Silverbrook ............ 348/207.2 |
| 2013/0016231 A1* | 1/2013 | Silverbrook ............ 348/207.2 |
| 2013/0016234 A1* | 1/2013 | Silverbrook ............ 348/207.2 |
| 2013/0016237 A1* | 1/2013 | Silverbrook ............ 348/207.2 |
| 2013/0016247 A1 | 1/2013 | Silverbrook |
| 2013/0016265 A1* | 1/2013 | Silverbrook ............... 348/308 |
| 2013/0016279 A1* | 1/2013 | Silverbrook ............... 348/372 |
| 2013/0016280 A1* | 1/2013 | Silverbrook ............... 348/374 |
| 2013/0021443 A1 | 1/2013 | Silverbrook |
| 2013/0021444 A1 | 1/2013 | Silverbrook |
| 2013/0021480 A1* | 1/2013 | Silverbrook ............ 348/207.2 |
| 2013/0021481 A1* | 1/2013 | Silverbrook ............ 348/207.2 |
| 2013/0063568 A1 | 3/2013 | Silverbrook |
| 2013/0222617 A1 | 8/2013 | Silverbrook |

FOREIGN PATENT DOCUMENTS

| | | |
|---|---|---|
| AU | 199855415 A | 8/1998 |
| CA | 2079534 A1 | 4/1993 |
| DE | 248983 A1 | 8/1987 |
| DE | 4444294 A1 | 6/1996 |
| DE | 19832369 A1 | 1/2000 |
| DE | 10001768 A1 | 8/2000 |
| EP | 771101 A2 | 5/1977 |
| EP | 771102 A2 | 5/1977 |
| EP | 89114858.7 A2 | 8/1989 |
| EP | 0332787 A1 | 9/1989 |
| EP | 0354581 A2 | 2/1990 |
| EP | 0382044 A2 | 8/1990 |
| EP | 0398295 A2 | 11/1990 |
| EP | 0402016 A2 | 12/1990 |
| EP | 0440261 A2 | 2/1991 |
| EP | 0574581 A1 | 3/1991 |
| EP | 0430692 A1 | 6/1991 |
| EP | 0438841 A1 | 7/1991 |
| EP | 0512709 A2 | 11/1992 |
| EP | 0512799 A2 | 11/1992 |
| EP | 520289 A2 | 12/1992 |
| EP | 0670555 A1 | 9/1993 |
| EP | 0568357 A2 | 11/1993 |
| EP | 3083015 B1 | 12/1993 |

(56) References Cited

FOREIGN PATENT DOCUMENTS

| | | |
|---|---|---|
| EP | 408241 B1 | 10/1994 |
| EP | 0650125 A | 4/1995 |
| EP | 0670555 A1 | 9/1995 |
| EP | 676291 A | 10/1995 |
| EP | 0748697 A1 | 2/1996 |
| EP | 0709825 A | 5/1996 |
| EP | 0720915 A | 7/1996 |
| EP | 725364 A2 | 8/1996 |
| EP | 0732859 A2 | 9/1996 |
| EP | 735420 A1 | 10/1996 |
| EP | 0755162 A2 | 1/1997 |
| EP | 0761450 A2 | 3/1997 |
| EP | 0763430 A2 | 3/1997 |
| EP | 0763930 A1 | 3/1997 |
| EP | 0779736 A2 | 6/1997 |
| EP | 0782053 A2 | 7/1997 |
| EP | 0822078 A2 | 2/1998 |
| EP | 825758 A2 | 2/1998 |
| EP | 0848540 A | 6/1998 |
| EP | 0884197 A1 | 12/1998 |
| EP | 907139 A2 | 4/1999 |
| EP | 0912035 A2 | 4/1999 |
| EP | 913814 A2 | 5/1999 |
| EP | 924647 A2 | 6/1999 |
| EP | 0935384 A | 8/1999 |
| EP | 949804 A2 | 10/1999 |
| EP | 965451 A2 | 12/1999 |
| EP | 974924 A | 1/2000 |
| EP | 978799 A2 | 2/2000 |
| EP | 1039351 A2 | 9/2000 |
| EP | 1080917 A1 | 3/2001 |
| EP | 1129388 A1 | 9/2001 |
| EP | 0652108 B1 | 2/2003 |
| EP | 1289309 A1 | 3/2003 |
| EP | 1389876 A1 | 2/2004 |
| GB | 1520594 A | 8/1978 |
| GB | 1595797 A | 6/1981 |
| GB | 2212481 A | 7/1989 |
| GB | 2228579 A | 8/1990 |
| GB | 2242753 A | 10/1991 |
| GB | 2263841 A | 8/1993 |
| GB | 2299787 A | 10/1996 |
| GB | 2327838 A | 2/1999 |
| GB | 2346110 A | 8/2000 |
| JP | 57-107339 A | 7/1982 |
| JP | 57-208547 A | 12/1982 |
| JP | 57-208547 A | 12/1983 |
| JP | 59-128144 A | 7/1984 |
| JP | 59-190857 A | 10/1984 |
| JP | 60-096067 A | 5/1985 |
| JP | 60-136480 A | 7/1985 |
| JP | 60-204361 A | 10/1985 |
| JP | 61-129740 A | 6/1986 |
| JP | 62-32778 A | 2/1987 |
| JP | 62-081164 A | 3/1987 |
| JP | 62-245857 A | 10/1987 |
| JP | 62-272682 A | 11/1987 |
| JP | 01-114858 A | 5/1989 |
| JP | 01-148587 A | 6/1989 |
| JP | 01-267254 A | 10/1989 |
| JP | 01-277979 A | 11/1989 |
| JP | 1292483 A | 11/1989 |
| JP | 02-30543 A | 1/1990 |
| JP | 02-302181 A | 2/1990 |
| JP | 02-096880 A | 4/1990 |
| JP | 02-178163 A | 7/1990 |
| JP | 02-188259 A | 7/1990 |
| JP | 02-241760 A | 9/1990 |
| JP | 2241760 A | 9/1990 |
| JP | 03-011483 A | 1/1991 |
| JP | 03-14879 A | 1/1991 |
| JP | 3127341 A | 5/1991 |
| JP | 03-227875 A | 10/1991 |
| JP | 04-1051 A | 1/1992 |
| JP | 04-105113 A | 4/1992 |
| JP | 04-200184 A | 7/1992 |
| JP | 04-200186 A | 7/1992 |
| JP | 04-232084 A | 8/1992 |
| JP | 04-282995 A | 10/1992 |
| JP | 04-286444 A | 10/1992 |
| JP | 05-016377 A | 1/1993 |
| JP | 05-056160 A | 3/1993 |
| JP | 05-064045 A | 3/1993 |
| JP | 05-108278 A | 4/1993 |
| JP | 05-137147 A | 6/1993 |
| JP | 05-201081 A | 8/1993 |
| JP | 05-208773 A | 8/1993 |
| JP | 05-330150 A | 12/1993 |
| JP | 06-37944 A | 2/1994 |
| JP | 06-064160 A | 3/1994 |
| JP | 06-086197 A | 3/1994 |
| JP | 06-103358 A | 4/1994 |
| JP | 06-138588 A | 5/1994 |
| JP | 06-149051 A | 5/1994 |
| JP | 06-161047 A | 6/1994 |
| JP | 06-183117 A | 7/1994 |
| JP | 06-205147 A | 7/1994 |
| JP | 06-238958 A | 8/1994 |
| JP | 07-001874 A | 1/1995 |
| JP | 07-009680 A | 1/1995 |
| JP | 07-315590 A | 2/1995 |
| JP | 07-059107 A | 3/1995 |
| JP | 07-108688 A | 4/1995 |
| JP | 07-108786 A | 4/1995 |
| JP | 07-129762 A | 5/1995 |
| JP | 07-234911 A | 9/1995 |
| JP | 07-251038 A | 10/1995 |
| JP | 07-285250 A | 10/1995 |
| JP | 07-298123 A | 11/1995 |
| JP | 07-307956 A | 11/1995 |
| JP | 08-002754 A | 1/1996 |
| JP | 08-79417 A | 3/1996 |
| JP | 08-90879 A | 4/1996 |
| JP | 08-113990 A | 5/1996 |
| JP | 08-118653 A | 5/1996 |
| JP | 08-129634 A | 5/1996 |
| JP | 08-137882 A | 5/1996 |
| JP | 08-185492 A | 7/1996 |
| JP | 08-216384 A | 8/1996 |
| JP | 08-224730 A | 9/1996 |
| JP | 08-224865 A | 9/1996 |
| JP | 08-249409 A | 9/1996 |
| JP | 08-276600 A | 10/1996 |
| JP | 09-005902 A | 1/1997 |
| JP | 09-008592 A | 1/1997 |
| JP | 09-015766 A | 1/1997 |
| JP | 09-300645 A | 1/1997 |
| JP | 09024631 A | 1/1997 |
| JP | 09-036941 A | 2/1997 |
| JP | 09-039318 A | 2/1997 |
| JP | 09-058883 A | 3/1997 |
| JP | 09-065182 A | 3/1997 |
| JP | 09-069064 A | 3/1997 |
| JP | 09-071015 A | 3/1997 |
| JP | 09-076532 A | 3/1997 |
| JP | 09-076584 A | 3/1997 |
| JP | 09065266 A | 3/1997 |
| JP | 09-090513 A | 4/1997 |
| JP | 09-113990 A | 5/1997 |
| JP | 09-116843 A | 5/1997 |
| JP | 09-123474 A | 5/1997 |
| JP | 09-135316 A | 5/1997 |
| JP | 09-149311 A | 6/1997 |
| JP | 09-163196 A | 6/1997 |
| JP | 09-187040 A | 7/1997 |
| JP | 09-187960 A | 7/1997 |
| JP | 09-261382 A | 10/1997 |
| JP | 09-267487 A | 10/1997 |
| JP | 09-314918 A | 12/1997 |
| JP | 09-327906 A | 12/1997 |
| JP | 10-000183 A | 1/1998 |
| JP | 10-294918 A | 1/1998 |
| JP | 63-046193 A | 2/1998 |
| JP | 10-065780 A | 3/1998 |

(56) References Cited

FOREIGN PATENT DOCUMENTS

| | | |
|---|---|---|
| JP | 10-107981 A | 4/1998 |
| JP | 10-112855 A | 4/1998 |
| JP | 10-126728 A | 5/1998 |
| JP | 10-155053 A | 6/1998 |
| JP | 10-164538 A | 6/1998 |
| JP | 10-164602 A | 6/1998 |
| JP | 63-145071 A | 6/1998 |
| JP | 10-229533 A | 8/1998 |
| JP | 10-235957 A | 9/1998 |
| JP | 10-264479 A | 10/1998 |
| JP | 10-301718 A | 11/1998 |
| JP | 11-122565 A | 4/1999 |
| JP | 11122565 A | 4/1999 |
| JP | 11-155053 A | 6/1999 |
| JP | 11-164184 A | 6/1999 |
| JP | 11-164248 A | 6/1999 |
| JP | 11-167173 A | 6/1999 |
| JP | 11-176173 A | 7/1999 |
| JP | 11-187194 A | 7/1999 |
| JP | 11-205517 A | 7/1999 |
| JP | 11-227367 A | 8/1999 |
| JP | 11-254700 A | 9/1999 |
| JP | 11243516 A | 9/1999 |
| JP | 11249233 A | 9/1999 |
| JP | 11-275501 A | 10/1999 |
| JP | 11-298910 A | 10/1999 |
| JP | 11275418 A | 10/1999 |
| JP | 11275501 A | 10/1999 |
| JP | 11317897 A | 11/1999 |
| JP | 2000-099616 A | 4/2000 |
| JP | 2000-141788 A | 5/2000 |
| JP | 2000-158712 A | 6/2000 |
| JP | 2000-158720 A | 6/2000 |
| JP | 2000-196931 A | 7/2000 |
| JP | 2000-207512 A | 7/2000 |
| JP | 2000-222520 A | 8/2000 |
| JP | 2000-284370 A | 10/2000 |
| JP | 2001-008153 A | 1/2001 |
| JP | 2001-144459 A | 5/2001 |
| JP | 2001-169222 A | 6/2001 |
| JP | 2002-0158135 A | 12/2002 |
| KR | 1019930005409 A | 3/1993 |
| KR | 1019960015313 A | 5/1996 |
| KR | 1019960704320 A | 8/1996 |
| KR | 1002270420 B1 | 10/1999 |
| WO | WO 83/03941 A1 | 11/1983 |
| WO | WO 86/05641 A1 | 9/1986 |
| WO | WO 87/07741 A1 | 12/1987 |
| WO | WO 91/14336 A1 | 9/1991 |
| WO | WO 91/14338 A1 | 9/1991 |
| WO | WO 91/15078 A1 | 10/1991 |
| WO | WO 92/10058 A2 | 6/1992 |
| WO | WO 93/04425 A1 | 3/1993 |
| WO | WO 93/16323 A1 | 8/1993 |
| WO | WO 95/02247 A1 | 1/1995 |
| WO | WO 95/16323 A1 | 6/1995 |
| WO | WO 96/08114 A1 | 3/1996 |
| WO | WO 96/32265 A1 | 10/1996 |
| WO | WO 96/32274 A1 | 10/1996 |
| WO | WO 96/32278 A1 | 10/1996 |
| WO | WO 96/32281 A2 | 10/1996 |
| WO | WO 96/32808 A1 | 10/1996 |
| WO | WO 96/39301 A1 | 12/1996 |
| WO | WO 97/04353 A1 | 2/1997 |
| WO | WO 97/05738 A1 | 2/1997 |
| WO | WO 97/06958 A | 2/1997 |
| WO | WO 97/32265 A2 | 9/1997 |
| WO | WO 97/50243 A1 | 12/1997 |
| WO | WO 98/18253 A1 | 4/1998 |
| WO | WO 98/30021 A1 | 7/1998 |
| WO | WO 98/48567 A1 | 10/1998 |
| WO | WO 99/04368 A1 | 1/1999 |
| WO | WO 99/04388 A1 | 1/1999 |
| WO | WO 99/04551 A1 | 1/1999 |
| WO | WO 99/50787 A1 | 10/1999 |
| WO | WO 00/23279 A1 | 4/2000 |
| WO | WO 00/28379 A1 | 5/2000 |
| WO | WO 00/71348 A1 | 11/2000 |
| WO | WO 02/35286 A1 | 5/2002 |
| WO | WO 02/093902 A1 | 11/2002 |
| WO | WO 03/095224 A1 | 11/2003 |

OTHER PUBLICATIONS

Chi, Min-hwa, "Technologies for High Performance CMOS Active Pixel Imaging System-on-a-chip," IEEE, 0-7803-4306-9, pp. 180-183 (Oct. 1998).

Connolly et al., "A study of efficiency and accuracy in the transformation from RGB to CIELAB color space," *IEEE Transactions on Image Processing* 6(7): 1046-1048 (Jul. 1997).

Dunsmore et al., "A low-cost megapixel digital camera using high-performance in-camera image processing" *Proceedings, IS&T's PICS Conference.* Annual Conference, Proceedings of Conference for the Society of Imaging Science and Technology 67-70 (May 17, 1998).

"HEDR-8000 Series Reflective Optical Surface Mount Encoders Data Sheet," *Avago Technologies* p. 2 (May 2006).

Kasson et al., "Performing Color Space Conversations with Three-Dimensional Linear Interpolation," *Journal of Electronic Imaging* 4(3): 226-249 (Jul. 1, 1995).

Krishnan et al., A Miniture Surface Mount Reflective Optical Shaft Encoder, *Hewlett-Packard Journal* (Dec. 1996).

"Polaroid Introduces New Single-Use Instant Camera", Newswire, Sep. 16, 1998.

Fujioka et al., Reconfigurable parallel VLSI processor for dynamic control of intelligent robots, *IEE Proc.-Comput. Digit Tech.*, 143(1): 23-29 (Jan. 1996).

Ostromoukhov et al., "Halftoning by Rotating Non-Bayer Dispersed Dither Arrays",*Proceedings of the SPIE—The International Socciety for Optical Engineering*, vol. 2411, pp. 180-197, 1995.

Ostromoukhov et al, Rotated Disperser Dither: a New Technique for Digital Halftoning, *Computer Graphics Proceedings* 123-130 Jul. 24, 1994.

Smith et al., "A Single-Chip 306×244—Pixel CMOS NTSC Video Camera," ISSCC98, Session 11, *Image Sensors*, Paper FA 11.2, pp. 170-171 (Feb. 6, 1998).

Sukemura T., "FR500 VLIW__Architecture High-preformance Embedded Microprocessor" *Fujitsu-Scientific and Technical Journal* 36(1): 31-38 (Jun. 2000).

Texas Instruments, TMS320C80 Parallel Processor (User's Guide), 1995, pp. iii; pp. 1-5 and pp. 2-8; fig. 2-3 MVP crossbar.

Wawrzynek et al, Spert-11: A Vector Microprocessor System, Mar. 1996, IEEE, pp. 79-86.

United States Patent and Trademark Office, Office Action Issued in U.S. Appl. No. 12/850,627 Mailed Nov. 6, 2013.

United States Patent and Trademark Office, Office Action Issued in U.S. Appl. No. 13/540,613 Mailed Dec. 17, 2013.

United States Patent and Trademark Office, Office Action Issued in U.S. Appl. No. 13/620,917 Mailed Nov. 6, 2013.

United States Patent and Trademark Office, Office Action Issued in U.S. Appl. No. 13/620,924 Mailed Dec. 27, 13.

United States Patent and Trademark Office, Office Action Issued in U.S. Appl. No. 13/620,971 Mailed Dec. 4, 13.

United States Patent and Trademark Office, Office Action Issued in U.S. Appl. No. 13/620,977 Mailed Dec. 17, 2013.

United States Patent and Trademark Office, Office Action Issued in U.S. Appl. No. 13/621,026 Mailed Dec. 24, 2013.

United States Patent and Trademark Office, Office Action Issued in U.S. Appl. No. 13/621,040 Mailed Jan. 17, 2014.

Texas Instruments, TMS320C80 (MVP) Video Controller (User's Guide), 1995.

United States Patent and Trademark Office, Office Action Issued in U.S. Appl. No. 12/114,813 Mailed Apr. 30, 2014.

United States Patent and Trademark Office, Office Action Issued in U.S. Appl. No. 13/621,026 Mailed Jun. 3, 2014.

United States Patent and Trademark Office, Notice of Allowance Issued in U.S. Appl. No. 13/620,872 Mailed Jun. 6, 2014.

(56) References Cited

OTHER PUBLICATIONS

United States Patent and Trademark Office, Office Action Issued in U.S. Appl. No. 13/620,917 Mailed Jun. 17, 2014.
United States Patent and Trademark Office, Office Action Issued in U.S. Appl. No. 13/620,891 Mailed Jun. 18, 2014.
United States Patent and Trademark Office, Office Action Issued in U.S. Appl. No. 13/620,977 Mailed Jul. 7, 2014.
United States Patent and Trademark Office, Office Action Issued in U.S. Appl. No. 13/620,965 Mailed Jul. 18, 2014.
United States Patent and Trademark Office, Office Action Issued in U.S. Appl. No. 13/620,969 Mailed Jul. 23, 2014.
United States Patent and Trademark Office, Office Action Issued in U.S. Appl. No. 13/620,861 Mailed Mar. 6, 2014.
United States Patent and Trademark Office, Office Action Issued in U.S. Appl. No. 13/620,872 Mailed Mar. 20, 2014.
United States Patent and Trademark Office, Office Action Issued in U.S. Appl. No. 13/620,933 Mailed Mar. 21, 2014.
United States Patent and Trademark Office, Office Action Issued in U.S. Appl. No. 13/620,939 Mailed Mar. 21, 2014.
United States Patent and Trademark Office, Office Action Issued in U.S. Appl. No. 13/620,918 Mailed Mar. 25, 2014.
United States Patent and Trademark Office, Office Action Issued in U.S. Appl. No. 13/620,832 Mailed Apr. 3, 2014.
United States Patent and Trademark Office, Office Action Issued in U.S. Appl. No. 13/620,971 Mailed Apr. 14, 2014.
United States Patent and Trademark Office, Office Action Issued in U.S. Appl. No. 13/620,857 Mailed Jan. 29, 2014.
United States Patent and Trademark Office, Office Action Issued in U.S. Appl. No. 13/620,969 Mailed Feb. 6, 2014.
European Patent Office, Supplementary European Search Report in European Patent Application No. 98933349.7(Oct. 16, 2002).
European Patent Office, Supplementary European Search Report in European Patent Application No. 00929022.2 (Feb. 18, 2005).
European Patent Office, Supplementary European Search Report in European Patent Application No. 00929026.3 (Apr. 2, 2004).
European Patent Office, Supplementary European Search Report in European Patent Application No. 00929024.8 (Dec. 6, 2004).
European Patent Office, Supplementary European Search Report in European Patent Application No. 00929025.5 (Jun. 2, 2004).
European Patent Office, Supplementary European Search Report in European Patent Application No. 00962074.1 (May 9, 2003).
European Patent Office, Supplementary European Search Report in European Patent Application No. 00962075.8 (Jun. 5, 2003).
European Patent Office, Supplementary European Search Report in European Patent Application No. 00967420.1 (May 20, 2003).
European Patent Office, Supplementary European Search Report in European Patent Application No. 00962076.6 (May 8, 2003).
European Patent Office, Supplementary European Search Report in European Patent Application No. 01975879.6 (Jan. 2, 2006).
European Patent Office, Supplementary European Search Report in European Patent Application No. 01977985.9 (Feb. 11, 2005).
European Patent Office, Supplementary European Search Report in European Patent Application No. 98933351.3 (Jun. 12, 2003).
European Patent Office, Supplementary European Search Report in European Patent Application No. 00929017.2 (Mar. 16, 2004).
European Patent Office, Supplementary European Search Report in European Patent Application No. 00929018.0 (Apr. 2, 2004).
European Patent Office, Supplementary European Search Report in European Patent Application No. 00929019.8 (Jul. 4, 2002).
European Patent Office, Supplementary European Search Report in European Patent Application No. 00929020.6 (Jul. 25, 2002).
European Patent Office, Supplementary European Search Report in European Patent Application No. 00929021.4 (Oct. 26, 2004).
European Patent Office, Supplementary European Search Report in European Patent Application No. 00929023.0 (May 27, 2003).
European Patent Office, Supplementary European Search Report in European Patent Application No. 00929028.9 (Apr. 27, 2004).
European Patent Office, Supplementary European Search Report in European Patent Application No. 00929029.7 (Mar. 31, 2004).
European Patent Office, Supplementary European Search Report in European Patent Application No. 00929030.5 (Mar. 24, 2004).
European Patent Office, Supplementary European Search Report in European Patent Application No. 00929031.3 (May 8, 2003).
European Patent Office, Supplementary European Search Report in European Patent Application No. 99957715.8 (Jun. 21, 2006).
Australian Patent Office, International Search Report in International Patent Application No. PCT/AU98/00544 (Sep. 9, 1998).
Australian Patent Office, International Search Report in International Patent Application No. PCT/AU98/00549 (Sep. 9, 1998).
Australian Patent Office, International Search Report in International Patent Application No. PCT/AU99/00985 (Jan. 19, 2000).
Australian Patent Office, International Search Report in International Patent Application No. PCT/AU00/00515 (Aug. 1, 2000).
Australian Patent Office, International Search Report in International Patent Application No. PCT/AU00/00514 (Aug. 3, 2000).
Australian Patent Office, International Search Report in International Patent Application No. PCT/AU00/00513 (Aug. 1, 2000).
Australian Patent Office, International Search Report in International Patent Application No. PCT/AU00/00512 (Aug. 3, 2000).
Australian Patent Office, International Search Report in International Patent Application No. PCT/AU00/00510 (Aug. 18, 2000).
Australian Patent Office, International Search Report in International Patent Application No. PCT/AU00/00509 (Aug. 18, 2000).
Australian Patent Office, International Search Report in International Patent Application No. PCT/AU00/00508 (Aug. 29, 2000).
Australian Patent Office, International Search Report in International Patent Application No. PCT/AU00/00507 (Aug. 3, 2000).
Australian Patent Office, International Search Report in International Patent Application No. PCT/AU00/00506 (Aug. 3, 2000).
Australian Patent Office, International Search Report in International Patent Application No. PCT/AU00/00505 (Aug. 29, 2000).
Australian Patent Office, International Search Report in International Patent Application No. PCT/AU00/00504 (Aug. 3, 2000).
Australian Patent Office, International Search Report in International Patent Application No. PCT/AU00/00503 (Jul. 10, 2000).
Australian Patent Office, International Search Report in International Patent Application No. PCT/AU00/00502 (Jul. 24, 2000).
Australian Patent Office, International Search Report in International Patent Application No. PCT/AU00/00501 (Aug. 3, 2000).
Australian Patent Office, International Search Report in International Patent Application No. PCT/AU00/01076 (Nov. 16, 2000).
Australian Patent Office, International Search Report in International Patent Application No. PCT/AU00/01075 (Nov. 16, 2000).
Australian Patent Office, International Search Report in International Patent Application No. PCT/AU00/01074 (Nov. 20, 2000).
Australian Patent Office, International Search Report in International Patent Application No. PCT/AU00/01073 (Nov. 16, 2000).
Australian Patent Office, International Search Report in International Patent Application No. PCT/AU01/01326 (Dec. 1, 2001).
Australian Patent Office, International Search Report in International Patent Application No. PCT/AU01/01317 (Jan. 8, 2002).
"Suppliers Focus on Teens" Chain Drug Review 22(17): p. 30 Full Text (Oct. 9, 2000).
Cipra, Barry, "The Ubiquitous Reed-Solomon Codes" Siam News, 26(1) (Jan. 1993).
IS&T 46$^{th}$ Annual Conference in Cambridge, Massachusetts "First Impressions: Digital Photography" The Society for Imaging Science and Technology (May 11, 1993).
Curtis et al., "Computer-Generated Watercolor", Proceedings of SIGGRAPH 97, *Computer Graphic Proceedings* pp. 421-430 (1997).
Fisher, Joseph A., "Very Long Instruction Word Architectures and the ELI-512" ACM, International Symposium on Computer Architecture, pp. 140-150 (1983).
Foley et al., Computer Graphics: Principles and Practice, Second Edition, pp. 604-853, 1990.
Gonzalez, R.C. and Woods, R.E., "Image Segmentation:Region-Oriented Segmentation" Digital Image Processing, Addison-Wesley Publishing Company, Inc., pp. 458-462 (1992).
Hayat et al., "A Fast Thinning Algorithm Based on Image Compression" IEEE, pp. 2661-2664 (1991).

(56) References Cited

OTHER PUBLICATIONS

Henrich, D., "Space-efficient Region Filling in Raster Graphics" The Visual Computer: An International Journal of Computer Graphics (1993).

Hsu et al., "Drawing and Animation Using Skeletal Strokes", Proceedings of SIGGRAPH 94, *Computer Graphic Proceedings* pp. 1-9 (1994).

Jaspers, E G T et al., "A Generic 2d Sharpness Enhancement Algorithm for Luminance Signals", Sixth International Conference on Image Processing and Its Applications (Conf. Publ. No. 443), pp. 14-17.( Jul. 1997).

Litwinowicz, "Processing Images and Video for an Impressionist Effect", Proceedings of SIGGRAPH 97, *Computer Graphic Proceedings* pp. 1-9 (1997).

Liu, N. et al., "Improved Method for Color Image Enhancement Based on Luminance and Color Contrast", Journal of Electronic Imaging, SPIE IS&T, vol. 3, No. 2, 1 pp. 190-197 (Apr. 1994).

Meade, Instruction Manual for Meade 7" LX200 Maksutov-Cassegrain Telescope 8", 10" and 12" LX200 Schmidt-Cassegrain Telescopes, Meade Instruments Corporation, 1-16 (1996).

Ogniewicz, Skeleton-Space: A Multiscale Space Description Combining Region and Boundary Information, IEEE, pp. 746-751(1994).

Ohyama, S., Optical Sheet Memory System, Electronics and Communications in Japan, Part 2, vol. 75, No. 4, (1992).

Ohzu et al., "Behind the Scenes of Virtual Reality: Vision and Motion" Proceedings of the IEEE, Invited Paper, 84(5): pp. 782-798 (May 1996).

Ong et al., "Image Analysis of Tissue Sections" Computers in Biology and Medicine, 26(3): pp. 269-279 (May 1996).

Parulski, K.A. et al., "High-Performance Digital Color Video Camera" Journal of Electronic Imaging, SPIE IS&T, vol. 1, No. 1, pp. 35-45 (1992).

Petit et al., "VLIW Processor Architecture Adapted to FPAs", The International Society for Optical Engineering, 3410(99): pp. 128-132 (May 1998).

Russ, John C., "Segmentation and Thresholding" The Image Processing Handbook, 2nd Edition, pp. 355-361 (1994).

Sakamoto,T. et al., "Software Pixel Interpolation for Digital Still Cameras Suitable for a 32-Bit MCU", IEEE Transactions on Consumer Electronics 44(4):pp. 1342-1352 (1998).

Salisbury et al., "Interactive Pen-and-Ink Illustration", Proceedings of SIGGRAPH 94, *Computer Graphic Proceedings* pp. 101-108 (1994).

Singh et al., "Object Skeletons From Sparse Shapes in Industrial Image Settings", Proceedings of the 1998 IEEE, pp. 3388-3393 (1998).

Takovacs, Gregory T.A., "Mechanical Transducers" Micromachined Transducers Sourcebook, pp. 289-293 (1998).

Thorpe et al., "The All-Digital Camcorder—The Arrival of Electronic Cinematography", SMPTE Journal, pp. 13-30 (Jan. 1996).

Topfer, K., Adams, J.E., Keelan B.W., "Modulation Transfer Functions and Aliasing Patterns of CFA Interpolation Algorithms" Proceedings IS&T's Pics Conference. $51^{st}$ Annual Conference, pp. 367-370, (1998).

Yarmish et al., "Meet the Computer: A Computer System" Assembly Language Fundamentals 360/370 OS/VS DOS/VS, pp. 13-16 (1979).

United States Patent and Trademark Office, Office Action Issued in U.S. Appl. No. 13/620,879 Mailed Sep. 12, 2014.

United States Patent and Trademark Office, Office Action Issued in U.S. Appl. No. 13/620,939 Mailed Sep. 12, 2014.

United States Patent and Trademark Office, Office Action Issued in U.S. Appl. No. 13/620,924 Mailed Oct. 10, 2014.

United States Patent and Trademark Office, Office Action Issued in U.S. Appl. No. 13/621,046 Mailed Feb. 18, 2015.

United States Patent and Trademark Office, Office Action Issued in U.S. Appl. No. 13/856,761 Mailed Mar. 16, 2015.

United States Patent and Trademark Office, Office Action Issued in U.S. Appl. No. 13/620,861 Mailed Apr. 6, 2015.

United States Patent and Trademark Office, Office Action Issued in U.S. Appl. No. 13/620,924 Mailed Apr. 21, 2015.

United States Patent and Trademark Office, Office Action Issued in U.S. Appl. No. 13/620,965 Mailed Apr. 27, 2015.

United States Patent and Trademark Office, Notice of Allowance Issued In U.S. Appl. No. 13/620,838 Mailed Jul. 13, 2015.

\* cited by examiner

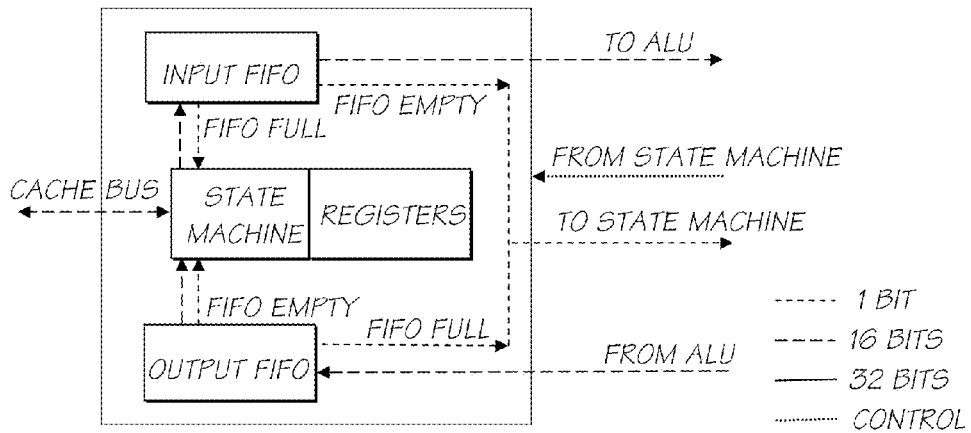
FIG. 16
ORDER OF PIXELS PRESENTED BY A SEQUENTIAL READ ITERATOR
ON A 4 X 2 IMAGE WITH PADDING.
| 0 | 1 | 2 | 3 |
|---|---|---|---|
| 4 | 5 | 6 | 7 |
FIG. 17
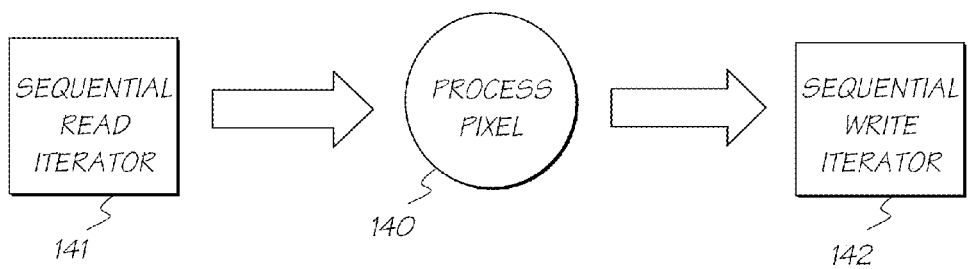
FIG. 18

A 3x3 BOX VIEW TRAVERSES THE PIXELS IN ORDER: 0, 1, 2, 3, 4, 5, 6, 7, 8 ETC, PLACING A 3x3 BOX CENTERED OVER EACH PIXEL...

3x3 BOX VIEW OF FIRST
PIXEL IN IMAGE = 9 PIXELS,
5 OF WHICH ARE OUTSIDE
THE IMAGE

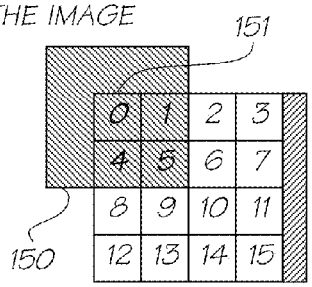

FIRST 9 PIXELS FROM THE BOX READ ITERATOR:

IF DUPLICATION OF EDGE PIXELS IS ON: 0, 0, 0, 0, 0, 1, 4, 4, 5

IF DUPLICATION OF EDGE PIXELS IS OFF: V, V, V, V, 0, 1, V, 4, 5
WHERE V IS CONSTANTPIXEL REGISTER VALUE REPRESENTING "OUTSIDE THE IMAGE"

3x3 BOX VIEW OF
SECOND PIXEL IN IMAGE
= 9 PIXELS,
3 OF WHICH ARE
OUTSIDE THE IMAGE

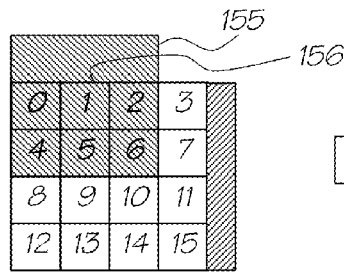

SECOND 9 PIXELS FROM THE BOX READ ITERATOR:

IF DUPLICATION OF EDGE PIXELS IS ON: 0, 1, 2, 0, 1, 2, 4, 5, 6

IF DUPLICATION OF EDGE PIXELS IS OFF: V, V, V, 0, 1, 2, 4, 5, 6
WHERE V IS CONSTANTPIXEL REGISTER VALUE REPRESENTING "OUTSIDE THE IMAGE"

FIG. 19

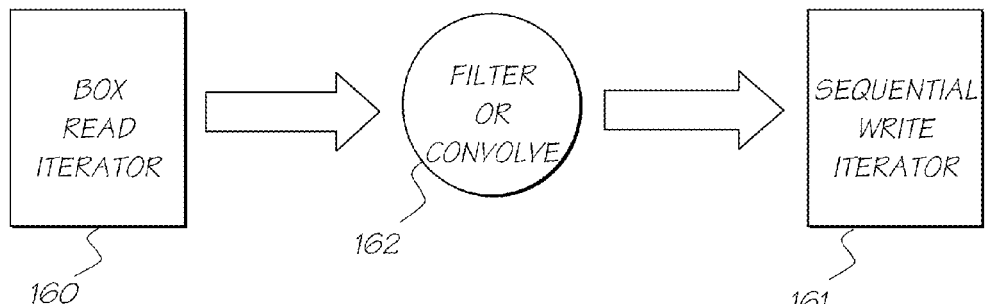
FIG. 20
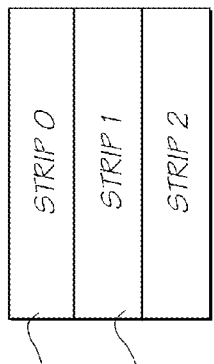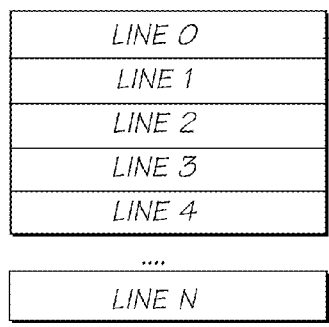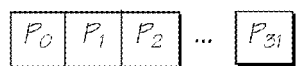
FIG. 21
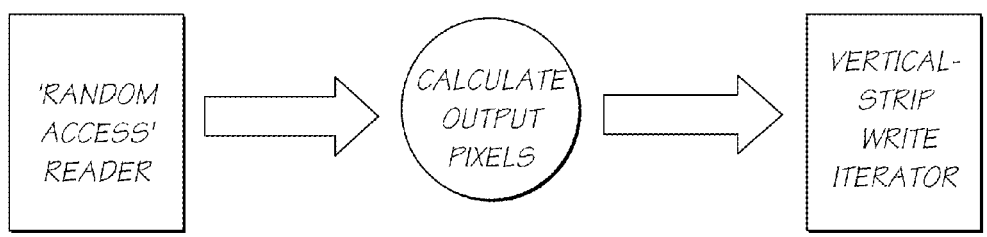
FIG. 22

2X2 PIXEL BLOCK FROM SENSOR

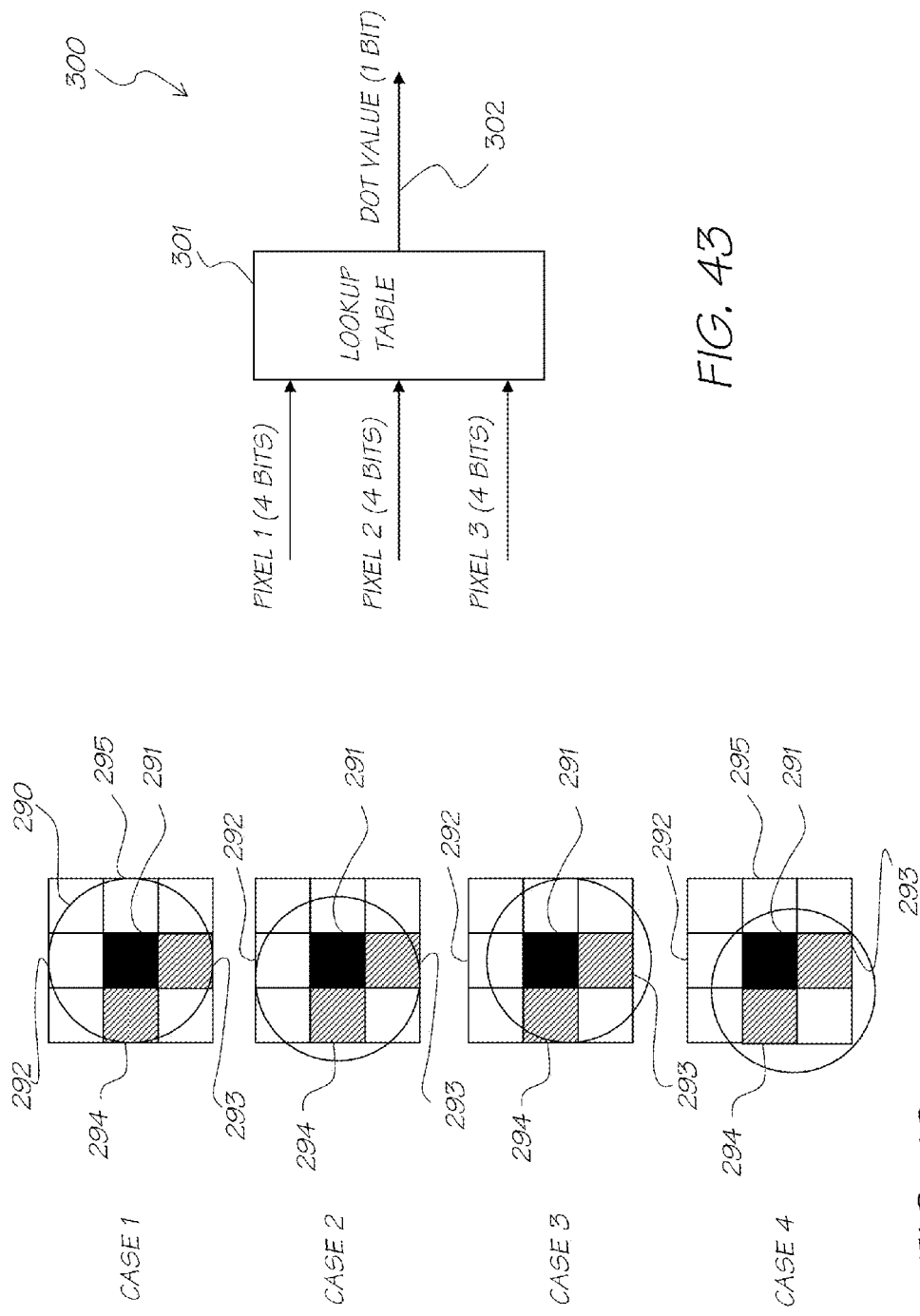

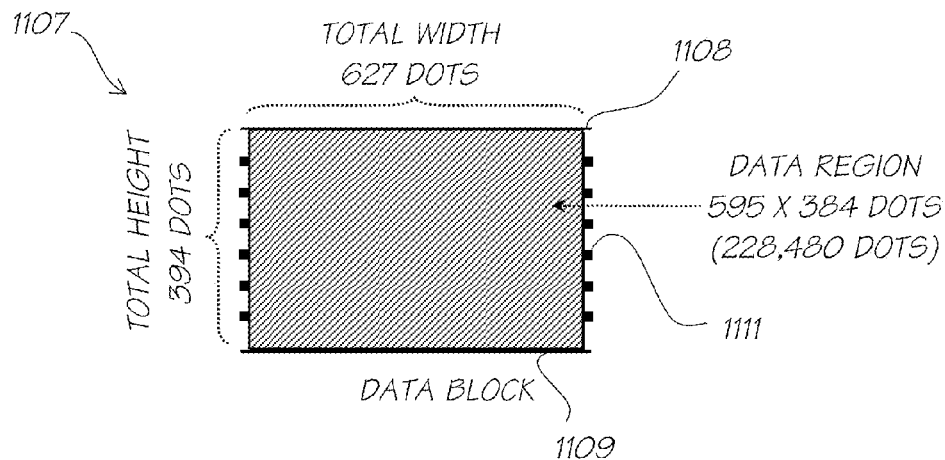
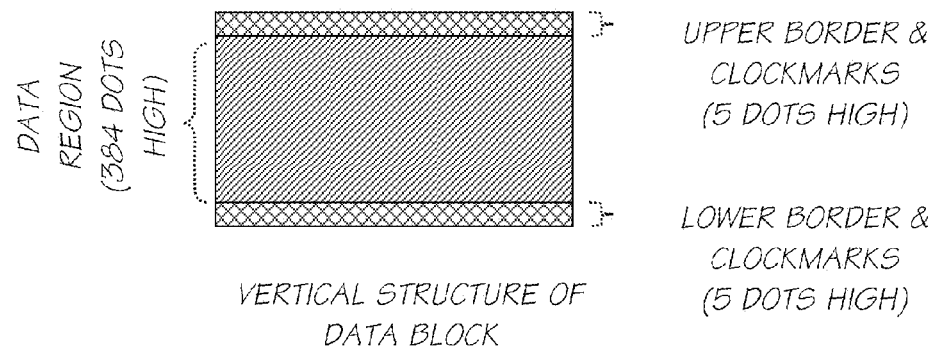
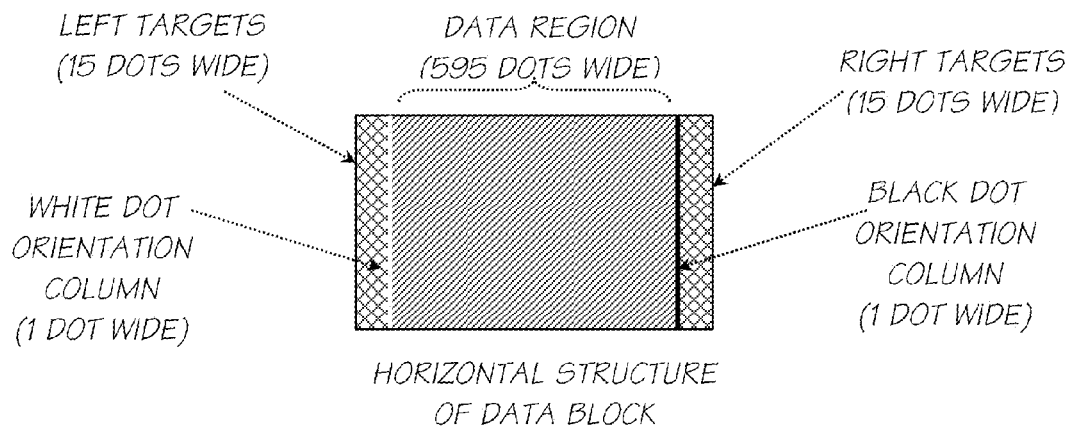
FIG. 49

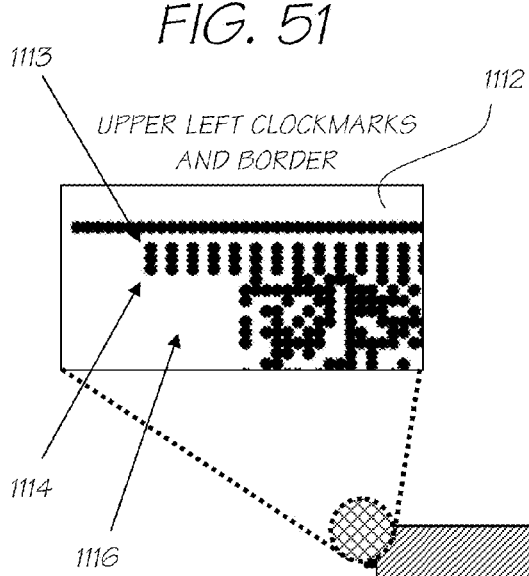
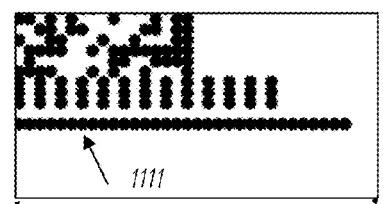
FIG. 51 — UPPER LEFT CLOCKMARKS AND BORDER
FIG. 52 — LOWER RIGHT CLOCKMARKS AND BORDER
FIG. 50

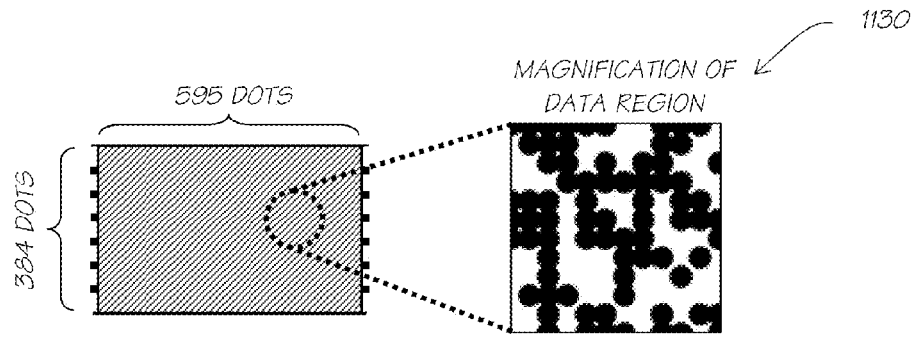
FIG. 57
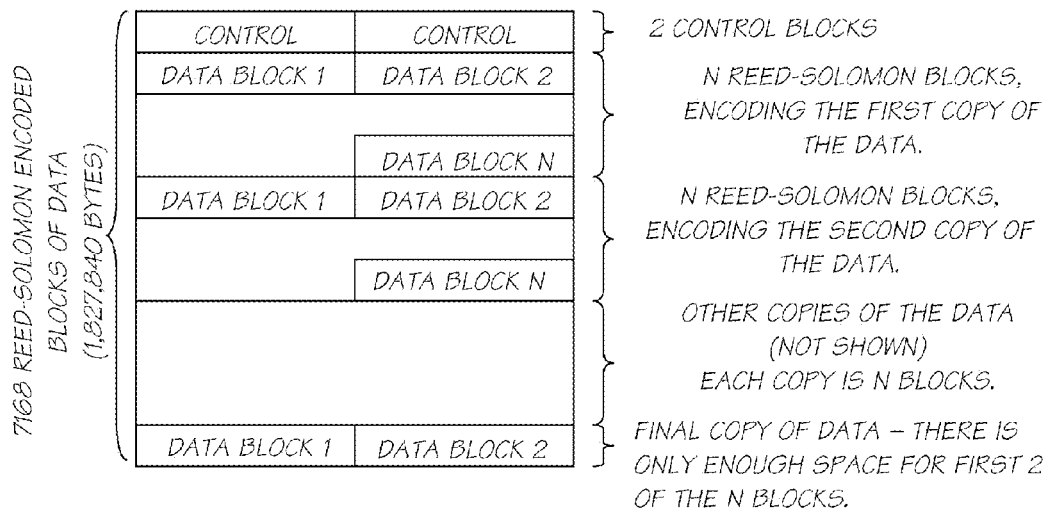
FIG. 58
```
00:  4F 00 3D 4F 00 3D 4F 00 3D 4F 00 3D
0C:  4F 00 3D 4F 00 3D 4F 00 3D 4F 00 3D
18:  4F 00 3D 4F 00 3D 4F 00 3D 4F 00 3D
24:  4F 00 3D 4F 00 3D 4F 00 3D 4F 00 3D     32 COPIES OF THE
30:  4F 00 3D 4F 00 3D 4F 00 3D 4F 00 3D      3 BYTE CONTROL
3C:  4F 00 3D 4F 00 3D 4F 00 3D 4F 00 3D       INFORMATION
48:  4F 00 3D 4F 00 3D 4F 00 3D 4F 00 3D
54:  4F 00 3D 4F 00 3D 4F 00 3D 4F 00 3D
60:  00 00 00 00 00 00 00 00 00 00 00
6C:  00 00 00 00 00 00 00 00 00 00 00          RESERVED
78:  00 00 00 00 00 00 00 00 00 00 00         BYTES ARE 0
```
FIG. 59

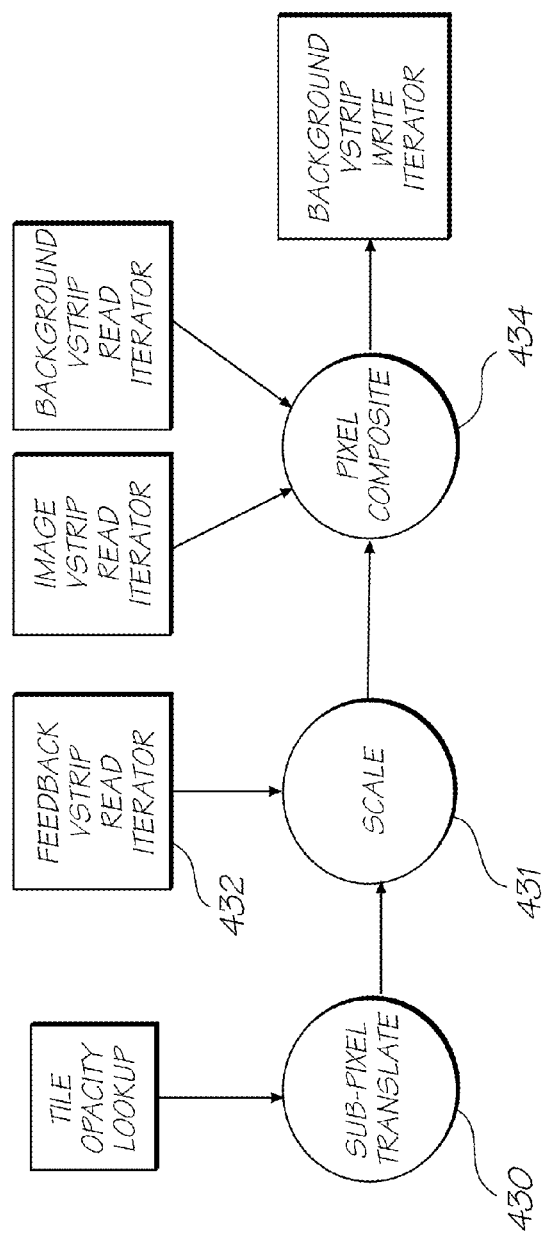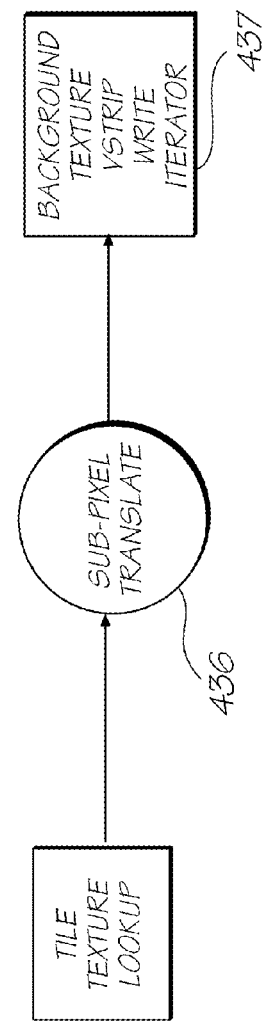
FIG. 106
FIG. 107

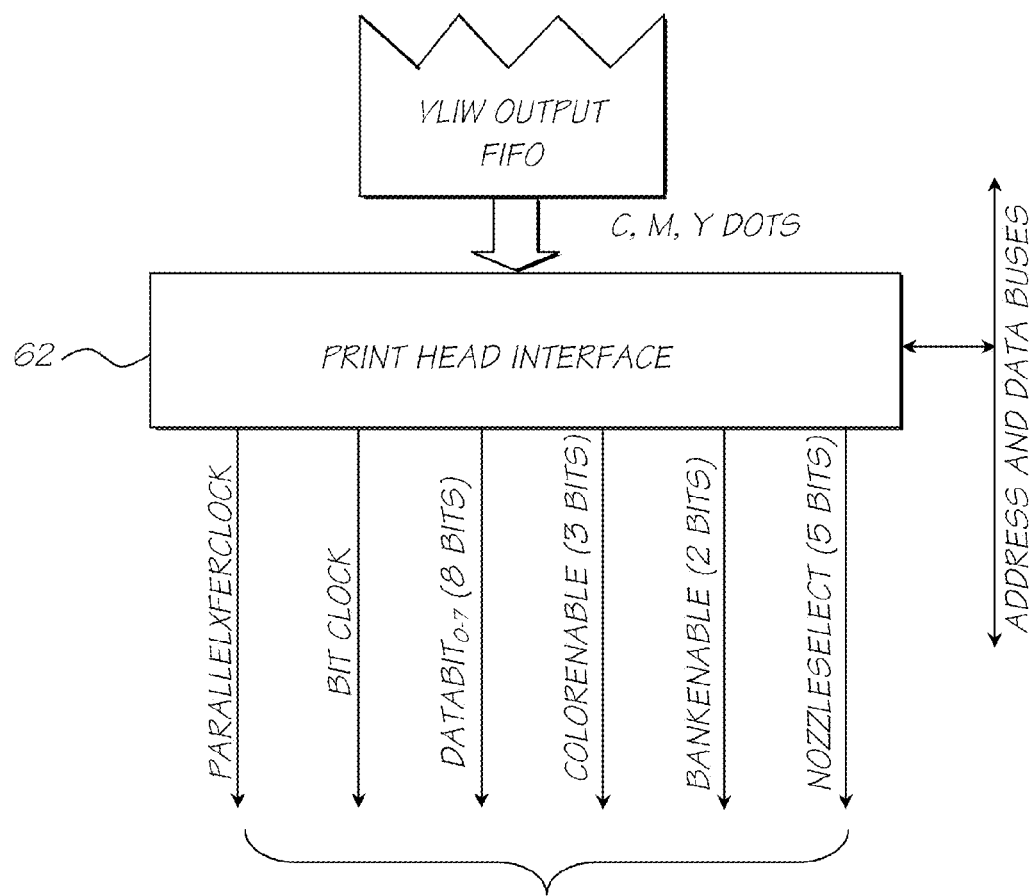
FIG. 119
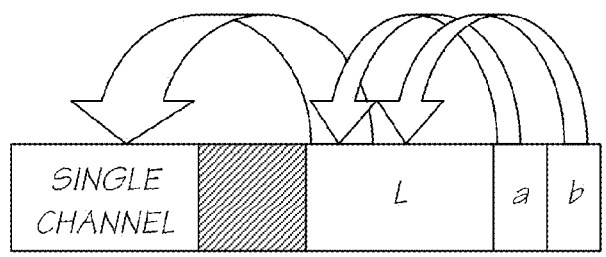
BECOMES:
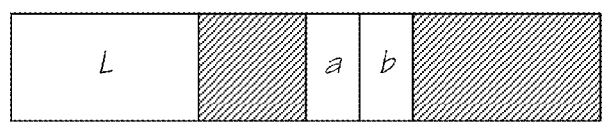
FIG. 120

PORTABLE IMAGING DEVICE WITH MULTI-CORE PROCESSOR

CROSS REFERENCE TO RELATED APPLICATION

The present application is a Continuation of U.S. application Ser. No. 13/104,021 filed May 10, 2011 now abandoned, which is a Continuation of U.S. application Ser. No. 12/758,730 filed Apr. 12, 2010, issued Jun. 14, 2011 as U.S. Pat. No. 7,961,249, which is a continuation of U.S. application Ser. No. 11/045,442 filed Jan. 31, 2005, issued Apr. 20, 2010 as U.S. Pat. No. 7,701,506, which is a continuation of U.S. application Ser. No. 09/112,786 filed on Jul. 10, 1998, issued Apr. 12, 2005 as U.S. Pat. No. 6,879,341. Each of the above identified patents and applications is hereby incorporated herein by reference in its entirety. With respect to the present application, any disclaimer of claim scope made in the parent application or any predecessor or related application is hereby rescinded.

FIELD OF THE INVENTION

The present invention relates to digital image processing and in particular discloses Camera System Containing a VLIW Vector Processor.

Further the present invention relates to an image processing method and apparatus and, in particular, discloses a Digital Instant Camera with Image Processing Capability.

The present invention further relates to the field of digital camera technology and, particularly, discloses a digital camera having an integral color printer.

BACKGROUND OF THE INVENTION

Traditional camera technology has for many years relied upon the provision of an optical processing system which relies on a negative of an image which is projected onto a photosensitive film which is subsequently chemically processed so as to "fix" the film and to allow for positive prints to be produced which reproduce the original image. Such an image processing technology, although it has become a standard, can be unduly complex, as expensive and difficult technologies are involved in full color processing of images. Recently, digital cameras have become available. These cameras normally rely upon the utilization of a charged coupled device (CCD) to sense a particular image. The camera normally includes storage media for the storage of the sensed scenes in addition to a connector for the transfer of images to a computer device for subsequent manipulation and printing out.

Such devices are generally inconvenient in that all images must be stored by the camera and printed out at some later stage. Hence, the camera must have sufficient storage capabilities for the storing of multiple images and, additionally, the user of the camera must have access to a subsequent computer system for the downloading of the images and printing out by a computer printer or the like.

Further, digital camera devices have only limited on board processing capabilities which can only perform limited manipulation of sensed image. The main function of the on board processing capability is to store the sensed image. As it may be desirable to carry out extensive modification of an image, the capabilities of such digital camera devices are considered inadequate.

SUMMARY OF THE INVENTION

The present invention relates to the provision of a digital camera system having significant on-board computational capabilities for the manipulation of images.

In accordance with a first aspect of the present invention, there is provided a digital camera system comprising a sensing means for sensing an image; modification means for modifying the sensed image in accordance with modification instructions input into the camera; and an output means for outputting the modified image; wherein the modification means includes a series of processing elements arranged around a central crossbar switch. Preferably, the processing elements include an Arithmetic Logic Unit (ALU) acting under the control of a microcode store wherein the microcode store comprises a writeable control store. The processing elements can include an internal input and output FIFO for storing pixel data utilized by the processing elements and the modification means is interconnected to a read and write FIFO for reading and writing pixel data of images to the modification means.

Each of the processing elements can be arranged in a ring and each element is also separately connected to its nearest neighbours. The ALU accepts a series of inputs interconnected via an internal crossbar switch to a series of core processing units within the ALU and includes a number of internal registers for the storage of temporary data. The core processing units can include at least one of a multiplier, an adder and a barrel shifter.

The processing elements are further connected to a common data bus for the transfer of pixel data to the processing elements and the data bus is interconnected to a data cache which acts as an intermediate cache between the processing elements and a memory store for storing the images.

BRIEF DESCRIPTION OF THE DRAWINGS

Notwithstanding any other forms that may fall within the scope of the present invention, preferred forms of the invention will now be described, by way of example only, with reference to the accompanying drawings in which:

FIG. 3A is a schematic block diagram of the Artcam Central Processor incorporating an interface for the array of capacitive sensors;

FIG. 16 illustrates the I/O address generator block in more detail;
FIG. 17 illustrates a pixel storage format;
FIG. 18 illustrates a sequential read iterator process;
FIG. 19 illustrates a box read iterator process;
FIG. 20 illustrates a box write iterator process;
FIG. 21 illustrates the vertical strip read/write iterator process;
FIG. 22 illustrates the vertical strip read/write iterator process;
FIG. 42 illustrates the process of centroid drift;
FIG. 43 shows one form of centroid lookup table;
FIG. 49 illustrates schematically the layout of a single datablock;
FIG. 50 illustrates a single datablock;
FIG. 51 and FIG. 52 illustrate magnified views of portions of the datablock of FIG. 50;
FIG. 57 illustrates the array of dots of a datablock;
FIG. 58 illustrates schematically the structure of data for Reed-Solomon encoding;
FIG. 59 illustrates an example Reed-Solomon encoding;
FIG. 106 illustrates the process of tiling with feedback;

FIG. 107 illustrates the process of tiling with texture replacement;
FIG. 119 illustrates the structure of the printhead interface;
FIG. 120 illustrates the process of rotation of a Lab image.

DESCRIPTION OF PREFERRED AND OTHER EMBODIMENTS

Figure 1:
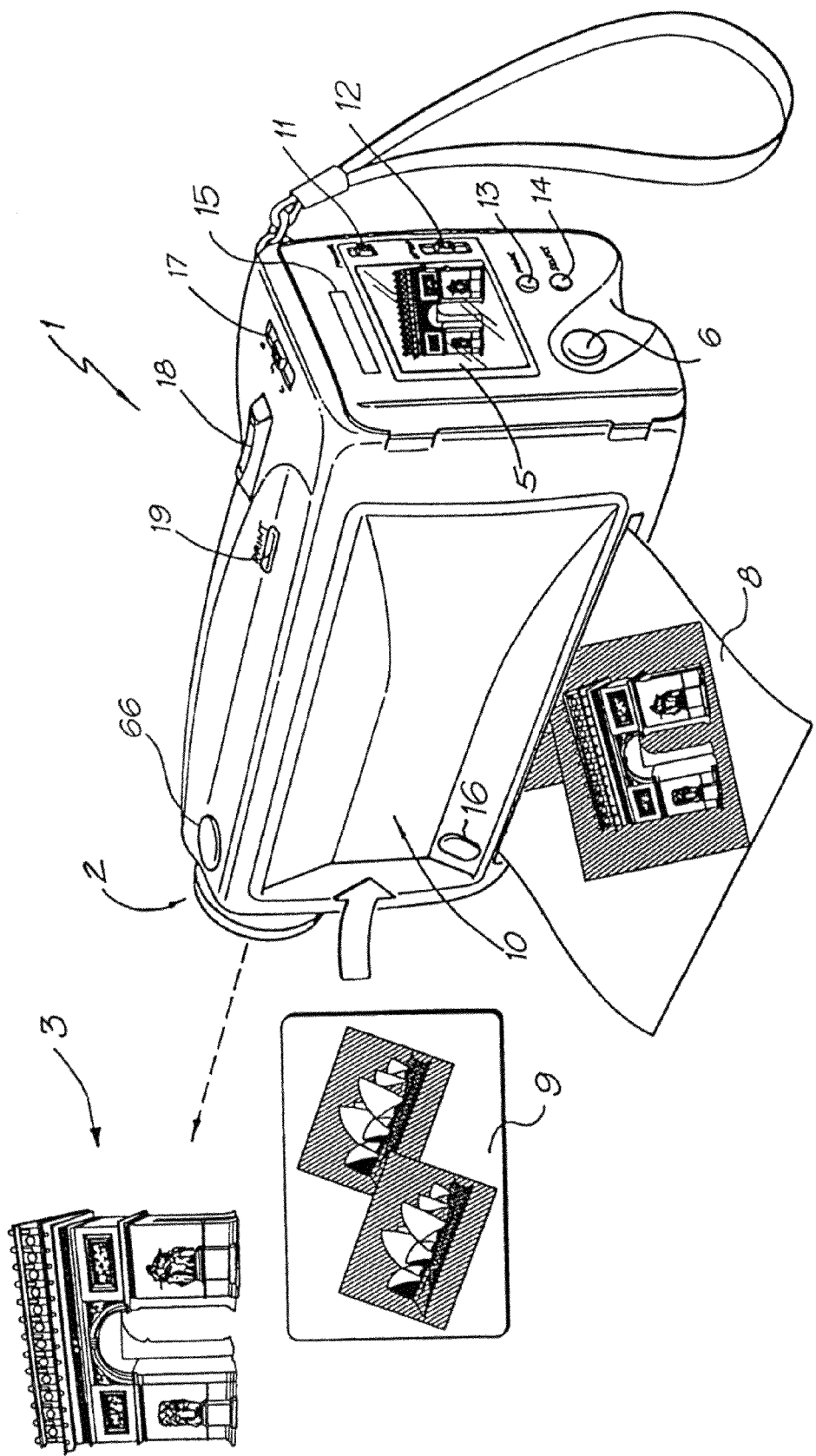
FIG. 1 illustrates an Artcam device constructed in accordance with the preferred embodiment.

The digital image processing camera system constructed in accordance with the preferred embodiment is as illustrated in FIG. 1. The camera unit 1 includes means for the insertion of an integral print roll (not shown). The camera unit 1 can include an area image sensor 2 which sensors an image 3 for captured by the camera. Optionally, the second area image sensor can be provided to also image the scene 3 and to optionally provide for the production of stereographic output effects.

The camera 1 can include an optional color display 5 for the display of the image being sensed by the sensor 2. When a simple image is being displayed on the display 5, the button 6 can be depressed resulting in the printed image 8 being output by the camera unit 1. A series of cards, herein after known as "Artcards" 9 contain, on one surface encoded information and on the other surface, contain an image distorted by the particular effect produced by the Artcard 9. The Artcard 9 is inserted in an Artcard reader 10 in the side of camera 1 and, upon insertion, results in output image 8 being distorted in the same manner as the distortion appearing on the surface of Artcard 9. Hence, by means of this simple user interface a user wishing to produce a particular effect can insert one of many Artcards 9 into the Artcard reader 10 and utilize button 19 to take a picture of the image 3 resulting in a corresponding distorted output image 8.

The camera unit 1 can also include a number of other control button 13, 14 in addition to a simple LCD output display 15 for the display of informative information including the number of printouts left on the internal print roll on the camera unit. Additionally, different output formats can be controlled by CHP switch 17.

Figure 2:
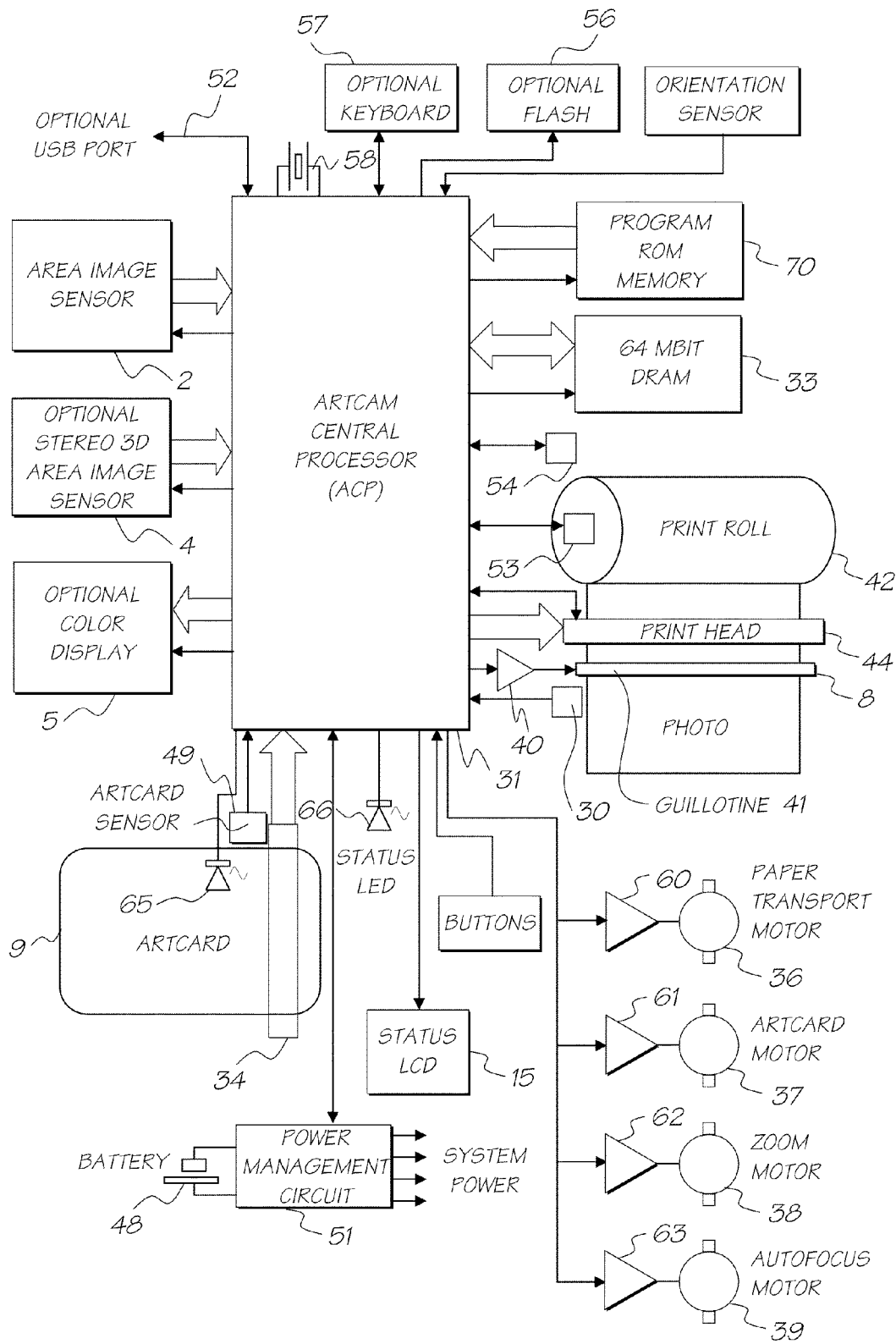
FIG. 2 is a schematic block diagram of the main Artcam electronic components.
Figure 2A:
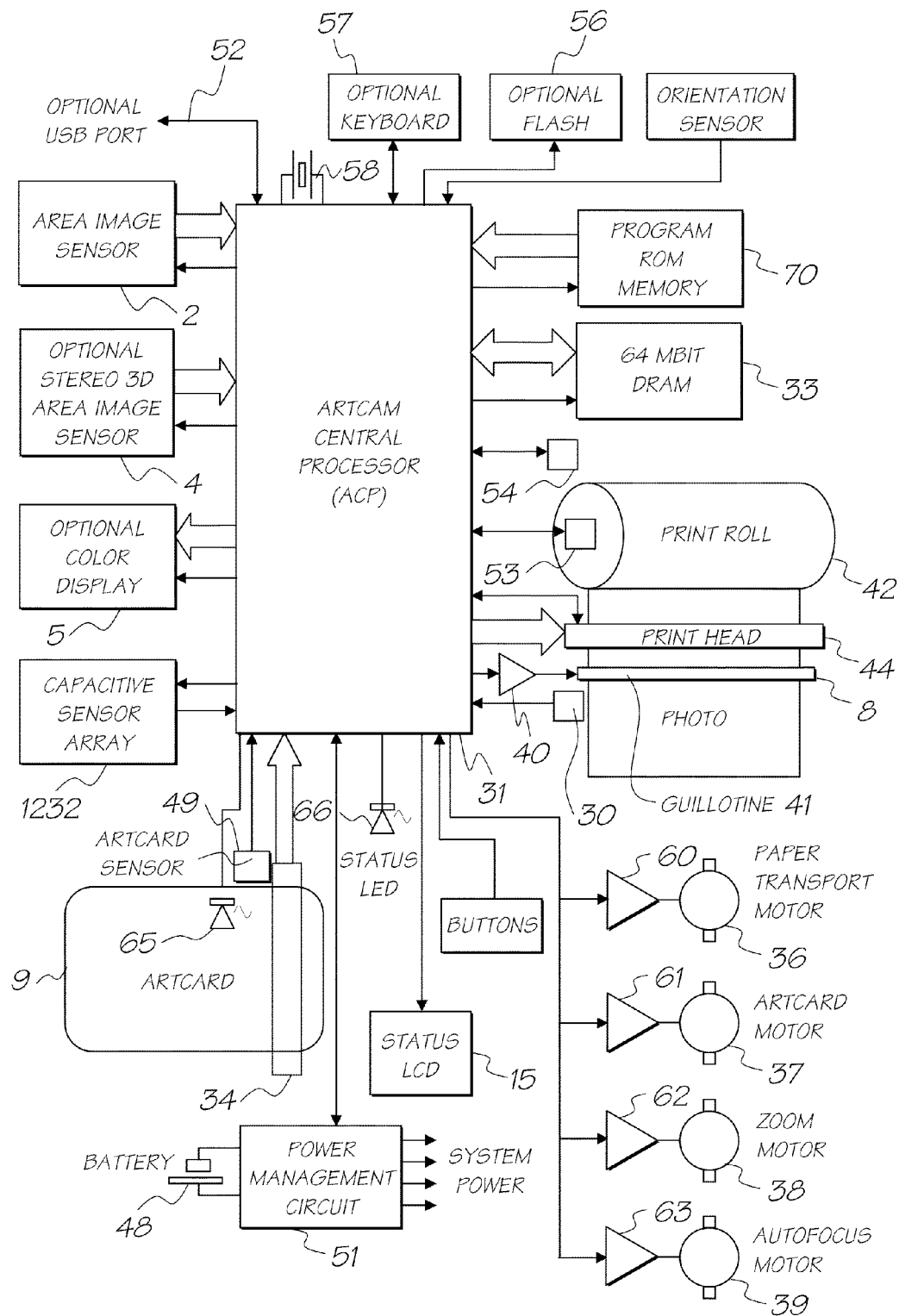
FIG. 2A is a schematic block diagram of the main Artcam components, including an array of capacitive sensors for actuation by an actuating formation on a printing cartridge.

Turning now to FIG. 2, there is illustrated a schematic view of the internal hardware of the camera unit 1. The internal hardware is based around an Artcam central processor unit (ACP) 31.

Artcam Central Processor 31

The Artcam central processor 31 provides many functions which form the 'heart' of the system. The ACP 31 is preferably implemented as a complex, high speed, CMOS system on-a-chip. Utilising standard cell design with some full custom regions is recommended. Fabrication on a 0.25 micron CMOS process will provide the density and speed required, along with a reasonably small die area.

The functions provided by the ACP 31 include:

1. Control and digitization of the area image sensor 2. A 3D stereoscopic version of the ACP requires two area image sensor interfaces with a second optional image sensor 4 being provided for stereoscopic effects.

2. Area image sensor compensation, reformatting, and image enhancement.

3. Memory interface and management to a memory store 33.

4. Interface, control, and analog to digital conversion of an Artcard reader linear image sensor 34 which is provided for the reading of data from the Artcards 9.

5. Extraction of the raw Artcard data from the digitized and encoded Artcard image.

6. Reed-Solomon error detection and correction of the Artcard encoded data. The encoded surface of the Artcard 9 includes information on how to process an image to produce the effects displayed on the image distorted surface of the Artcard 9. This information is in the form of a script, hereinafter known as a "Vark script". The Vark script is utilised by an interpreter running within the ACP 31 to produce the desired effect.

7. Interpretation of the Vark script on the Artcard 9.

8. Performing image processing operations as specified by the Vark script.

9. Controlling various motors for the paper transport 36, zoom lens 38, autofocus 39 and Artcard driver 37.

10. Controlling a guillotine actuator 40 for the operation of a guillotine 41 for the cutting of photographs 8 from print roll 42.

11. Half-toning of the image data for printing.

12. Providing the print data to a print-head 44 at the appropriate times.

13. Controlling the print head 44.

14. Controlling the ink pressure feed to print-head 44.

15. Controlling optional flash unit 56.

16. Reading and acting on various sensors in the camera, including camera orientation sensor 46, autofocus 47 and Artcard insertion sensor 49.

17. Reading and acting on the user interface buttons 6, 13, 14.

18. Controlling the status display 15.

19. Providing viewfinder and preview images to the color display 5.

20. Control of the system power consumption, including the ACP power consumption via power management circuit 51.

21. Providing external communications 52 to general purpose computers (using part USB).

22. Reading and storing information in a printing roll authentication chip 53.

23. Reading and storing information in a camera authentication chip 54.

24. Communicating with an optional mini-keyboard 57 for text modification.

Quartz Crystal 58

A quartz crystal 58 is used as a frequency reference for the system clock. As the system clock is very high, the ACP 31 includes a phase locked loop clock circuit to increase the frequency derived from the crystal 58.

Image Sensing
Area Image Sensor 2

The area image sensor 2 converts an image through its lens into an electrical signal. It can either be a charge coupled device (CCD) or an active pixel sensor (APS) CMOS image sector. At present, available CCD's normally have a higher image quality, however, there is currently much development occurring in CMOS imagers. CMOS imagers are eventually expected to be substantially cheaper than CCD's have smaller pixel areas, and be able to incorporate drive circuitry and signal processing. They can also be made in CMOS fabs, which are transitioning to 12" wafers. CCD's are usually built in 6" wafer fabs, and economics may not allow a conversion to 12" fabs. Therefore, the difference in fabrication cost between CCD's and CMOS imagers is likely to increase, progressively favoring CMOS imagers. However, at present, a CCD is probably the best option.

The Artcam unit will produce suitable results with a 1,500× 1,000 area image sensor. However, smaller sensors, such as 750×500, will be adequate for many markets. The Artcam is less sensitive to image sensor resolution than are conventional digital cameras. This is because many of the styles contained on Artcards 9 process the image in such a way as to obscure the lack of resolution. For example, if the image is distorted to simulate the effect of being converted to an impressionistic painting, low source image resolution can be used with minimal effect. Further examples for which low resolution input images will typically not be noticed include image warps which produce high distorted images, multiple miniature copies of the of the image (eg. passport photos), textural processing such as bump mapping for a base relief metal look, and photo-compositing into structured scenes.

This tolerance of low resolution image sensors may be a significant factor in reducing the manufacturing cost of an Artcam unit 1 camera. An Artcam with a low cost 750×500 image sensor will often produce superior results to a conventional digital camera with a much more expensive 1,500×1, 000 image sensor.

Optional Stereoscopic 3D Image Sensor 4

The 3D versions of the Artcam unit 1 have an additional image sensor 4, for stereoscopic operation. This image sensor is identical to the main image sensor. The circuitry to drive the optional image sensor may be included as a standard part of the ACP chip 31 to reduce incremental design cost. Alternatively, a separate 3D Artcam ACP can be designed. This option will reduce the manufacturing cost of a mainstream single sensor Artcam.

Print Roll Authentication Chip 53

A small chip 53 is included in each print roll 42. This chip replaced the functions of the bar code, optical sensor and wheel, and ISO/ASA sensor on other forms of camera film units such as Advanced Photo Systems film cartridges.

The authentication chip also provides other features:

1. The storage of data rather than that which is mechanically and optically sensed from APS rolls
2. A remaining media length indication, accurate to high resolution.
3. Authentication Information to prevent inferior clone print roll copies.

The authentication chip 53 contains 1024 bits of Flash memory, of which 128 bits is an authentication key, and 512 bits is the authentication information. Also included is an encryption circuit to ensure that the authentication key cannot be accessed directly.

Print-Head 44

The Artcam unit 1 can utilize any color print technology which is small enough, low enough power, fast enough, high enough quality, and low enough cost, and is compatible with the print roll. Relevant printheads will be specifically discussed hereinafter.

The specifications of the ink jet head are:

| | |
|---|---|
| Image type | Bi-level, dithered |
| Color | CMY Process Color |
| Resolution | 1600 dpi |
| Print head length | 'Page-width' (100 mm) |
| Print speed | 2 seconds per photo |

Optional Ink Pressure Controller (not Shown)

The function of the ink pressure controller depends upon the type of ink jet print head 44 incorporated in the Artcam. For some types of ink jet, the use of an ink pressure controller can be eliminated, as the ink pressure is simply atmospheric pressure. Other types of print head require a regulated positive ink pressure. In this case, the in pressure controller consists of a pump and pressure transducer.

Other print heads may require an ultrasonic transducer to cause regular oscillations in the ink pressure, typically at frequencies around 100 KHz. In the case, the ACP 31 controls the frequency phase and amplitude of these oscillations.

Paper Transport Motor 36

The paper transport motor 36 moves the paper from within the print roll 42 past the print head at a relatively constant rate. The motor 36 is a miniature motor geared down to an appropriate speed to drive rollers which move the paper. A high quality motor and mechanical gears are required to achieve high image quality, as mechanical rumble or other vibrations will affect the printed dot row spacing.

Paper Transport Motor Driver 60

The motor driver 60 is a small circuit which amplifies the digital motor control signals from the APC 31 to levels suitable for driving the motor 36.

Paper Pull Sensor

A paper pull sensor 50 detects a user's attempt to pull a photo from the camera unit during the printing process. The APC 31 reads this sensor 50, and activates the guillotine 41 if the condition occurs. The paper pull sensor 50 is incorporated to make the camera more 'foolproof' in operation. Were the user to pull the paper out forcefully during printing, the print mechanism 44 or print roll 42 may (in extreme cases) be damaged. Since it is acceptable to pull out the 'pod' from a Polaroid type camera before it is fully ejected, the public has been 'trained' to do this. Therefore, they are unlikely to heed printed instructions not to pull the paper.

The Artcam preferably restarts the photo print process after the guillotine 41 has cut the paper after pull sensing.

The pull sensor can be implemented as a strain gauge sensor, or as an optical sensor detecting a small plastic flag which is deflected by the torque that occurs on the paper drive rollers when the paper is pulled. The latter implementation is recommendation for low cost.

Paper Guillotine Actuator 40

The paper guillotine actuator 40 is a small actuator which causes the guillotine 41 to cut the paper either at the end of a photograph, or when the paper pull sensor 50 is activated.

The guillotine actuator 40 is a small circuit which amplifies a guillotine control signal from the APC tot the level required by the actuator 41.

Artcard 9

The Artcard 9 is a program storage medium for the Artcam unit. As noted previously, the programs are in the form of Vark scripts. Vark is a powerful image processing language especially developed for the Artcam unit. Each Artcard 9 contains one Vark script, and thereby defines one image processing style.

Preferably, the VARK language is highly image processing specific. By being highly image processing specific, the amount of storage required to store the details on the card are substantially reduced. Further, the ease with which new programs can be created, including enhanced effects, is also substantially increased. Preferably, the language includes facilities for handling many image processing functions including image warping via a warp map, convolution, color lookup tables, posterizing an image, adding noise to an image, image enhancement filters, painting algorithms, brush jittering and manipulation edge detection filters, tiling, illumination via light sources, bump maps, text, face detection and object detection attributes, fonts, including three dimensional fonts, and arbitrary complexity pre-rendered icons. Further details of the operation of the Vark language interpreter are contained hereinafter.

Hence, by utilizing the language constructs as defined by the created language, new affects on arbitrary images can be created and constructed for inexpensive storage on Artcard and subsequent distribution to camera owners. Further, on one surface of the card can be provided an example illustrating the effect that a particular VARK script, stored on the other surface of the card, will have on an arbitrary captured image.

By utilizing such a system, camera technology can be distributed without a great fear of obsolescence in that, provided a VARK interpreter is incorporated in the camera device, a device independent scenario is provided whereby the underlying technology can be completely varied over time. Further, the VARK scripts can be updated as new filters are created and distributed in an inexpensive manner, such as via simple cards for card reading.

The Artcard 9 is a piece of thin white plastic with the same format as a credit card (86 mm long by 54 mm wide). The Artcard is printed on both sides using a high resolution ink jet printer. The inkjet printer technology is assumed to be the same as that used in the Artcam, with 1600 dpi (63 dpmm) resolution. A major feature of the Artcard 9 is low manufacturing cost. Artcards can be manufactured at high speeds as a wide web of plastic film. The plastic web is coated on both sides with a hydrophilic dye fixing layer. The web is printed simultaneously on both sides using a 'pagewidth' color ink jet printer. The web is then cut and punched into individual cards. On one face of the card is printed a human readable representation of the effect the Artcard 9 will have on the sensed image. This can be simply a standard image which has been processed using the Vark script stored on the back face of the card.

On the back face of the card is printed an array of dots which can be decoded into the Vark script that defines the image processing sequence. The print area is 80 mm×50 mm, giving a total of 15,876,000 dots. This array of dots could represent at least 1.89 Mbytes of data. To achieve high reliability, extensive error detection and correction is incorporated in the array of dots. This allows a substantial portion of the card to be defaced, worn, creased, or dirty with no effect on data integrity. The data coding used is Reed-Solomon coding, with half of the data devoted to error correction. This allows the storage of 967 Kbytes of error corrected data on each Artcard 9.

Linear Image Sensor 34

The Artcard linear sensor 34 converts the aforementioned Artcard data image to electrical signals. As with the area image sensor 2, 4, the linear image sensor can be fabricated using either CCD or APS CMOS technology. The active length of the image sensor 34 is 50 mm, equal to the width of the data array on the Artcard 9. To satisfy Nyquist's sampling theorem, the resolution of the linear image sensor 34 must be at least twice the highest spatial frequency of the Artcard optical image reaching the image sensor. In practice, data detection is easier if the image sensor resolution is substantially above this. A resolution of 4800 dpi (189 dpmm) is chosen, giving a total of 9,450 pixels. This resolution requires a pixel sensor pitch of 5.3 µm. This can readily be achieved by using four staggered rows of 20 µm pixel sensors.

The linear image sensor is mounted in a special package which includes a LED 65 to illuminate the Artcard 9 via a light-pipe (not shown).

The Artcard reader light-pipe can be a molded light-pipe which has several function:

1. It diffuses the light from the LED over the width of the card using total internal reflection facets.

2. It focuses the light onto a 16 µm wide strip of the Artcard 9 using an integrated cylindrical lens.

3. It focuses light reflected from the Artcard onto the linear image sensor pixels using a molded array of microlenses.

The operation of the Artcard reader is explained further hereinafter.

Artcard Reader Motor 37

The Artcard reader motor propels the Artcard past the linear image sensor 34 at a relatively constant rate. As it may not be cost effective to include extreme precision mechanical components in the Artcard reader, the motor 37 is a standard miniature motor geared down to an appropriate speed to drive a pair of rollers which move the Artcard 9. The speed variations, rumble, and other vibrations will affect the raw image data as circuitry within the APC 31 includes extensive compensation for these effects to reliably read the Artcard data.

The motor 37 is driven in reverse when the Artcard is to be ejected.

Artcard Motor Driver 61

The Artcard motor driver 61 is a small circuit which amplifies the digital motor control signals from the APC 31 to levels suitable for driving the motor 37.

Card Insertion Sensor 49

The card insertion sensor 49 is an optical sensor which detects the presence of a card as it is being inserted in the card reader 34. Upon a signal from this sensor 49, the APC 31 initiates the card reading process, including the activation of the Artcard reader motor 37.

Card Eject Button 16

A card eject button 16 (FIG. 1) is used by the user to eject the current Artcard, so that another Artcard can be inserted. The APC 31 detects the pressing of the button, and reverses the Artcard reader motor 37 to eject the card.

Card Status Indicator 66

A card status indicator 66 is provided to signal the user as to the status of the Artcard reading process. This can be a standard bi-color (red/green) LED. When the card is successfully read, and data integrity has been verified, the LED lights up green continually. If the card is faulty, then the LED lights up red.

If the camera is powered from a 1.5 V instead of 3V battery, then the power supply voltage is less than the forward voltage drop of the greed LED, and the LED will not light. In this case, red LEDs can be used, or the LED can be powered from a voltage pump which also powers other circuits in the Artcam which require higher voltage.

64 Mbit DRAM 33

To perform the wide variety of image processing effects, the camera utilizes 8 Mbytes of memory 33. This can be provided by a single 64 Mbit memory chip. Of course, with changing memory technology increased Dram storage sizes may be substituted.

High speed access to the memory chip is required. This can be achieved by using a Rambus DRAM (burst access rate of 500 Mbytes per second) or chips using the new open standards such as double data rate (DDR) SDRAM or Synclink DRAM.

Camera Authentication Chip

The camera authentication chip 54 is identical to the print roll authentication chip 53, except that it has different information stored in it. The camera authentication chip 54 has three main purposes:

1. To provide a secure means of comparing authentication codes with the print roll authentication chip;
2. To provide storage for manufacturing information, such as the serial number of the camera;
3. To provide a small amount of non-volatile memory for storage of user information.

Displays

The Artcam includes an optional color display 5 and small status display 15. Lowest cost consumer cameras may include a color image display, such as a small TFT LCD 5 similar to those found on some digital cameras and camcorders. The color display 5 is a major cost element of these versions of Artcam, and the display 5 plus back light are a major power consumption drain.

Status Display 15

The status display 15 is a small passive segment based LCD, similar to those currently provided on silver halide and digital cameras. Its main function is to show the number of prints remaining in the print roll 42 and icons for various standard camera features, such as flash and battery status.

Color Display 5

The color display 5 is a full motion image display which operates as a viewfinder, as a verification of the image to be printed, and as a user interface display. The cost of the display 5 is approximately proportional to its area, so large displays (say 4" diagonal) unit will be restricted to expensive versions of the Artcam unit. Smaller displays, such as color camcorder viewfinder TFT's at around 1", may be effective for mid-range Artcams.

Zoom Lens (not Shown)

The Artcam can include a zoom lens. This can be a standard electronically controlled zoom lens, identical to one which would be used on a standard electronic camera, and similar to pocket camera zoom lenses. A referred version of the Artcam unit may include standard interchangeable 35 mm SLR lenses.

Autofocus Motor 39

The autofocus motor 39 changes the focus of the zoom lens. The motor is a miniature motor geared down to an appropriate speed to drive the autofocus mechanism.

Autofocus Motor Driver 63

The autofocus motor driver 63 is a small circuit which amplifies the digital motor control signals from the APC 31 to levels suitable for driving the motor 39.

Zoom Motor 38

The zoom motor 38 moves the zoom front lenses in and out. The motor is a miniature motor geared down to an appropriate speed to drive the zoom mechanism.

Zoom Motor Driver 62

The zoom motor driver 62 is a small circuit which amplifies the digital motor control signals from the APC 31 to levels suitable for driving the motor.

Communications

The ACP 31 contains a universal serial bus (USB) interface 52 for communication with personal computers. Not all Artcam models are intended to include the USB connector. However, the silicon area required for a USB circuit 52 is small, so the interface can be included in the standard ACP.

Optional Keyboard 57

The Artcam unit may include an optional miniature keyboard 57 for customizing text specified by the Artcard. Any text appearing in an Artcard image may be editable, even if it is in a complex metallic 3D font. The miniature keyboard includes a single line alphanumeric LCD to display the original text and edited text. The keyboard may be a standard accessory.

The ACP 31 contains a serial communications circuit for transferring data to and from the miniature keyboard.

Power Supply

The Artcam unit uses a battery 48. Depending upon the Artcam options, this is either a 3V Lithium cell, 1.5 V AA alkaline cells, or other battery arrangement.

Power Management Unit 51

Power consumption is an important design constraint in the Artcam. It is desirable that either standard camera batteries (such as 3V lithium batters) or standard AA or AAA alkaline cells can be used. While the electronic complexity of the Artcam unit is dramatically higher than 35 mm photographic cameras, the power consumption need not be commensurately higher. Power in the Artcam can be carefully managed with all unit being turned off when not in use.

The most significant current drains are the ACP 31, the area image sensors 2,4, the printer 44 various motors, the flash unit 56, and the optional color display 5 dealing with each part separately:

1. ACP: If fabricated using 0.25 µm CMOS, and running on 1.5V, the ACP power consumption can be quite low. Clocks to various parts of the ACP chip can be quite low. Clocks to various parts of the ACP chip can be turned off when not in use, virtually eliminating standby current consumption. The ACP will only fully used for approximately 4 seconds for each photograph printed.

2. Area image sensor: power is only supplied to the area image sensor when the user has their finger on the button.

3. The printer power is only supplied to the printer when actually printing. This is for around 2 seconds for each photograph. Even so, suitably lower power consumption printing should be used.

4. The motors required in the Artcam are all low power miniature motors, and are typically only activated for a few seconds per photo.

5. The flash unit 45 is only used for some photographs. Its power consumption can readily be provided by a 3V lithium battery for a reasonably battery life.

6. The optional color display 5 is a major current drain for two reasons: it must be on for the whole time that the camera is in use, and a backlight will be required if a liquid crystal display is used. Cameras which incorporate a color display will require a larger battery to achieve acceptable batter life.

Flash Unit 56

The flash unit 56 can be a standard miniature electronic flash for consumer cameras.

Overview of the ACP 31

Figure 3:
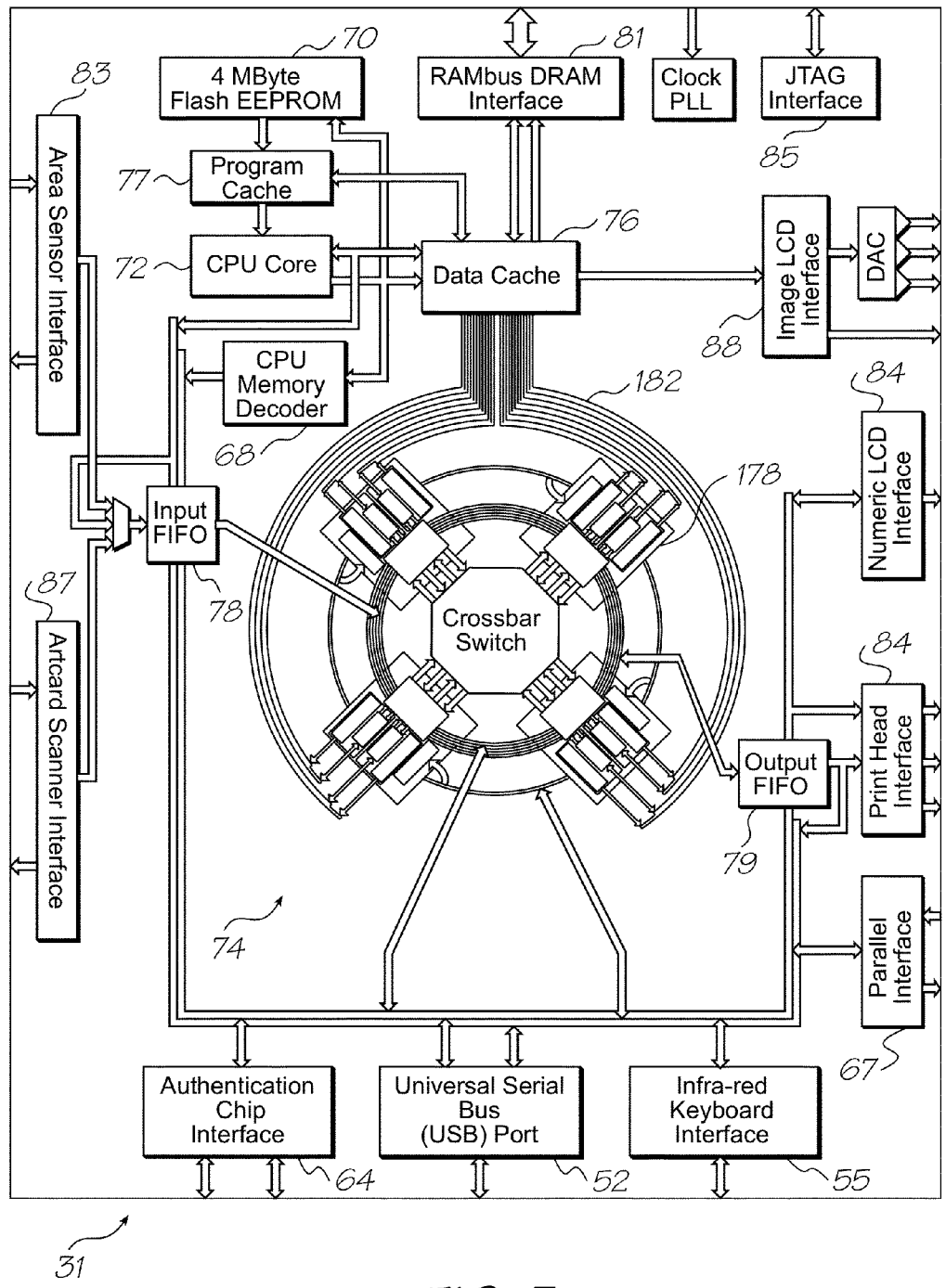
FIG. 3 is a schematic block diagram of the Artcam Central Processor.

FIG. 3 illustrates the Artcam Central Processor (ACP) 31 in more detail. The Artcam Central Processor provides all of the processing power for Artcam. It is designed for a 0.25 micron CMOS process, with approximately 1.5 million transistors and an area of around 50 mm$^2$. The ACP 31 is a complex design, but design effort can be reduced by the use of datapath compilation techniques, macrocells, and IP cores. The ACP 31 contains:

A RISC CPU core 72
A 4 way parallel VLIW Vector Processor 74
A Direct RAMbus interface 81
A CMOS image sensor interface 83
A CMOS linear image sensor interface 88
A USB serial interface 52
An infrared keyboard interface 55
A numeric LCD interface 84, and
A color TFT LCD interface 88
A 4 Mbyte Flash memory 70 for program storage 70

The RISC CPU, Direct RAMbus interface 81, CMOS sensor interface 83 and USB serial interface 52 can be vendor supplied cores. The ACP 31 is intended to run at a clock speed of 200 MHz on 3V externally and 1.5V internally to minimize power consumption. The CPU core needs only to run at 100 MHz. The following two block diagrams give two views of the ACP 31:

A View of the ACP 31 in Isolation

An example Artcam showing a high-level view of the ACP 31 connected to the rest of the Artcam hardware.

Image Access

As stated previously, the DRAM Interface 81 is responsible for interfacing between other client portions of the ACP chip and the RAMBUS DRAM. In effect, each module within the DRAM Interface is an address generator.

There are three logical types of images manipulated by the ACP. They are:

CCD Image, which is the Input Image captured from the CCD.

Internal Image format—the Image format utilised internally by the Artcam device.

Print Image—the Output Image format printed by the Artcam

These images are typically different in color space, resolution, and the output & input color spaces which can vary from camera to camera. For example, a CCD image on a low-end camera may be a different resolution, or have different color characteristics from that used in a high-end camera. However all internal image formats are the same format in terms of color space across all cameras.

In addition, the three image types can vary with respect to which direction is 'up'. The physical orientation of the camera causes the notion of a portrait or landscape image, and this must be maintained throughout processing. For this reason, the internal image is always oriented correctly, and rotation is performed on images obtained from the CCD and during the print operation.

CPU Core (CPU) 72

The ACP 31 incorporates a 32 bit RISC CPU 72 to run the Vark image processing language interpreter and to perform Artcam's general operating system duties. A wide variety of CPU cores are suitable: it can be any processor core with sufficient processing power to perform the required core calculations and control functions fast enough to met consumer expectations. Examples of suitable cores are: MIPS R4000 core from LSI Logic, StrongARM core. There is no need to maintain instruction set continuity between different Artcam models. Artcard compatibility is maintained irrespective of future processor advances and changes, because the Vark interpreter is simply re-compiled for each new instruction set. The ACP 31 architecture is therefore also free to evolve. Different ACP 31 chip designs may be fabricated by different manufacturers, without requiring to license or port the CPU core. This device independence avoids the chip vendor lock-in such as has occurred in the PC market with Intel. The CPU operates at 100 MHz, with a single cycle time of 10 ns. It must be fast enough to run the Vark interpreter, although the VLIW Vector Processor 74 is responsible for most of the time-critical operations.

Program Cache 72

Although the program code is stored in on-chip Flash memory 70, it is unlikely that well packed Flash memory 70 will be able to operate at the 10 ns cycle time required by the CPU. Consequently a small cache is required for good performance. 16 cache lines of 32 bytes each are sufficient, for a total of 512 bytes. The program cache 72 is defined in the chapter entitled Program cache 72.

Data Cache 76

A small data cache 76 is required for good performance. This requirement is mostly due to the use of a RAMbus DRAM, which can provide high-speed data in bursts, but is inefficient for single byte accesses. The CPU has access to a memory caching system that allows flexible manipulation of CPU data cache 76 sizes. A minimum of 16 cache lines (512 bytes) is recommended for good performance.

CPU Memory Model

An Artcam's CPU memory model consists of a 32 MB area. It consists of 8 MB of physical RDRAM off-chip in the base model of Artcam, with provision for up to 16 MB of off-chip memory. There is a 4 MB Flash memory 70 on the ACP 31 for program storage, and finally a 4 MB address space mapped to the various registers and controls of the ACP 31. The memory map then, for an Artcam is as follows:

| Contents | Size |
|---|---|
| Base Artcam DRAM | 8 MB |
| Extended DRAM | 8 MB |
| Program memory (on ACP 31 in Flash memory 70) | 4 MB |
| Reserved for extension of program memory | 4 MB |
| ACP 31 registers and memory-mapped I/O | 4 MB |
| Reserved | 4 MB |
| TOTAL | 32 MB |

A straightforward way of decoding addresses is to use address bits 23-24:

If bit 24 is clear, the address is in the lower 16-MB range, and hence can be satisfied from DRAM and the Data cache 76. In most cases the DRAM will only be 8 MB, but 16 MB is allocated to cater for a higher memory model Artcams.

If bit 24 is set, and bit 23 is clear, then the address represents the Flash memory 70 4 Mbyte range and is satisfied by the Program cache 72.

If bit 24=1 and bit 23=1, the address is translated into an access over the low speed bus to the requested component in the AC by the CPU Memory Decoder 68.

Flash Memory 70

The ACP 31 contains a 4 Mbyte Flash memory 70 for storing the Artcam program. It is envisaged that Flash memory 70 will have denser packing coefficients than masked ROM, and allows for greater flexibility for testing camera program code. The downside of the Flash memory 70 is the access time, which is unlikely to be fast enough for the 100 MHz operating speed (10 ns cycle time) of the CPU. A fast Program Instruction cache 77 therefore acts as the interface between the CPU and the slower Flash memory 70.

Program Cache 72

A small cache is required for good CPU performance. This requirement is due to the slow speed Flash memory 70 which stores the Program code. 16 cache lines of 32 bytes each are sufficient, for a total of 512 bytes. The Program cache 72 is a read only cache. The data used by CPU programs comes through the CPU Memory Decoder 68 and if the address is in DRAM, through the general Data cache 76. The separation allows the CPU to operate independently of the VLIW Vector Processor 74. If the data requirements are low for a given process, it can consequently operate completely out of cache. Finally, the Program cache 72 can be read as data by the CPU rather than purely as program instructions. This allows tables, microcode for the VLIW etc to be loaded from the Flash memory 70. Addresses with bit 24 set and bit 23 clear are satisfied from the Program cache 72.

CPU Memory Decoder 68

The CPU Memory Decoder 68 is a simple decoder for satisfying CPU data accesses. The Decoder translates data addresses into internal ACP register accesses over the internal low speed bus, and therefore allows for memory mapped I/O of ACP registers. The CPU Memory Decoder 68 only interprets addresses that have bit 24 set and bit 23 clear. There is no caching in the CPU Memory Decoder 68.

DRAM Interface 81

The DRAM used by the Artcam is a single channel 64 Mbit (8 MB) RAMbus RDRAM operating at 1.6 GB/sec. RDRAM accesses are by a single channel (16-bit data path) controller. The RDRAM also has several useful operating modes for low power operation. Although the Rambus specification describes a system with random 32 byte transfers as capable of achieving a greater than 95% efficiency, this is not true if only part of the 32 bytes are used. Two reads followed by two writes to the same device yields over 86% efficiency. The primary latency is required for bus turn-around going from a Write to a Read, and since there is a Delayed Write mechanism, efficiency can be further improved. With regards to writes, Write Masks allow specific subsets of bytes to be written to. These write masks would be set via internal cache "dirty bits". The upshot of the Rambus Direct RDRAM is a throughput of >1 GB/sec is easily achievable, and with multiple reads for every write (most processes) combined with intelligent algorithms making good use of 32 byte transfer knowledge, transfer rates of >1.3 GB/sec are expected. Every 10 ns, 16 bytes can be transferred to or from the core.

Data Cache 76

The ACP 31 contains a dedicated CPU instruction cache 77 and a general data cache 76. The Data cache 76 handles all DRAM requests (reads and writes of data) from the CPU, the VLIW Vector Processor 74, and the Display Controller 88. These requests may have very different profiles in terms of memory usage and algorithmic timing requirements. For example, a VLIW process may be processing an image in linear memory, and lookup a value in a table for each value in the image. There is little need to cache much of the image, but it may be desirable to cache the entire lookup table so that no real memory access is required. Because of these differing requirements, the Data cache 76 allows for an intelligent definition of caching.

Although the Rambus DRAM interface 81 is capable of very high-speed memory access (an average throughput of 32 bytes in 25 ns), it is not efficient dealing with single byte requests. In order to reduce effective memory latency, the ACP 31 contains 128 cache lines. Each cache line is 32 bytes wide. Thus the total amount of data cache 76 is 4096 bytes (4 KB). The 128 cache lines are configured into 16 programmable-sized groups. Each of the 16 groups must be a contiguous set of cache lines. The CPU is responsible for determining how many cache lines to allocate to each group. Within each group cache lines are filled according to a simple Least Recently Used algorithm. In terms of CPU data requests, the Data cache 76 handles memory access requests that have address bit 24 clear. If bit 24 is clear, the address is in the lower 16 MB range, and hence can be satisfied from DRAM and the Data cache 76. In most cases the DRAM will only be 8 MB, but 16 MB is allocated to cater for a higher memory model Artcam. If bit 24 is set, the address is ignored by the Data cache 76.

All CPU data requests are satisfied from Cache Group 0. A minimum of 16 cache lines is recommended for good CPU performance, although the CPU can assign any number of cache lines (except none) to Cache Group 0. The remaining Cache Groups (1 to 15) are allocated according to the current requirements. This could mean allocation to a VLIW Vector Processor 74 program or the Display Controller 88. For example, a 256 byte lookup table required to be permanently available would require 8 cache lines. Writing out a sequential image would only require 2-4 cache lines (depending on the size of record being generated and whether write requests are being Write Delayed for a significant number of cycles). Associated with each cache line byte is a dirty bit, used for creating a Write Mask when writing memory to DRAM. Associated with each cache line is another dirty bit, which indicates whether any of the cache line bytes has been written to (and therefore the cache line must be written back to DRAM before it can be reused). Note that it is possible for two different Cache Groups to be accessing the same address in memory and to get out of sync. The VLIW program writer is responsible to ensure that this is not an issue. It could be perfectly reasonable, for example, to have a Cache Group responsible for reading an image, and another Cache Group responsible for writing the changed image back to memory again. If the images are read or written sequentially there may be advantages in allocating cache lines in this manner. A total of 8 buses 182 connect the VLIW Vector Processor 74 to the Data cache 76. Each bus is connected to an I/O Address Generator. (There are 2 I/O Address Generators 189, 190 per Processing Unit 178, and there are 4 Processing Units in the VLIW Vector Processor 74. The total number of buses is therefore 8.)

In any given cycle, in addition to a single 32 bit (4 byte) access to the CPU's cache group (Group 0), 4 simultaneous accesses of 16 bits (2 bytes) to remaining cache groups are permitted on the 8 VLIW Vector Processor 74 buses. The Data cache 76 is responsible for fairly processing the requests. On a given cycle, no more than 1 request to a specific Cache Group will be processed. Given that there are 8 Address Generators 189, 190 in the VLIW Vector Processor 74, each one of these has the potential to refer to an individual Cache Group. However it is possible and occasionally reasonable for 2 or more Address Generators 189, 190 to access the same Cache Group. The CPU is responsible for ensuring that the Cache Groups have been allocated the correct number of cache lines, and that the various Address Generators 189, 190 in the VLIW Vector Processor 74 reference the specific Cache Groups correctly.

The Data cache 76 as described allows for the Display Controller 88 and VLIW Vector Processor 74 to be active simultaneously. If the operation of these two components were deemed to never occur simultaneously, a total 9 Cache Groups would suffice. The CPU would use Cache Group 0, and the VLIW Vector Processor 74 and the Display Controller 88 would share the remaining 8 Cache Groups, requiring only 3 bits (rather than 4) to define which Cache Group would satisfy a particular request.

JTAG Interface 85

A standard JTAG (Joint Test Action Group) Interface is included in the ACP 31 for testing purposes. Due to the complexity of the chip, a variety of testing techniques are required, including BIST (Built In Self Test) and functional block isolation. An overhead of 10% in chip area is assumed for overall chip testing circuitry. The test circuitry is beyond the scope of this document.

Serial Interfaces

USB Serial Port Interface 52

This is a standard USB serial port, which is connected to the internal chip low speed bus, thereby allowing the CPU to control it.

Keyboard Interface 65

This is a standard low-speed serial port, which is connected to the internal chip low speed bus, thereby allowing the CPU to control it. It is designed to be optionally connected to a keyboard to allow simple data input to customize prints.

Authentication Chip Serial Interfaces 64

These are 2 standard low-speed serial ports, which are connected to the internal chip low speed bus, thereby allowing the CPU to control them. The reason for having 2 ports is to connect to both the on-camera Authentication chip, and to the print-roll Authentication chip using separate lines. Only using 1 line may make it possible for a clone print-roll manufacturer to design a chip which, instead of generating an authentication code, tricks the camera into using the code generated by the authentication chip in the camera.

Parallel Interface 67

The parallel interface connects the ACP 31 to individual static electrical signals. The CPU is able to control each of these connections as memory-mapped I/O via the low speed bus The following table is a list of connections to the parallel interface:

| Connection | Direction | Pins |
| --- | --- | --- |
| Paper transport stepper motor | Out | 4 |
| Artcard stepper motor | Out | 4 |
| Zoom stepper motor | Out | 4 |
| Guillotine motor | Out | 1 |
| Flash trigger | Out | 1 |
| Status LCD segment drivers | Out | 7 |
| Status LCD common drivers | Out | 4 |
| Artcard illumination LED | Out | 1 |
| Artcard status LED (red/green) | In | 2 |
| Artcard sensor | In | 1 |
| Paper pull sensor | In | 1 |
| Orientation sensor | In | 2 |
| Buttons | In | 4 |
| TOTAL | | 36 |

VLIW Input and Output FIFOs 78, 79

The VLIW Input and Output FIFOs are 8 bit wide FIFOs used for communicating between processes and the VLIW Vector Processor 74. Both FIFOs are under the control of the VLIW Vector Processor 74, but can be cleared and queried (e.g. for status) etc by the CPU.

VLIW Input FIFO 78

A client writes 8-bit data to the VLIW Input FIFO 78 in order to have the data processed by the VLIW Vector Processor 74. Clients include the Image Sensor Interface, Artcard Interface, and CPU. Each of these processes is able to offload processing by simply writing the data to the FIFO, and letting the VLIW Vector Processor 74 do all the hard work. An example of the use of a client's use of the VLIW Input FIFO 78 is the Image Sensor Interface (ISI 83). The ISI 83 takes data from the Image Sensor and writes it to the FIFO. A VLIW process takes it from the FIFO, transforming it into the correct image data format, and writing it out to DRAM. The ISI 83 becomes much simpler as a result.

VLIW Output FIFO 79

The VLIW Vector Processor 74 writes 8-bit data to the VLIW Output FIFO 79 where clients can read it. Clients include the Print Head Interface and the CPU. Both of these clients is able to offload processing by simply reading the already processed data from the FIFO, and letting the VLIW Vector Processor 74 do all the hard work. The CPU can also be interrupted whenever data is placed into the VLIW Output FIFO 79, allowing it to only process the data as it becomes available rather than polling the FIFO continuously. An example of the use of a client's use of the VLIW Output FIFO 79 is the Print Head Interface (PHI 62). A VLIW process takes an image, rotates it to the correct orientation, color converts it, and dithers the resulting image according to the print head requirements. The PHI 62 reads the dithered formatted 8-bit data from the VLIW Output FIFO 79 and simply passes it on to the Print Head external to the ACP 31. The PHI 62 becomes much simpler as a result.

VLIW Vector Processor 74

To achieve the high processing requirements of Artcam, the ACP 31 contains a VLIW (Very Long Instruction Word) Vector Processor. The VLIW processor is a set of 4 identical Processing Units (PU e.g 178) working in parallel, connected by a crossbar switch 183. Each PU e.g 178 can perform four 8-bit multiplications, eight 8-bit additions, three 32-bit additions, I/O processing, and various logical operations in each cycle. The PUs e.g 178 are microcoded, and each has two Address Generators 189, 190 to allow full use of available cycles for data processing. The four PUs e.g 178 are normally synchronized to provide a tightly interacting VLIW processor. Clocking at 200 MHz, the VLIW Vector Processor 74 runs at 12 Gops (12 billion operations per second). Instructions are tuned for image processing functions such as warping, artistic brushing, complex synthetic illumination, color transforms, image filtering, and compositing. These are accelerated by two orders of magnitude over desktop computers.

Figure 3A:
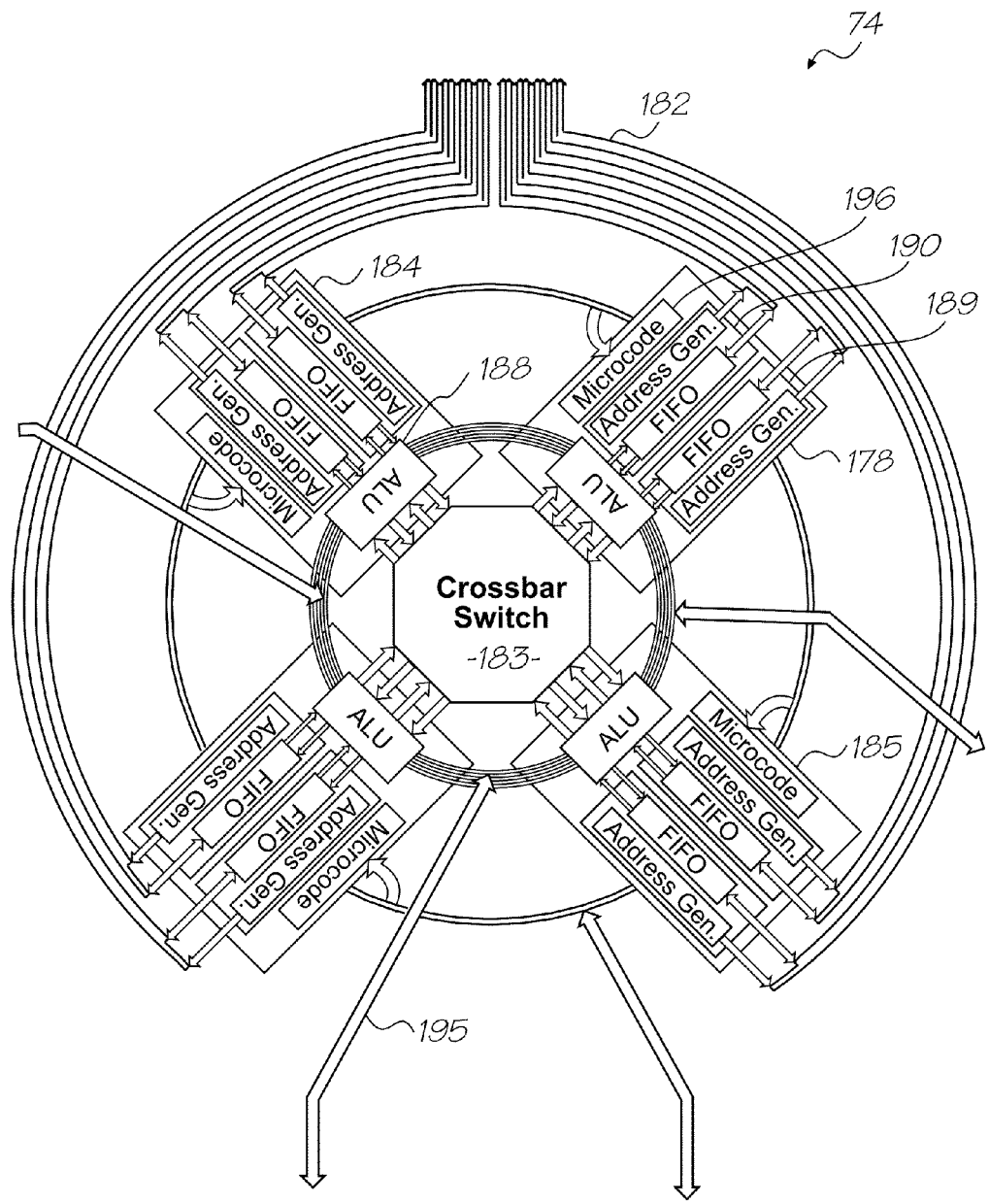
FIG. 3(a) illustrates the VLIW Vector Processor in more detail.
Figure 3A:
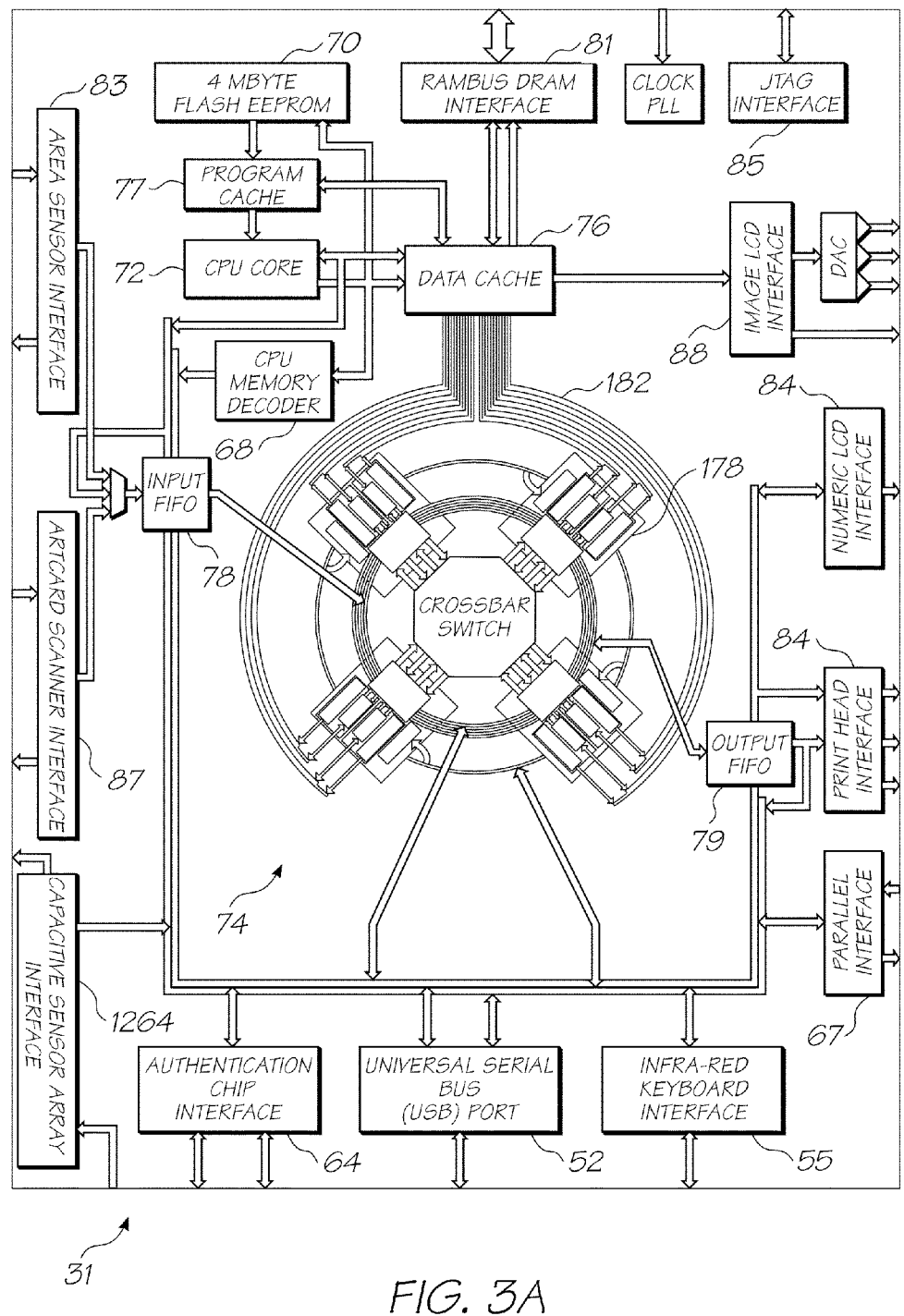

As shown in more detail in FIG. 3(a), the VLIW Vector Processor 74 is 4 PUs e.g 178 connected by a crossbar switch 183 such that each PU e.g 178 provides two inputs to, and takes two outputs from, the crossbar switch 183. Two common registers form a control and synchronization mechanism for the PUs e.g 178. 8 Cache buses 182 allow connectivity to DRAM via the Data cache 76, with 2 buses going to each PU e.g 178 (1 bus per I/O Address Generator).

Figure 4:
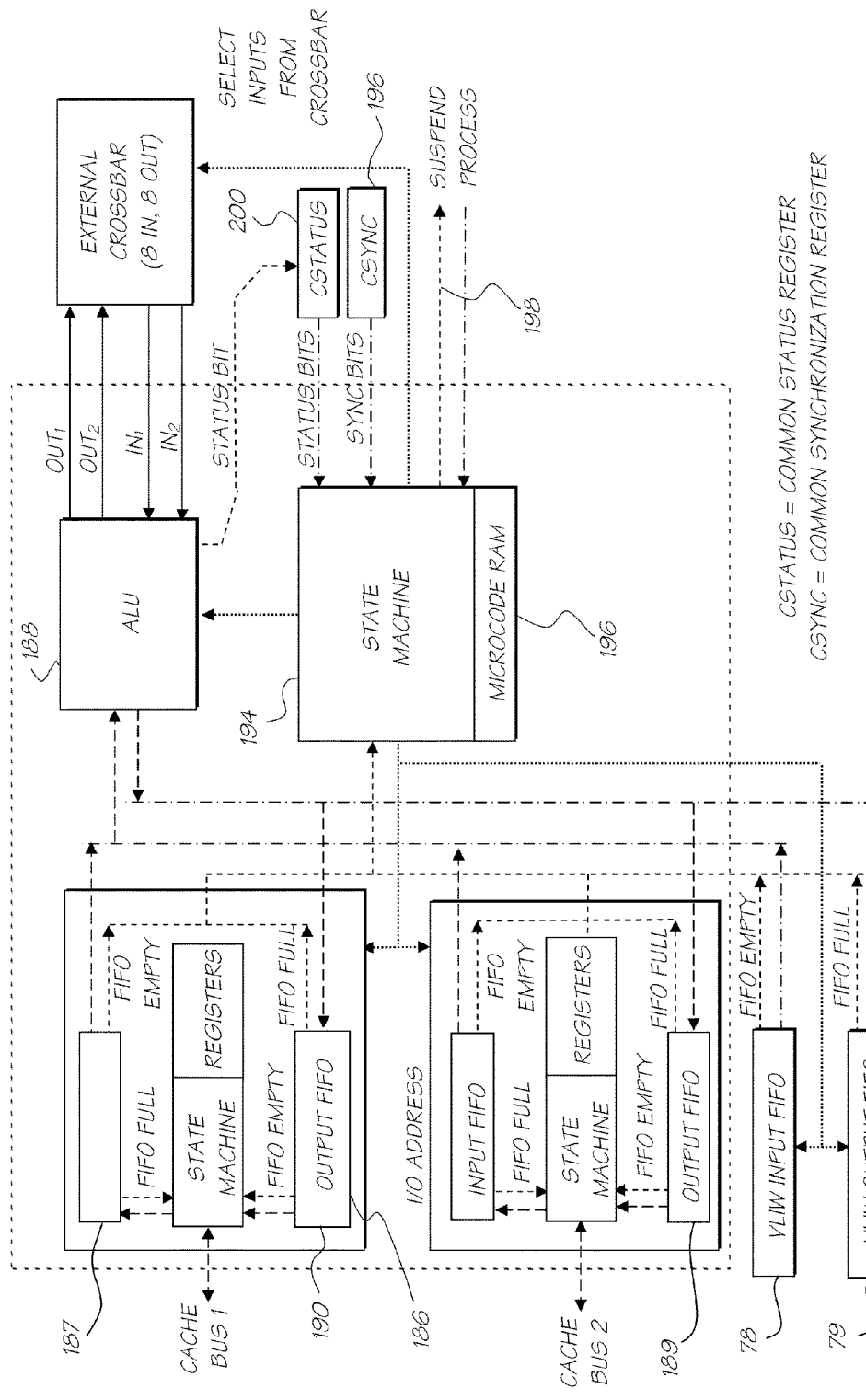
FIG. 4 illustrates the Processing Unit in more detail.

Each PU e.g 178 consists of an ALU 188 (containing a number of registers & some arithmetic logic for processing data), some microcode RAM 196, and connections to the outside world (including other ALUs). A local PU state machine runs in microcode and is the means by which the PU e.g 178 is controlled. Each PU e.g 178 contains two I/O Address Generators 189, 190 controlling data flow between DRAM (via the Data cache 76) and the ALU 188 (via Input FIFO and Output FIFO). The address generator is able to read and write data (specifically images in a variety of formats) as well as tables and simulated FIFOs in DRAM. The formats are customizable under software control, but are not microcoded. Data taken from the Data cache 76 is transferred to the ALU 188 via the 16-bit wide Input FIFO. Output data is written to the 16-bit wide Output FIFO and from there to the Data cache 76. Finally, all PUs e.g 178 share a single 8-bit wide VLIW Input FIFO 78 and a single 8-bit wide VLIW Output FIFO 79. The low speed data bus connection allows the CPU to read and write registers in the PU e.g 178, update microcode, as well as the common registers shared by all PUs e.g 178 in the VLIW Vector Processor 74. Turning now to FIG. 4, a closer detail of the internals of a single PU e.g 178 can be seen, with components and control signals detailed in subsequent hereinafter:

Microcode

Each PU e.g 178 contains a microcode RAM 196 to hold the program for that particular PU e.g 178. Rather than have the microcode in ROM, the microcode is in RAM, with the CPU responsible for loading it up. For the same space on chip, this tradeoff reduces the maximum size of any one function to the size of the RAM, but allows an unlimited number of functions to be written in microcode. Functions implemented using microcode include Vark acceleration, Artcard reading, and Printing. The VLIW Vector Processor 74 scheme has several advantages for the case of the ACP 31:

Hardware design complexity is reduced

Hardware risk is reduced due to reduction in complexity

Hardware design time does not depend on all Vark functionality being implemented in dedicated silicon Space on chip is reduced overall (due to large number of processes able to be implemented as microcode)

Functionality can be added to Vark (via microcode) with no impact on hardware design time Size and Content The CPU loaded microcode RAM 196 for controlling each PU e.g 178 is 128 words, with each word being 96 bits wide. A summary of the microcode size for control of various units of the PU e.g 178 is listed in the following table:

| Process Block | Size (bits) |
| --- | --- |
| Status Output | 3 |
| Branching (microcode control) | 11 |
| In | 8 |
| Out | 6 |
| Registers | 7 |
| Read | 10 |
| Write | 6 |
| Barrel Shifter | 12 |

| Process Block | Size (bits) |
| --- | --- |
| Adder/Logical | 14 |
| Multiply/Interpolate | 19 |
| TOTAL | 96 |

With 128 instruction words, the total microcode RAM 196 per PU e.g 178 is 12,288 bits, or 1.5 KB exactly. Since the VLIW Vector Processor 74 consists of 4 identical PUs e.g 178 this equates to 6,144 bytes, exactly 6 KB. Some of the bits in a microcode word are directly used as control bits, while others are decoded. See the various unit descriptions that detail the interpretation of each of the bits of the microcode word.

Synchronization Between PUs E.G 178

Each PU e.g 178 contains a 4 bit Synchronization Register 197. It is a mask used to determine which PUs e.g 178 work together, and has one bit set for each of the corresponding PUs e.g 178 that are functioning as a single process. For example, if all of the PUs e.g 178 were functioning as a single process, each of the 4 Synchronization Register 197s would have all 4 bits set. If there were two asynchronous processes of 2 PUs e.g 178 each, two of the PUs e.g 178 would have 2 bits set in their Synchronization Register 197s (corresponding to themselves), and the other two would have the other 2 bits set in their Synchronization Register 197s (corresponding to themselves).

The Synchronization Register 197 is used in two basic ways:
Stopping and starting a given process in synchrony
Suspending execution within a process Stopping and Starting Processes The CPU is responsible for loading the microcode RAM 196 and loading the execution address for the first instruction (usually 0). When the CPU starts executing microcode, it begins at the specified address.

Execution of microcode only occurs when all the bits of the Synchronization Register 197 are also set in the Common Synchronization Register 197. The CPU therefore sets up all the PUs e.g 178 and then starts or stops processes with a single write to the Common Synchronization Register 197.

This synchronization scheme allows multiple processes to be running asynchronously on the PUs e.g 178, being stopped and started as processes rather than one PU e.g 178 at a time.

Suspending Execution within a Process

In a given cycle, a PU e.g 178 may need to read from or write to a FIFO (based on the opcode of the current microcode instruction). If the FIFO is empty on a read request, or full on a write request, the FIFO request cannot be completed. The PU e.g 178 will therefore assert its SuspendProcess control signal 198. The SuspendProcess signals from all PUs e.g 178 are fed back to all the PUs e.g 178.

The Synchronization Register 197 is ANDed with the 4 SuspendProcess bits, and if the result is non-zero, none of the PU e.g 178's register WriteEnables or FIFO strobes will be set. Consequently none of the PUs e.g 178 that form the same process group as the PU e.g 178 that was unable to complete its task will have their registers or FIFOs updated during that cycle. This simple technique keeps a given process group in synchronization. Each subsequent cycle the PU e.g 178's state machine will attempt to re-execute the microcode instruction at the same address, and will continue to do so until successful. Of course the Common Synchronization Register 197 can be written to by the CPU to stop the entire process if necessary. This synchronization scheme allows any combinations of PUs e.g 178 to work together, each group only affecting its co-workers with regards to suspension due to data not being ready for reading or writing.

Control and Branching

During each cycle, each of the four basic input and calculation units within a PU e.g 178's ALU 188 (Read, Adder/Logic, Multiply/Interpolate, and Barrel Shifter) produces two status bits: a Zero flag and a Negative flag indicating whether the result of the operation during that cycle was 0 or negative. Each cycle one of those 4 status bits is chosen by microcode instructions to be output from the PU e.g 178. The 4 status bits (1 per PU e.g 178's ALU 188) are combined into a 4 bit Common Status Register 200. During the next cycle, each PU e.g 178's microcode program can select one of the bits from the Common Status Register 200, and branch to another microcode address dependant on the value of the status bit.

Status Bit

Each PU e.g 178's ALU 188 contains a number of input and calculation units. Each unit produces 2 status bits—a negative flag and a zero flag. One of these status bits is output from the PU e.g 178 when a particular unit asserts the value on the 1-bit tri-state status bit bus. The single status bit is output from the PU e.g 178, and then combined with the other PU e.g 178 status bits to update the Common Status Register 200. The microcode for determining the output status bit takes the following form:

| # Bits | Description |
| --- | --- |
| 2 | Select unit whose status bit is to be output<br>00 = Adder unit<br>01 = Multiply/Logic unit<br>10 = Barrel Shift unit<br>11 = Reader unit |
| 1 | 0 = Zero flag<br>1 = Negative flag |
| 3 | TOTAL |

Within the ALU 188, the 2-bit Select Processor Block value is decoded into four 1-bit enable bits, with a different enable bit sent to each processor unit block. The status select bit (choosing Zero or Negative) is passed into all units to determine which bit is to be output onto the status bit bus.

Branching within Microcode

Each PU e.g 178 contains a 7 bit Program Counter (PC) that holds the current microcode address being executed. Normal program execution is linear, moving from address N in one cycle to address N+1 in the next cycle. Every cycle however, a microcode program has the ability to branch to a different location, or to test a status bit from the Common Status Register 200 and branch. The microcode for determining the next execution address takes the following form:

| # Bits | Description |
| --- | --- |
| 2 | 00 = NOP (PC = PC + 1)<br>01 = Branch always<br>10 = Branch if status bit clear<br>11 = Branch if status bit set |
| 2 | Select status bit from status word |
| 7 | Address to branch to (absolute address, 00-7F) |
| 11 | TOTAL |

ALU 188

Figure 5:
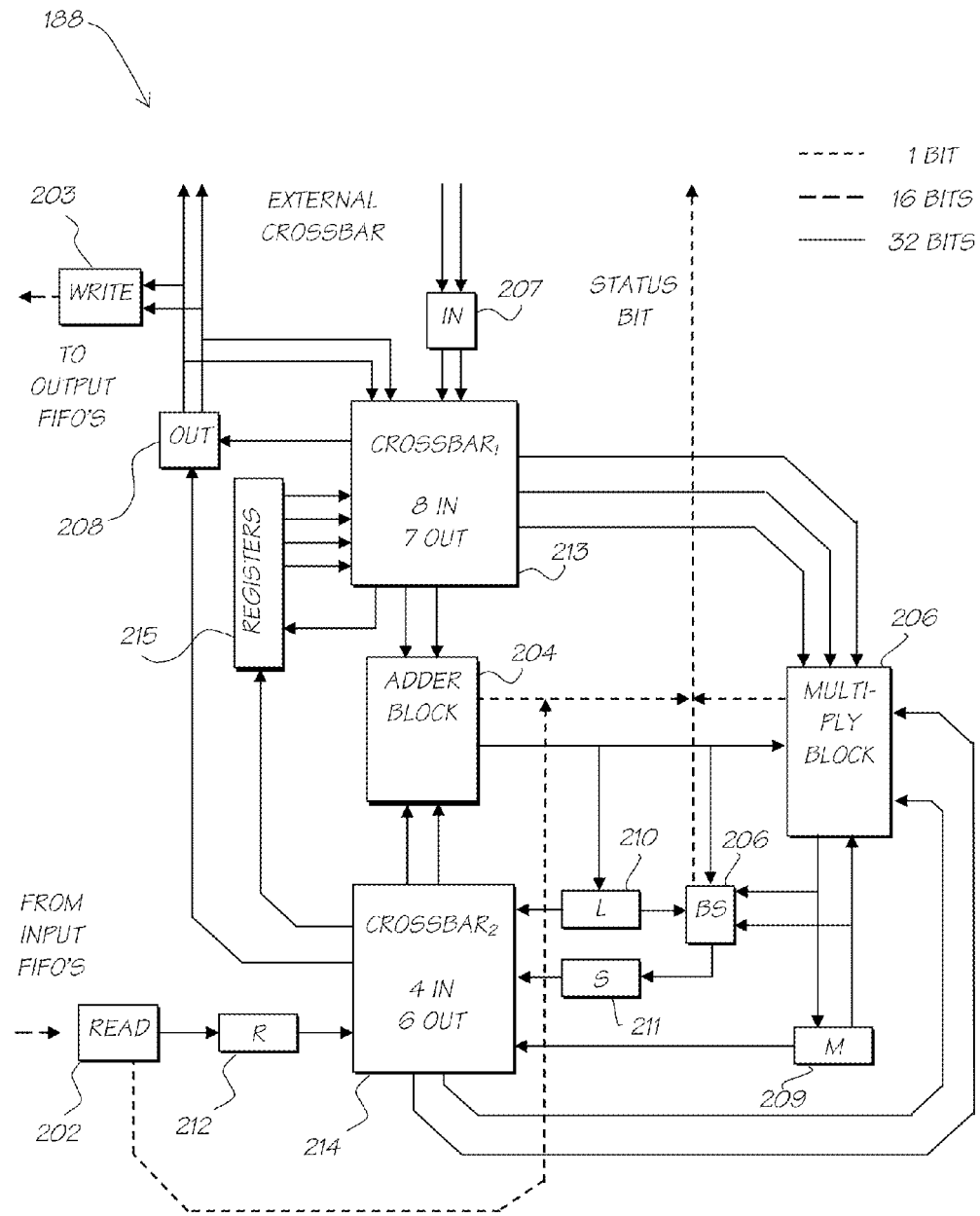
FIG. 5 illustrates the ALU 188 in more detail.

FIG. 5 illustrates the ALU 188 in more detail. Inside the ALU 188 are a number of specialized processing blocks, controlled by a microcode program. The specialized processing blocks include:

- Read Block 202, for accepting data from the input FIFOs
- Write Block 203, for sending data out via the output FIFOs
- Adder/Logical block 204, for addition & subtraction, comparisons and logical operations
- Multiply/Interpolate block 205, for multiple types of interpolations and multiply/accumulates
- Barrel Shift block 206, for shifting data as required
- In block 207, for accepting data from the external crossbar switch 183
- Out block 208, for sending data to the external crossbar switch 183
- Registers block 215, for holding data in temporary storage Four specialized 32 bit registers hold the results of the 4 main processing blocks:

- M register 209 holds the result of the Multiply/Interpolate block
- L register 209 holds the result of the Adder/Logic block
- S register 209 holds the result of the Barrel Shifter block
- R register 209 holds the result of the Read Block 202

In addition there are two internal crossbar switches 213m 214 for data transport. The various process blocks are further expanded in the following sections, together with the microcode definitions that pertain to each block. Note that the microcode is decoded within a block to provide the control signals to the various units within.

Data Transfers Between PUs e.g 178

Each PU e.g 178 is able to exchange data via the external crossbar. A PU e.g 178 takes two inputs and outputs two values to the external crossbar. In this way two operands for processing can be obtained in a single cycle, but cannot be actually used in an operation until the following cycle.

In 207

Figure 6:
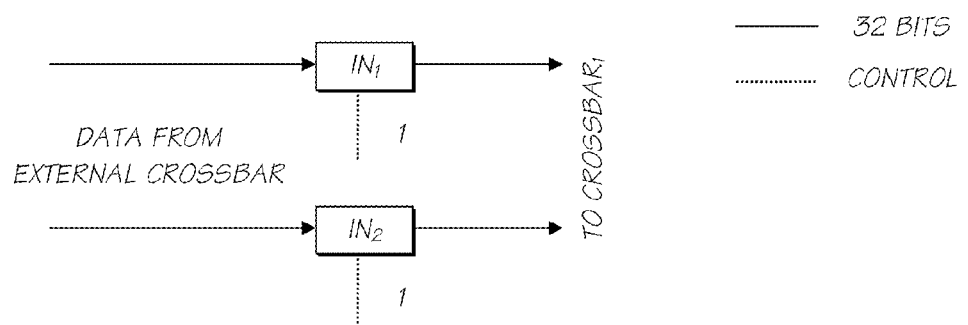
FIG. 6 illustrates the In block in more detail.

This block is illustrated in FIG. 6 and contains two registers, $In_1$ and $In_2$ that accept data from the external crossbar. The registers can be loaded each cycle, or can remain unchanged. The selection bits for choosing from among the 8 inputs are output to the external crossbar switch 183. The microcode takes the following form:

| # Bits | Description |
| --- | --- |
| 1 | 0 = NOP<br>1 = Load $In_1$ from crossbar |
| 3 | Select Input 1 from external crossbar |
| 1 | 0 = NOP<br>1 = Load $In_2$ from crossbar |
| 3 | Select Input 2 from external crossbar |
| 8 | TOTAL |

Out 208

Figure 7:
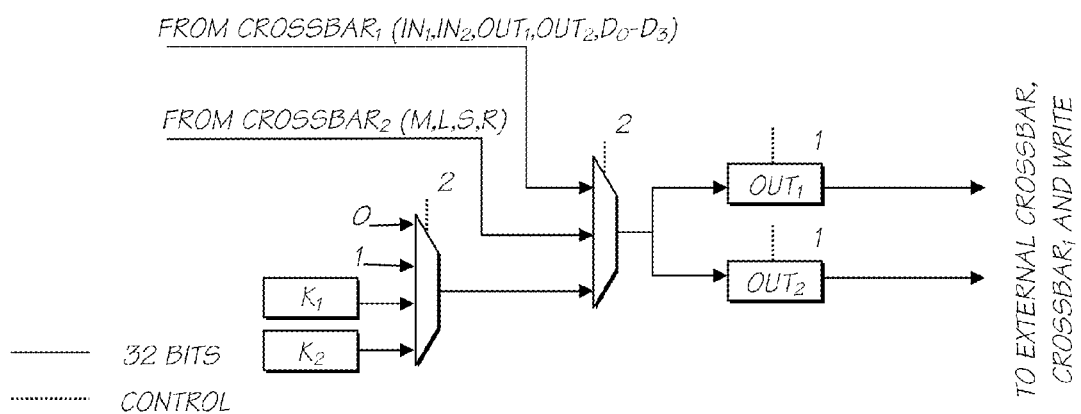
FIG. 7 illustrates the Out block in more detail.

Complementing In is Out 208. The Out block is illustrated in more detail in FIG. 7. Out contains two registers, $Out_1$ and $Out_2$, both of which are output to the external crossbar each cycle for use by other PUs e.g 178. The Write unit is also able to write one of $Out_1$ or $Out_2$ to one of the output FIFOs attached to the ALU 188. Finally, both registers are available as inputs to Crossbar1 213, which therefore makes the register values available as inputs to other units within the ALU 188. Each cycle either of the two registers can be updated according to microcode selection. The data loaded into the specified register can be one of $D_0$-$D_3$ (selected from Crossbar1 213) one of M, L, S, and R (selected from Crossbar2 214), one of 2 programmable constants, or the fixed values 0 or 1. The microcode for Out takes the following form:

| # Bits | Description |
|---|---|
| 1 | 0 = NOP |
|   | 1 = Load Register |
| 1 | Select Register to load [$Out_1$ or $Out_2$] |
| 4 | Select input |
|   | [$In_1, In_2, Out_1, Out_2, D_0, D_1,$ |
|   | $D_2, D_3, M, L, S, R, K_1, K_2, 0, 1$] |
| 6 | TOTAL |

Local Registers and Data Transfers within ALU 188

As noted previously, the ALU 188 contains four specialized 32-bit registers to hold the results of the 4 main processing blocks:

M register 209 holds the result of the Multiply/Interpolate block
L register 209 holds the result of the Adder/Logic block
S register 209 holds the result of the Barrel Shifter block
R register 209 holds the result of the Read Block 202

Figure 8:
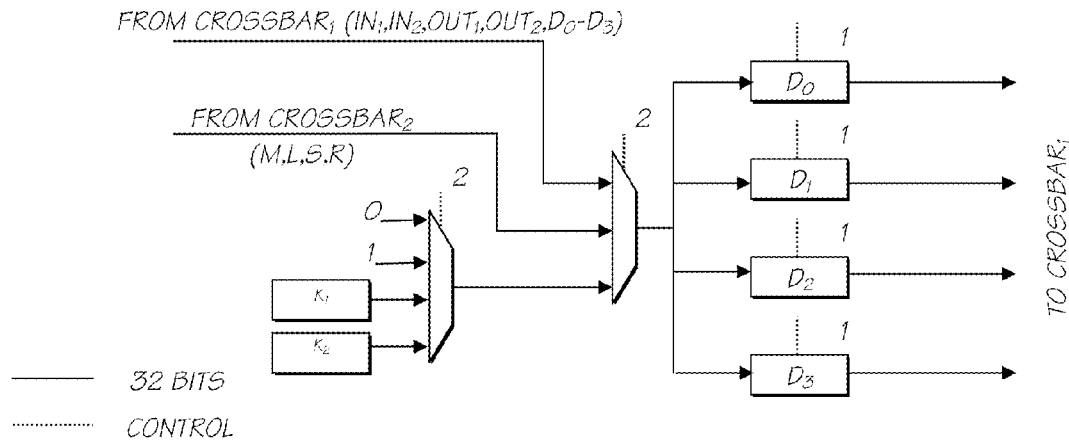
FIG. 8 illustrates the Registers block in more detail.

The CPU has direct access to these registers, and other units can select them as inputs via Crossbar2 214. Sometimes it is necessary to delay an operation for one or more cycles. The Registers block contains four 32-bit registers $D_0$-$D_3$ to hold temporary variables during processing. Each cycle one of the registers can be updated, while all the registers are output for other units to use via Crossbar1 213 (which also includes $In_1$, $In_2$, $Out_1$ and $Out_2$). The CPU has direct access to these registers. The data loaded into the specified register can be one of $D_0$-$D_3$ (selected from Crossbar1 213) one of M, L, S, and R (selected from Crossbar2 214), one of 2 programmable constants, or the fixed values 0 or 1. The Registers block 215 is illustrated in more detail in FIG. 8. The microcode for Registers takes the following form:

| # Bits | Description |
|---|---|
| 1 | 0 = NOP |
|   | 1 = Load Register |
| 2 | Select Register to load [$D_0$-$D_3$] |
| 4 | Select input |
|   | [$In_1, In_2, Out_1, Out_2, D_0, D_1,$ |
|   | $D_2, D_3, M, L, S, R, K_1, K_2, 0, 1$] |
| 7 | TOTAL |

Crossbar1 213

Figure 9:
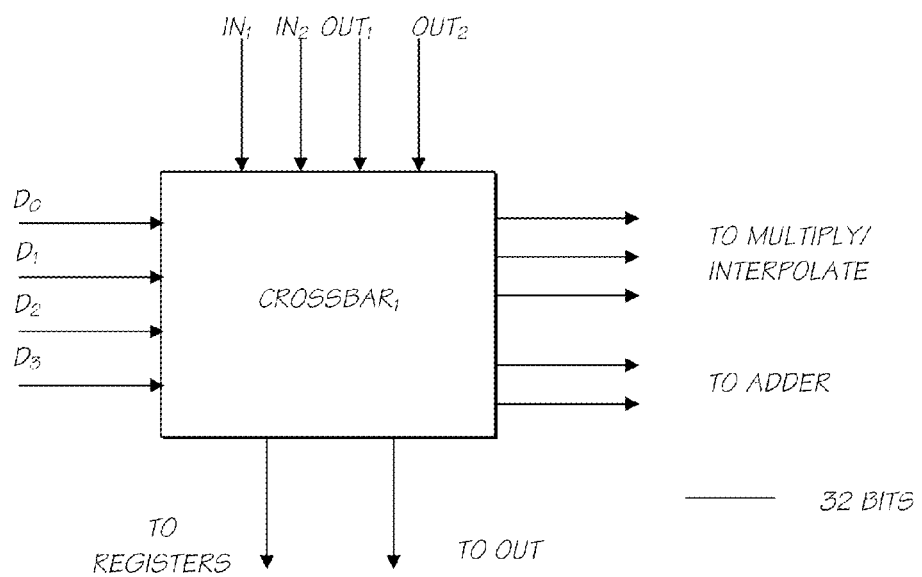
FIG. 9 illustrates the Crossbar1 in more detail.

Crossbar1 213 is illustrated in more detail in FIG. 9. Crossbar1 213 is used to select from inputs $In_1, In_2, Out_1, Out_2, D_0$-$D_3$. 7 outputs are generated from Crossbar1 213: 3 to the Multiply/Interpolate Unit, 2 to the Adder Unit, 1 to the Registers unit and 1 to the Out unit. The control signals for Crossbar1 213 come from the various units that use the Crossbar inputs. There is no specific microcode that is separate for Crossbar1 213.

Crossbar2 214

Figure 10:
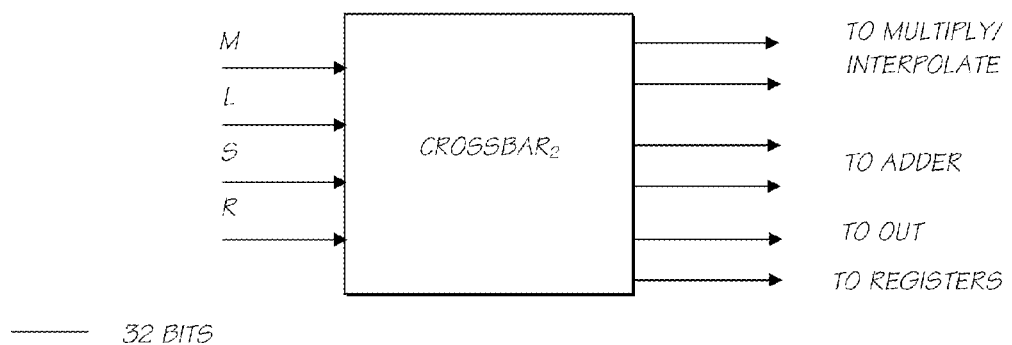
FIG. 10 illustrates the Crossbar2 in more detail.

Crossbar2 214 is illustrated in more detail in FIG. 10. Crossbar2 214 is used to select from the general ALU 188 registers M, L, S and R. 6 outputs are generated from Crossbar1 213: 2 to the Multiply/Interpolate Unit, 2 to the Adder Unit, 1 to the Registers unit and 1 to the Out unit. The control signals for Crossbar2 214 come from the various units that use the Crossbar inputs. There is no specific microcode that is separate for Crossbar2 214.

Data Transfers Between Pus E.G 178 and Dram or External Processes

Returning to FIG. 4, PUs e.g 178 share data with each other directly via the external crossbar. They also transfer data to and from external processes as well as DRAM. Each PU e.g 178 has 2 I/O Address Generators 189, 190 for transferring data to and from DRAM. A PU e.g 178 can send data to DRAM via an I/O Address Generator's Output FIFO e.g. 186, or accept data from DRAM via an I/O Address Generator's Input FIFO 187. These FIFOs are local to the PU e.g 178. There is also a mechanism for transferring data to and from external processes in the form of a common VLIW Input FIFO 78 and a common VLIW Output FIFO 79, shared between all ALUs. The VLIW Input and Output FIFOs are only 8 bits wide, and are used for printing, Artcard reading, transferring data to the CPU etc. The local Input and Output FIFOs are 16 bits wide.

Read

Figure 11:
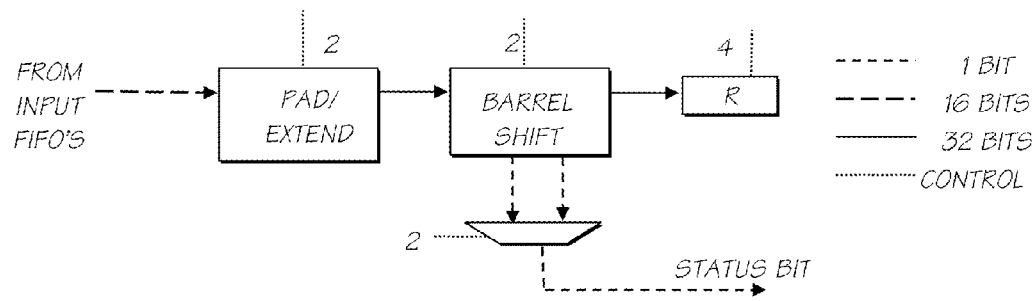
FIG. 11 illustrates the read process block in more detail.

The Read process block 202 of FIG. 5 is responsible for updating the ALU 188's R register 209, which represents the external input data to a VLIW microcoded process. Each cycle the Read Unit is able to read from either the common VLIW Input FIFO 78 (8 bits) or one of two local Input FIFOs (16 bits). A 32-bit value is generated, and then all or part of that data is transferred to the R register 209. The process can be seen in FIG. 11. The microcode for Read is described in the following table. Note that the interpretations of some bit patterns are deliberately chosen to aid decoding.

| # Bits | Description |
|---|---|
| 2 | 00 = NOP |
|   | 01 = Read from VLIW Input FIFO 78 |
|   | 10 = Read from Local FIFO 1 |
|   | 11 = Read from Local FIFO 2 |
| 1 | How many significant bits |
|   | 0 = 8 bits (pad with 0 or sign extend) |
|   | 1 = 16 bits (only valid for Local FIFO reads) |
| 1 | 0 = Treat data as unsigned (pad with 0) |
|   | 1 = Treat data as signed (sign extend when reading from FIFO)r |
| 2 | How much to shift data left by: |
|   | 00 = 0 bits (no change) |
|   | 01 = 8 bits |
|   | 10 = 16 bits |
|   | 11 = 24 bits |
| 4 | Which bytes of R to update (hi to lo order byte) |
|   | Each of the 4 bits represents 1 byte WriteEnable on R |
| 10 | TOTAL |

Write

Figure 12:
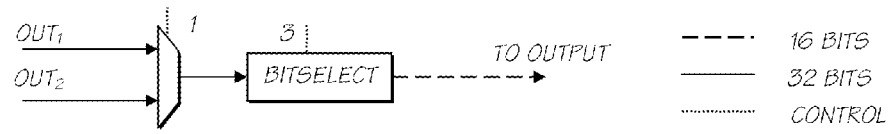
FIG. 12 illustrates the read process block in more detail.

The Write process block is able to write to either the common VLIW Output FIFO 79 or one of the two local Output FIFOs each cycle. Note that since only 1 FIFO is written to in a given cycle, only one 16-bit value is output to all FIFOs, with the low 8 bits going to the VLIW Output FIFO 79. The microcode controls which of the FIFOs gates in the value. The process of data selection can be seen in more detail in FIG. 12. The source values $Out_1$ and $Out_2$ come from the Out block. They are simply two registers. The microcode for Write takes the following form:

| # Bits | Description |
|---|---|
| 2 | 00 = NOP |
|   | 01 = Write VLIW Output FIFO 79 |
|   | 10 = Write local Output FIFO 1 |
|   | 11 = Write local Output FIFO 2 |

-continued

| # Bits | Description |
|---|---|
| 1 | Select Output Value [$Out_1$ or $Out_2$] |
| 3 | Select part of Output Value to write (32 bits = 4 bytes ABCD)<br>000 = 0D<br>001 = 0D<br>010 = 0B<br>011 = 0A<br>100 = CD<br>101 = BC<br>110 = AB<br>111 = 0 |
| 6 | TOTAL |

Computational Blocks

Each ALU 188 has two computational process blocks, namely an Adder/Logic process block 204, and a Multiply/Interpolate process block 205. In addition there is a Barrel Shifter block to provide help to these computational blocks. Registers from the Registers block 215 can be used for temporary storage during pipelined operations.

Barrel Shifter

Figure 13:
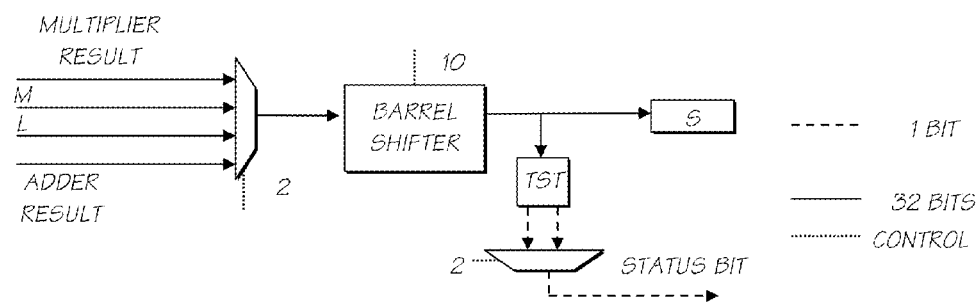
FIG. 13 illustrates the barrel shifter block in more detail.

The Barrel Shifter process block 206 is shown in more detail in FIG. 13 and takes its input from the output of Adder/Logic or Multiply/Interpolate process blocks or the previous cycle's results from those blocks (ALU registers L and M). The 32 bits selected are barrel shifted an arbitrary number of bits in either direction (with sign extension as necessary), and output to the ALU 188's S register 209. The microcode for the Barrel Shift process block is described in the following table. Note that the interpretations of some bit patterns are deliberately chosen to aid decoding.

| # Bits | Description |
|---|---|
| 3 | 000 = NOP<br>001 = Shift Left (unsigned)<br>010 = Reserved<br>011 = Shift Left (signed)<br>100 = Shift right (unsigned, no rounding)<br>101 = Shift right (unsigned, with rounding)<br>110 = Shift right (signed, no rounding)<br>111 = Shift right (signed, with rounding) |
| 2 | Select Input to barrel shift:<br>00 = Multiply/Interpolate result<br>01 = M<br>10 = Adder/Logic result<br>11 = L |
| 5 | # bits to shift |
| 1 | Ceiling of 255 |
| 1 | Floor of 0 (signed data) |
| 12 | TOTAL |

Adder/Logic 204

Figure 14:
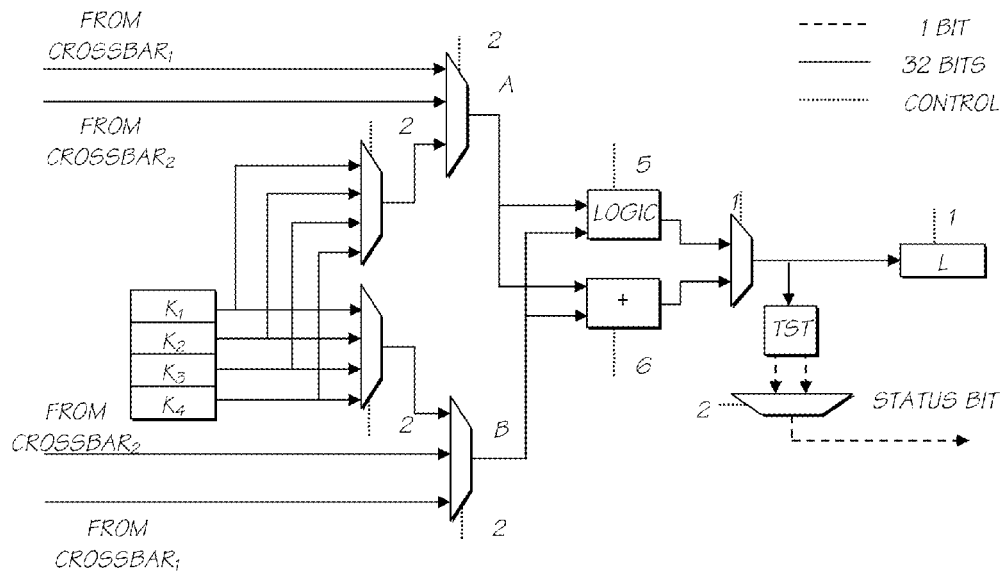
FIG. 14 illustrates the adder/logic block in more detail.

The Adder/Logic process block is shown in more detail in FIG. 14 and is designed for simple 32-bit addition/subtraction, comparisons, and logical operations. In a single cycle a single addition, comparison, or logical operation can be performed, with the result stored in the ALU 188's L register 209. There are two primary operands, A and B, which are selected from either of the two crossbars or from the 4 constant registers. One crossbar selection allows the results of the previous cycle's arithmetic operation to be used while the second provides access to operands previously calculated by this or another ALU 188. The CPU is the only unit that has write access to the four constants ($K_1$-$K_4$). In cases where an operation such as (A+B)×4 is desired, the direct output from the adder can be used as input to the Barrel Shifter, and can thus be shifted left 2 places without needing to be latched into the L register 209 first. The output from the adder can also be made available to the multiply unit for a multiply-accumulate operation. The microcode for the Adder/Logic process block is described in the following table. The interpretations of some bit patterns are deliberately chosen to aid decoding. Microcode bit interpretation for Adder/Logic unit

| # Bits | Description |
|---|---|
| 4 | 0000 = A + B (carry in = 0)<br>0001 = A + B (carry in = carry out of previous operation)<br>0010 = A + B + 1 (carry in = 1)<br>0011 = A + 1 (increments A)<br>0100 = A − B − 1 (carry in = 0)<br>0101 = A − B (carry in = carry out of previous operation)<br>0110 = A − B (carry in = 1)<br>0111 = A − 1 (decrements A)<br>1000 = NOP<br>1001 = ABS(A − B)<br>1010 = MIN(A, B)<br>1011 = MAX(A, B)<br>1100 = A AND B (both A & B can be inverted, see below)<br>1101 = A OR B (both A & B can be inverted, see below)<br>1110 = A XOR B (both A & B can be inverted, see below)<br>1111 = A (A can be inverted, see below) |
| 1 | If logical operation:<br>0 = A = A<br>1 = A = NOT(A)<br>If Adder operation:<br>0 = A is unsigned<br>1 = A is signed |
| 1 | If logical operation:<br>0 = B = B<br>1 = B = NOT(B)<br>If Adder operation<br>0 = B is unsigned<br>1 = B is signed |
| 4 | Select A<br>[$In_1$, $In_2$, $Out_1$, $Out_2$, $D_0$, $D_1$, $D_2$, $D_3$, M, L, S, R, $K_1$, $K_2$, $K_3$, $K_4$] |
| 4 | Select B<br>[$In_1$, $In_2$, $Out_1$, $Out_2$, $D_0$, $D_1$, $D_2$, $D_3$, M, L, S, R, $K_1$, $K_2$, $K_3$, $K_4$] |
| 14 | TOTAL |

Multiply/Interpolate 205

Figure 15:
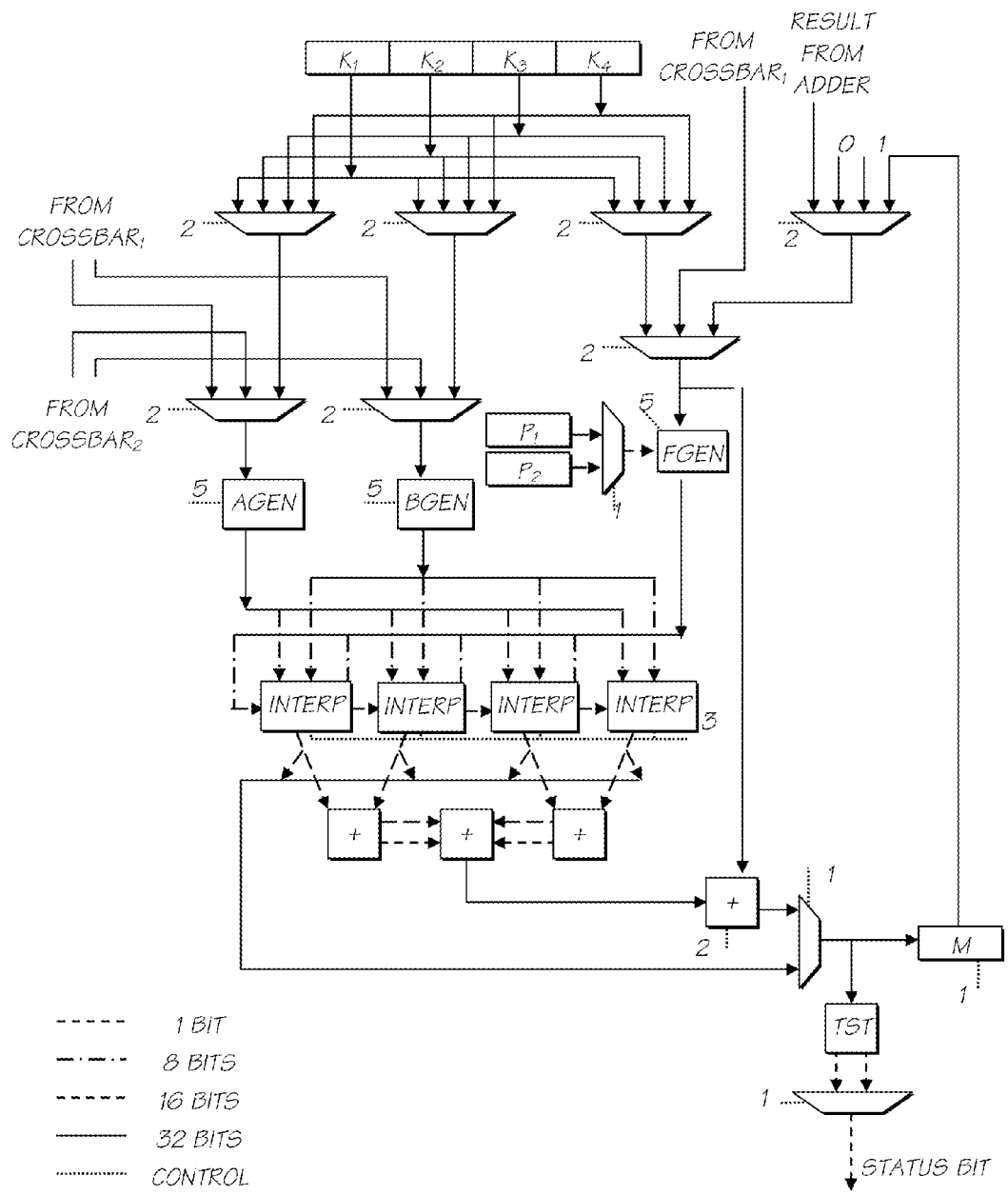
FIG. 15 illustrates the multiply block in more detail.

The Multiply/Interpolate process block is shown in more detail in FIG. 15 and is a set of four 8×8 interpolator units that are capable of performing four individual 8×8 interpolates per cycle, or can be combined to perform a single 16×16 multiply. This gives the possibility to perform up to 4 linear interpolations, a single bi-linear interpolation, or half of a tri-linear interpolation in a single cycle. The result of the interpolations or multiplication is stored in the ALU 188's M register 209. There are two primary operands, A and B, which are selected from any of the general registers in the ALU 188 or from four programmable constants internal to the Multiply/Interpolate process block. Each interpolator block functions as a simple 8 bit interpolator [result=A+(B−A)f] or as a simple 8×8 multiply [result=A*B]. When the operation is interpolation, A and B are treated as four 8 bit numbers $A_0$ thru $A_3$ ($A_0$ is the low order byte), and $B_0$ thru $B_3$. Agen, Bgen, and Fgen are responsible for ordering the inputs to the Interpolate units so that they match the operation being performed. For example, to perform bilinear interpolation, each of the 4 values must be multiplied by a different factor & the result summed, while a 16×16 bit multiplication requires the factors to be 0. The microcode for the Adder/Logic process block is described in the following table. Note that the interpretations of some bit patterns are deliberately chosen to aid decoding.

| # Bits | Description |
|---|---|
| 4 | 0000 = $(A_{10} * B_{10}) + V$ |
| | 0001 = $(A0 * B0) + (A1 * B1) + V$ |
| | 0010 = $(A_{10} * B_{10}) - V$ |
| | 0011 = $V - (A_{10} * B_{10})$ |
| | 0100 = Interpolate $A_0, B_0$ by $f_0$ |
| | 0101 = Interpolate $A_0, B_0$ by $f_0, A_1, B_1$ by $f_1$ |
| | 0110 = Interpolate $A_0, B_0$ by $f_0, A_1, B_1$ by $f_1, A_2, B_2$ by $f_2$ |
| | 0111 = Interpolate $A_0, B_0$ by $f_0, A_1, B_1$ by $f_1, A_2, B_2$ by $f_2, A_3, B_3$ by $f_3$ |
| | 1000 = Interpolate 16 bits stage 1 [$M = A_{10} * f_{10}$] |
| | 1001 = Interpolate 16 bits stage 2 [$M = M + (A_{10} * f_{10})$] |
| | 1010 = Tri-linear interpolate A by f stage 1 [$M = A_0f_0 + A_1f_1 + A_2f_2 + A_3f_3$] |
| | 1011 = Tri-linear interpolate A by f stage 2 [$M = M + A_0f_0 + A_1f_1 + A_2f_2 + A_3f_3$] |
| | 1100 = Bi-linear interpolate A by f stage 1 [$M = A_0f_0 + A_1f_1$] |
| | 1101 = Bi-linear interpolate A by f stage 2 [$M = M + A_0f_0 + A_1f_1$] |
| | 1110 = Bi-linear interpolate A by f complete [$M = A_0f_0 + A_1f_1 + A_2f_2 + A_3f_3$] |
| | 1111 = NOP |
| 4 | Select A [$In_1, In_2, Out_1, Out_2, D_0, D_1, D_2, D_3, M, L, S, R, K_1, K_2, K_3, K_4$] |
| 4 | Select B [$In_1, In_2, Out_1, Out_2, D_0, D_1, D_2, D_3, M, L, S, R, K_1, K_2, K_3, K_4$] |
| If Mult: | |
| 4 | Select V [$In_1, In_2, Out_1, Out_2, D_0, D_1, D_2, D_3, K_1, K_2, K_3, K_4$, Adder result, M, 0, 1] |
| 1 | Treat A as signed |
| 1 | Treat B as signed |
| 1 | Treat V as signed |
| If Interp: | |
| 4 | Select basis for f [$In_1, In_2, Out_1, Out_2, D_0, D_1, D_2, D_3, K_1, K_2, K_3, K_4$, X, X, X, X] |
| 1 | Select interpolation f generation from $P_1$ or $P_2$ $P_n$ is interpreted as # fractional bits in f If $P_n = 0$, f is range 0 . . . 255 representing 0 . . . 1 |
| 2 | Reserved |
| 19 | TOTAL |

The same 4 bits are used for the selection of V and f, although the last 4 options for V don't generally make sense as f values. Interpolating with a factor of 1 or 0 is pointless, and the previous multiplication or current result is unlikely to be a meaningful value for f.

I/O Address Generators 189, 190

The I/O Address Generators are shown in more detail in FIG. 16. A VLIW process does not access DRAM directly. Access is via 2 I/O Address Generators 189, 190, each with its own Input and Output FIFO. A PU e.g 178 reads data from one of two local Input FIFOs, and writes data to one of two local Output FIFOs. Each I/O Address Generator is responsible for reading data from DRAM and placing it into its Input FIFO, where it can be read by the PU e.g 178, and is responsible for taking the data from its Output FIFO (placed there by the PU e.g 178) and writing it to DRAM. The I/O Address Generator is a state machine responsible for generating addresses and control for data retrieval and storage in DRAM via the Data cache 76. It is customizable under CPU software control, but cannot be microcoded. The address generator produces addresses in two broad categories:

Image Iterators, used to iterate (reading, writing or both) through pixels of an image in a variety of ways Table I/O, used to randomly access pixels in images, data in tables, and to simulate FIFOs in DRAM Each of the I/O Address Generators 189, 190 has its own bus connection to the Data cache 76, making 2 bus connections per PU e.g 178, and a total of 8 buses over the entire VLIW Vector Processor 74. The Data cache 76 is able to service 4 of the maximum 8 requests from the 4 PUs e.g 178 each cycle.

The Input and Output FIFOs are 8 entry deep 16-bit wide FIFOs. The various types of address generation (Image Iterators and Table I/O) are described in the subsequent sections.

Registers

The I/O Address Generator has a set of registers for that are used to control address generation. The addressing mode also determines how the data is formatted and sent into the local Input FIFO, and how data is interpreted from the local Output FIFO. The CPU is able to access the registers of the I/O Address Generator via the low speed bus. The first set of registers define the housekeeping parameters for the I/O Generator:

| Register Name | # bits | Description |
|---|---|---|
| Reset | 0 | A write to this register halts any operations, and writes 0s to all the data registers of the I/O Generator. The input and output FIFOs are not cleared. |
| Go | 0 | A write to this register restarts the counters according to the current setup. For example, if the I/O Generator is a Read Iterator, and the Iterator is currently halfway through the image, a write to Go will cause the reading to begin at the start of the image again. While the I/O Generator is performing, the Active bit of the Status register will be set. |
| Halt | 0 | A write to this register stops any current activity and clears the Active bit of the Status register. If the Active bit is already cleared, writing to this register has no effect. |
| Continue | 0 | A write to this register continues the I/O Generator from the current setup. Counters are not reset, and FIFOs are not cleared. A write to this register while the I/O Generator is active has no effect. |
| ClearFIFOsOnGo | 1 | 0 = Don't clear FIFOs on a write to the Go bit. 1 = Do clear FIFOs on a write to the Go bit. |
| Status | 8 | Status flags |

The Status Register has the Following Values

| Register Name | # bits | Description |
| --- | --- | --- |
| Active | 1 | 0 = Currently inactive |
|  |  | 1 = Currently active |
| Reserved | 7 | — |

Caching

Several registers are used to control the caching mechanism, specifying which cache group to use for inputs, outputs etc. See the section on the Data cache 76 for more information about cache groups.

| Register Name | # bits | Description |
| --- | --- | --- |
| CacheGroup1 | 4 | Defines cache group to read data from |
| CacheGroup2 | 4 | Defines which cache group to write data to, and in the case of the ImagePyramidLookup I/O mode, defines the cache to use for reading the Level Information Table. |

Image Iterators=Sequential Automatic Access to Pixels

The primary image pixel access method for software and hardware algorithms is via Image Iterators. Image iterators perform all of the addressing and access to the caches of the pixels within an image channel and read, write or read & write pixels for their client. Read Iterators read pixels in a specific order for their clients, and Write Iterators write pixels in a specific order for their clients. Clients of Iterators read pixels from the local Input FIFO or write pixels via the local Output FIFO.

Read Image Iterators read through an image in a specific order, placing the pixel data into the local Input FIFO. Every time a client reads a pixel from the Input FIFO, the Read Iterator places the next pixel from the image (via the Data cache 76) into the FIFO.

Write Image Iterators write pixels in a specific order to write out the entire image. Clients write pixels to the Output FIFO that is in turn read by the Write Image Iterator and written to DRAM via the Data cache 76.

Typically a VLIW process will have its input tied to a Read Iterator, and output tied to a corresponding Write Iterator. From the PU e.g 178 microcode program's perspective, the FIFO is the effective interface to DRAM. The actual method of carrying out the storage (apart from the logical ordering of the data) is not of concern. Although the FIFO is perceived to be effectively unlimited in length, in practice the FIFO is of limited length, and there can be delays storing and retrieving data, especially if several memory accesses are competing. A variety of Image Iterators exist to cope with the most common addressing requirements of image processing algorithms. In most cases there is a corresponding Write Iterator for each Read Iterator. The different Iterators are listed in the following table:

| Read Iterators | Write Iterators |
| --- | --- |
| Sequential Read | Sequential Write |
| Box Read | — |
| Vertical Strip Read | Vertical Strip Write |

The 4 Bit Address Mode Register is Used to Determine the Iterator Type:

| Bit # | Address Mode |
| --- | --- |
| 3 | 0 = This addressing mode is an Iterator |
| 2 to 0 | Iterator Mode |
|  | 001 = Sequential Iterator |
|  | 010 = Box [read only] |
|  | 100 = Vertical Strip |
|  | remaining bit patterns are reserved |

The Access Specific Registers are Used as Follows:

| Register Name | LocalName | Description |
| --- | --- | --- |
| AccessSpecific$_1$ | Flags | Flags used for reading and writing |
| AccessSpecific$_2$ | XBoxSize | Determines the size in X of Box Read. Valid values are 3, 5, and 7. |
| AccessSpecific$_3$ | YBoxSize | Determines the size in Y of Box Read. Valid values are 3, 5, and 7. |
| AccessSpecific$_4$ | BoxOffset | Offset between one pixel center and the next during a Box Read only. Usual value is 1, but other useful values include 2, 4, 8 . . . See Box Read for more details. |

The Flags register (AccessSpecific$_1$) contains a number of flags used to determine factors affecting the reading and writing of data. The Flags register has the following composition:

| Label | # bits | Description |
| --- | --- | --- |
| ReadEnable | 1 | Read data from DRAM |
| WriteEnable | 1 | Write data to DRAM [not valid for Box mode] |
| PassX | 1 | Pass X (pixel) ordinate back to Input FIFO |
| PassY | 1 | Pass Y (row) ordinate back to Input FIFO |
| Loop | 1 | 0 = Do not loop through data |
|  |  | 1 = Loop through data |
| Reserved | 11 | Must be 0 |

Notes on ReadEnable and WriteEnable:
When ReadEnable is set, the I/O Address Generator acts as a Read Iterator, and therefore reads the image in a particular order, placing the pixels into the Input FIFO.
When WriteEnable is set, the I/O Address Generator acts as a Write Iterator, and therefore writes the image in a particular order, taking the pixels from the Output FIFO.
When both ReadEnable and WriteEnable are set, the I/O Address Generator acts as a Read Iterator and as a Write Iterator, reading pixels into the Input FIFO, and writing pixels from the Output FIFO. Pixels are only written after they have been read—i.e. the Write Iterator will never go faster than the Read Iterator. Whenever this mode is used, care should be taken to ensure balance between in and out processing by the VLIW microcode. Note that separate cache groups can be specified on reads and writes by loading different values in CacheGroup1 and CacheGroup2.

Notes on PassX and PassY:
If PassX and PassY are both set, the Y ordinate is placed into the Input FIFO before the X ordinate.
PassX and PassY are only intended to be set when the ReadEnable bit is clear. Instead of passing the ordinates to the address generator, the ordinates are placed directly into the Input FIFO. The ordinates advance as they are removed from the FIFO.

If WriteEnable bit is set, the VLIW program must ensure that it balances reads of ordinates from the Input FIFO with writes to the Output FIFO, as writes will only occur up to the ordinates (see note on ReadEnable and WriteEnable above).

Notes on Loop:
If the Loop bit is set, reads will recommence at [StartPixel, StartRow] once it has reached [EndPixel, EndRow]. This is ideal for processing a structure such a convolution kernel or a dither cell matrix, where the data must be read repeatedly.

Looping with ReadEnable and WriteEnable set can be useful in an environment keeping a single line history, but only where it is useful to have reading occur before writing. For a FIFO effect (where writing occurs before reading in a length constrained fashion), use an appropriate Table I/O addressing mode instead of an Image Iterator.

Looping with only WriteEnable set creates a written window of the last N pixels. This can be used with an asynchronous process that reads the data from the window. The Artcard Reading algorithm makes use of this mode.

Sequential Read and Write Iterators

FIG. 17 illustrates the pixel data format. The simplest Image Iterators are the Sequential Read Iterator and corresponding Sequential Write Iterator. The Sequential Read Iterator presents the pixels from a channel one line at a time from top to bottom, and within a line, pixels are presented left to right. The padding bytes are not presented to the client. It is most useful for algorithms that must perform some process on each pixel from an image but don't care about the order of the pixels being processed, or want the data specifically in this order. Complementing the Sequential Read Iterator is the Sequential Write Iterator. Clients write pixels to the Output FIFO. A Sequential Write Iterator subsequently writes out a valid image using appropriate caching and appropriate padding bytes. Each Sequential Iterator requires access to 2 cache lines. When reading, while 32 pixels are presented from one cache line, the other cache line can be loaded from memory. When writing, while 32 pixels are being filled up in one cache line, the other can be being written to memory. A process that performs an operation on each pixel of an image independently would typically use a Sequential Read Iterator to obtain pixels, and a Sequential Write Iterator to write the new pixel values to their corresponding locations within the destination image. Such a process is shown in FIG. 18.

In most cases, the source and destination images are different, and are represented by 2 I/O Address Generators 189, 190. However it can be valid to have the source image and destination image to be the same, since a given input pixel is not read more than once. In that case, then the same Iterator can be used for both input and output, with both the ReadEnable and WriteEnable registers set appropriately. For maximum efficiency, 2 different cache groups should be used—one for reading and the other for writing. If data is being created by a VLIW process to be written via a Sequential Write Iterator, the PassX and PassY flags can be used to generate coordinates that are then passed down the Input FIFO. The VLIW process can use these coordinates and create the output data appropriately.

Box Read Iterator

The Box Read Iterator is used to present pixels in an order most useful for performing operations such as general-purpose filters and convolve. The Iterator presents pixel values in a square box around the sequentially read pixels. The box is limited to being 1, 3, 5, or 7 pixels wide in X and Y (set XBoxSize and YBoxSize—they must be the same value or 1 in one dimension and 3, 5, or 7 in the other). The process is shown in FIG. 19:

BoxOffset: This special purpose register is used to determine a sub-sampling in terms of which input pixels will be used as the center of the box. The usual value is 1, which means that each pixel is used as the center of the box. The value "2" would be useful in scaling an image down by 4:1 as in the case of building an image pyramid. Using pixel addresses from the previous diagram, the box would be centered on pixel 0, then 2, 8, and 10. The Box Read Iterator requires access to a maximum of 14 (2×7) cache lines. While pixels are presented from one set of 7 lines, the other cache lines can be loaded from memory.

Box Write Iterator

There is no corresponding Box Write Iterator, since the duplication of pixels is only required on input. A process that uses the Box Read Iterator for input would most likely use the Sequential Write Iterator for output since they are in sync. A good example is the convolver, where N input pixels are read to calculate 1 output pixel. The process flow is as illustrated in FIG. 20. The source and destination images should not occupy the same memory when using a Box Read Iterator, as subsequent lines of an image require the original (not newly calculated) values.

Vertical-Strip Read and Write Iterators

In some instances it is necessary to write an image in output pixel order, but there is no knowledge about the direction of coherence in input pixels in relation to output pixels. An example of this is rotation. If an image is rotated 90 degrees, and we process the output pixels horizontally, there is a complete loss of cache coherence. On the other hand, if we process the output image one cache line's width of pixels at a time and then advance to the next line (rather than advance to the next cache-line's worth of pixels on the same line), we will gain cache coherence for our input image pixels. It can also be the case that there is known 'block' coherence in the input pixels (such as color coherence), in which case the read governs the processing order, and the write, to be synchronized, must follow the same pixel order.

The order of pixels presented as input (Vertical-Strip Read), or expected for output (Vertical-Strip Write) is the same. The order is pixels 0 to 31 from line 0, then pixels 0 to 31 of line 1 etc for all lines of the image, then pixels 32 to 63 of line 0, pixels 32 to 63 of line 1 etc. In the final vertical strip there may not be exactly 32 pixels wide. In this case only the actual pixels in the image are presented or expected as input. This process is illustrated in FIG. 21.

process that requires only a Vertical-Strip Write Iterator will typically have a way of mapping input pixel coordinates given an output pixel coordinate. It would access the input image pixels according to this mapping, and coherence is determined by having sufficient cache lines on the 'random-access' reader for the input image. The coordinates will typically be generated by setting the PassX and PassY flags on the VerticalStripWrite Iterator, as shown in the process overview illustrated in FIG. 22.

It is not meaningful to pair a Write Iterator with a Sequential Read Iterator or a Box read Iterator, but a Vertical-Strip Write Iterator does give significant improvements in performance when there is a non trivial mapping between input and output coordinates.

It can be meaningful to pair a Vertical Strip Read Iterator and Vertical Strip Write Iterator. In this case it is possible to assign both to a single ALU 188 if input and output images are the same. If coordinates are required, a further Iterator must be used with PassX and PassY flags set. The Vertical Strip Read/

Write Iterator presents pixels to the Input FIFO, and accepts output pixels from the Output FIFO. Appropriate padding bytes will be inserted on the write. Input and output require a minimum of 2 cache lines each for good performance.

Table I/O Addressing Modes

It is often necessary to lookup values in a table (such as an image). Table I/O addressing modes provide this functionality, requiring the client to place the index/es into the Output FIFO. The I/O Address Generator then processes the index/es, looks up the data appropriately, and returns the looked-up values in the Input FIFO for subsequent processing by the VLIW client.

1D, 2D and 3D tables are supported, with particular modes targeted at interpolation. To reduce complexity on the VLIW client side, the index values are treated as fixed-point numbers, with AccessSpecific registers defining the fixed point and therefore which bits should be treated as the integer portion of the index. Data formats are restricted forms of the general Image Characteristics in that the PixelOffset register is ignored, the data is assumed to be contiguous within a row, and can only be 8 or 16 bits (1 or 2 bytes) per data element. The 4 bit Address Mode Register is used to determine the I/O type:

| Bit # | Address Mode |
|---|---|
| 3 | 1 = This addressing mode is Table I/O |
| 2 to 0 | 000 = 1D Direct Lookup |
| | 001 = 1D Interpolate (linear) |
| | 010 = DRAM FIFO |
| | 011 = Reserved |
| | 100 = 2D Interpolate (bi-linear) |
| | 101 = Reserved |
| | 110 = 3D Interpolate (tri-linear) |
| | 111 = Image Pyramid Lookup |

The access specific registers are:

| Register Name | LocalName | # bits | Description |
|---|---|---|---|
| AccessSpecific$_1$ | Flags | 8 | General flags for reading and writing. See below for more information. |
| AccessSpecific$_2$ | FractX | 8 | Number of fractional bits in X index |
| AccessSpecific$_3$ | FractY | 8 | Number of fractional bits in Y index |
| AccessSpecific$_4$ (low 8 bits/next 12 or 24 bits)) | ZOffset | 12 or 24 | See below |

FractX, FractY, and FractZ are used to generate addresses based on indexes, and interpret the format of the index in terms of significant bits and integer/fractional components. The various parameters are only defined as required by the number of dimensions in the table being indexed. A 1D table only needs FractX, a 2D table requires FractX and FractY. Each Fract_value consists of the number of fractional bits in the corresponding index. For example, an X index may be in the format 5:3. This would indicate 5 bits of integer, and 3 bits of fraction. FractX would therefore be set to 3. A simple 1D lookup could have the format 8:0, i.e. no fractional component at all. FractX would therefore be 0. ZOffset is only required for 3D lookup and takes on two different interpretations. It is described more fully in the 3D-table lookup section. The Flags register (AccessSpecific$_1$) contains a number of flags used to determine factors affecting the reading (and in one case, writing) of data. The Flags register has the following composition:

| Label | # bits | Description |
|---|---|---|
| ReadEnable | 1 | Read data from DRAM |
| WriteEnable | 1 | Write data to DRAM [only valid for 1D direct lookup] |
| DataSize | 1 | 0 = 8 bit data<br>1 = 16 bit data |
| Reserved | 5 | Must be 0 |

With the exception of the 1D Direct Lookup and DRAM FIFO, all Table I/O modes only support reading, and not writing. Therefore the ReadEnable bit will be set and the WriteEnable bit will be clear for all I/O modes other than these two modes. The 1D Direct Lookup supports 3 modes:

Read only, where the ReadEnable bit is set and the WriteEnable bit is clear

Write only, where the ReadEnable bit is clear and the WriteEnable bit is clear

Read-Modify-Write, where both ReadEnable and the WriteEnable bits are set

The different modes are described in the 1D Direct Lookup section below. The DRAM FIFO mode supports only 1 mode:

Write-Read mode, where both ReadEnable and the WriteEnable bits are set This mode is described in the DRAM FIFO section below. The DataSize flag determines whether the size of each data elements of the table is 8 or 16 bits. Only the two data sizes are supported. 32 bit elements can be created in either of 2 ways depending on the requirements of the process:

Reading from 2 16-bit tables simultaneously and combining the result. This is convenient if timing is an issue, but has the disadvantage of consuming 2 I/O Address Generators 189, 190, and each 32-bit element is not readable by the CPU as a 32-bit entity.

Reading from a 16-bit table twice and combining the result. This is convenient since only 1 lookup is used, although different indexes must be generated and passed into the lookup.

1 Dimensional Structures

Direct Lookup

A direct lookup is a simple indexing into a 1 dimensional lookup table. Clients can choose between 3 access modes by setting appropriate bits in the Flags register:

Read only

Write only

Read-Modify-Write

Read Only

A client passes the fixed-point index X into the Output FIFO, and the 8 or 16-bit value at Table[Int(X)] is returned in the Input FIFO. The fractional component of the index is completely ignored. If the index is out of bounds, the DuplicateEdge flag determines whether the edge pixel or ConstantPixel is returned. The address generation is straightforward:

If DataSize indicates 8 bits, X is barrel-shifted right FractX bits, and the result is added to the table's base address ImageStart.

If DataSize indicates 16 bits, X is barrel-shifted right FractX bits, and the result shifted left 1 bit (bit0 becomes 0) is added to the table's base address ImageStart.

The 8 or 16-bit data value at the resultant address is placed into the Input FIFO. Address generation takes 1 cycle, and transferring the requested data from the cache to the Output FIFO also takes 1 cycle (assuming a cache hit). For example, assume we are looking up values in a 256-entry table, where each entry is 16 bits, and the index is a 12 bit fixed-point format of 8:4. FractX should be 4, and DataSize 1. When an index is passed to the lookup, we shift right 4 bits, then add the result shifted left 1 bit to ImageStart.

Write Only

A client passes the fixed-point index X into the Output FIFO followed by the 8 or 16-bit value that is to be written to the specified location in the table. A complete transfer takes a minimum of 2 cycles. 1 cycle for address generation, and 1 cycle to transfer the data from the FIFO to DRAM. There can be an arbitrary number of cycles between a VLIW process placing the index into the FIFO and placing the value to be written into the FIFO. Address generation occurs in the same way as Read Only mode, but instead of the data being read from the address, the data from the Output FIFO is written to the address. If the address is outside the table range, the data is removed from the FIFO but not written to DRAM.

Read-Modify-Write

A client passes the fixed-point index X into the Output FIFO, and the 8 or 16-bit value at Table[Int(X)] is returned in the Input FIFO. The next value placed into the Output FIFO is then written to Table[Int(X)], replacing the value that had been returned earlier. The general processing loop then, is that a process reads from a location, modifies the value, and writes it back. The overall time is 4 cycles:

Generate address from index
    Return value from table
    Modify value in some way
    Write it back to the table There is no specific read/write mode where a client passes in a flag saying "read from X" or "write to X". Clients can simulate a "read from X" by writing the original value, and a "write to X" by simply ignoring the returned value. However such use of the mode is not encouraged since each action consumes a minimum of 3 cycles (the modify is not required) and 2 data accesses instead of 1 access as provided by the specific Read and Write modes.

Interpolate Table

This is the same as a Direct Lookup in Read mode except that two values are returned for a given fixed-point index X instead of one. The values returned are Table[Int(X)], and Table[Int(X)+1]. If either index is out of bounds the DuplicateEdge flag determines whether the edge pixel or ConstantPixel is returned. Address generation is the same as Direct Lookup, with the exception that the second address is simply Address1+1 or 2 depending on 8 or 16 bit data. Transferring the requested data to the Output FIFO takes 2 cycles (assuming a cache hit), although two 8-bit values may actually be returned from the cache to the Address Generator in a single 16-bit fetch.

DRAM FIFO

A special case of a read/write 1D table is a DRAM FIFO. It is often necessary to have a simulated FIFO of a given length using DRAM and associated caches. With a DRAM FIFO, clients do not index explicitly into the table, but write to the Output FIFO as if it was one end of a FIFO and read from the Input FIFO as if it was the other end of the same logical FIFO. 2 counters keep track of input and output positions in the simulated FIFO, and cache to DRAM as needed. Clients need to set both ReadEnable and WriteEnable bits in the Flags register.

An example use of a DRAM FIFO is keeping a single line history of some value. The initial history is written before processing begins. As the general process goes through a line, the previous line's value is retrieved from the FIFO, and this line's value is placed into the FIFO (this line will be the previous line when we process the next line). So long as input and outputs match each other on average, the Output FIFO should always be full. Consequently there is effectively no access delay for this kind of FIFO (unless the total FIFO length is very small—say 3 or 4 bytes, but that would defeat the purpose of the FIFO).

2 Dimensional Tables

Direct Lookup

A 2 dimensional direct lookup is not supported. Since all cases of 2D lookups are expected to be accessed for bi-linear interpolation, a special bi-linear lookup has been implemented.

Bi-Linear Lookup

This kind of lookup is necessary for bi-linear interpolation of data from a 2D table. Given fixed-point X and Y coordinates (placed into the Output FIFO in the order Y, X), 4 values are returned after lookup. The values (in order) are:

Table[Int(X), Int(Y)]
    Table[Int(X)+1, Int(Y)]
    Table[Int(X), Int(Y)+1]
    Table[Int(X)+1, Int(Y)+1]

The order of values returned gives the best cache coherence. If the data is 8-bit, 2 values are returned each cycle over 2 cycles with the low order byte being the first data element. If the data is 16-bit, the 4 values are returned in 4 cycles, 1 entry per cycle. Address generation takes 2 cycles. The first cycle has the index (Y) barrel-shifted right FractY bits being multiplied by RowOffset, with the result added to ImageStart. The second cycle shifts the X index right by FractX bits, and then either the result (in the case of 8 bit data) or the result shifted left 1 bit (in the case of 16 bit data) is added to the result from the first cycle. This gives us address Adr=address of Table[Int(X), Int(Y)]:

$$Adr = ImageStart + ShiftRight(Y, FractY) * RowOffset +$$
$$ShiftRight(X, FractX)$$

We keep a copy of Adr in AdrOld for use fetching subsequent entries.

If the data is 8 bits, the timing is 2 cycles of address generation, followed by 2 cycles of data being returned (2 table entries per cycle).
    If the data is 16 bits, the timing is 2 cycles of address generation, followed by 4 cycles of data being returned (1 entry per cycle)

The following 2 tables show the method of address calculation for 8 and 16 bit data sizes:

| Cycle | Calculation while fetching 2 × 8-bit data entries from Adr |
|---|---|
| 1 | Adr = Adr + RowOffset |
| 2 | <preparing next lookup> |

| Cycle | Calculation while fetching 1 × 16-bit data entry from Adr |
|---|---|
| 1 | Adr = Adr + 2 |
| 2 | Adr = AdrOld + RowOffset |
| 3 | Adr = Adr + 2 |
| 4 | <preparing next lookup> |

In both cases, the first cycle of address generation can overlap the insertion of the X index into the FIFO, so the effective timing can be as low as 1 cycle for address generation, and 4 cycles of return data. If the generation of indexes is 2 steps ahead of the results, then there is no effective address generation time, and the data is simply produced at the appropriate rate (2 or 4 cycles per set).

3 Dimensional Lookup

Direct Lookup

Since all cases of 2D lookups are expected to be accessed for tri-linear interpolation, .two special tri-linear lookups have been implemented. The first is a straightforward lookup table, while the second is for tri-linear interpolation from an Image Pyramid.

Tri-Linear Lookup

This type of lookup is useful for 3D tables of data, such as color conversion tables. The standard image parameters define a single XY plane of the data—i.e. each plane consists of ImageHeight rows, each row containing RowOffset bytes. In most circumstances, assuming contiguous planes, one XY plane will be ImageHeight×RowOffset bytes after another. Rather than assume or calculate this offset, the software via the CPU must provide it in the form of a 12-bit ZOffset register. In this form of lookup, given 3 fixed-point indexes in the order Z, Y, X, 8 values are returned in order from the lookup table:

Table[Int(X), Int(Y), Int(Z)]

Table[Int(X)+1, Int(Y), Int(Z)]

Table[Int(X), Int(Y)+1, Int(Z)]

Table[Int(X)+1, Int(Y)+1, Int(Z)]

Table[Int(X), Int(Y), Int(Z)+1]

Table[Int(X)+1, Int(Y), Int(Z)+1]

Table[Int(X), Int(Y)+1, Int(Z)+1]

Table[Int(X)+1, Int(Y)+1, Int(Z)+1]

The order of values returned gives the best cache coherence. If the data is 8-bit, 2 values are returned each cycle over 4 cycles with the low order byte being the first data element. If the data is 16-bit, the 4 values are returned in 8 cycles, 1 entry per cycle. Address generation takes 3 cycles. The first cycle has the index (Z) barrel-shifted right FractZ bits being multiplied by the 12-bit ZOffset and added to ImageStart. The second cycle has the index (Y) barrel-shifted right FractY bits being multiplied by RowOffset, with the result added to the result of the previous cycle. The second cycle shifts the X index right by FractX bits, and then either the result (in the case of 8 bit data) or the result shifted left 1 bit (in the case of 16 bit data) is added to the result from the second cycle. This gives us address Adr=address of Table[Int(X), Int(Y), Int(Z)]:

$$Adr = ImageStart + (ShiftRight(Z, FractZ) * ZOffset) +$$
$$(ShiftRight(Y, FractY) * RowOffset) + ShiftRight(X, FractX)$$

We keep a copy of Adr in AdrOld for use fetching subsequent entries.

If the data is 8 bits, the timing is 2 cycles of address generation, followed by 2 cycles of data being returned (2 table entries per cycle).

If the data is 16 bits, the timing is 2 cycles of address generation, followed by 4 cycles of data being returned (1 entry per cycle)

The following 2 tables show the method of address calculation for 8 and 16 bit data sizes:

| Cycle | Calculation while fetching 2 × 8-bit data entries from Adr |
|---|---|
| 1 | Adr = Adr + RowOffset |
| 2 | Adr = AdrOld + ZOffset |
| 3 | Adr = Adr + RowOffset |
| 4 | <preparing next lookup> |

| Cycle | Calculation while fetching 1 × 16-bit data entries from Adr |
|---|---|
| 1 | Adr = Adr + 2 |
| 2 | Adr = AdrOld + RowOffset |
| 3 | Adr = Adr + 2 |
| 4 | Adr, AdrOld = AdrOld + Zoffset |
| 5 | Adr = Adr + 2 |
| 6 | Adr = AdrOld + RowOffset |
| 7 | Adr = Adr + 2 |
| 8 | <preparing next lookup> |

In both cases, the cycles of address generation can overlap the insertion of the indexes into the FIFO, so the effective timing for a single one-off lookup can be as low as 1 cycle for address generation, and 4 cycles of return data. If the generation of indexes is 2 steps ahead of the results, then there is no effective address generation time, and the data is simply produced at the appropriate rate (4 or 8 cycles per set).

Image Pyramid Lookup

During brushing, tiling, and warping it is necessary to compute the average color of a particular area in an image. Rather than calculate the value for each area given, these functions make use of an image pyramid. The description and construction of an image pyramid is detailed in the section on Internal Image Formats in the DRAM interface 81 chapter of this document. This section is concerned with a method of addressing given pixels in the pyramid in terms of 3 fixed-point indexes ordered: level (Z), Y, and X. Note that Image Pyramid lookup assumes 8 bit data entries, so the DataSize flag is completely ignored. After specification of Z, Y, and X, the following 8 pixels are returned via the Input FIFO:

The pixel at [Int(X), Int(Y)], level Int(Z)

The pixel at [Int(X)+1, Int(Y)], level Int(Z)

The pixel at [Int(X), Int(Y)+1], level Int(Z)

The pixel at [Int(X)+1, Int(Y)+1], level Int(Z)

The pixel at [Int(X), Int(Y)], level Int(Z)+1

The pixel at [Int(X)+1, Int(Y)], level Int(Z)+1

The pixel at [Int(X), Int(Y)+1], level Int(Z)+1

The pixel at [Int(X)+1, Int(Y)+1], level Int(Z)+1

The 8 pixels are returned as 4×16 bit entries, with X and X+1 entries combined hi/lo. For example, if the scaled (X, Y) coordinate was (10.4, 12.7) the first 4 pixels returned would be: (10, 12), (11, 12), (10, 13) and (11, 13). When a coordinate is outside the valid range, clients have the choice of edge pixel duplication or returning of a constant color value via the DuplicateEdgePixels and ConstantPixel registers (only the low 8 bits are used). When the Image Pyramid has been constructed, there is a simple mapping from level 0 coordinates to level Z coordinates. The method is simply to shift the X or Y coordinate right by Z bits. This must be done in addition to the number of bits already shifted to retrieve the integer portion of the coordinate (i.e. shifting right FractX and FractY bits for X and Y ordinates respectively). To find the ImageStart and RowOffset value for a given level of the image pyramid, the 24-bit ZOffset register is used as a pointer to a Level Information Table. The table is an array of records, each representing a given level of the pyramid, ordered by level number. Each record consists of a 16-bit offset ZOffset from ImageStart to that level of the pyramid (64-byte aligned address as lower 6 bits of the offset are not present), and a 12 bit ZRowOffset for that level. Element 0 of the table would contain a ZOffset of 0, and a ZRowOffset equal to the general register RowOffset, as it simply points to the full sized image. The ZOffset value at element N of the table should be added to ImageStart to yield the effective ImageStart of level N of the image pyramid. The RowOffset value in element N of the table contains the RowOffset value for level N. The software running on the CPU must set up the table appropriately before using this addressing mode. The actual address generation is outlined here in a cycle by cycle description:

| Cycle | Load Register | From Address | Other Operations |
|---|---|---|---|
| 0 | — | — | ZAdr = ShiftRight(Z, FractZ) + ZOffset<br>ZInt = ShiftRight(Z, FractZ) |
| 1 | ZOffset | Zadr | ZAdr += 2<br>YInt = ShiftRight(Y, FractY) |
| 2 | ZRowOffset | ZAdr | ZAdr += 2<br>YInt = ShiftRight(YInt, ZInt)<br>Adr = ZOffset + ImageStart |
| 3 | ZOffset | ZAdr | ZAdr += 2<br>Adr += ZrowOffset * YInt<br>XInt = ShiftRight(X, FractX) |
| 4 | ZAdr | ZAdr | Adr += ShiftRight(XInt, ZInt)<br>ZOffset += ShiftRight(XInt, 1) |
| 5 | FIFO | Adr | Adr += ZrowOffset<br>ZOffset += ImageStart |
| 6 | FIFO | Adr | Adr = (ZAdr * ShiftRight(Yint, 1)) + ZOffset |
| 7 | FIFO | Adr | Adr += Zadr |
| 8 | FIFO | Adr | <Cycle 0 for next retrieval> |

The address generation as described can be achieved using a single Barrel Shifter, 2 adders, and a single 16×16 multiply/add unit yielding 24 bits. Although some cycles have 2 shifts, they are either the same shift value (i.e. the output of the Barrel Shifter is used two times) or the shift is 1 bit, and can be hard wired. The following internal registers are required: ZAdr, Adr, ZInt, YInt, XInt, ZRowOffset, and ZImageStart. The _Int registers only need to be 8 bits maximum, while the others can be up to 24 bits. Since this access method only reads from, and does not write to image pyramids, the Cache-Group2 is used to lookup the Image Pyramid Address Table (via ZAdr). CacheGroup1 is used for lookups to the image pyramid itself (via Adr). The address table is around 22 entries (depending on original image size), each of 4 bytes. Therefore 3 or 4 cache lines should be allocated to Cache-Group2, while as many cache lines as possible should be allocated to CacheGroup1. The timing is 8 cycles for returning a set of data, assuming that Cycle 8 and Cycle 0 overlap in operation—i.e. the next request's Cycle 0 occurs during Cycle 8. This is acceptable since Cycle 0 has no memory access, and Cycle 8 has no specific operations.

Generation of Coordinates Using VLIW Vector Processor 74

Some functions that are linked to Write Iterators require the X and/or Y coordinates of the current pixel being processed in part of the processing pipeline. Particular processing may also need to take place at the end of each row, or column being processed. In most cases, the PassX and PassY flags should be sufficient to completely generate all coordinates. However, if there are special requirements, the following functions can be used. The calculation can be spread over a number of ALUs, for a single cycle generation, or be in a single ALU 188 for a multi-cycle generation.

Generate Sequential [X, Y]

Figure 23:
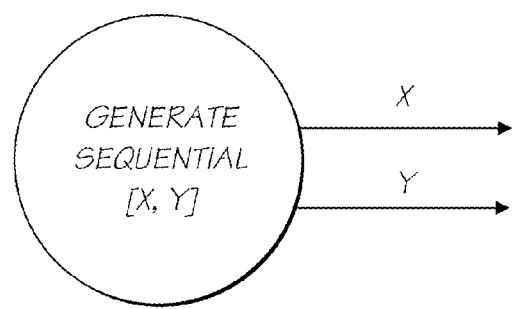
FIG. 23 illustrates the generate sequential process.
Figure 24:
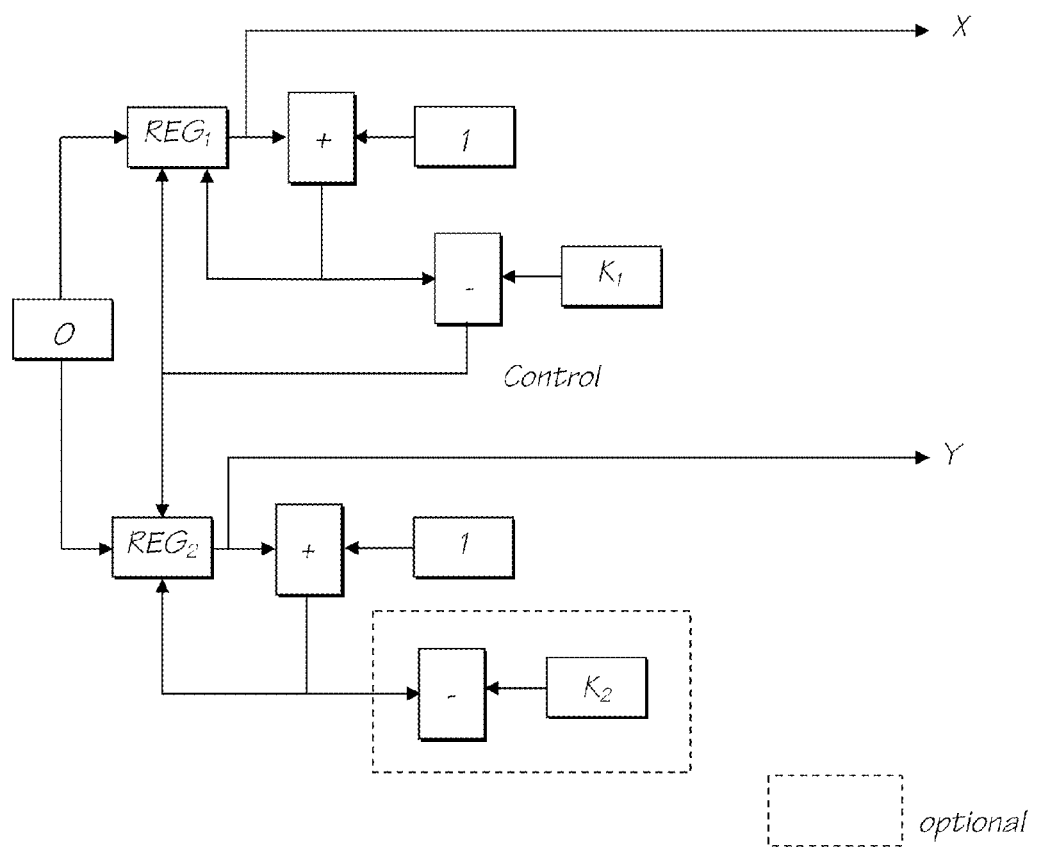
FIG. 24 illustrates the generate sequential process.

When a process is processing pixels in sequential order according to the Sequential Read Iterator (or generating pixels and writing them out to a Sequential Write Iterator), the following process can be used to generate X, Y coordinates instead of PassX/PassY flags as shown in FIG. 23. The coordinate generator counts up to ImageWidth in the X ordinate, and once per ImageWidth pixels increments the Y ordinate. The actual process is illustrated in FIG. 24, where the following constants are set by software:

| Constant | Value |
|---|---|
| $K_1$ | ImageWidth |
| $K_2$ | ImageHeight (optional) |

The following registers are used to hold temporary variables:

| Variable | Value |
|---|---|
| $Reg_1$ | X (starts at 0 each line) |
| $Reg_2$ | Y (starts at 0) |

The requirements are summarized as follows:

| Requirements | *+ | + | R | K | LU | Iterators |
|---|---|---|---|---|---|---|
| General | 0 | ¾ | 2 | ½ | 0 | 0 |
| TOTAL | 0 | ¾ | 2 | ½ | 0 | 0 |

Generate Vertical Strip [X, Y]

Figure 25:
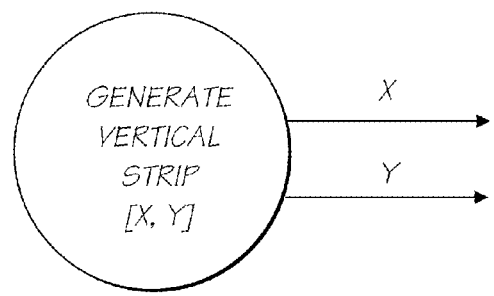
FIG. 25 illustrates the generate vertical strip process.
Figure 26:
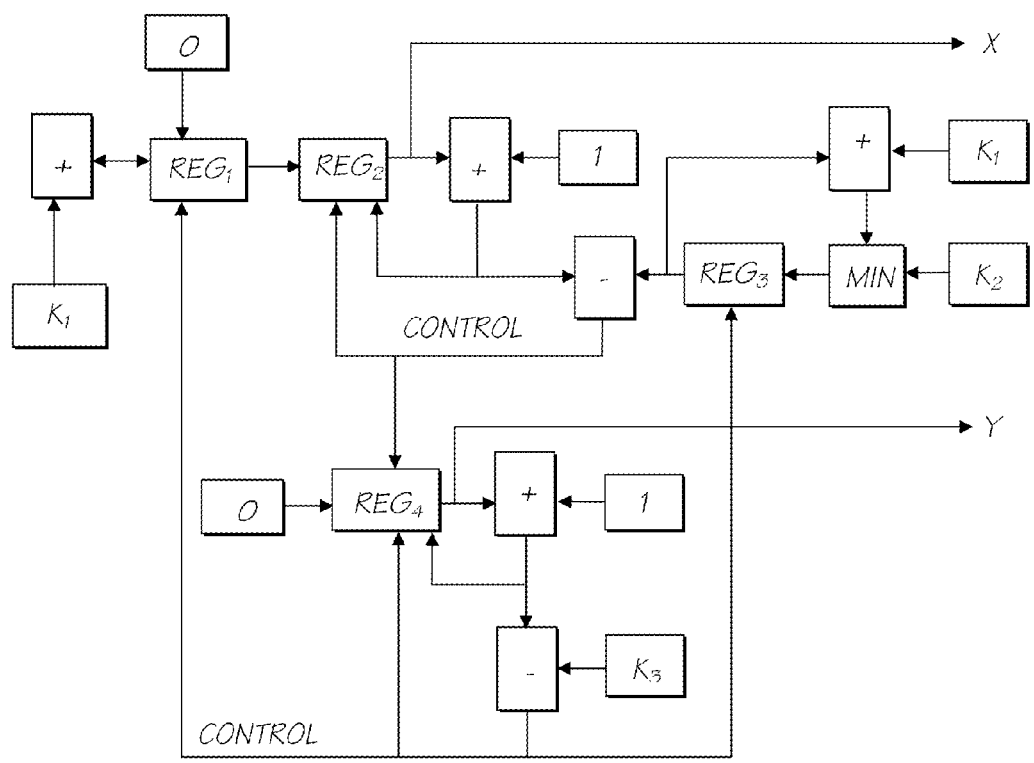
FIG. 26 illustrates the generate vertical strip process.

When a process is processing pixels in order to write them to a Vertical Strip Write Iterator, and for some reason cannot use the PassX/PassY flags, the process as illustrated in FIG. 25 can be used to generate X, Y coordinates. The coordinate generator simply counts up to ImageWidth in the X ordinate, and once per ImageWidth pixels increments the Y ordinate. The actual process is illustrated in FIG. 26, where the following constants are set by software:

| Constant | Value |
|---|---|
| $K_1$ | 32 |
| $K_2$ | ImageWidth |
| $K_3$ | ImageHeight |

The following registers are used to hold temporary variables:

| Variable | Value |
|---|---|
| $Reg_1$ | StartX (starts at 0, and is incremented by 32 once per vertical strip) |
| $Reg_2$ | X |
| $Reg_3$ | EndX (starts at 32 and is incremented by 32 to a maximum of ImageWidth) once per vertical strip) |
| $Reg_4$ | Y |

The requirements are summarized as follows:

| Requirements | *+ | + | R | K | LU | Iterators |
|---|---|---|---|---|---|---|
| General | 0 | 4 | 4 | 3 | 0 | 0 |
| TOTAL | 0 | 4 | 4 | 3 | 0 | 0 |

The calculations that occur once per vertical strip (2 additions, one of which has an associated MIN) are not included in the general timing statistics because they are not really part of the per pixel timing. However they do need to be taken into account for the programming of the microcode for the particular function.

Image Sensor Interface (ISI 83)

Figure 27:
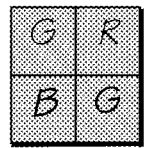
FIG. 27 illustrates a pixel data configuration.
Figure 28:
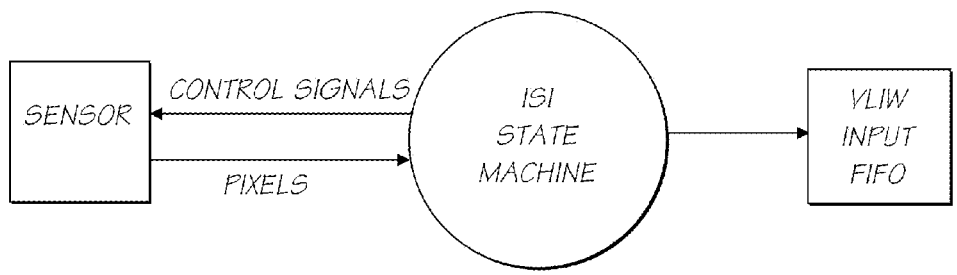
FIG. 28 illustrates a pixel processing process.

The Image Sensor Interface (ISI 83) takes data from the CMOS Image Sensor and makes it available for storage in DRAM. The image sensor has an aspect ratio of 3:2, with a typical resolution of 750×500 samples, yielding 375K (8 bits per pixel). Each 2×2 pixel block has the configuration as shown in FIG. 27. The ISI 83 is a state machine that sends control information to the Image Sensor, including frame sync pulses and pixel clock pulses in order to read the image. Pixels are read from the image sensor and placed into the VLIW Input FIFO 78. The VLIW is then able to process and/or store the pixels. This is illustrated further in FIG. 28. The ISI 83 is used in conjunction with a VLIW program that stores the sensed Photo Image in DRAM. Processing occurs in 2 steps:

A small VLIW program reads the pixels from the FIFO and writes them to DRAM via a Sequential Write Iterator.

The Photo Image in DRAM is rotated 90, 180 or 270 degrees according to the orientation of the camera when the photo was taken.

If the rotation is 0 degrees, then step 1 merely writes the Photo Image out to the final Photo Image location and step 2 is not performed. If the rotation is other than 0 degrees, the image is written out to a temporary area (for example into the Print Image memory area), and then rotated during step 2 into the final Photo Image location. Step 1 is very simple microcode, taking data from the VLIW Input FIFO 78 and writing it to a Sequential Write Iterator. Step 2's rotation is accomplished by using the accelerated Vark Affine Transform function. The processing is performed in 2 steps in order to reduce design complexity and to re-use the Vark affine transform rotate logic already required for images. This is acceptable since both steps are completed in approximately 0.03 seconds, a time imperceptible to the operator of the Artcam. Even so, the read process is sensor speed bound, taking 0.02 seconds to read the full frame, and approximately 0.01 seconds to rotate the image.

The orientation is important for converting between the sensed Photo Image and the internal format image, since the relative positioning of R, G, and B pixels changes with orientation. The processed image may also have to be rotated during the Print process in order to be in the correct orientation for printing. The 3D model of the Artcam has 2 image sensors, with their inputs multiplexed to a single ISI 83 (different microcode, but same ACP 31). Since each sensor is a frame store, both images can be taken simultaneously, and then transferred to memory one at a time.

Display Controller 88

Figure 29:
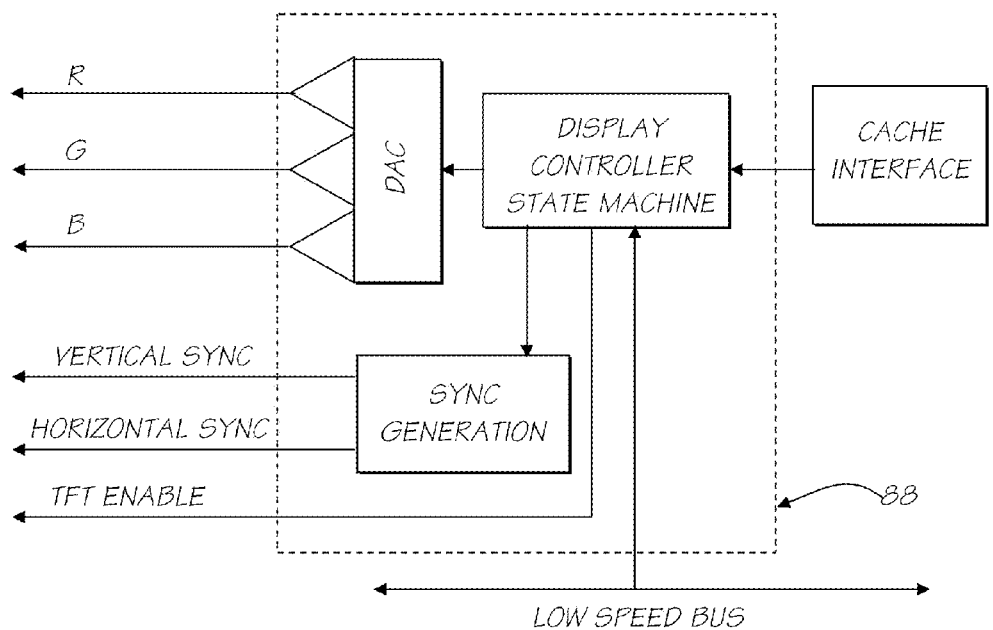
FIG. 29 illustrates a schematic block diagram of the display controller.

When the "Take" button on an Artcam is half depressed, the TFT will display the current image from the image sensor (converted via a simple VLIW process). Once the Take button is fully depressed, the Taken Image is displayed. When the user presses the Print button and image processing begins, the TFT is turned off. Once the image has been printed the TFT is turned on again. The Display Controller 88 is used in those Artcam models that incorporate a flat panel display. An example display is a TFT LCD of resolution 240×160 pixels. The structure of the Display Controller 88 is illustrated in FIG. 29. The Display Controller 88 State Machine contains registers that control the timing of the Sync Generation, where the display image is to be taken from (in DRAM via the Data cache 76 via a specific Cache Group), and whether the TFT should be active or not (via TFT Enable) at the moment. The CPU can write to these registers via the low speed bus. Displaying a 240×160 pixel image on an RGB TFT requires 3 components per pixel. The image taken from DRAM is displayed via 3 DACs, one for each of the R, G, and B output signals. At an image refresh rate of 30 frames per second (60 fields per second) the Display Controller 88 requires data transfer rates of:

$$240 \times 160 \times 3 \times 30 = 3.5 \text{ MB per second}$$

This data rate is low compared to the rest of the system. However it is high enough to cause VLIW programs to slow down during the intensive image processing. The general principles of TFT operation should reflect this.

Image Data Formats

As stated previously, the DRAM Interface 81 is responsible for interfacing between other client portions of the ACP chip and the RAMBUS DRAM. In effect, each module within the DRAM Interface is an address generator.

There are three logical types of images manipulated by the ACP. They are:

CCD Image, which is the Input Image captured from the CCD.

Internal Image format—the Image format utilised internally by the Artcam device.

Print Image—the Output Image format printed by the Artcam

These images are typically different in color space, resolution, and the output & input color spaces which can vary from camera to camera. For example, a CCD image on a low-end camera may be a different resolution, or have different color characteristics from that used in a high-end camera. However all internal image formats are the same format in terms of color space across all cameras.

In addition, the three image types can vary with respect to which direction is 'up'. The physical orientation of the camera causes the notion of a portrait or landscape image, and this must be maintained throughout processing. For this reason, the internal image is always oriented correctly, and rotation is performed on images obtained from the CCD and during the print operation.

CCD Image Organization

Figure 30:
FIG. 30 illustrates the CCD image organization.

Although many different CCD image sensors could be utilised, it will be assumed that the CCD itself is a 750×500 image sensor, yielding 375,000 bytes (8 bits per pixel). Each 2×2 pixel block having the configuration as depicted in FIG. 30.

A CCD Image as stored in DRAM has consecutive pixels with a given line contiguous in memory. Each line is stored one after the other. The image sensor Interface 83 is responsible for taking data from the CCD and storing it in the DRAM correctly oriented. Thus a CCD image with rotation 0 degrees has its first line G, R, G, R, G, R . . . and its second line as B, G, B, G, B, G . . . . If the CCD image should be portrait, rotated 90 degrees, the first line will be R, G, R, G, R, G and the second line G, B, G, B, G, B . . . etc.

Pixels are stored in an interleaved fashion since all color components are required in order to convert to the internal image format.

It should be noted that the ACP 31 makes no assumptions about the CCD pixel format, since the actual CCDs for imaging may vary from Artcam to Artcam, and over time. All processing that takes place via the hardware is controlled by major microcode in an attempt to extend the usefulness of the ACP 31.

Internal Image Organization

Internal images typically consist of a number of channels. Vark images can include, but are not limited to:

Lab
Labα
LabΔ
αΔ
L

L, a and b correspond to components of the Lab color space, α is a matte channel (used for compositing), and Δ is a bump-map channel (used during brushing, tiling and illuminating).

The VLIW processor 74 requires images to be organized in a planar configuration. Thus a Lab image would be stored as 3 separate blocks of memory:

one block for the L channel,
one block for the a channel, and
one block for the b channel Within each channel block, pixels are stored contiguously for a given row (plus some optional padding bytes), and rows are stored one after the other.

Figure 31:
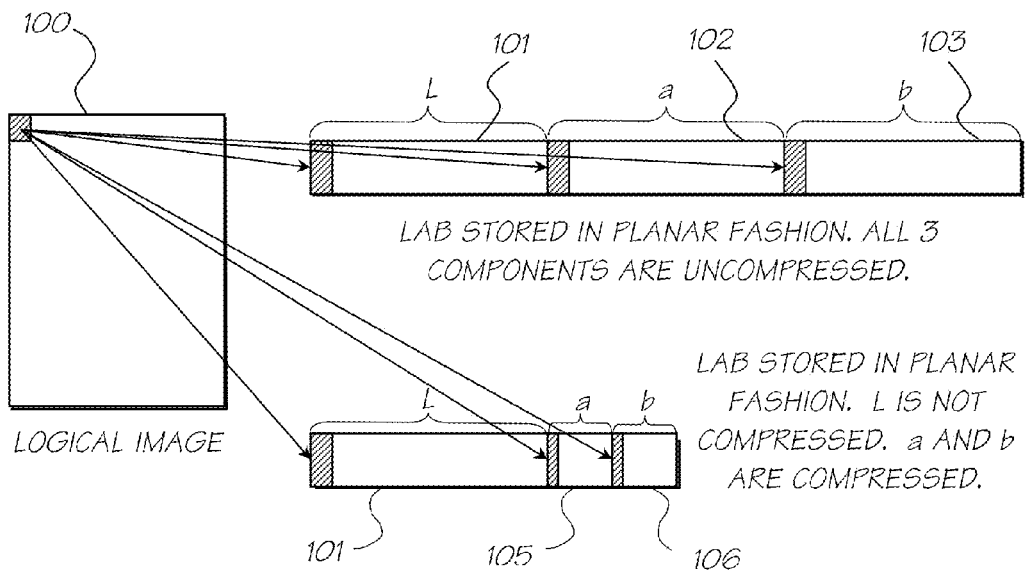
FIG. 31 illustrates the storage format for a logical image.

Turning to FIG. 31 there is illustrated an example form of storage of a logical image 100. The logical image 100 is stored in a planar fashion having L 101, a 102 and b 103 color components stored one after another. Alternatively, the logical image 100 can be stored in a compressed format having an uncompressed L component 101 and compressed A and B components 105, 106.

Figure 32:
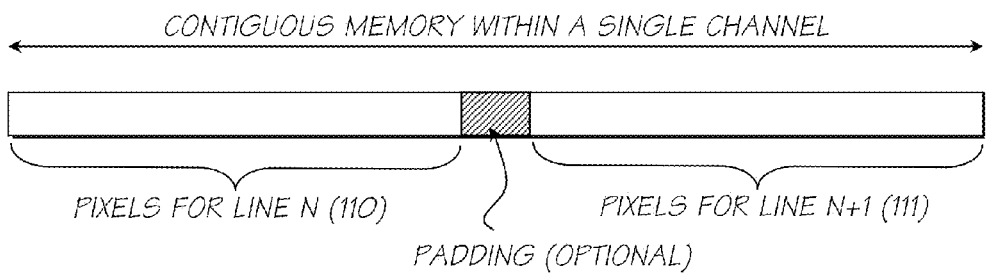
FIG. 32 illustrates the internal image memory storage format.

Turning to FIG. 32, the pixels of for line n 110 are stored together before the pixels of for line and n+1 (111). With the image being stored in contiguous memory within a single channel.

In the 8 MB-memory model, the final Print Image after all processing is finished, needs to be compressed in the chrominance channels. Compression of chrominance channels can be 4:1, causing an overall compression of 12:6, or 2:1.

Other than the final Print Image, images in the Artcam are typically not compressed. Because of memory constraints, software may choose to compress the final Print Image in the chrominance channels by scaling each of these channels by 2:1. If this has been done, the PRINT Vark function call utilised to print an image must be told to treat the specified chrominance channels as compressed. The PRINT function is the only function that knows how to deal with compressed chrominance, and even so, it only deals with a fixed 2:1 compression ratio.

Although it is possible to compress an image and then operate on the compressed image to create the final print image, it is not recommended due to a loss in resolution. In addition, an image should only be compressed once—as the final stage before printout. While one compression is virtually undetectable, multiple compressions may cause substantial image degradation.

Clip Image Organization

Clip images stored on Artcards have no explicit support by the ACP 31. Software is responsible for taking any images from the current Artcard and organizing the data into a form known by the ACP. If images are stored compressed on an Artcard, software is responsible for decompressing them, as there is no specific hardware support for decompression of Artcard images.

Image Pyramid Organization

Figure 33:
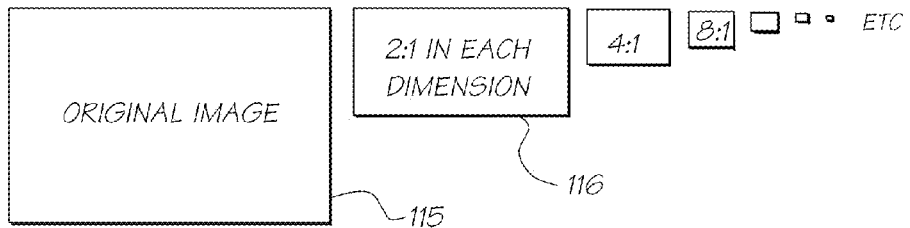
FIG. 33 illustrates the image pyramid storage format.

During brushing, tiling, and warping processes utilised to manipulate an image it is often necessary to compute the average color of a particular area in an image. Rather than calculate the value for each area given, these functions make use of an image pyramid. As illustrated in FIG. 33, an image pyramid is effectively a multi-resolution pixel-map. The original image 115 is a 1:1 representation. Low-pass filtering and sub-sampling by 2:1 in each dimension produces an image ¼ the original size 116. This process continues until the entire image is represented by a single pixel. An image pyramid is constructed from an original internal format image, and consumes ⅓ of the size taken up by the original image (¼+¹⁄₁₆+¹⁄₆₄+ . . . ). For an original image of 1500×1000 the corresponding image pyramid is approximately ½ MB. An image pyramid is constructed by a specific Vark function, and is used as a parameter to other Vark functions.

Print Image Organization

The entire processed image is required at the same time in order to print it. However the Print Image output can comprise a CMY dithered image and is only a transient image format, used within the Print Image functionality. However, it should be noted that color conversion will need to take place from the internal color space to the print color space. In addition, color conversion can be tuned to be different for different print rolls in the camera with different ink characteristics e.g. Sepia output can be accomplished by using a specific sepia toning Artcard, or by using a sepia tone print-roll (so all Artcards will work in sepia tone).

Color Spaces

As noted previously there are 3 color spaces used in the Artcam, corresponding to the different image types.

The ACP has no direct knowledge of specific color spaces. Instead, it relies on client color space conversion tables to convert between CCD, internal, and printer color spaces:

CCD:RGB
Internal:Lab
Printer:CMY

Removing the color space conversion from the ACP 31 allows:

Different CCDs to be used in different cameras
Different inks (in different print rolls over time) to be used in the same camera
Separation of CCD selection from ACP design path
A well defined internal color space for accurate color processing Artcard Interface 87

The Artcard Interface (AI) takes data from the linear image Sensor while an Artcard is passing under it, and makes that data available for storage in DRAM. The image sensor produces 11,000 8-bit samples per scanline, sampling the Artcard at 4800 dpi. The AI is a state machine that sends control information to the linear sensor, including LineSync pulses and PixelClock pulses in order to read the image. Pixels are read from the linear sensor and placed into the VLIW Input FIFO 78. The VLIW is then able to process and/or store the pixels. The AI has only a few registers:

| Register Name | Description |
| --- | --- |
| NumPixels | The number of pixels in a sensor line (approx 11,000) |
| Status | The Print Head Interface's Status Register |
| PixelsRemaining | The number of bytes remaining in the current line |
| Actions | |
| Reset | A write to this register resets the AI, stops any scanning, and loads all registers with 0. |
| Scan | A write to this register with a non-zero value sets the Scanning bit of the Status register, and causes the Artcard Interface Scan cycle to start. A write to this register with 0 stops the scanning process and clears the Scanning bit in the Status register. The Scan cycle causes the AI to transfer NumPixels bytes from the sensor to the VLIW Input FIFO |

-continued

| Register Name | Description |
|---|---|
| | 78, producing the PixelClock signals appropriately. Upon completion of NumPixels bytes, a LineSync pulse is given and the Scan cycle restarts. The PixelsRemaining register holds the number of pixels remaining to be read on the current scanline. |

Note that the CPU should clear the VLIW Input FIFO 78 before initiating a Scan. The Status register has bit interpretations as follows:

| Bit Name | Bits | Description |
|---|---|---|
| Scanning | 1 | If set, the AI is currently scanning, with the number of pixels remaining to be transferred from the current line recorded in PixelsRemaining. If clear, the AI is not currently scanning, so is not transferring pixels to the VLIW Input FIFO 78. |

Artcard Interface (AI) 87

The Artcard Interface (AI) 87 is responsible for taking an Artcard image from the Artcard Reader 34, and decoding it into the original data (usually a Vark script). Specifically, the AI 87 accepts signals from the Artcard scanner linear CCD 34, detects the bit pattern printed on the card, and converts the bit pattern into the original data, correcting read errors.

With no Artcard 9 inserted, the image printed from an Artcam is simply the sensed Photo Image cleaned up by any standard image processing routines. The Artcard 9 is the means by which users are able to modify a photo before printing it out. By the simple task of inserting a specific Artcard 9 into an Artcam, a user is able to define complex image processing to be performed on the Photo Image. With no Artcard inserted the Photo Image is processed in a standard way to create the Print Image. When a single Artcard 9 is inserted into the Artcam, that Artcard's effect is applied to the Photo Image to generate the Print Image.

When the Artcard 9 is removed (ejected), the printed image reverts to the Photo Image processed in a standard way. When the user presses the button to eject an Artcard, an event is placed in the event queue maintained by the operating system running on the Artcam Central Processor 31. When the event is processed (for example after the current Print has occurred), the following things occur:

If the current Artcard is valid, then the Print Image is marked as invalid and a 'Process Standard' event is placed in the event queue. When the event is eventually processed it will perform the standard image processing operations on the Photo Image to produce the Print Image.

The motor is started to eject the Artcard and a time-specific 'Stop-Motor' Event is added to the event queue.

Inserting an Artcard

When a user inserts an Artcard 9, the Artcard Sensor 49 detects it notifying the ACP 72. This results in the software inserting an 'Artcard Inserted' event into the event queue. When the event is processed several things occur:

The current Artcard is marked as invalid (as opposed to 'none').

The Print Image is marked as invalid.

The Artcard motor 37 is started up to load the Artcard

The Artcard Interface 87 is instructed to read the Artcard

The Artcard Interface 87 accepts signals from the Artcard scanner linear CCD 34, detects the bit pattern printed on the card, and corrects errors in the detected bit pattern, producing a valid Artcard data block in DRAM.

Reading Data from the Artcard CCD—General Considerations

Figure 34:
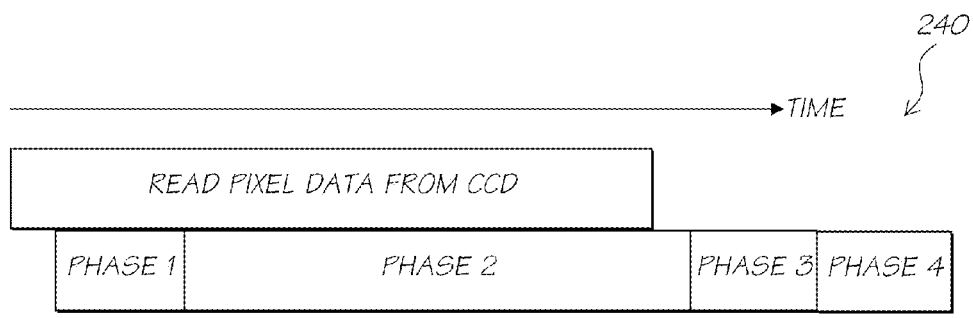
FIG. 34 illustrates a time line of the process of sampling an Artcard.

As illustrated in FIG. 34, the Data Card reading process has 4 phases operated while the pixel data is read from the card. The phases are as follows:

| | |
|---|---|
| Phase 1. | Detect data area on Artcard |
| Phase 2. | Detect bit pattern from Artcard based on CCD pixels, and write as bytes. |
| Phase 3. | Descramble and XOR the byte-pattern |
| Phase 4. | Decode data (Reed-Solomon decode) |

Figure 35:
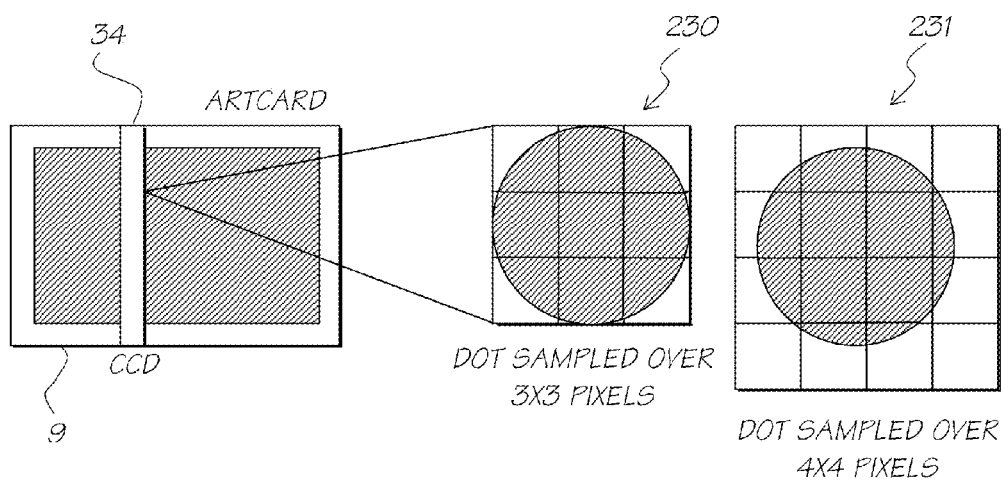
FIG. 35 illustrates the super sampling process.

As illustrated in FIG. 35, the Artcard 9 must be sampled at least at double the printed resolution to satisfy Nyquist's Theorem. In practice it is better to sample at a higher rate than this. Preferably, the pixels are sampled 230 at 3 times the resolution of a printed dot in each dimension, requiring 9 pixels to define a single dot. Thus if the resolution of the Artcard 9 is 1600 dpi, and the resolution of the sensor 34 is 4800 dpi, then using a 50 mm CCD image sensor results in 9450 pixels per column. Therefore if we require 2 MB of dot data (at 9 pixels per dot) then this requires 2 MB*8*9/9450=15,978 columns=approximately 16,000 columns. Of course if a dot is not exactly aligned with the sampling CCD the worst and most likely case is that a dot will be sensed over a 16 pixel area (4×4) 231.

Figure 36:
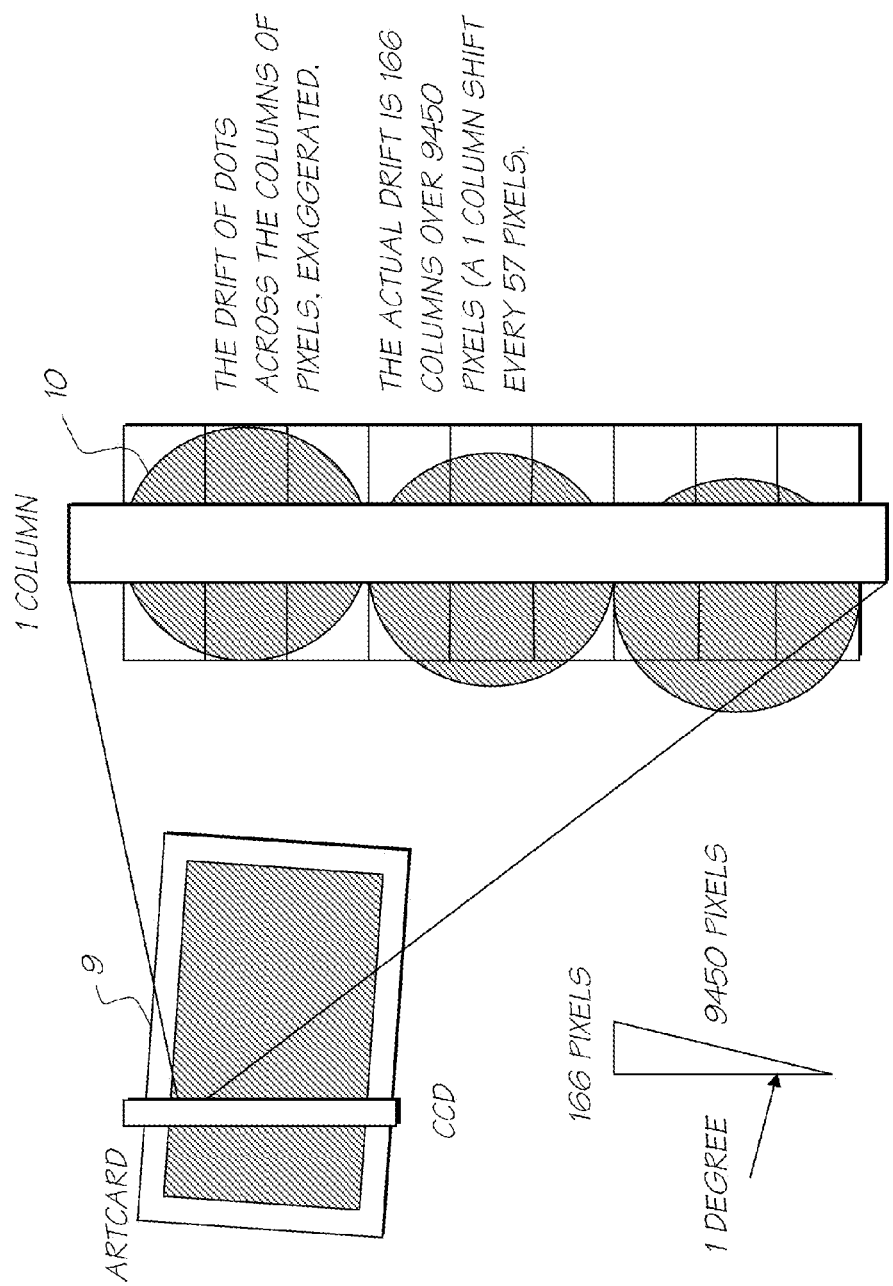
FIG. 36 illustrates the process of reading a rotated Artcard.

An Artcard 9 may be slightly warped due to heat damage, slightly rotated (up to, say 1 degree) due to differences in insertion into an Artcard reader, and can have slight differences in true data rate due to fluctuations in the speed of the reader motor 37. These changes will cause columns of data from the card not to be read as corresponding columns of pixel data. As illustrated in FIG. 36, a 1 degree rotation in the Artcard 9 can cause the pixels from a column on the card to be read as pixels across 166 columns:

Finally, the Artcard 9 should be read in a reasonable amount of time with respect to the human operator. The data on the Artcard covers most of the Artcard surface, so timing concerns can be limited to the Artcard data itself. A reading time of 1.5 seconds is adequate for Artcard reading.

The Artcard should be loaded in 1.5 seconds. Therefore all 16,000 columns of pixel data must be read from the CCD 34 in 1.5 second, i.e. 10,667 columns per second. Therefore the time available to read one column is $\frac{1}{10667}$ seconds, or 93,747 ns. Pixel data can be written to the DRAM one column at a time, completely independently from any processes that are reading the pixel data.

The time to write one column of data (9450/2 bytes since the reading can be 4 bits per pixel giving 2×4 bit pixels per byte) to DRAM is reduced by using 8 cache lines. If 4 lines were written out at one time, the 4 banks can be written to independently, and thus overlap latency reduced. Thus the 4725 bytes can be written in 11,840 ns (4725/128*320 ns). Thus the time taken to write a given column's data to DRAM uses just under 13% of the available bandwidth.

Decoding an Artcard

A simple look at the data sizes shows the impossibility of fitting the process into the 8 MB of memory 33 if the entire Artcard pixel data (140 MB if each bit is read as a 3×3 array) as read by the linear CCD 34 is kept. For this reason, the reading of the linear CCD, decoding of the bitmap, and the un-bitmap process should take place in real-time (while the Artcard 9 is traveling past the linear CCD 34), and these processes must effectively work without having entire data stores available.

When an Artcard 9 is inserted, the old stored Print Image and any expanded Photo Image becomes invalid. The new Artcard 9 can contain directions for creating a new image based on the currently captured Photo Image. The old Print Image is invalid, and the area holding expanded Photo Image data and image pyramid is invalid, leaving more than 5 MB that can be used as scratch memory during the read process. Strictly speaking, the 1 MB area where the Artcard raw data is to be written can also be used as scratch data during the Artcard read process as long as by the time the final Reed-Solomon decode is to occur, that 1 MB area is free again. The reading process described here does not make use of the extra 1 MB area (except as a final destination for the data).

It should also be noted that the unscrambling process requires two sets of 2 MB areas of memory since unscrambling cannot occur in place. Fortunately the 5 MB scratch area contains enough space for this process.

Figure 37:
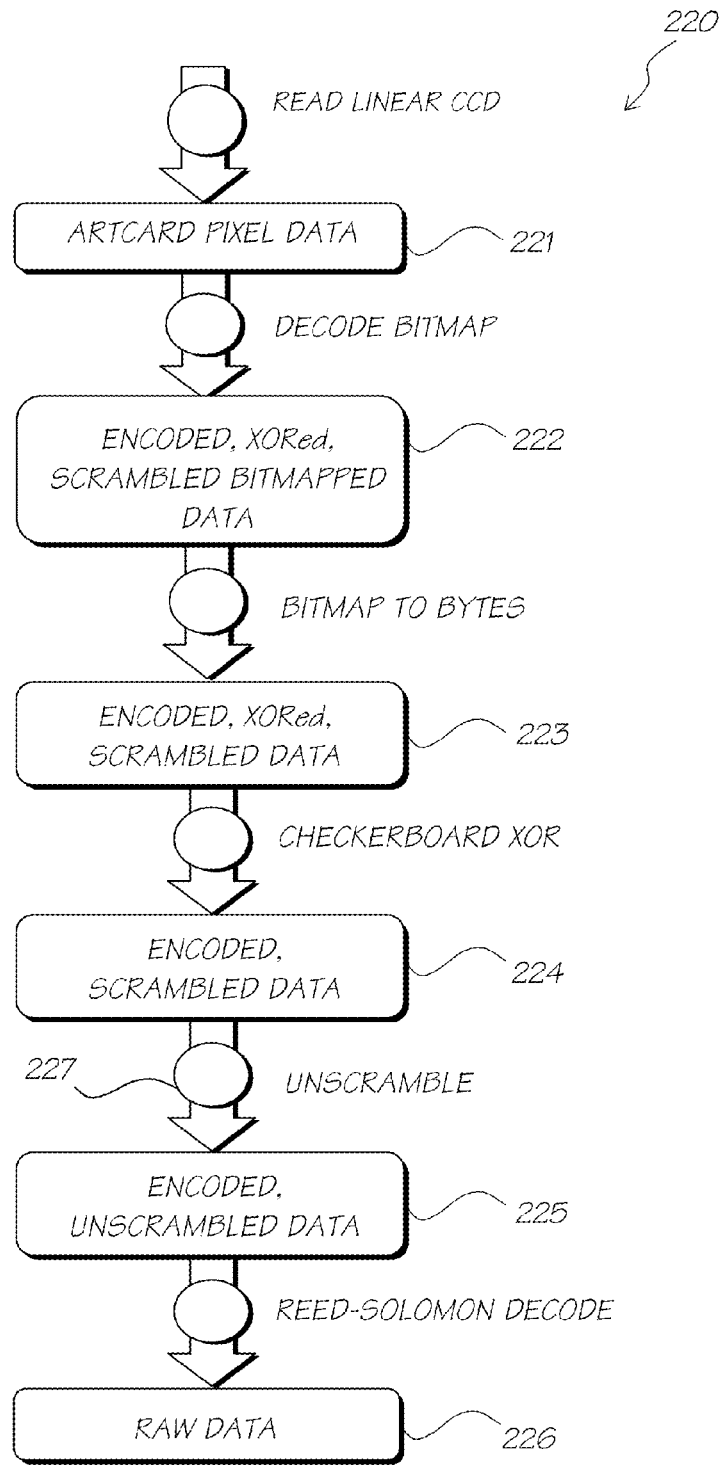
FIG. 37 illustrates a flow chart of the steps necessary to decode an Artcard.

Turning now to FIG. 37, there is shown a flowchart 220 of the steps necessary to decode the Artcard data. These steps include reading in the Artcard 221, decoding the read data to produce corresponding encoded XORed scrambled bitmap data 223. Next a checkerboard XOR is applied to the data to produces encoded scrambled data 224. This data is then unscrambled 227 to produce data 225 before this data is subjected to Reed-Solomon decoding to produce the original raw data 226. Alternatively, unscrambling and XOR process can take place together, not requiring a separate pass of the data. Each of the above steps is discussed in further detail hereinafter. As noted previously with reference to FIG. 37, the Artcard Interface, therefore, has 4 phases, the first 2 of which are time-critical, and must take place while pixel data is being read from the CCD:

| Phase 1. | Detect data area on Artcard |
| Phase 2. | Detect bit pattern from Artcard based on CCD pixels, and write as bytes. |
| Phase 3. | Descramble and XOR the byte-pattern |
| Phase 4. | Decode data (Reed-Solomon decode) |

The four phases are described in more detail as follows:

Phase 1. As the Artcard 9 moves past the CCD 34 the AI must detect the start of the data area by robustly detecting special targets on the Artcard to the left of the data area. If these cannot be detected, the card is marked as invalid. The detection must occur in real-time, while the Artcard 9 is moving past the CCD 34.

If necessary, rotation invariance can be provided. In this case, the targets are repeated on the right side of the Artcard, but relative to the bottom right corner instead of the top corner. In this way the targets end up in the correct orientation if the card is inserted the "wrong" way. Phase 3 below can be altered to detect the orientation of the data, and account for the potential rotation.

Phase 2. Once the data area has been determined, the main read process begins, placing pixel data from the CCD into an 'Artcard data window', detecting bits from this window, assembling the detected bits into bytes, and constructing a byte-image in DRAM. This must all be done while the Artcard is moving past the CCD.

Phase 3. Once all the pixels have been read from the Artcard data area, the Artcard motor 37 can be stopped, and the byte image descrambled and XORed. Although not requiring real-time performance, the process should be fast enough not to annoy the human operator. The process must take 2 MB of scrambled bit-image and write the unscrambled/XORed bit-image to a separate 2 MB image.

Phase 4. The final phase in the Artcard read process is the Reed-Solomon decoding process, where the 2 MB bit-image is decoded into a 1 MB valid Artcard data area. Again, while not requiring real-time performance it is still necessary to decode quickly with regard to the human operator. If the decode process is valid, the card is marked as valid. If the decode failed, any duplicates of data in the bit-image are attempted to be decoded, a process that is repeated until success or until there are no more duplicate images of the data in the bit image.

The four phase process described requires 4.5 MB of DRAM. 2 MB is reserved for Phase 2 output, and 0.5 MB is reserved for scratch data during phases 1 and 2. The remaining 2 MB of space can hold over 440 columns at 4725 byes per column. In practice, the pixel data being read is a few columns ahead of the phase 1 algorithm, and in the worst case, about 180 columns behind phase 2, comfortably inside the 440 column limit.

A description of the actual operation of each phase will now be provided in greater detail.

Phase 1—Detect Data Area on Artcard

This phase is concerned with robustly detecting the left-hand side of the data area on the Artcard 9. Accurate detection of the data area is achieved by accurate detection of special targets printed on the left side of the card. These targets are especially designed to be easy to detect even if rotated up to 1 degree.

Figure 38:
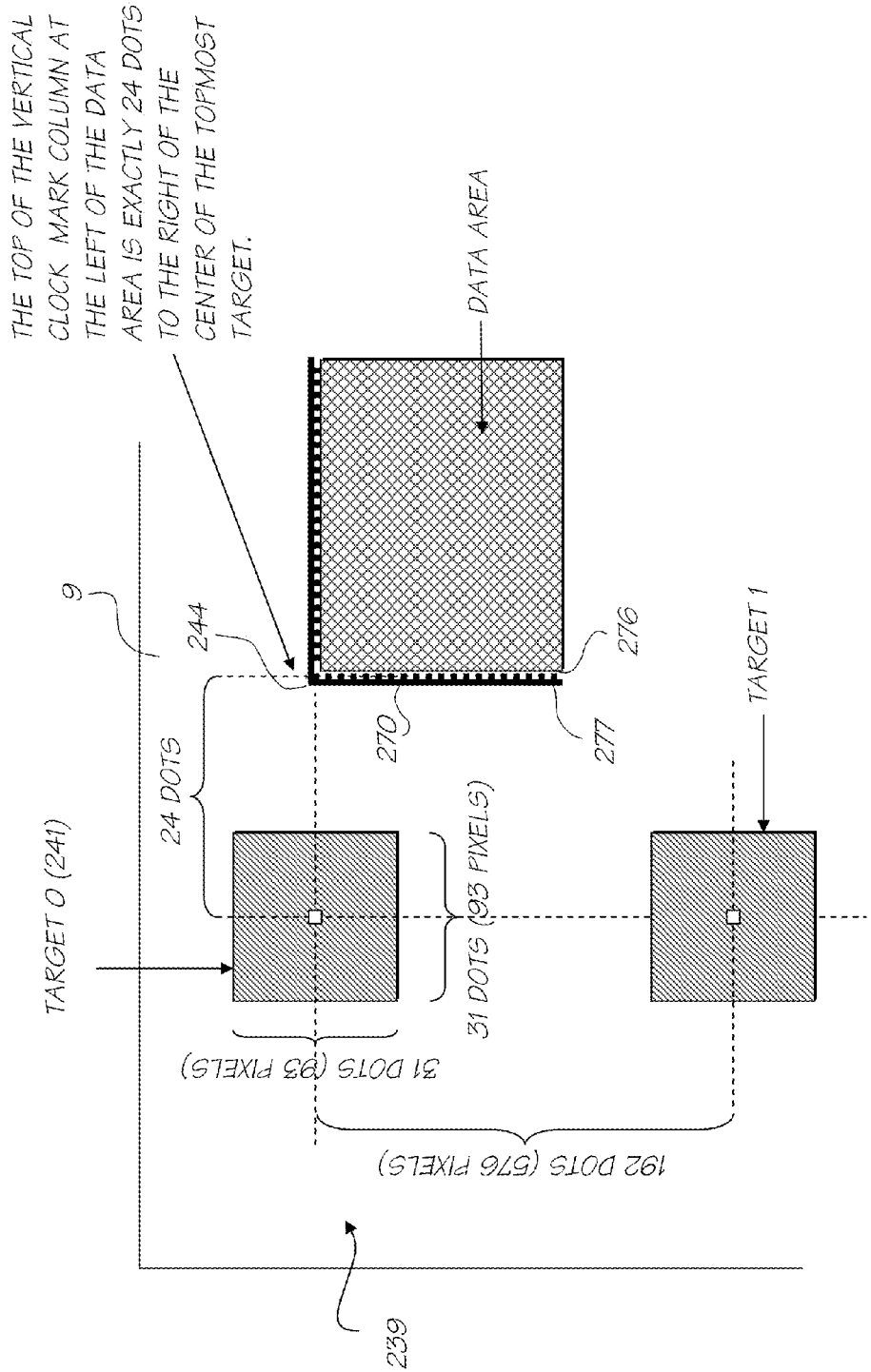
FIG. 38 illustrates an enlargement of the left hand corner of a single Artcard.
Figure 39:
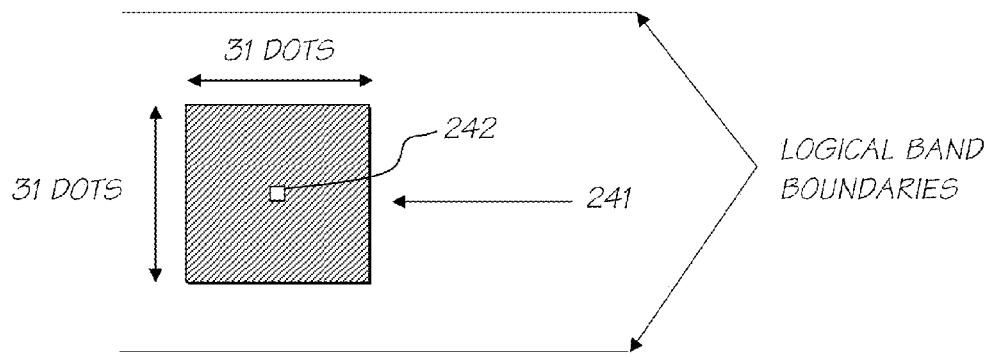
FIG. 39 illustrates a single target for detection.

Turning to FIG. 38, there is shown an enlargement of the left hand side of an Artcard 9. The side of the card is divided into 16 bands, 239 with a target eg. 241 located at the center of each band. The bands are logical in that there is no line drawn to separate bands. Turning to FIG. 39, there is shown a single target 241. The target 241, is a printed black square containing a single white dot. The idea is to detect firstly as many targets 241 as possible, and then to join at least 8 of the detected white-dot locations into a single logical straight line. If this can be done, the start of the data area 243 is a fixed distance from this logical line. If it cannot be done, then the card is rejected as invalid.

As shown in FIG. 38, the height of the card 9 is 3150 dots. A target (Target0) 241 is placed a fixed distance of 24 dots away from the top left corner 244 of the data area so that it falls well within the first of 16 equal sized regions 239 of 192 dots (576 pixels) with no target in the final pixel region of the card. The target 241 must be big enough to be easy to detect, yet be small enough not to go outside the height of the region if the card is rotated 1 degree. A suitable size for the target is a 31×31 dot (93×93 sensed pixels) black square 241 with the white dot 242.

At the worst rotation of 1 degree, a 1 column shift occurs every 57 pixels. Therefore in a 590 pixel sized band, we cannot place any part of our symbol in the top or bottom 12 pixels or so of the band or they could be detected in the wrong band at CCD read time if the card is worst case rotated.

Therefore, if the black part of the rectangle is 57 pixels high (19 dots) we can be sure that at least 9.5 black pixels will be read in the same column by the CCD (worst case is half the pixels are in one column and half in the next). To be sure of reading at least 10 black dots in the same column, we must have a height of 20 dots. To give room for erroneous detection on the edge of the start of the black dots, we increase the number of dots to 31, giving us 15 on either side of the white dot at the target's local coordinate (15, 15). 31 dots is 91 pixels, which at most suffers a 3 pixel shift in column, easily within the 576 pixel band.

Thus each target is a block of 31×31 dots (93×93 pixels) each with the composition:

15 columns of 31 black dots each (45 pixel width columns of 93 pixels).

1 column of 15 black dots (45 pixels) followed by 1 white dot (3 pixels) and then a further 15 black dots (45 pixels)

15 columns of 31 black dots each (45 pixel width columns of 93 pixels)

Detect Targets

Targets are detected by reading columns of pixels, one column at a time rather than by detecting dots. It is necessary to look within a given band for a number of columns consisting of large numbers of contiguous black pixels to build up the left side of a target. Next, it is expected to see a white region in the center of further black columns, and finally the black columns to the left of the target center.

Eight cache lines are required for good cache performance on the reading of the pixels. Each logical read fills 4 cache lines via 4 sub-reads while the other 4 cache-lines are being used. This effectively uses up 13% of the available DRAM bandwidth.

Figure 40:
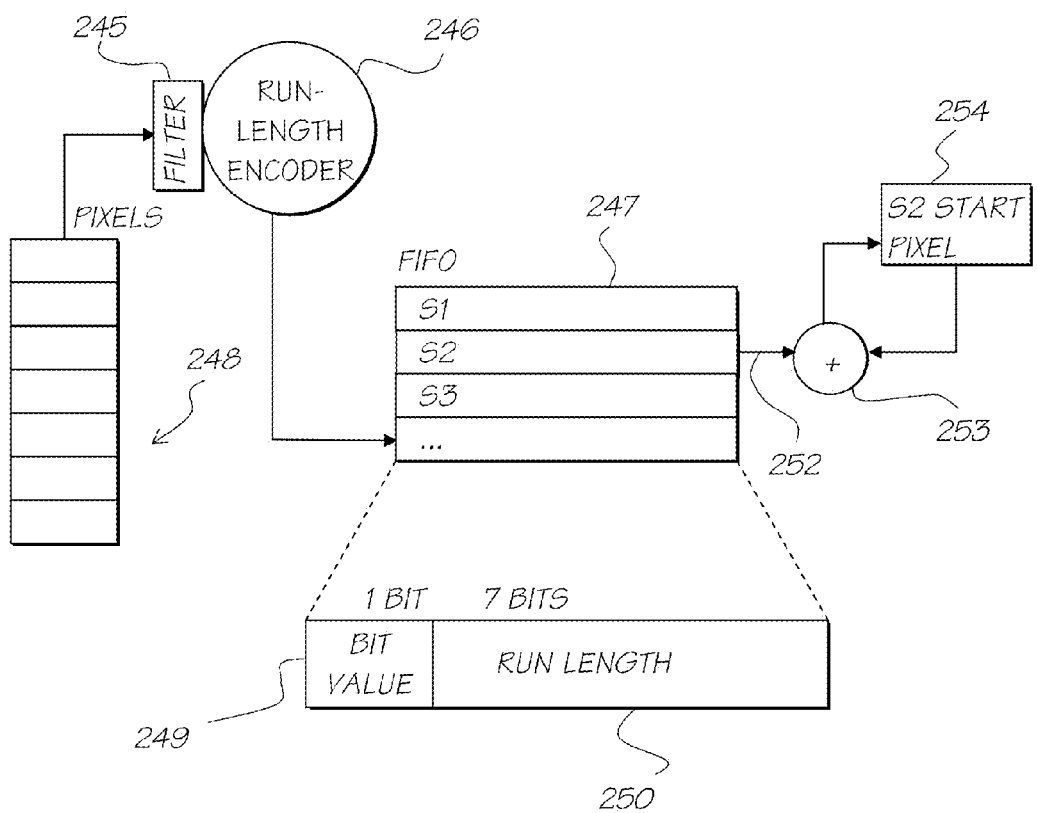
FIG. 40 illustrates the method utilised to detect targets.
Figure 41:
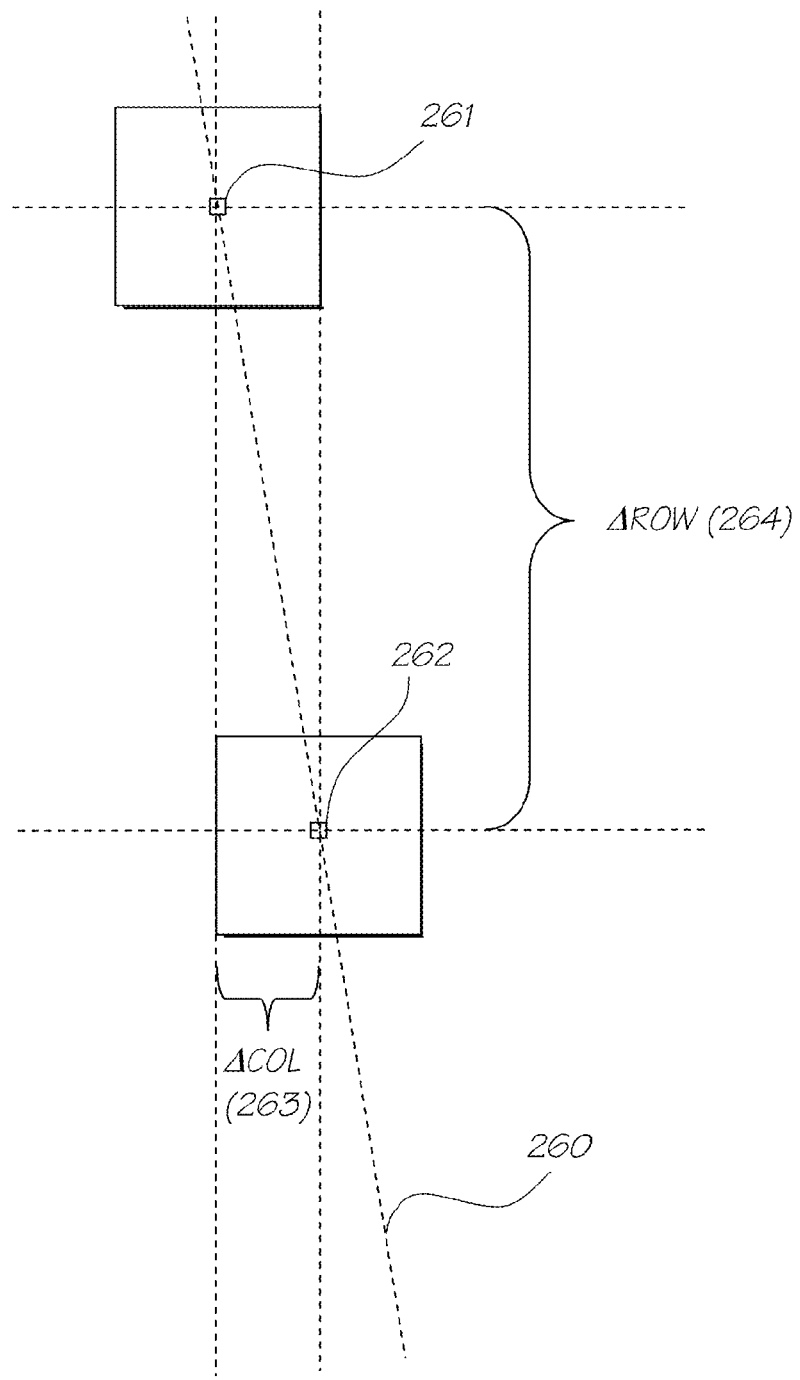
FIG. 41 illustrates the method of calculating the distance between two targets.

As illustrated in FIG. 40, the detection mechanism FIFO for detecting the targets uses a filter 245, run-length encoder 246, and a FIFO 247 that requires special wiring of the top 3 elements (S1, S2, and S3) for random access.

The columns of input pixels are processed one at a time until either all the targets are found, or until a specified number of columns have been processed. To process a column, the pixels are read from DRAM, passed through a filter 245 to detect a 0 or 1, and then run length encoded 246. The bit value and the number of contiguous bits of the same value are placed in FIFO 247. Each entry of the FIFO 249 is in 8 bits, 7 bits 250 to hold the run-length, and 1 bit 249 to hold the value of the bit detected.

The run-length encoder 246 only encodes contiguous pixels within a 576 pixel (192 dot) region.

The top 3 elements in the FIFO 247 can be accessed 252 in any random order. The run lengths (in pixels) of these entries are filtered into 3 values: short, medium, and long in accordance with the following table:

| Short | Used to detect white dot. | RunLength < 16 |
|---|---|---|
| Medium | Used to detect runs of black above or below the white dot in the center of the target. | 16 <= RunLength < 48 |
| Long | Used to detect run lengths of black to the left and right of the center dot in the target. | RunLength >= 48 |

Looking at the top three entries in the FIFO 247 there are 3 specific cases of interest:

| Case 1 | S1 = white long<br>S2 = black long<br>S3 = white medium/long | We have detected a black column of the target to the left of or to the right of the white center dot. |
|---|---|---|
| Case 2 | S1 = white long<br>S2 = black medium<br>S3 = white short<br>Previous 8 columns were Case 1 | If we've been processing a series of columns of Case 1s, then we have probably detected the white dot in this column. We know that the next entry will be black (or it would have been included in the white S3 entry), but the number of black pixels is in question. Need to verify by checking after the next FIFO advance (see Case 3). |
| Case 3 | Prev = Case 2<br>S3 = black med | We have detected part of the white dot. We expect around 3 of these, and then some more columns of Case 1. |

Preferably, the following information per region band is kept:

| TargetDetected | 1 bit |
|---|---|
| BlackDetectCount | 4 bits |
| WhiteDetectCount | 3 bits |
| PrevColumnStartPixel | 15 bits |
| TargetColumn ordinate | 16 bits (15:1) |
| TargetRow ordinate | 16 bits (15:1) |
| TOTAL | 7 bytes (rounded to 8 bytes for easy addressing) |

Given a total of 7 bytes. It makes address generation easier if the total is assumed to be 8 bytes. Thus 16 entries requires 16*8=128 bytes, which fits in 4 cache lines. The address range should be inside the scratch 0.5 MB DRAM area since other phases make use of the remaining 4 MB data area.

When beginning to process a given pixel column, the register value S2StartPixel 254 is reset to 0. As entries in the FIFO advance from S2 to S1, they are also added 255 to the existing S2StartPixel value, giving the exact pixel position of the run currently defined in S2. Looking at each of the 3 cases of interest in the FIFO, S2StartPixel can be used to determine the start of the black area of a target (Cases 1 and 2), and also the start of the white dot in the center of the target (Case 3). An algorithm for processing columns can be as follows:

| 1 | TargetDetected[0-15] := 0<br>BlackDetectCount[0-15] := 0<br>WhiteDetectCount[0-15] := 0<br>TargetRow[0-15] := 0<br>TargetColumn[0-15] := 0<br>PrevColStartPixel[0-15] := 0<br>CurrentColumn := 0 |
|---|---|
| 2 | Do ProcessColumn |
| 3 | CurrentColumn++ |
| 4 | If (CurrentColumn <= LastValidColumn)<br>Goto 2 |

The steps involved in the processing a column (Process Column) are as follows:

| 1 | S2StartPixel := 0<br>FIFO := 0<br>BlackDetectCount := 0<br>WhiteDetectCount := 0<br>ThisColumnDetected := FALSE<br>PrevCaseWasCase2 := FALSE |
|---|---|
| 2 | If (! TargetDetected[Target]) & (! ColumnDetected[Target])<br>ProcessCases<br>EndIf |
| 3 | PrevCaseWasCase2 := Case = 2 |
| 4 | Advance FIFO |

The processing for each of the 3 (Process Cases) cases is as follows:

Case 1:

| BlackDetectCount[target] < 8<br>OR<br>WhiteDetectCount[Target] = 0 | Δ := ABS(S2StartPixel − PrevColStartPixel[Target])<br>If (0 <= Δ < 2)<br>BlackDetectCount[Target]++<br>(max value = 8) |
|---|---|

-continued

| | Else |
| | BlackDetectCount[Target] := 1 |
| | WhiteDetectCount[Target] := 0 |
| | EndIf |
| | PrevColStartPixel[Target] := S2StartPixel |
| | ColumnDetected[Target] := TRUE |
| | BitDetected = 1 |
| BlackDetectCount[target] >= 8 | PrevColStartPixel[Target] := S2StartPixel |
| WhiteDetectCount[Target] != 0 | ColumnDetected[Target] := TRUE |
| | BitDetected = 1 |
| | TargetDetected[Target] := TRUE |
| | TargetColumn[Target] := |
| | CurrentColumn − 8 − |
| | (WhiteDetectCount[Target]/2) |

Case 2:

No special processing is recorded except for setting the 'PrevCaseWasCase2' flag for identifying Case 3 (see Step 3 of processing a column described above)

Case 3:

| PrevCaseWasCase2 = TRUE | If (WhiteDetectCount < 2) |
| BlackDetectCount[Target] >= 8 | TargetRow[Target] = S2StartPixel + |
| WhiteDetectCount = 1 | (S2$_{RunLength}$/2) |
| | EndIf |
| | Δ := ABS(S2StartPixel − |
| | PrevColStartPixel[Target]) |
| | If (0 <= Δ < 2) |
| | WhiteDetectCount[Target]++ |
| | Else |
| | WhiteDetectCount[Target] := 1 |
| | EndIf |
| | PrevColStartPixel[Target] := S2StartPixel |
| | ThisColumnDetected := TRUE |
| | BitDetected = 0 |

At the end of processing a given column, a comparison is made of the current column to the maximum number of columns allowed for target detection. If the number of columns allowed has been exceeded, then it is necessary to check how many targets have been found. If fewer than 8 have been found, the card is considered invalid.

Process Targets

After the targets have been detected, they should be processed. All the targets may be available or merely some of them. Some targets may also have been erroneously detected.

This phase of processing is to determine a mathematical line that passes through the center of as many targets as possible. The more targets that the line passes through, the more confident the target position has been found. The limit is set to be 8 targets. If a line passes through at least 8 targets, then it is taken to be the right one.

It is all right to take a brute-force but straightforward approach since there is the time to do so (see below), and lowering complexity makes testing easier. It is necessary to determine the line between targets 0 and 1 (if both targets are considered valid) and then determine how many targets fall on this line. Then we determine the line between targets 0 and 2, and repeat the process. Eventually we do the same for the line between targets 1 and 2, 1 and 3 etc. and finally for the line between targets 14 and 15. Assuming all the targets have been found, we need to perform 15+14+13+ ... =90 sets of calculations (with each set of calculations requiring 16 tests=1440 actual calculations), and choose the line which has the maximum number of targets found along the line. The algorithm for target location can be as follows:

```
TargetA := 0
MaxFound := 0
BestLine := 0
While (TargetA < 15)
    If (TargetA is Valid)
        TargetB:= TargetA + 1
        While (TargetB<= 15)
            If (TargetB is valid)
                CurrentLine := line between TargetA and TargetB
                TargetC := 0;
                While (TargetC <= 15)
                    If (TargetC valid AND TargetC on line AB)
                        TargetsHit++
                    EndIf
                    If (TargetsHit > MaxFound)
                        MaxFound := TargetsHit
                        BestLine := CurrentLine
                    EndIf
                    TargetC++
                EndWhile
            EndIf
        TargetB ++
        EndWhile
    EndIf
    TargetA++
EndWhile
If (MaxFound < 8)
    Card is Invalid
Else
    Store expected centroids for rows based on BestLine
EndIf
```

As illustrated in FIG. 34, in the algorithm above, to determine a CurrentLine 260 from Target A 261 and target B, it is necessary to calculate Δrow (264) & Δcolumn (263) between targets 261, 262, and the location of Target A. It is then possible to move from Target 0 to Target 1 etc. by adding Δrow and Δcolumn. The found (if actually found) location of target N can be compared to the calculated expected position of Target N on the line, and if it falls within the tolerance, then Target N is determined to be on the line.

To calculate Δrow & Δcolumn:

$$\Delta row = (row_{TargetA} - row_{TargetB})/(B-A)$$

$$\Delta column = (column_{TargetA} - column_{TargetB})/(B-A)$$

Then we calculate the position of Target0:

$$row = rowTargetA - (A * \Delta row)$$

$$column = columnTargetA - (A * \Delta column)$$

And compare (row, column) against the actual row$_{Target0}$ and column$_{Target0}$. To move from one expected target to the next (e.g. from Target0 to Target1), we simply add Δrow and Δcolumn to row and column respectively. To check if each target is on the line, we must calculate the expected position of Target0, and then perform one add and one comparison for each target ordinate.

At the end of comparing all 16 targets against a maximum of 90 lines, the result is the best line through the valid targets. If that line passes through at least 8 targets (i.e. Max-Found>=8), it can be said that enough targets have been found to form a line, and thus the card can be processed. If the best line passes through fewer than 8, then the card is considered invalid.

The resulting algorithm takes 180 divides to calculate Δrow and Δcolumn, 180 multiply/adds to calculate target0 position, and then 2880 adds/comparisons. The time we have to perform this processing is the time taken to read 36 columns of pixel data=3,374,892 ns. Not even accounting for the fact that an add takes less time than a divide, it is necessary to perform 3240 mathematical operations in 3,374,892 ns. That gives approximately 1040 ns per operation, or 104 cycles. The CPU can therefore safely perform the entire processing of targets, reducing complexity of design.

Update Centroids Based on Data Edge Border and Clockmarks

Step 0: Locate the Data Area

From Target 0 (241 of FIG. 38) it is a predetermined fixed distance in rows and columns to the top left border 244 of the data area, and then a further 1 dot column to the vertical clock marks 276. So we use TargetA, $\Delta$row and $\Delta$column found in the previous stage ($\Delta$row and $\Delta$column refer to distances between targets) to calculate the centroid or expected location for Target0 as described previously.

Since the fixed pixel offset from Target0 to the data area is related to the distance between targets (192 dots between targets, and 24 dots between Target0 and the data area 243), simply add $\Delta$row/8 to Target0's centroid column coordinate (aspect ratio of dots is 1:1). Thus the top co-ordinate can be defined as:

(column$_{DotColumnTop}$=column$_{Target0}$+($\Delta$row/8)

(row$_{DotColumnTop}$=row$_{Target0}$+($\Delta$column/8)

Next $\Delta$row and $\Delta$column are updated to give the number of pixels between dots in a single column (instead of between targets) by dividing them by the number of dots between targets:

$\Delta$row=$\Delta$row/192

$\Delta$column=$\Delta$column/192

We also set the currentColumn register (see Phase 2) to be −1 so that after step 2, when phase 2 begins, the currentColumn register will increment from −1 to 0.

Step 1: Write Out the Initial Centroid Deltas ($\Delta$) and Bit History

This simply involves writing setup information required for Phase 2.

This can be achieved by writing 0s to all the $\Delta$row and $\Delta$column entries for each row, and a bit history. The bit history is actually an expected bit history since it is known that to the left of the clock mark column 276 is a border column 277, and before that, a white area. The bit history therefore is 011, 010, 011, 010 etc.

Step 2: Update the Centroids Based on Actual Pixels Read.

The bit history is set up in Step 1 according to the expected clock marks and data border. The actual centroids for each dot row can now be more accurately set (they were initially 0) by comparing the expected data against the actual pixel values. The centroid updating mechanism is achieved by simply performing step 3 of Phase 2.

Phase 2—Detect Bit Pattern from Artcard Based on Pixels Read, and Write as Bytes.

Since a dot from the Artcard 9 requires a minimum of 9 sensed pixels over 3 columns to be represented, there is little point in performing dot detection calculations every sensed pixel column. It is better to average the time required for processing over the average dot occurrence, and thus make the most of the available processing time. This allows processing of a column of dots from an Artcard 9 in the time it takes to read 3 columns of data from the Artcard. Although the most likely case is that it takes 4 columns to represent a dot, the 4$^{th}$ column will be the last column of one dot and the first column of a next dot. Processing should therefore be limited to only 3 columns.

As the pixels from the CCD are written to the DRAM in 13% of the time available, 83% of the time is available for processing of 1 column of dots i.e. 83% of (93,747*3)=83% of 281,241 ns=233,430 ns.

In the available time, it is necessary to detect 3150 dots, and write their bit values into the raw data area of memory. The processing therefore requires the following steps:

For each column of dots on the Artcard:

Step 0: Advance to the next dot column

Step 1: Detect the top and bottom of an Artcard dot column (check clock marks)

Step 2: Process the dot column, detecting bits and storing them appropriately

Step 3: Update the centroids

Since we are processing the Artcard's logical dot columns, and these may shift over 165 pixels, the worst case is that we cannot process the first column until at least 165 columns have been read into DRAM. Phase 2 would therefore finish the same amount of time after the read process had terminated. The worst case time is: 165*93,747 ns=15,468,255 ns or 0.015 seconds.

Step 0: Advance to the Next Dot Column

In order to advance to the next column of dots we add $\Delta$row and $\Delta$column to the dotColumnTop to give us the centroid of the dot at the top of the column. The first time we do this, we are currently at the clock marks column 276 to the left of the bit image data area, and so we advance to the first column of data. Since $\Delta$row and $\Delta$column refer to distance between dots within a column, to move between dot columns it is necessary to add $\Delta$row to column$_{dotColumnTop}$ and $\Delta$column to row$_{dotColumnTop}$.

To keep track of what column number is being processed, the column number is recorded in a register called CurrentColumn. Every time the sensor advances to the next dot column it is necessary to increment the CurrentColumn register. The first time it is incremented, it is incremented from −1 to 0 (see Step 0 Phase 1). The CurrentColumn register determines when to terminate the read process (when reaching maxColumns), and also is used to advance the DataOut Pointer to the next column of byte information once all 8 bits have been written to the byte (once every 8 dot columns). The lower 3 bits determine what bit we're up to within the current byte. It will be the same bit being written for the whole column.

Step 1: Detect the Top and Bottom of an Artcard Dot Column.

In order to process a dot column from an Artcard, it is necessary to detect the top and bottom of a column. The column should form a straight line between the top and bottom of the column (except for local warping etc.). Initially dotColumnTop points to the clock mark column 276. We simply toggle the expected value, write it out into the bit history, and move on to step 2, whose first task will be to add the $\Delta$row and $\Delta$column values to dotColumnTop to arrive at the first data dot of the column.

Step 2: Process an Artcard's Dot Column

Given the centroids of the top and bottom of a column in pixel coordinates the column should form a straight line between them, with possible minor variances due to warping etc.

Assuming the processing is to start at the top of a column (at the top centroid coordinate) and move down to the bottom of the column, subsequent expected dot centroids are given as:

row$_{next}$=row+$\Delta$row column$_{next}$=column+$\Delta$column

This gives us the address of the expected centroid for the next dot of the column. However to account for local warping and error we add another Δrow and Δcolumn based on the last time we found the dot in a given row. In this way we can account for small drifts that accumulate into a maximum drift of some percentage from the straight line joining the top of the column to the bottom.

We therefore keep 2 values for each row, but store them in separate tables since the row history is used in step 3 of this phase.

Δrow and Δcolumn (2 @ 4 bits each=1 byte)
row history (3 bits per row, 2 rows are stored per byte)
For each row we need to read a Δrow and Δcolumn to determine the change to the centroid. The read process takes 5% of the bandwidth and 2 cache lines:

76*(3150/32)+2*3150=13,824 ns=5% of bandwidth

Once the centroid has been determined, the pixels around the centroid need to be examined to detect the status of the dot and hence the value of the bit. In the worst case a dot covers a 4×4 pixel area. However, thanks to the fact that we are sampling at 3 times the resolution of the dot, the number of pixels required to detect the status of the dot and hence the bit value is much less than this. We only require access to 3 columns of pixel columns at any one time.

In the worst case of pixel drift due to a 1% rotation, centroids will shift 1 column every 57 pixel rows, but since a dot is 3 pixels in diameter, a given column will be valid for 171 pixel rows (3*57). As a byte contains 2 pixels, the number of bytes valid in each buffered read (4 cache lines) will be a worst case of 86 (out of 128 read).

Once the bit has been detected it must be written out to DRAM. We store the bits from 8 columns as a set of contiguous bytes to minimize DRAM delay. Since all the bits from a given dot column will correspond to the next bit position in a data byte, we can read the old value for the byte, shift and OR in the new bit, and write the byte back. The read/shift&OR/write process requires 2 cache lines.

We need to read and write the bit history for the given row as we update it. We only require 3 bits of history per row, allowing the storage of 2 rows of history in a single byte. The read/shift&OR/write process requires 2 cache lines.

The total bandwidth required for the bit detection and storage is summarised in the following table:

| | |
|---|---|
| Read centroid Δ | 5% |
| Read 3 columns of pixel data | 19% |
| Read/Write detected bits into byte buffer | 10% |
| Read/Write bit history | 5% |
| TOTAL | 39% |

Detecting a Dot

The process of detecting the value of a dot (and hence the value of a bit) given a centroid is accomplished by examining 3 pixel values and getting the result from a lookup table. The process is fairly simple and is illustrated in FIG. 42. A dot 290 has a radius of about 1.5 pixels. Therefore the pixel 291 that holds the centroid, regardless of the actual position of the centroid within that pixel, should be 100% of the dot's value. If the centroid is exactly in the center of the pixel 291, then the pixels above 292 & below 293 the centroid's pixel, as well as the pixels to the left 294 & right 295 of the centroid's pixel will contain a majority of the dot's value. The further a centroid is away from the exact center of the pixel 295, the more likely that more than the center pixel will have 100% coverage by the dot.

Although FIG. 42 only shows centroids differing to the left and below the center, the same relationship obviously holds for centroids above and to the right of center. center. In Case 1, the centroid is exactly in the center of the middle pixel 295. The center pixel 295 is completely covered by the dot, and the pixels above, below, left, and right are also well covered by the dot. In Case 2, the centroid is to the left of the center of the middle pixel 291. The center pixel is still completely covered by the dot, and the pixel 294 to the left of the center is now completely covered by the dot. The pixels above 292 and below 293 are still well covered. In Case 3, the centroid is below the center of the middle pixel 291. The center pixel 291 is still completely covered by the dot 291, and the pixel below center is now completely covered by the dot. The pixels left 294 and right 295 of center are still well covered. In Case 4, the centroid is left and below the center of the middle pixel. The center pixel 291 is still completely covered by the dot, and both the pixel to the left of center 294 and the pixel below center 293 are completely covered by the dot.

The algorithm for updating the centroid uses the distance of the centroid from the center of the middle pixel 291 in order to select 3 representative pixels and thus decide the value of the dot:

Pixel 1: the pixel containing the centroid
Pixel 2: the pixel to the left of Pixel 1 if the centroid's X coordinate (column value) is <½, otherwise the pixel to the right of Pixel 1.
Pixel 3: the pixel above pixel 1 if the centroid's Y coordinate (row value) is <½, otherwise the pixel below Pixel 1.

As shown in FIG. 43, the value of each pixel is output to a pre-calculated lookup table 301. The 3 pixels are fed into a 12-bit lookup table, which outputs a single bit indicating the value of the dot—on or off. The lookup table 301 is constructed at chip definition time, and can be compiled into about 500 gates. The lookup table can be a simple threshold table, with the exception that the center pixel (Pixel 1) is weighted more heavily.

Step 3: Update the Centroid Δs for Each Row in the Column

The idea of the Δs processing is to use the previous bit history to generate a 'perfect' dot at the expected centroid location for each row in a current column. The actual pixels (from the CCD) are compared with the expected 'perfect' pixels. If the two match, then the actual centroid location must be exactly in the expected position, so the centroid Δs must be valid and not need updating. Otherwise a process of changing the centroid Δs needs to occur in order to best fit the expected centroid location to the actual data. The new centroid Δs will be used for processing the dot in the next column.

Updating the centroid Δs is done as a subsequent process from Step 2 for the following reasons:

to reduce complexity in design, so that it can be performed as Step 2 of Phase 1 there is enough bandwidth remaining to allow it to allow reuse of DRAM buffers, and to ensure that all the data required for centroid updating is available at the start of the process without special pipelining.

The centroid Δ are processed as Δcolumn Δrow respectively to reduce complexity.

Although a given dot is 3 pixels in diameter, it is likely to occur in a 4×4 pixel area. However the edge of one dot will as a result be in the same pixel as the edge of the next dot. For this reason, centroid updating requires more than simply the information about a given single dot.

Figure 44:
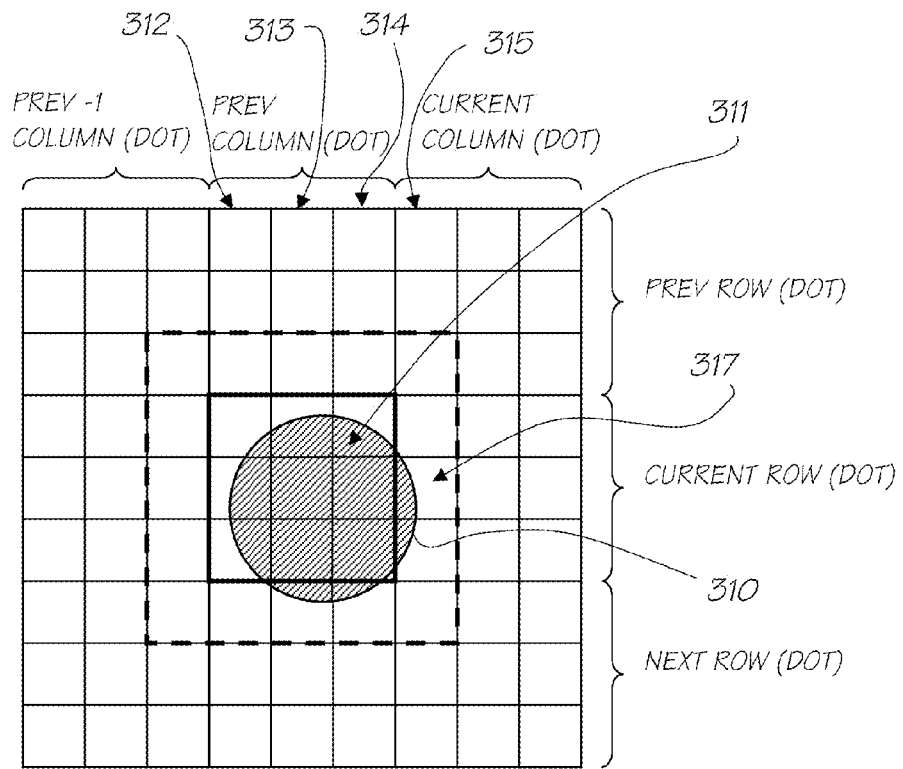
FIG. 44 illustrates the centroid updating process.

FIG. 44 shows a single dot 310 from the previous column with a given centroid 311. In this example, the dot 310 extend Δ over 4 pixel columns 312-315 and in fact, part of the previous dot column's dot (coordinate=(Prevcolumn, Current Row)) has entered the current column for the dot on the current row. If the dot in the current row and column was white, we would expect the rightmost pixel column 314 from the previous dot column to be a low value, since there is only the dot information from the previous column's dot (the current column's dot is white). From this we can see that the higher the pixel value is in this pixel column 315, the more the centroid should be to the right Of course, if the dot to the right was also black, we cannot adjust the centroid as we cannot get information sub-pixel. The same can be said for the dots to the left, above and below the dot at dot coordinates (PrevColumn, CurrentRow).

From this we can say that a maximum of 5 pixel columns and rows are required. It is possible to simplify the situation by taking the cases of row and column centroid Δs separately, treating them as the same problem, only rotated 90 degrees.

Taking the horizontal case first, it is necessary to change the column centroid Δs if the expected pixels don't match the detected pixels. From the bit history, the value of the bits found for the Current Row in the current dot column, the previous dot column, and the (previous-1)th dot column are known. The expected centroid location is also known. Using these two pieces of information, it is possible to generate a 20 bit expected bit pattern should the read be 'perfect'. The 20 bit bit-pattern represents the expected Δ values for each of the 5 pixels across the horizontal dimension. The first nibble would represent the rightmost pixel of the leftmost dot. The next 3 nibbles represent the 3 pixels across the center of the dot 310 from the previous column, and the last nibble would be the leftmost pixel 317 of the rightmost dot (from the current column).

If the expected centroid is in the center of the pixel, we would expect a 20 bit pattern based on the following table:

| Bit history | Expected pixels |
| --- | --- |
| 000 | 00000 |
| 001 | 0000D |
| 010 | 0DFD0 |
| 011 | 0DFDD |
| 100 | D0000 |
| 101 | D000D |
| 110 | DDFD0 |
| 111 | DDFDD |

The pixels to the left and right of the center dot are either 0 or D depending on whether the bit was a 0 or 1 respectively. The center three pixels are either 000 or DFD depending on whether the bit was a 0 or 1 respectively. These values are based on the physical area taken by a dot for a given pixel. Depending on the distance of the centroid from the exact center of the pixel, we would expect data shifted slightly, which really only affects the pixels either side of the center pixel. Since there are 16 possibilities, it is possible to divide the distance from the center by 16 and use that amount to shift the expected pixels.

Once the 20 bit 5 pixel expected value has been determined it can be compared against the actual pixels read. This can proceed by subtracting the expected pixels from the actual pixels read on a pixel by pixel basis, and finally adding the differences together to obtain a distance from the expected Δ values.

Figure 45:
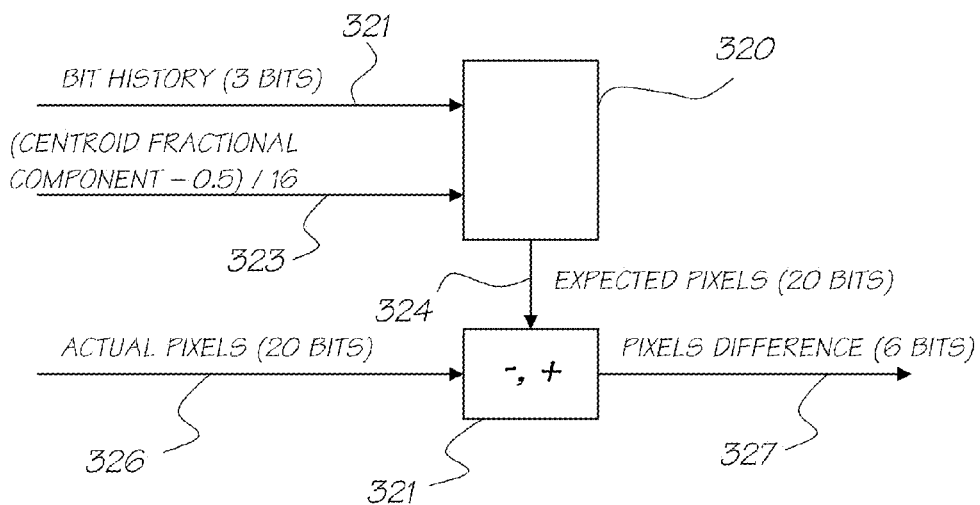
FIG. 45 illustrates a delta processing lookup table utilised in the preferred embodiment.

FIG. 45 illustrates one form of implementation of the above algorithm which includes a look up table 320 which receives the bit history 322 and central fractional component 323 and outputs 324 the corresponding 20 bit number which is subtracted 321 from the central pixel input 326 to produce a pixel difference 327.

This process is carried out for the expected centroid and once for a shift of the centroid left and right by 1 amount in Δcolumn. The centroid with the smallest difference from the actual pixels is considered to be the 'winner' and the Δcolumn updated accordingly (which hopefully is 'no change'). As a result, a Δcolumn cannot change by more than 1 each dot column.

The process is repeated for the vertical pixels, and Δrow is consequentially updated.

There is a large amount of scope here for parallelism. Depending on the rate of the clock chosen for the ACP unit 31 these units can be placed in series (and thus the testing of 3 different Δ could occur in consecutive clock cycles), or in parallel where all 3 can be tested simultaneously. If the clock rate is fast enough, there is less need for parallelism.

Bandwidth Utilization

It is necessary to read the old Δ of the Δs, and to write them out again. This takes 10% of the bandwidth:

$$2*(76(3150/32)+2*3150)=27{,}648 \text{ ns}=10\% \text{ of bandwidth}$$

It is necessary to read the bit history for the given row as we update its Δs. Each byte contains 2 row's bit histories, thus taking 2.5% of the bandwidth:

$$76((3150/2)/32)+2*(3150/2)=4{,}085 \text{ ns}=2.5\% \text{ of bandwidth}$$

In the worst case of pixel drift due to a 1% rotation, centroids will shift 1 column every 57 pixel rows, but since a dot is 3 pixels in diameter, a given pixel column will be valid for 171 pixel rows (3*57). As a byte contains 2 pixels, the number of bytes valid in cached reads will be a worst case of 86 (out of 128 read). The worst case timing for 5 columns is therefore 31% bandwidth.

$$5*(((9450/(128*2))*320)*128/86)=88{,}112 \text{ ns}=31\% \text{ of bandwidth.}$$

The total bandwidth required for the updating the centroid Δ is summarised in the following table:

| | |
| --- | --- |
| Read/Write centroid Δ | 10% |
| Read bit history | 2.5% |
| Read 5 columns of pixel data | 31% |
| TOTAL | 43.5% |

Memory Usage for Phase 2:

The 2 MB bit-image DRAM area is read from and written to during Phase 2 processing. The 2 MB pixel-data DRAM area is read.

The 0.5 MB scratch DRAM area is used for storing row data, namely:

| | |
| --- | --- |
| Centroid array | 24 bits (16:8) * 2 * 3150 = 18,900 byes |
| Bit History array | 3 bits * 3150 entries (2 per byte) = 1575 bytes |

Phase 3—Unscramble and XOR the Raw Data

Returning to FIG. 37, the next step in decoding is to unscramble and XOR the raw data. The 2 MB byte image, as taken from the Artcard, is in a scrambled XORed form. It must be unscrambled and re-XORed to retrieve the bit image necessary for the Reed Solomon decoder in phase 4.

Figure 46:
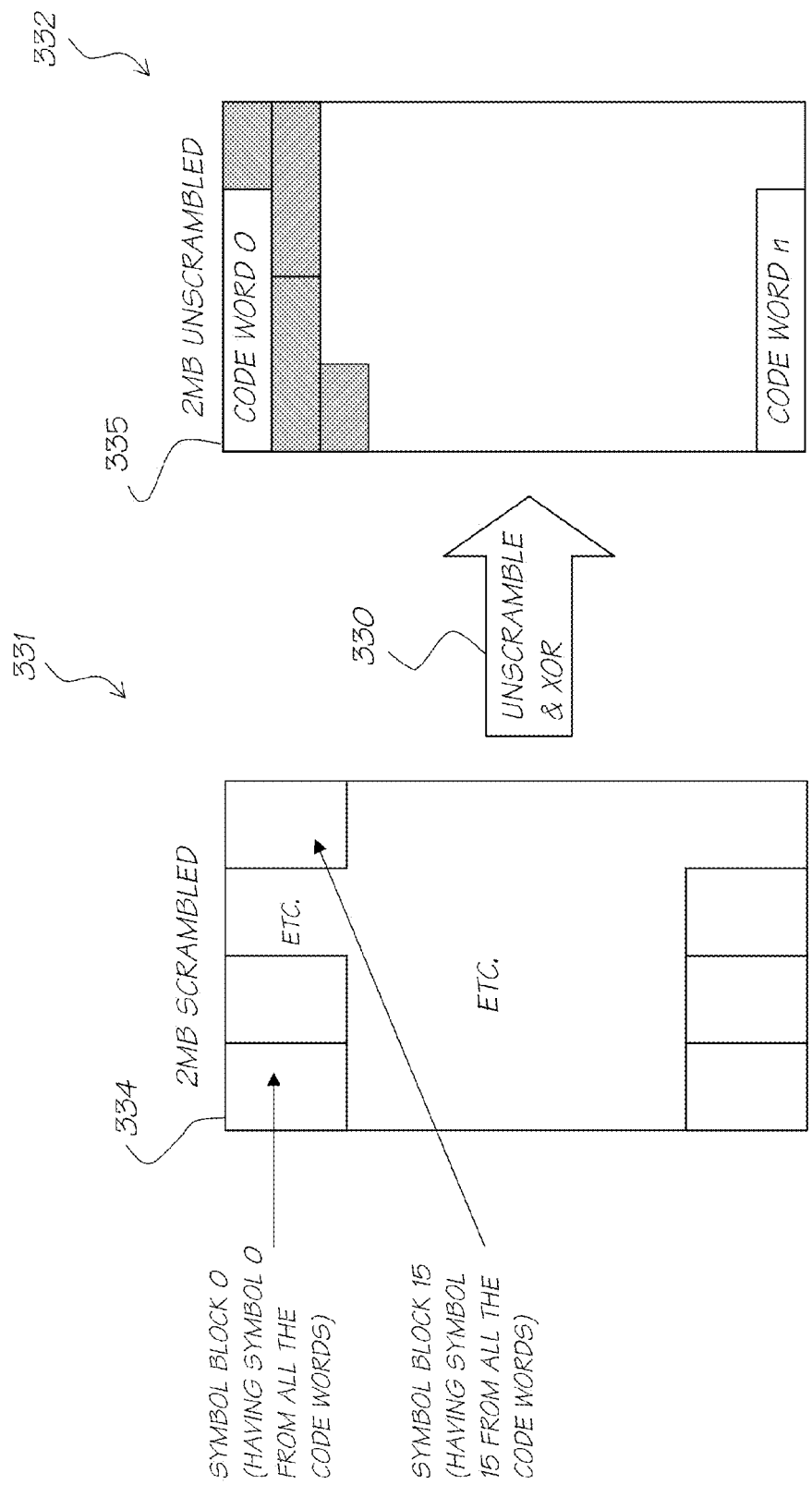
FIG. 46 illustrates the process of unscrambling Artcard data.
Figure 47:
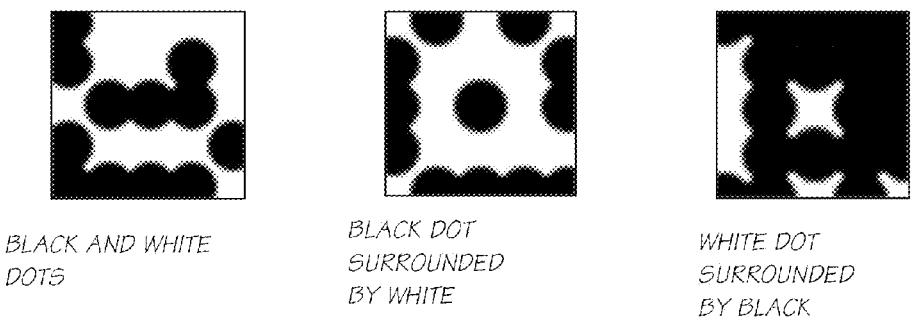
FIG. 47 illustrates a magnified view of a series of dots.
Figure 48:
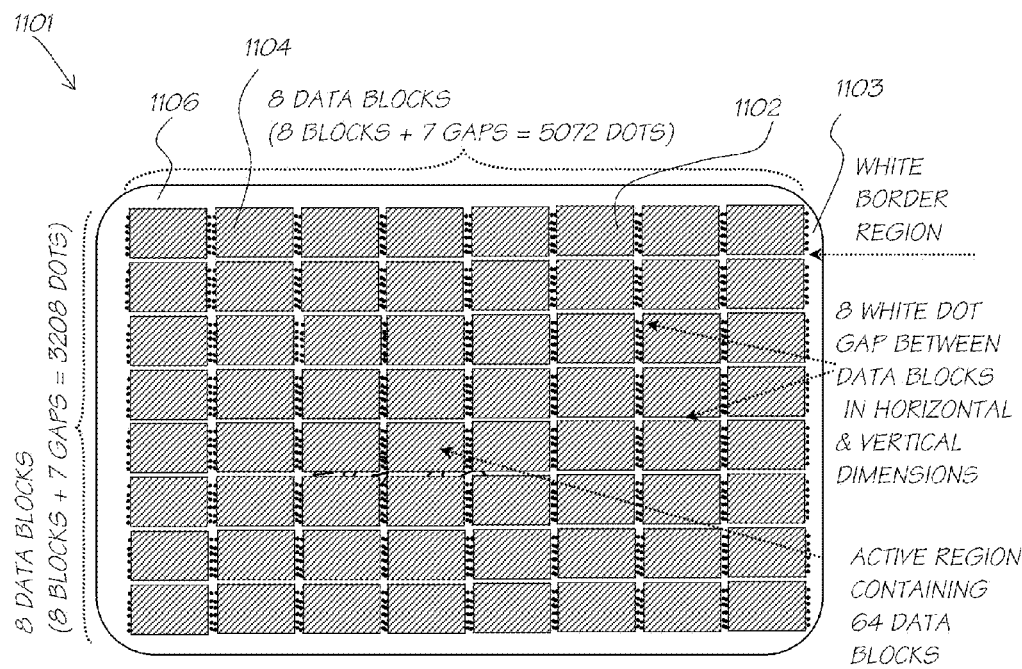
FIG. 48 illustrates the data surface of a dot card.
Figure 53:
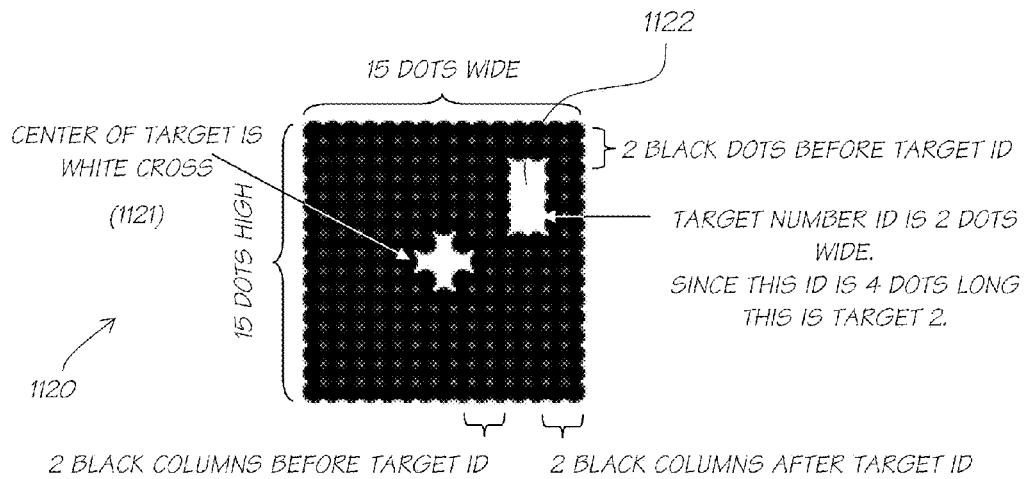
FIG. 53 illustrates a single target structure.
Figure 54:
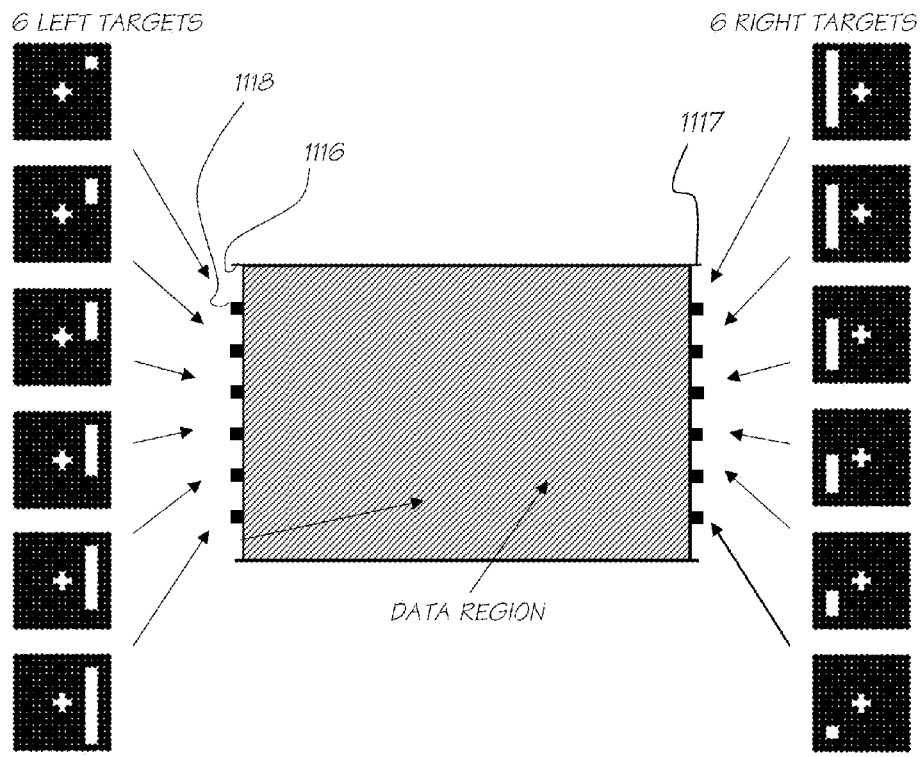
FIG. 54 illustrates the target structure of a datablock.
Figure 55:
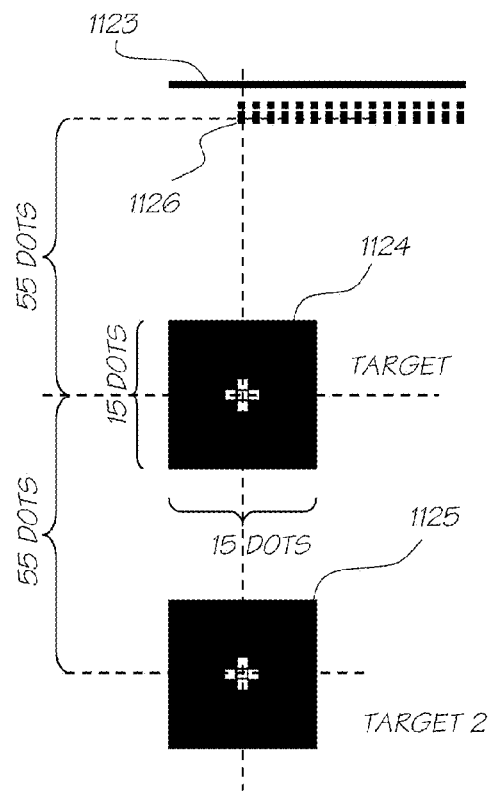
FIG. 55 illustrates the positional relationship of targets relative to border clocking regions of a data region.
Figure 56:
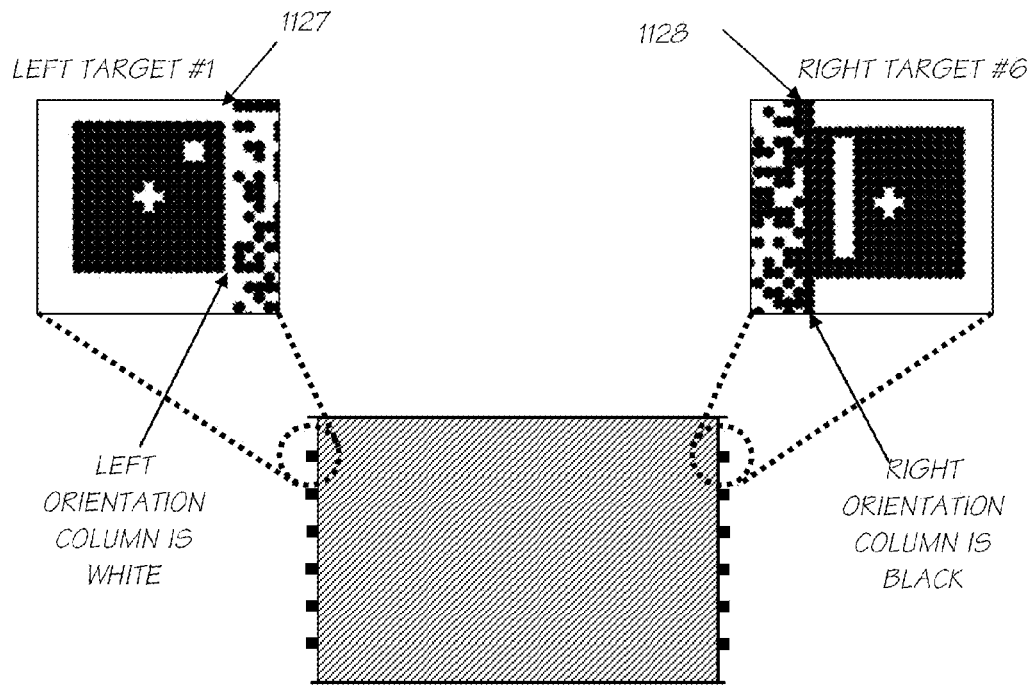
FIG. 56 illustrates the orientation columns of a datablock.
Figure 60:
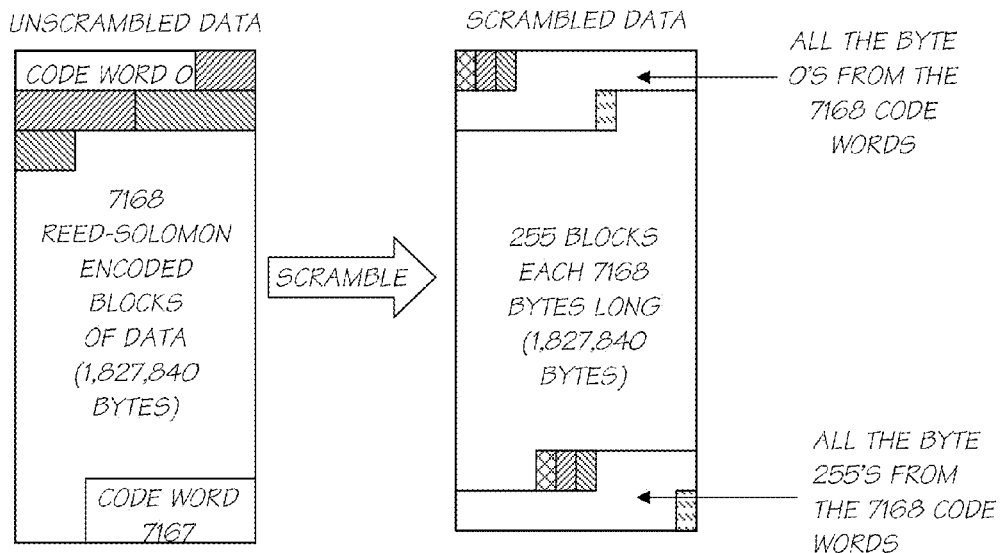
FIG. 60 illustrates the Reed-Solomon encoding process.
Figure 61:
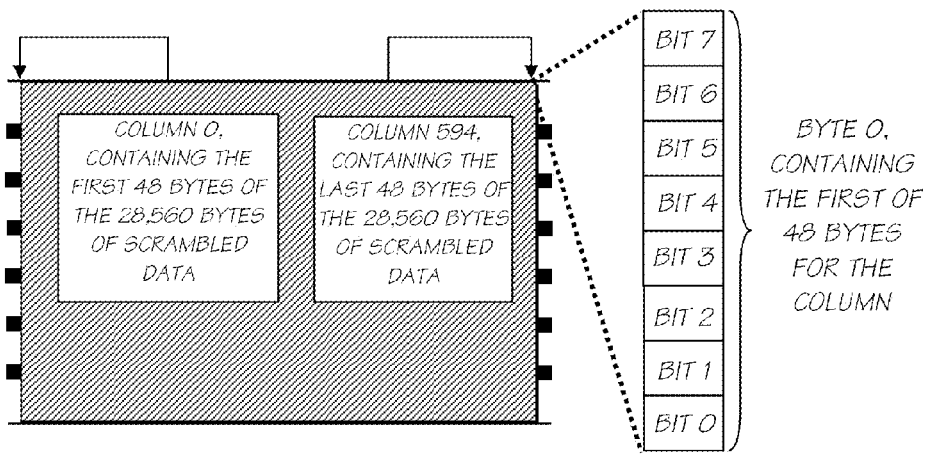
FIG. 61 illustrates the layout of encoded data within a datablock.
Figure 62:
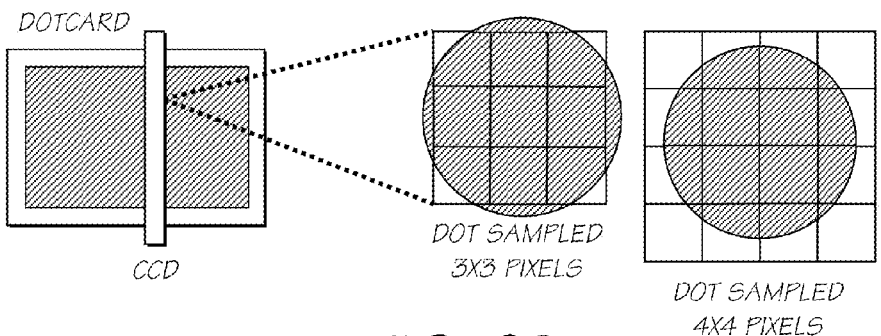
FIG. 62 illustrates the sampling process in sampling an alternative Artcard.
Figure 63:
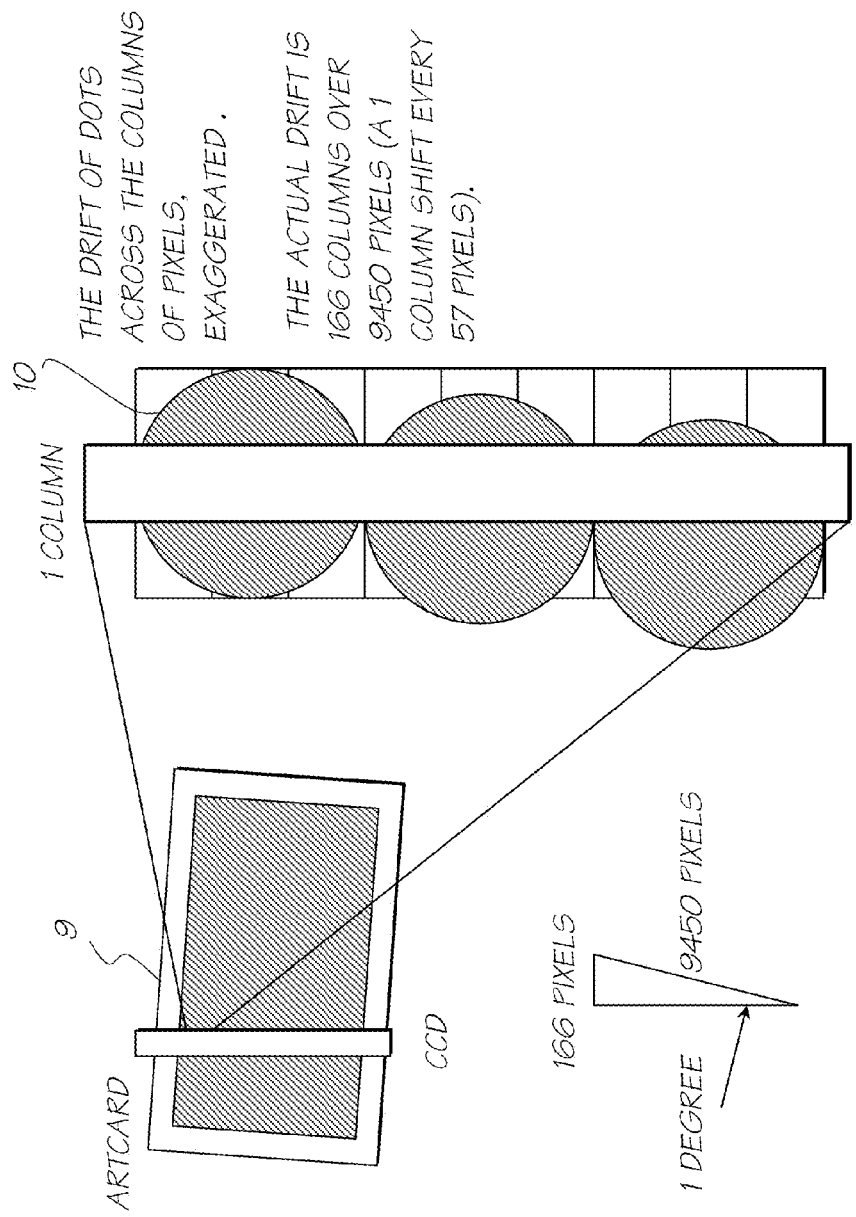
FIG. 63 illustrates, in exaggerated form, an example of sampling a rotated alternative Artcard.
Figure 64:
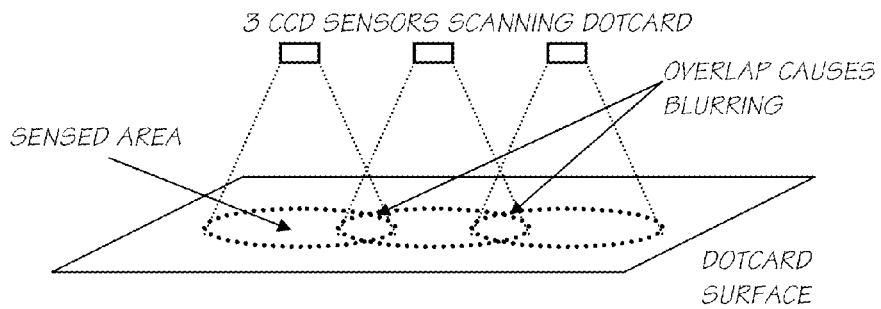
FIG. 64 illustrates the scanning process.
Figure 65:
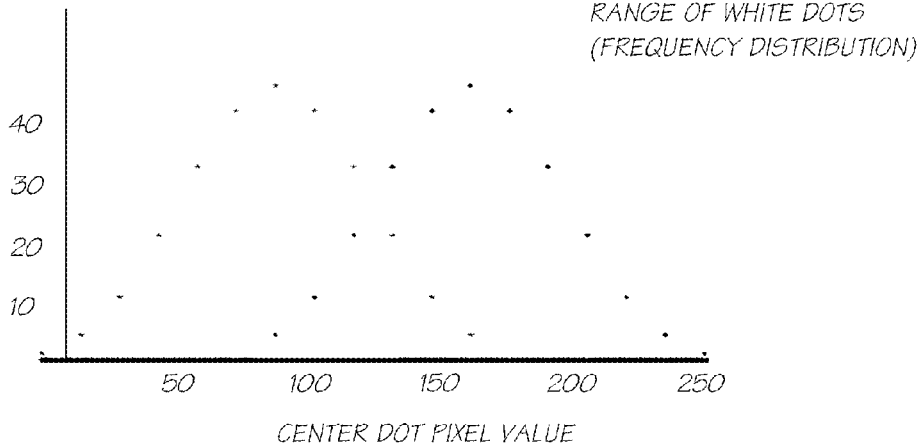
FIG. 65 illustrates the likely scanning distribution of the scanning process.
Figure 66:
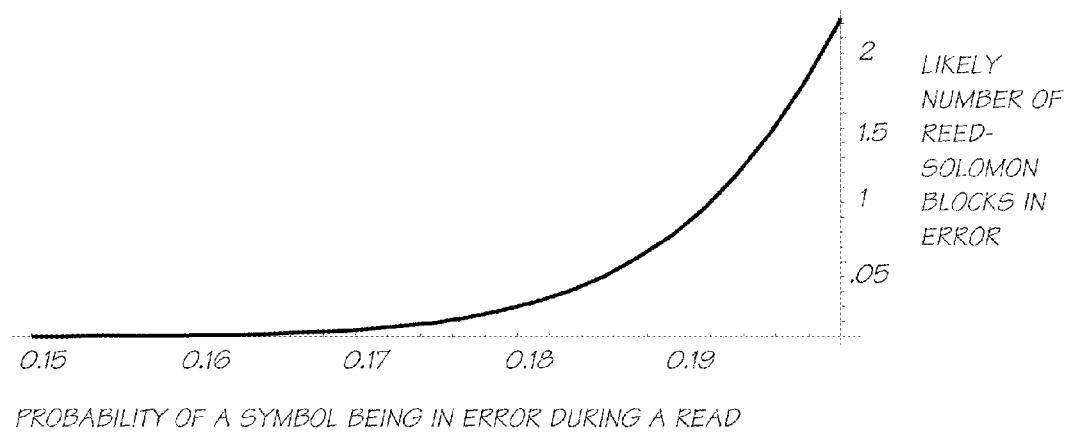
FIG. 66 illustrates the relationship between probability of symbol errors and Reed-Solomon block errors.
Figure 67:
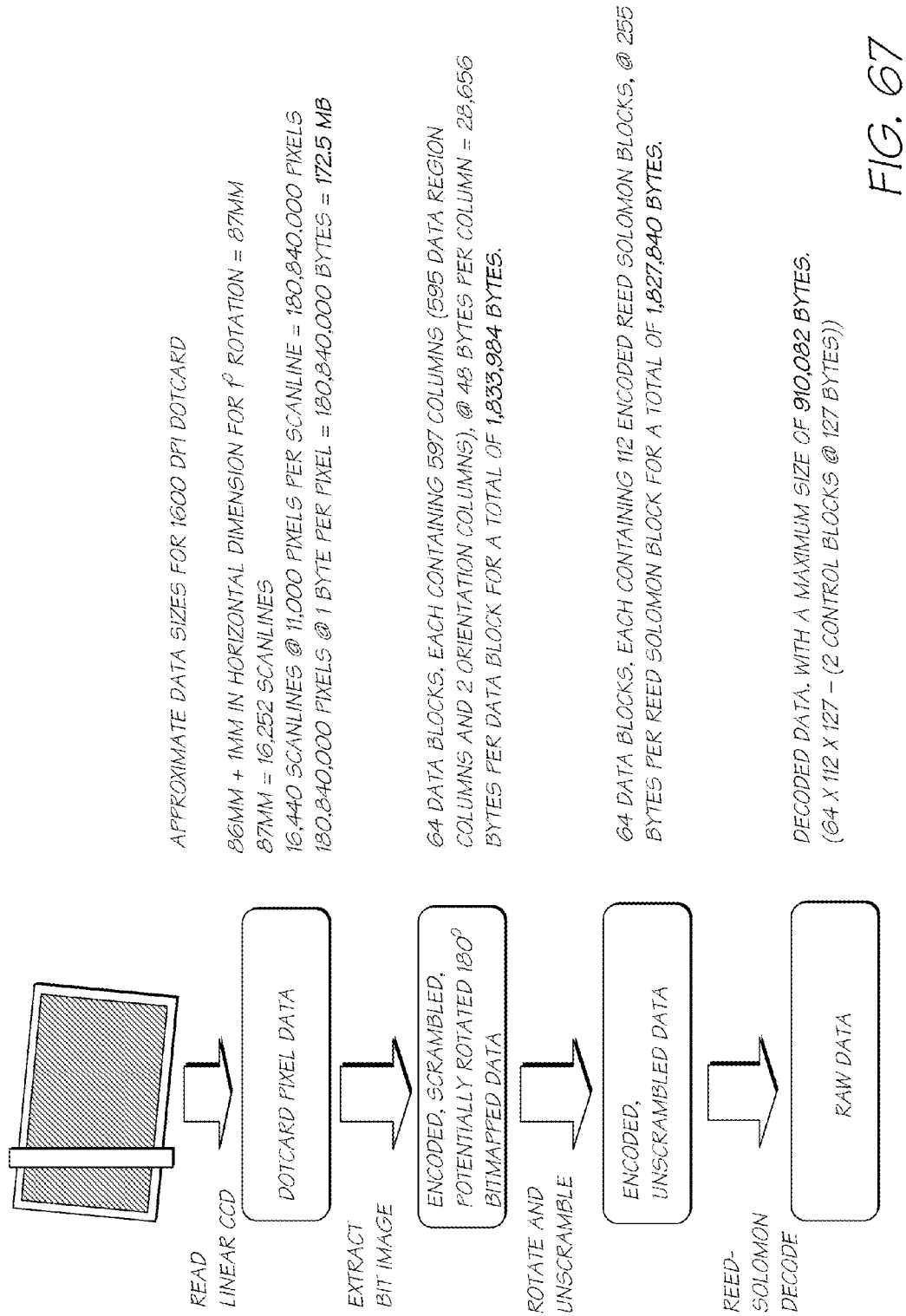
FIG. 67 illustrates a flow chart of the decoding process.
Figure 68:
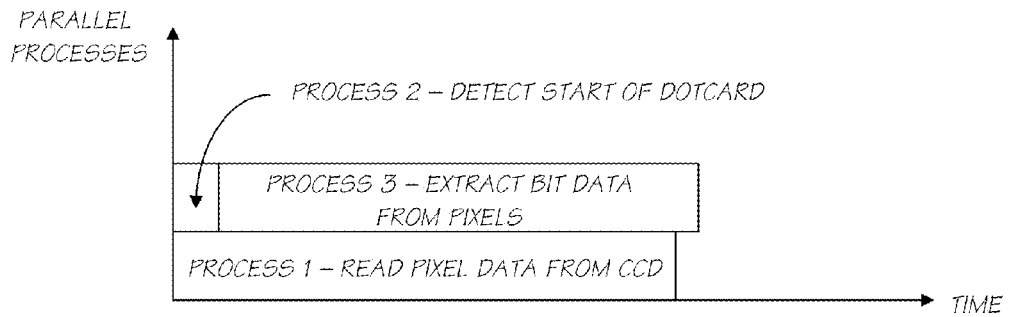
FIG. 68 illustrates a process utilization diagram of the decoding process.
Figure 69:
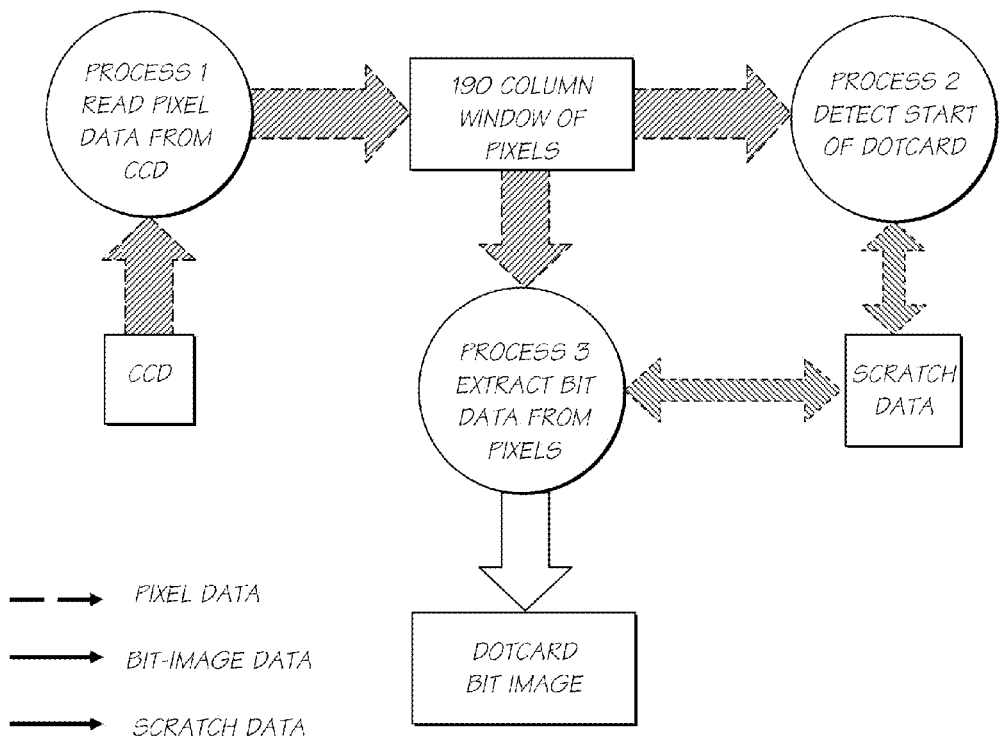
FIG. 69 illustrates the dataflow steps in decoding.
Figure 70:
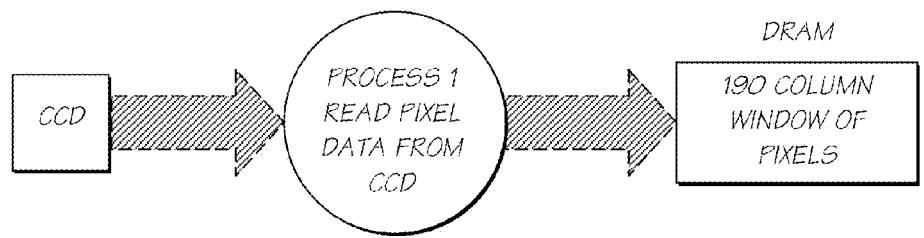
FIG. 70 illustrates the reading process in more detail.
Figure 71:
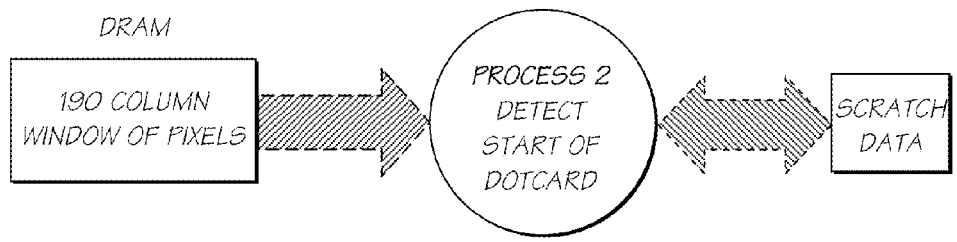
FIG. 71 illustrates the process of detection of the start of an alternative Artcard in more detail.
Figure 72:
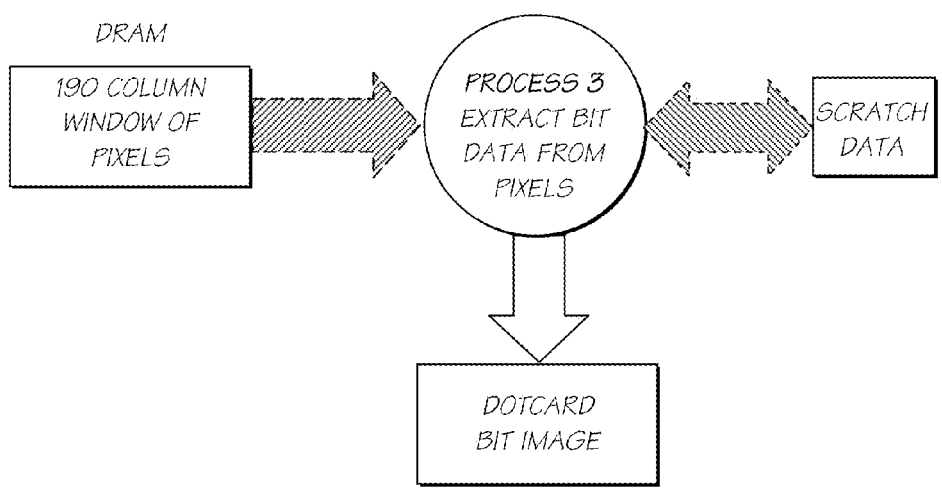
FIG. 72 illustrates the extraction of bit data process in more detail.
Figure 73:
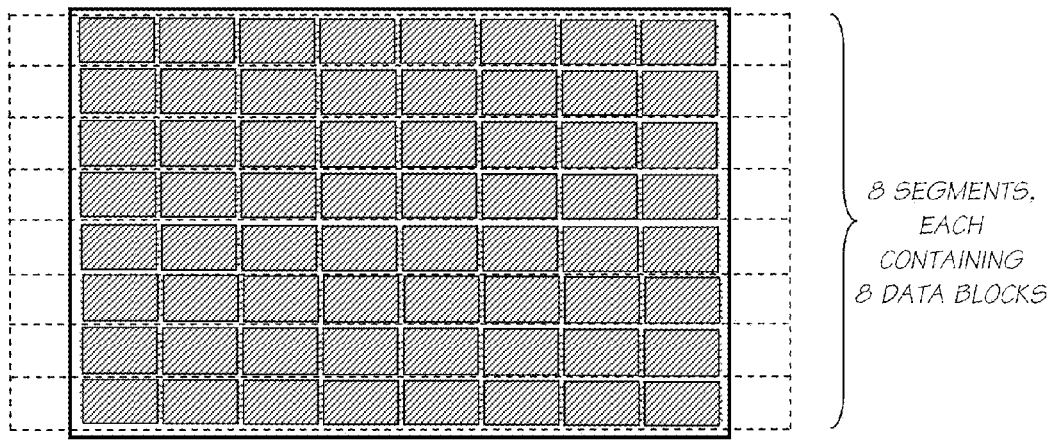
FIG. 73 illustrates the segmentation process utilized in the decoding process.
Figure 74:
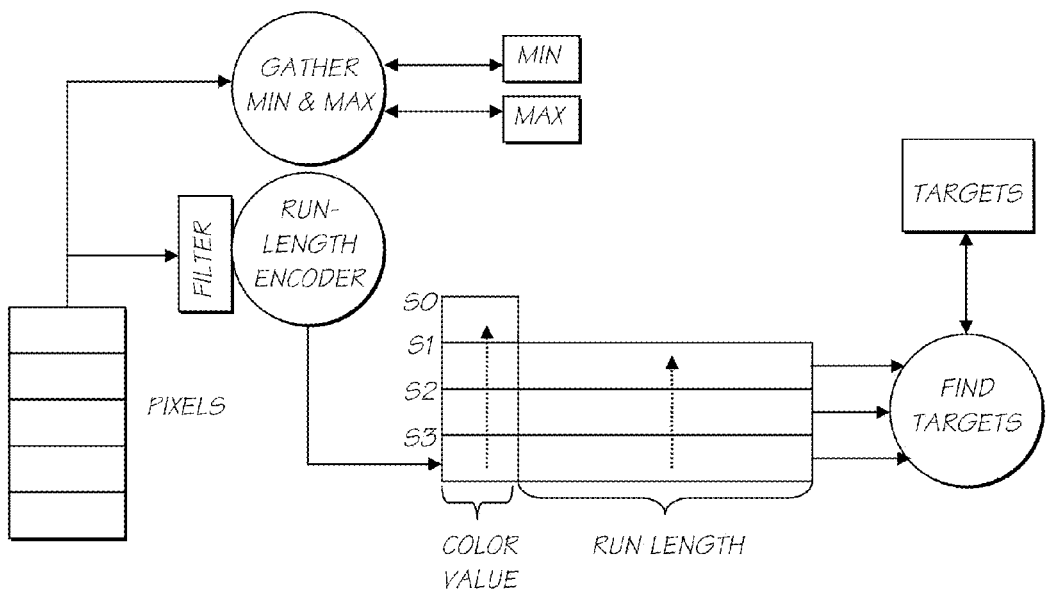
FIG. 74 illustrates the decoding process of finding targets in more detail.
Figure 75:
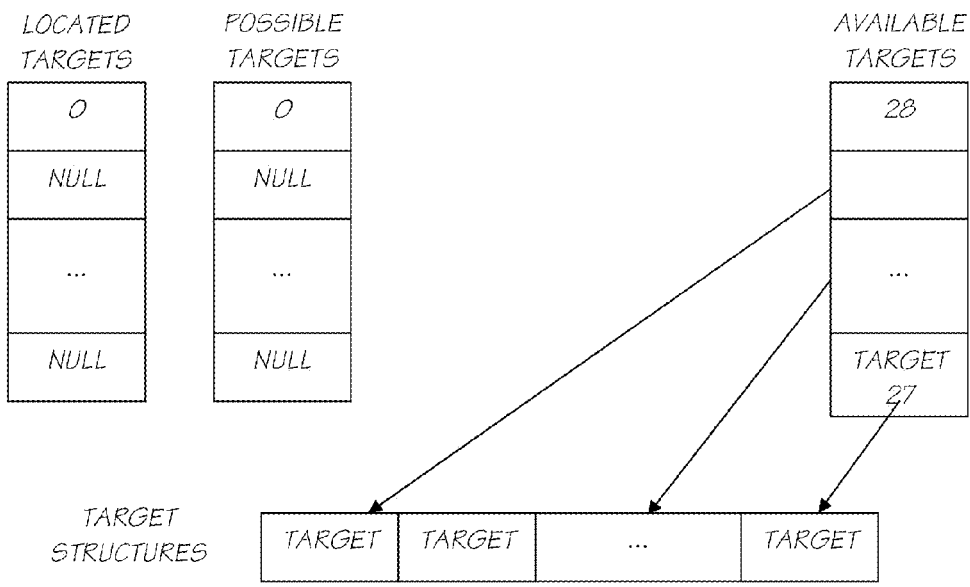
FIG. 75 illustrates the data structures utilized in locating targets.
Figure 76:
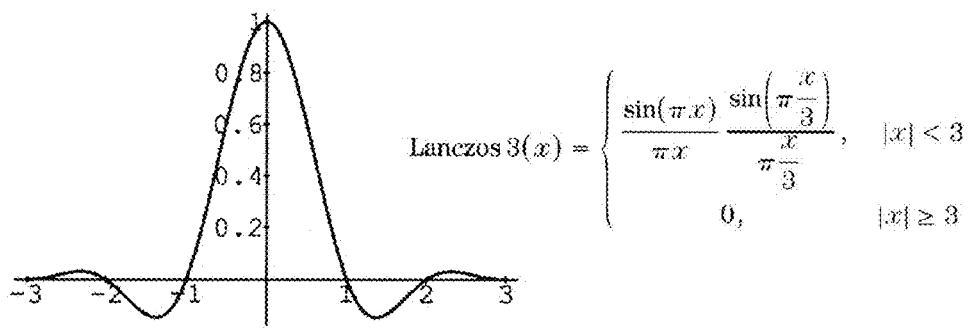
FIG. 76 illustrates the Lancos 3 function structure.
Figure 77:
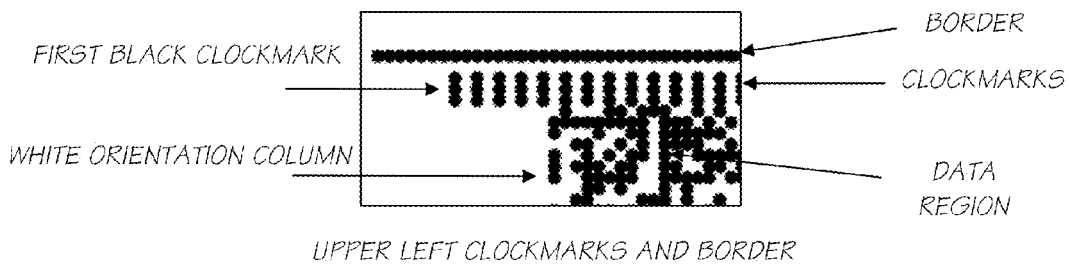
FIG. 77 illustrates an enlarged portion of a datablock illustrating the clockmark and border region.
Figure 78:
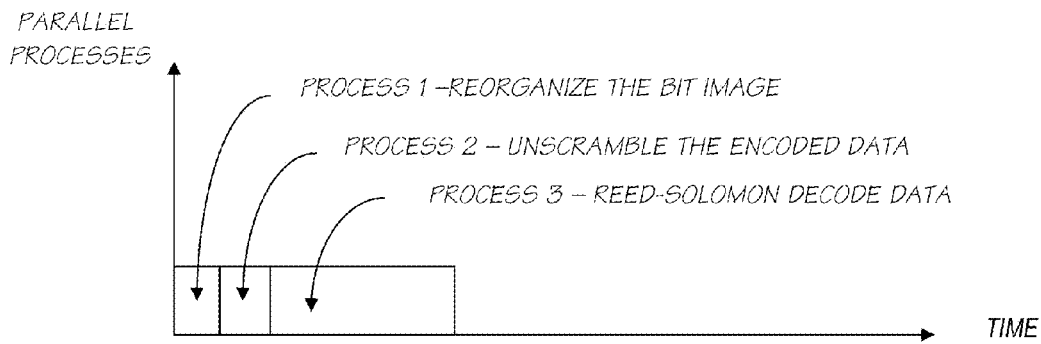
FIG. 78 illustrates the processing steps in decoding a bit image.
Figure 79:
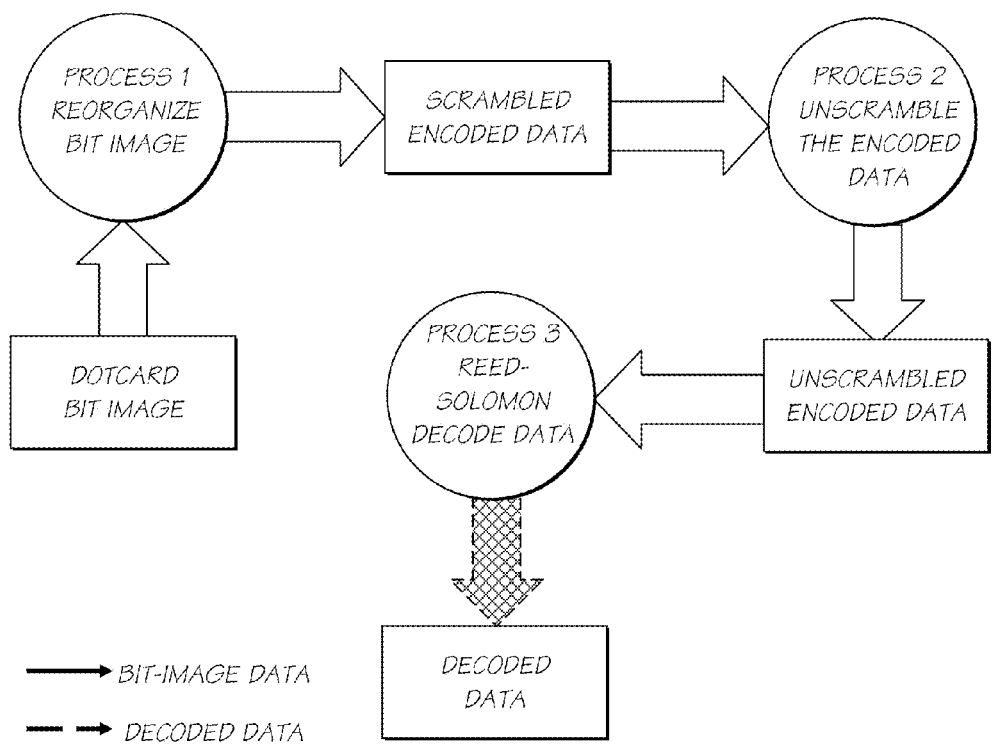
FIG. 79 illustrates the dataflow steps in decoding a bit image.
Figure 80:
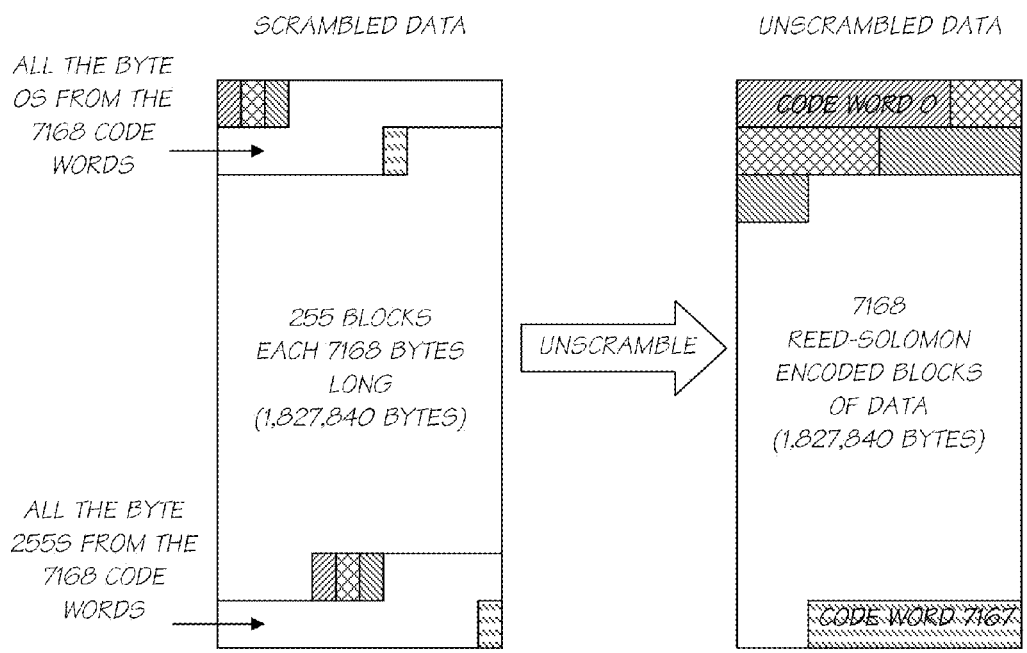
FIG. 80 illustrates the descrambling process of the preferred embodiment.

Turning to FIG. 46, the unscrambling process 330 takes a 2 MB scrambled byte image 331 and writes an unscrambled 2 MB image 332. The process cannot reasonably be performed in-place, so 2 sets of 2 MB areas are utilised. The scrambled data 331 is in symbol block order arranged in a 16×16 array, with symbol block 0 (334) having all the symbol 0's from all the code words in random order. Symbol block 1 has all the symbol 1's from all the code words in random order etc. Since there are only 255 symbols, the 256$^{th}$ symbol block is currently unused.

A linear feedback shift register is used to determine the relationship between the position within a symbol block eg. 334 and what code word eg. 355 it came from. This works as long as the same seed is used when generating the original Artcard images. The XOR of bytes from alternative source lines with 0xAA and 0x55 respectively is effectively free (in time) since the bottleneck of time is waiting for the DRAM to be ready to read/write to non-sequential addresses.

The timing of the unscrambling XOR process is effectively 2 MB of random byte-reads, and 2 MB of random byte-writes i.e. 2*(2 MB*76 ns+2 MB*2 ns)=327,155,712 ns or approximately 0.33 seconds. This timing assumes no caching.

Phase 4—Reed Solomon Decode

This phase is a loop, iterating through copies of the data in the bit image, passing them to the Reed-Solomon decode module until either a successful decode is made or until there are no more copies to attempt decode from.

The Reed-Solomon decoder used can be the VLIW processor, suitably programmed or, alternatively, a separate hard-wired core such as LSI Logic's L64712. The L64712 has a throughput of 50 Mbits per second (around 6.25 MB per second), so the time may be bound by the speed of the Reed-Solomon decoder rather than the 2 MB read and 1 MB write memory access time (500 MB/sec for sequential accesses). The time taken in the worst case is thus 2/6.25 s=approximately 0.32 seconds. Of course, other artcard formats are possible.

Phase 5 Running the Vark Script

The overall time taken to read the Artcard 9 and decode it is therefore approximately 2.15 seconds. The apparent delay to the user is actually only 0.65 seconds (the total of Phases 3 and 4), since the Artcard stops moving after 1.5 seconds.

Once the Artcard is loaded, the Artvark script must be interpreted, Rather than run the script immediately, the script is only run upon the pressing of the 'Print' button 13 (FIG. 1). The taken to run the script will vary depending on the complexity of the script, and must be taken into account for the perceived delay between pressing the print button and the actual print button and the actual printing.

As noted previously, the VLIW processor 74 is a digital processing system that accelerates computationally expensive Vark functions. The balance of functions performed in software by the CPU core 72, and in hardware by the VLIW processor 74 will be implementation dependent. The goal of the VLIW processor 74 is to assist all Artcard styles to execute in a time that does not seem too slow to the user. As CPUs become faster and more powerful, the number of functions requiring hardware acceleration becomes less and less. The VLIW processor has a microcoded ALU sub-system that allows general hardware speed up of the following time-critical functions.

1) Image access mechanisms for general software processing
2) Image convolver.
3) Data driven image warper
4) Image scaling
5) Image tessellation
6) Affine transform
7) Image compositor
8) Color space transform
9) Histogram collector
10) Illumination of the Image
11) Brush stamper
12) Histogram collector
13) CCD image to internal image conversion
14) Construction of image pyramids (used by warper & for brushing)

The following table summarizes the time taken for each Vark operation if implemented in the ALU model. The method of implementing the function using the ALU model is described hereinafter.

| | | 1500 * 1000 image | |
| --- | --- | --- | --- |
| Operation | Speed of Operation | 1 channel | 3 channels |
| Image composite | 1 cycle per output pixel | 0.015 s | 0.045 s |
| Image convolve | k/3 cycles per output pixel (k = kernel size) | | |
| | 3 × 3 convolve | 0.045 s | 0.135 s |
| | 5 × 5 convolve | 0.125 s | 0.375 s |
| | 7 × 7 convolve | 0.245 s | 0.735 s |
| Image warp | 8 cycles per pixel | 0.120 s | 0.360 s |
| Histogram collect | 2 cycles per pixel | 0.030 s | 0.090 s |
| Image Tessellate | ⅓ cycle per pixel | 0.005 s | 0.015 s |
| Image sub-pixel Translate | 1 cycle per output pixel | — | — |
| Color lookup replace | ½ cycle per pixel | 0.008 s | 0.023 |
| Color space transform | 8 cycles per pixel | 0.120 s | 0.360 s |
| Convert CCD image to internal image (including color convert & scale) | 4 cycles per output pixel | 0.06 s | 0.18 s |
| Construct image pyramid | 1 cycle per input pixel | 0.015 s | 0.045 s |
| Scale | Maximum of: 2 cycles per input pixel 2 cycles per output pixel 2 cycles per output pixel (scaled in X only) | 0.015 s (minimum) | 0.045 s (minimum) |
| Affine transform | 2 cycles per output pixel | 0.03 s | 0.09 s |
| Brush rotate/translate and composite | ? | | |
| Tile Image | 4-8 cycles per output pixel | 0.015 s to 0.030 s | 0.060 s to 0.120 s to for 4 channels (Lab, texture) |
| Illuminate image Ambient only | Cycles per pixel ½ | 0.008 s | 0.023 s |
| Directional light | 1 | 0.015 s | 0.045 s |
| Directional (bm) | 6 | 0.09 s | 0.27 s |
| Omni light | 6 | 0.09 s | 0.27 s |
| Omni (bm) | 9 | 0.137 s | 0.41 s |
| Spotlight | 9 | 0.137 s | 0.41 s |
| Spotlight (bm) | 12 | 0.18 s | 0.54 s |
| (bm) = bumpmap | | | |

For example, to convert a CCD image, collect histogram & perform lookup-color replacement (for image enhancement) takes: 9+2+0.5 cycles per pixel, or 11.5 cycles. For a 1500× 1000 image that is 172,500,000, or approximately 0.2 seconds per component, or 0.6 seconds for all 3 components. Add a simple warp, and the total comes to 0.6+0.36, almost 1 second.

Image Convolver

A convolve is a weighted average around a center pixel. The average may be a simple sum, a sum of absolute values, the absolute value of a sum, or sums truncated at 0.

The image convolver is a general-purpose convolver, allowing a variety of functions to be implemented by varying the values within a variable-sized coefficient kernel. The kernel sizes supported are 3×3, 5×5 and 7×7 only.

Figure 82:
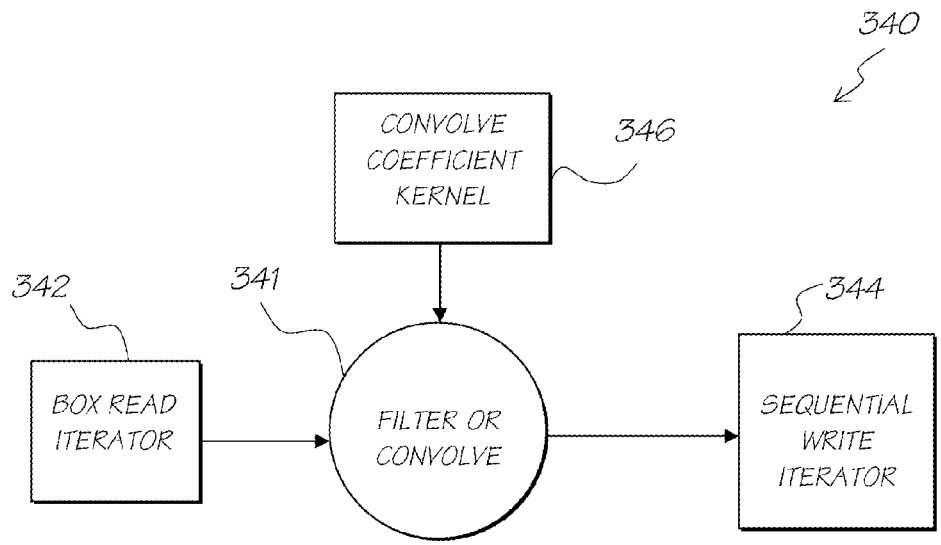
FIG. 82 illustrates a convolution process.

Turning now to FIG. 82, there is illustrated 340 an example of the convolution process. The pixel component values fed into the convolver process 341 come from a Box Read Iterator 342. The Iterator 342 provides the image data row by row, and within each row, pixel by pixel. The output from the convolver 341 is sent to a Sequential Write Iterator 344, which stores the resultant image in a valid image format.

A Coefficient Kernel 346 is a lookup table in DRAM. The kernel is arranged with coefficients in the same order as the Box Read Iterator 342. Each coefficient entry is 8 bits. A simple Sequential Read Iterator can be used to index into the kernel 346 and thus provide the coefficients. It simulates an image with ImageWidth equal to the kernel size, and a Loop option is set so that the kernel would continuously be provided.

Figure 81:
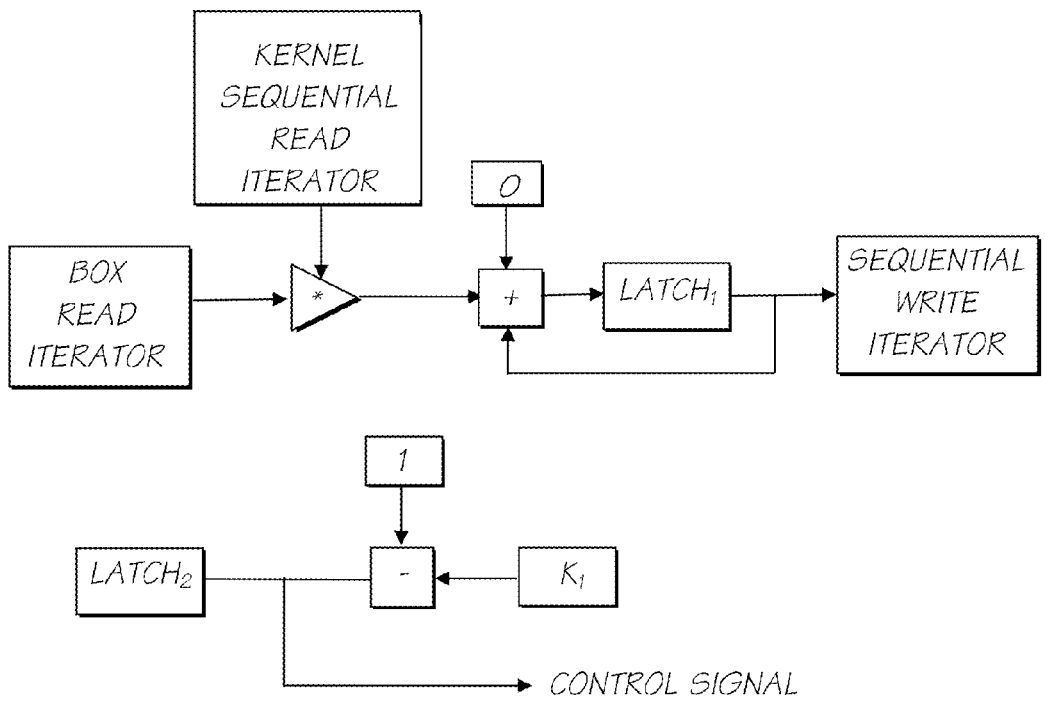
FIG. 81 illustrates one form of implementation of the convolver.

One form of implementation of the convolve process on an ALU unit is as illustrated in FIG. 81. The following constants are set by software:

| Constant | Value |
|---|---|
| $K_1$ | Kernel size (9, 25, or 49) |

The control logic is used to count down the number of multiply/adds per pixel. When the count (accumulated in $Latch_2$) reaches 0, the control signal generated is used to write out the current convolve value (from $Latch_1$) and to reset the count. In this way, one control logic block can be used for a number of parallel convolve streams.

Each cycle the multiply ALU can perform one multiply/add to incorporate the appropriate part of a pixel. The number of cycles taken to sum up all the values is therefore the number of entries in the kernel. Since this is compute bound, it is appropriate to divide the image into multiple sections and process them in parallel on different ALU units.

On a 7×7 kernel, the time taken for each pixel is 49 cycles, or 490 ns. Since each cache line holds 32 pixels, the time available for memory access is 12,740 ns. ((32−7+1)×490 ns). The time taken to read 7 cache lines and write 1 is worse case 1,120 ns (8*140 ns, all accesses to same DRAM bank). Consequently it is possible to process up to 10 pixels in parallel given unlimited resources. Given a limited number of ALUs it is possible to do at best 4 in parallel. The time taken to therefore perform the convolution using a 7×7 kernel is 0.18375 seconds (1500*1000*490 ns/4=183,750,000 ns).

On a 5×5 kernel, the time taken for each pixel is 25 cycles, or 250 ns. Since each cache line holds 32 pixels, the time available for memory access is 7,000 ns. ((32−5+1)×250 ns). The time taken to read 5 cache lines and write 1 is worse case 840 ns (6*140 ns, all accesses to same DRAM bank). Consequently it is possible to process up to 7 pixels in parallel given unlimited resources. Given a limited number of ALUs it is possible to do at best 4. The time taken to therefore perform the convolution using a 5×5 kernel is 0.09375 seconds (1500*1000*250 ns/4=93,750,000 ns).

On a 3×3 kernel, the time taken for each pixel is 9 cycles, or 90 ns. Since each cache line holds 32 pixels, the time available for memory access is 2,700 ns. ((32−3+1)×90 ns). The time taken to read 3 cache lines and write 1 is worse case 560 ns (4*140 ns, all accesses to same DRAM bank). Consequently it is possible to process up to 4 pixels in parallel given unlimited resources. Given a limited number of ALUs and Read/Write Iterators it is possible to do at best 4. The time taken to therefore perform the convolution using a 3×3 kernel is 0.03375 seconds (1500*1000*90 ns/4=33,750,000 ns).

Consequently each output pixel takes kernelsize/3 cycles to compute. The actual timings are summarised in the following table:

| Kernel size | Time taken to calculate output pixel | Time to process 1 channel at 1500 × 1000 | Time to Process 3 channels at 1500 × 1000 |
|---|---|---|---|
| 3 × 3 (9) | 3 cycles | 0.045 seconds | 0.135 seconds |
| 5 × 5 (25) | 8 ⅓ cycles | 0.125 seconds | 0.375 seconds |
| 7 × 7 (49) | 16 ⅓ cycles | 0.245 seconds | 0.735 seconds |

Image Compositor

Compositing is to add a foreground image to a background image using a matte or a channel to govern the appropriate proportions of background and foreground in the final image. Two styles of compositing are preferably supported, regular compositing and associated compositing. The rules for the two styles are:

Regular composite: new Value=Foreground+(Background−Foreground)a

Associated composite: new value=Foreground+(1−a) Background

Figure 83:
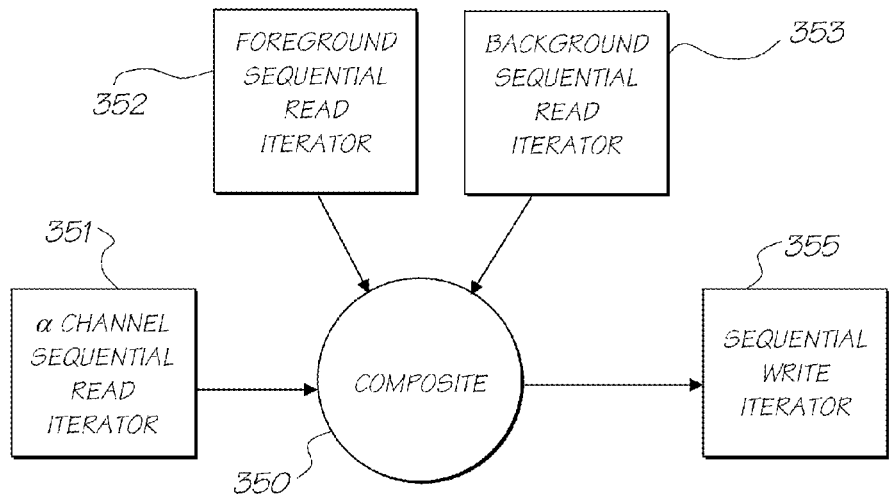
FIG. 83 illustrates the compositing process.

The difference then, is that with associated compositing, the foreground has been pre-multiplied with the matte, while in regular compositing it has not. An example of the compositing process is as illustrated in FIG. 83.

The alpha channel has values from 0 to 255 corresponding to the range 0 to 1.

Regular Composite

A regular composite is implemented as:

Foreground+(Background−Foreground)*α/255

Figure 84:
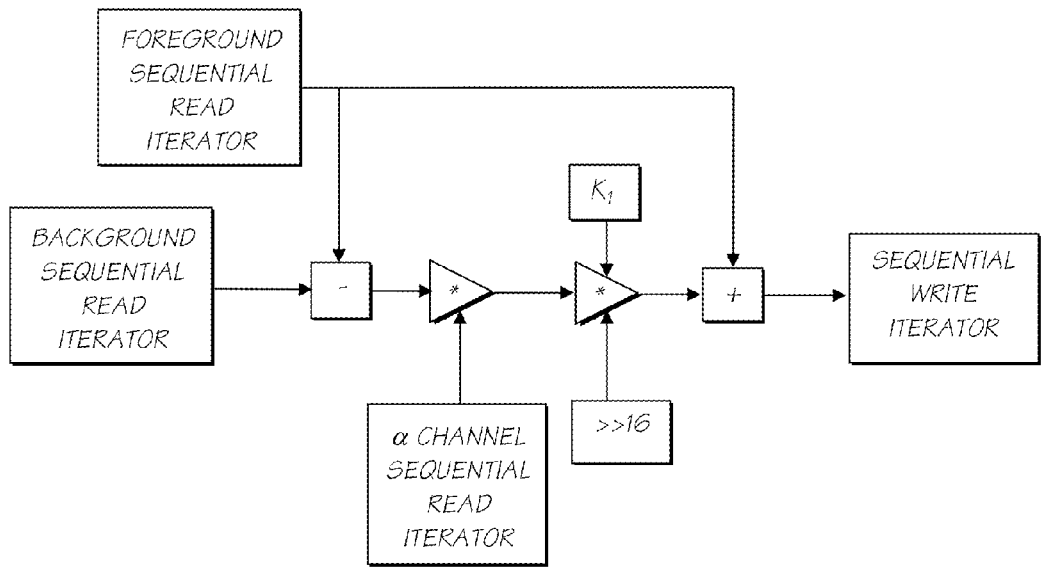
FIG. 84 illustrates the regular compositing process in more detail.

The division by X/255 is approximated by 257X/65536. An implementation of the compositing process is shown in more detail in FIG. 84, where the following constant is set by software:

| Constant | Value |
|---|---|
| $K_1$ | 257 |

Since 4 Iterators are required, the composite process takes 1 cycle per pixel, with a utilization of only half of the ALUs. The composite process is only run on a single channel. To composite a 3-channel image with another, the compositor must be run 3 times, once for each channel.

The time taken to composite a full size single channel is 0.015 s (1500*1000*1*10 ns), or 0.045 s to composite all 3 channels.

To approximate a divide by 255 it is possible to multiply by 257 and then divide by 65536. It can also be achieved by a single add (256*x+x) and ignoring (except for rounding purposes) the final 16 bits of the result.

As shown in FIG. 42, the compositor process requires 3 Sequential Read Iterators 351-353 and 1 Sequential Write Iterator 355, and is implemented as microcode using a Adder ALU in conjunction with a multiplier ALU. Composite time is 1 cycle (10 ns) per-pixel. Different microcode is required for associated and regular compositing, although the average time per pixel composite is the same.

The composite process is only run on a single channel. To composite one 3-channel image with another, the compositor must be run 3 times, once for each channel. As the a channel is the same for each composite, it must be read each time. However it should be noted that to transfer (read or write) 4×32 byte cache-lines in the best case takes 320 ns. The pipeline gives an average of 1 cycle per pixel composite, taking 32 cycles or 320 ns (at 100 MHz) to composite the 32 pixels, so the a channel is effectively read for free. An entire channel can therefore be composited in:

1500/32*1000*320 ns=15,040,000 ns=0.015 seconds.

The time taken to composite a full size 3 channel image is therefore 0.045 seconds.

Construct Image Pyramid

Several functions, such as warping, tiling and brushing, require the average value of a given area of pixels. Rather than calculate the value for each area given, these functions preferably make use of an image pyramid. As illustrated previously in FIG. 33, an image pyramid 360 is effectively a multi-resolution pixelmap. The original image is a 1:1 representation. Sub-sampling by 2:1 in each dimension produces an image ¼ the original size. This process continues until the entire image is represented by a single pixel.

An image pyramid is constructed from an original image, and consumes ⅓ of the size taken up by the original image (¼+ 1/16+ 1/64+ . . . ). For an original image of 1500×1000 the corresponding image pyramid is approximately ½ MB The image pyramid can be constructed via a 3×3 convolve performed on 1 in 4 input image pixels advancing the center of the convolve kernel by 2 pixels each dimension. A 3×3 convolve results in higher accuracy than simply averaging 4 pixels, and has the added advantage that coordinates on different pyramid levels differ only by shifting 1 bit per level.

The construction of an entire pyramid relies on a software loop that calls the pyramid level construction function once for each level of the pyramid.

The timing to produce 1 level of the pyramid is 9/4*¼ of the resolution of the input image since we are generating an image ¼ of the size of the original. Thus for a 1500×1000 image:

Timing to produce level 1 of pyramid=9/4*750*500=843,750 cycles

Timing to produce level 2 of pyramid=9/4*375*250=210,938 cycles

Timing to produce level 3 of pyramid=9/4*188*125=52,735 cycles

Etc.

The total time is ¾ cycle per original image pixel (image pyramid is ⅓ of original image size, and each pixel takes 9/4 cycles to be calculated, i.e. ⅓*9/4=¾). In the case of a 1500× 1000 image is 1,125,000 cycles (at 100 MHz), or 0.011 seconds. This timing is for a single color channel, 3 color channels require 0.034 seconds processing time.

General Data Driven Image Warper

The ACP 31 is able to carry out image warping manipulations of the input image. The principles of image warping are well-known in theory. One thorough text book reference on the process of warping is "Digital Image Warping" by George Wolberg published in 1990 by the IEEE Computer Society Press, Los Alamitos, Calif. The warping process utilizes a warp map which forms part of the data fed in via Artcard 9. The warp map can be arbitrarily dimensioned in accordance with requirements and provides information of a mapping of input pixels to output pixels. Unfortunately, the utilization of arbitrarily sized warp maps presents a number of problems which must be solved by the image warper.

Figure 85:
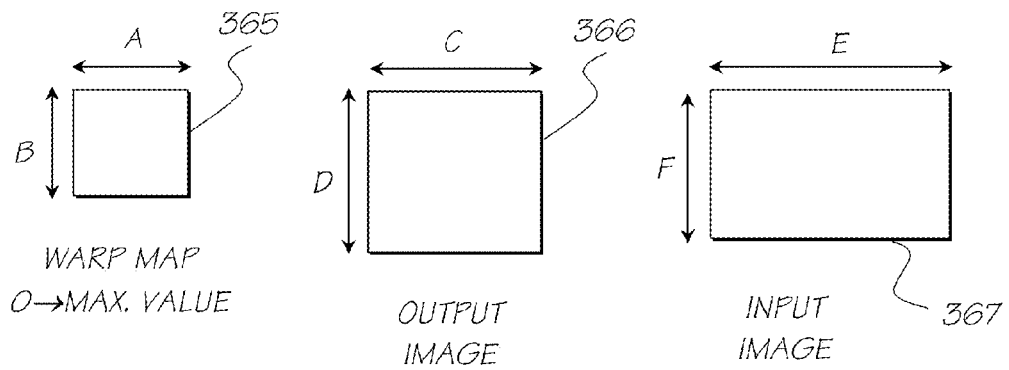
FIG. 85 illustrates the process of warping using a warp map.

Turning to FIG. 85, a warp map 365, having dimensions A×B comprises array values of a certain magnitude (for example 8 bit values from 0-255) which set out the coordinate of a theoretical input image which maps to the corresponding "theoretical" output image having the same array coordinate indices. Unfortunately, any output image eg. 366 will have its own dimensions C×D which may further be totally different from an input image which may have its own dimensions E×F. Hence, it is necessary to facilitate the remapping of the warp map 365 so that it can be utilised for output image 366 to determine, for each output pixel, the corresponding area or region of the input image 367 from which the output pixel color data is to be constructed. For each output pixel in output image 366 it is necessary to first determine a corresponding warp map value from warp map 365. This may include the need to bilinearly interpolate the surrounding warp map values when an output image pixel maps to a fractional position within warp map table 365. The result of this process will give the location of an input image pixel in a "theoretical" image which will be dimensioned by the size of each data value within the warp map 365. These values must be re-scaled so as to map the theoretical image to the corresponding actual input image 367.

In order to determine the actual value and output image pixel should take so as to avoid aliasing effects, adjacent output image pixels should be examined to determine a region of input image pixels 367 which will contribute to the final output image pixel value. In this respect, the image pyramid is utilised as will become more apparent hereinafter.

The image warper performs several tasks in order to warp an image.

Scale the warp map to match the output image size.

Determine the span of the region of input image pixels represented in each output pixel.

Calculate the final output pixel value via tri-linear interpolation from the input image pyramid Scale Warp Map As noted previously, in a data driven warp, there is the need for a warp map that describes, for each output pixel, the center of a corresponding input image map. Instead of having a single warp map as previously described, containing interleaved x and y value information, it is possible to treat the X and Y coordinates as separate channels.

Consequently, preferably there are two warp maps: an X warp map showing the warping of X coordinates, and a Y warp map, showing the warping of the Y coordinates. As noted previously, the warp map 365 can have a different spatial resolution than the image they being scaled (for example a 32×32 warp-map 365 may adequately describe a warp for a 1500×1000 image 366). In addition, the warp maps can be represented by 8 or 16 bit values that correspond to the size of the image being warped.

There are several steps involved in producing points in the input image space from a given warp map:

1. Determining the corresponding position in the warp map for the output pixel

2. Fetch the values from the warp map for the next step (this can require scaling in the resolution domain if the warp map is only 8 bit values)

3. Bi-linear interpolation of the warp map to determine the actual value

4. Scaling the value to correspond to the input image domain

The first step can be accomplished by multiplying the current X/Y coordinate in the output image by a scale factor (which can be different in X & Y). For example, if the output image was 1500×1000, and the warp map was 150×100, we scale both X & Y by 1/10.

Fetching the values from the warp map requires access to 2 Lookup tables. One Lookup table indexes into the X warp-map, and the other indexes into the Y warp-map. The lookup table either reads 8 or 16 bit entries from the lookup table, but always returns 16 bit values (clearing the high 8 bits if the original values are only 8 bits).

The next step in the pipeline is to bi-linearly interpolate the looked-up warp map values.

Finally the result from the bi-linear interpolation is scaled to place it in the same domain as the image to be warped. Thus, if the warp map range was 0-255, we scale X by 1500/255, and Y by 1000/255.

Figure 86:
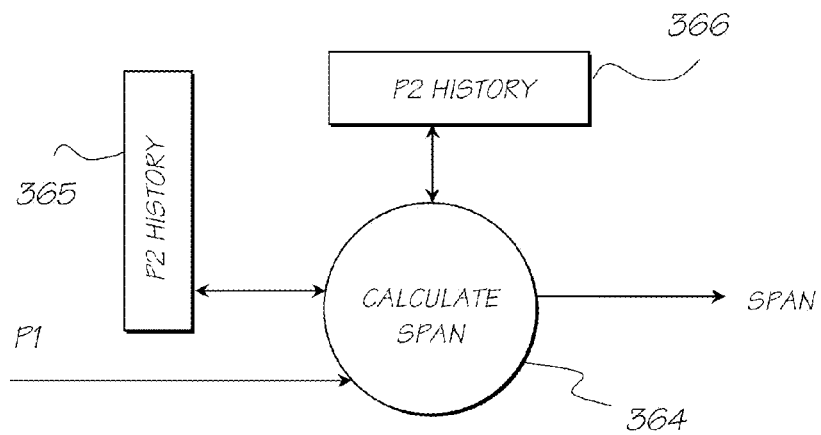
FIG. 86 illustrates the warping bi-linear interpolation process.

The interpolation process is as illustrated in FIG. 86 with the following constants set by software:

| Constant | Value |
| --- | --- |
| $K_1$ | Xscale (scales 0-ImageWidth to 0-WarpmapWidth) |
| $K_2$ | Yscale (scales 0-ImageHeight to 0-WarpmapHeight) |
| $K_3$ | XrangeScale (scales warpmap range (eg 0-255) to 0-ImageWidth) |
| $K_4$ | YrangeScale (scales warpmap range (eg 0-255) to 0-ImageHeight) |

The following lookup table is used:

| Lookup | Size | Details |
| --- | --- | --- |
| $LU_1$ and $LU_2$ | WarpmapWidth × WarpmapHeight | Warpmap lookup. Given [X, Y] the 4 entries required for bi-linear interpolation are returned. Even if entries are only 8 bit, they are returned as 16 bit (high 8 bits 0). Transfer time is 4 entries at 2 bytes per entry. Total time is 8 cycles as 2 lookups are used. |

Span Calculation

The points from the warp map 365 locate centers of pixel regions in the input image 367. The distance between input image pixels of adjacent output image pixels will indicate the size of the regions, and this distance can be approximated via a span calculation.

Figure 87:
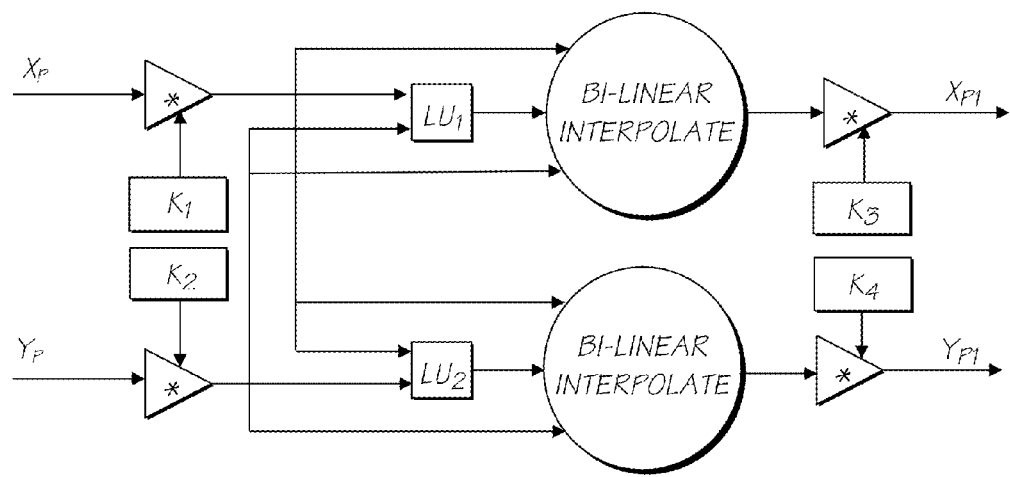
FIG. 87 illustrates the process of span calculation.

Turning to FIG. 87, for a given current point in the warp map P1, the previous point on the same line is called P0, and the previous line's point at the same position is called P2. We determine the absolute distance in X & Y between P1 and P0, and between P1 and P2. The maximum distance in X or Y becomes the span which will be a square approximation of the actual shape.

Figure 88:
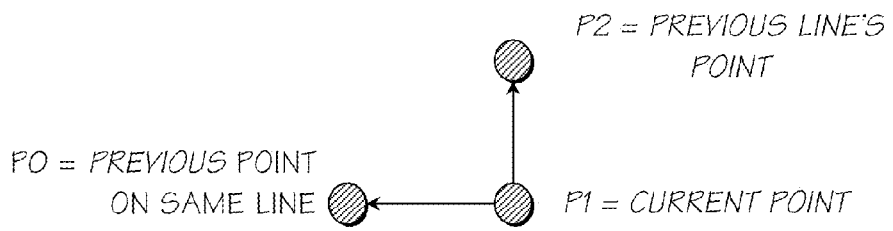
FIG. 88 illustrates the basic span calculation process.
Figure 89:
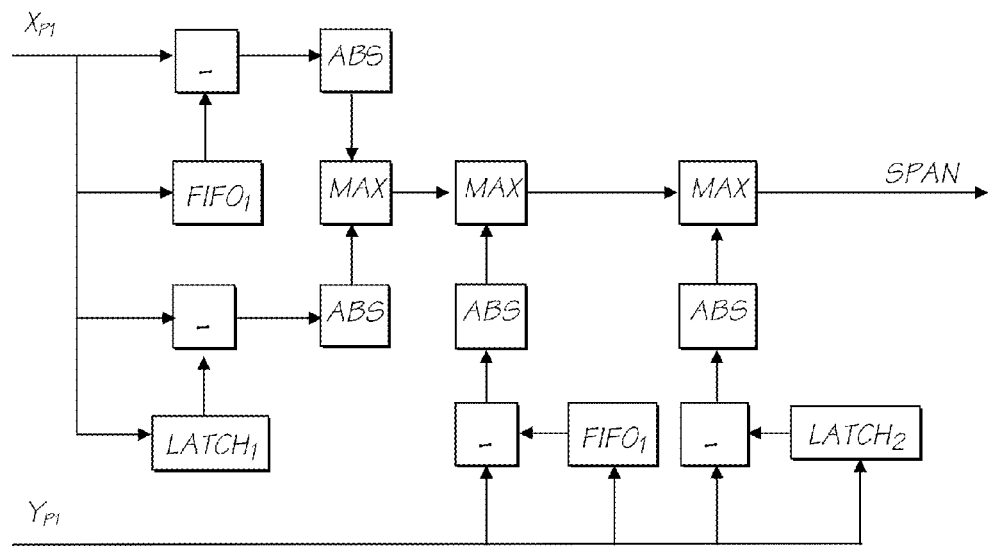
FIG. 89 illustrates one form of detail implementation of the span calculation process.

Preferably, the points are processed in a vertical strip output order, P0 is the previous point on the same line within a strip, and when P1 is the first point on line within a strip, then P0 refers to the last point in the previous strip's corresponding line. P2 is the previous line's point in the same strip, so it can be kept in a 32-entry history buffer. The basic of the calculate span process are as illustrated in FIG. 88 with the details of the process as illustrated in FIG. 89.

The following DRAM FIFO is used:

| Lookup | Size | Details |
| --- | --- | --- |
| $FIFO_1$ | 8 ImageWidth bytes. [ImageWidth × 2 entries at 32 bits per entry] | P2 history/lookup (both X & Y in same FIFO) P1 is put into the FIFO and taken out again at the same pixel on the following row as P2. Transfer time is 4 cycles (2 × 32 bits, with 1 cycle per 16 bits) |

Since a 32 bit precision span history is kept, in the case of a 1500 pixel wide image being warped 12,000 bytes temporary storage is required.

Calculation of the span 364 uses 2 Adder ALUs (1 for span calculation, 1 for looping and counting for P0 and P2 histories) takes 7 cycles as follows:

| Cycle | Action |
| --- | --- |
| 1 | $A = ABS(P1_x - P2_x)$ Store $P1_x$ in $P2_x$ history |
| 2 | $B = ABS(P1_x - P0_x)$ Store $P1_x$ in $P0_x$ history |
| 3 | $A = MAX(A, B)$ |
| 4 | $B = ABS(P1_y - P2_y)$ Store $P1_y$ in $P2_y$ history |
| 5 | $A = MAX(A, B)$ |
| 6 | $B = ABS(P1_y - P0_y)$ Store $P1_y$ in $P0_y$ history |
| 7 | $A = MAX(A, B)$ |

The history buffers 365, 366 are cached DRAM. The 'Previous Line' (for P2 history) buffer 366 is 32 entries of span-precision. The 'Previous Point' (for P0 history). Buffer 365 requires 1 register that is used most of the time (for calculation of points 1 to 31 of a line in a strip), and a DRAM buffered set of history values to be used in the calculation of point 0 in a strip's line.

32 bit precision in span history requires 4 cache lines to hold P2 history, and 2 for P0 history. P0's history is only written and read out once every 8 lines of 32 pixels to a temporary storage space of (ImageHeight*4) bytes. Thus a 1500 pixel high image being warped requires 6000 bytes temporary storage, and a total of 6 cache lines.

Tri-Linear Interpolation

Having determined the center and span of the area from the input image to be averaged, the final part of the warp process is to determine the value of the output pixel. Since a single output pixel could theoretically be represented by the entire input image, it is potentially too time-consuming to actually read and average the specific area of the input image contributing to the output pixel. Instead, it is possible to approximate the pixel value by using an image pyramid of the input image.

If the span is 1 or less, it is necessary only to read the original image's pixels around the given coordinate, and perform bi-linear interpolation. If the span is greater than 1, we must read two appropriate levels of the image pyramid and perform tri-linear interpolation. Performing linear interpolation between two levels of the image pyramid is not strictly correct, but gives acceptable results (it errs on the side of blurring the resultant image).

Figure 90:
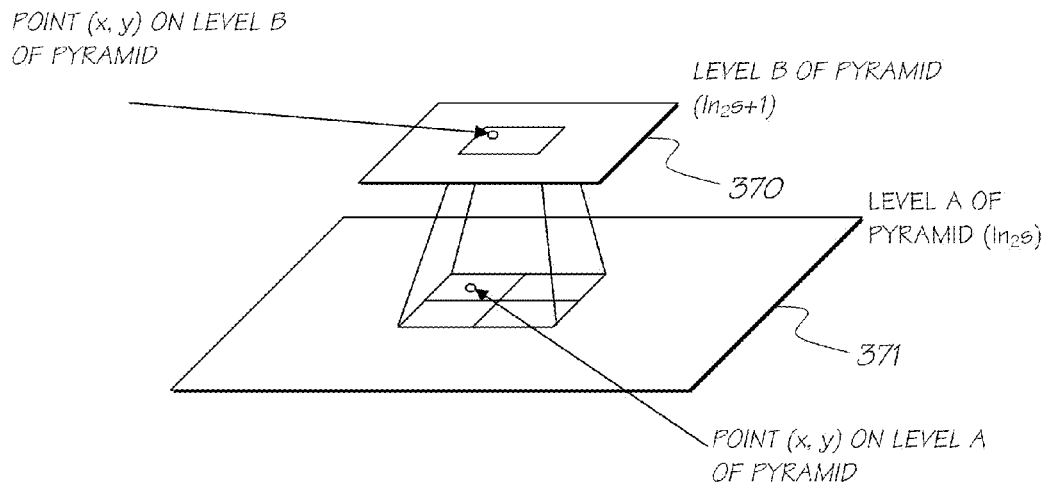
FIG. 90 illustrates the process of reading image pyramid levels.

Turning to FIG. 90, generally speaking, for a given span 's', it is necessary to read image pyramid levels given by $ln_2 s$ (370) and $ln_2 s+1$ (371). $Ln_2 s$ is simply decoding the highest set bit of s. We must bi-linear interpolate to determine the value for the pixel value on each of the two levels 370,371 of the pyramid, and then interpolate between levels.

Figure 91:
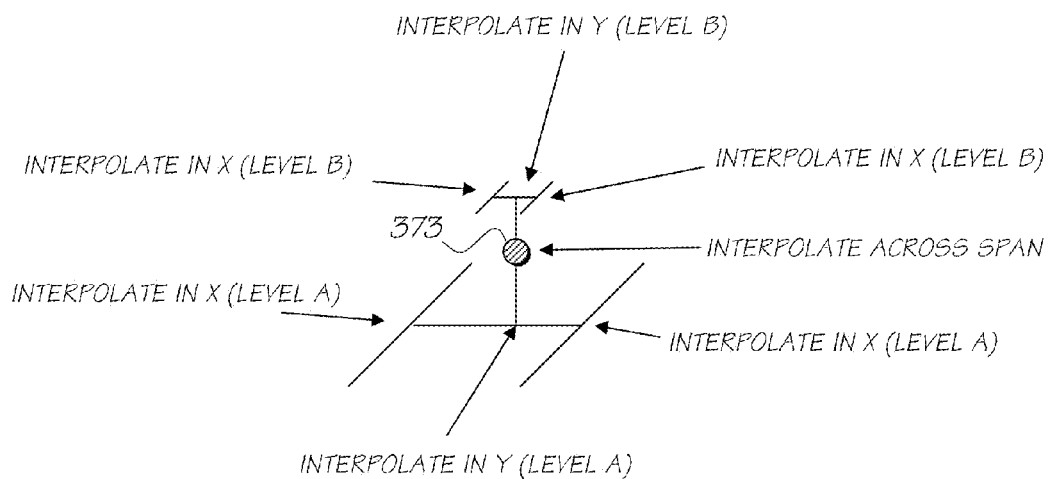
FIG. 91 illustrates using the pyramid table for bilinear interpolation.

As shown in FIG. 91, it is necessary to first interpolate in X and Y for each pyramid level before interpolating between the pyramid levels to obtain a final output value 373.

The image pyramid address mode issued to generate addresses for pixel coordinates at (x, y) on pyramid level s & s+1. Each level of the image pyramid contains pixels sequential in x. Hence, reads in x are likely to be cache hits.

Reasonable cache coherence can be obtained as local regions in the output image are typically locally coherent in the input image (perhaps at a different scale however, but coherent within the scale). Since it is not possible to know the relationship between the input and output images, we ensure that output pixels are written in a vertical strip (via a Vertical-Strip Iterator) in order to best make use of cache coherence.

Tri-linear interpolation can be completed in as few as 2 cycles on average using 4 multiply ALUs and all 4 adder ALUs as a pipeline and assuming no memory access required. But since all the interpolation values are derived from the image pyramids, interpolation speed is completely dependent on cache coherence (not to mention the other units are busy doing warp-map scaling and span calculations). As many cache lines as possible should therefore be available to the image-pyramid reading. The best speed will be 8 cycles, using 2 Multiply ALUs.

The output pixels are written out to the DRAM via a Vertical-Strip Write Iterator that uses 2 cache lines. The speed is therefore limited to a minimum of 8 cycles per output pixel. If the scaling of the warp map requires 8 or fewer cycles, then the overall speed will be unchanged. Otherwise the throughput is the time taken to scale the warp map. In most cases the warp map will be scaled up to match the size of the photo.

Assuming a warp map that requires 8 or fewer cycles per pixel to scale, the time taken to convert a single color component of image is therefore 0.12 s (1500*1000*8 cycles*10 ns per cycle).

Histogram Collector

The histogram collector is a microcode program that takes an image channel as input, and produces a histogram as output. Each of a channel's pixels has a value in the range 0-255. Consequently there are 256 entries in the histogram table, each entry 32 bits—large enough to contain a count of an entire 1500×1000 image.

Figure 92:
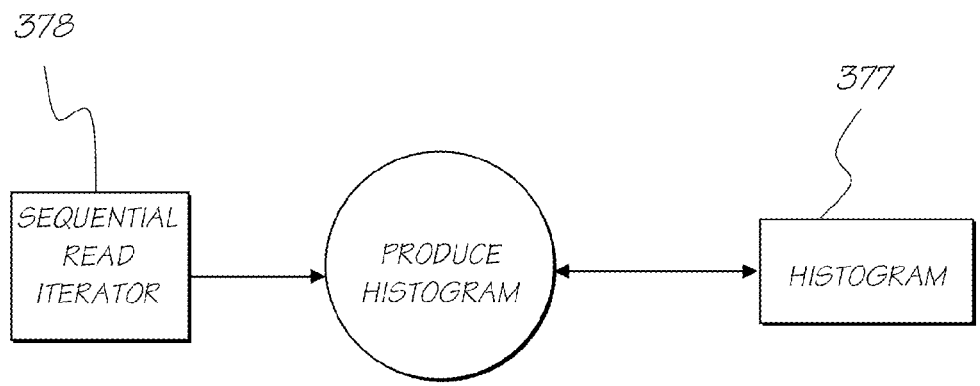
FIG. 92 illustrates the histogram collection process.
Figure 93:
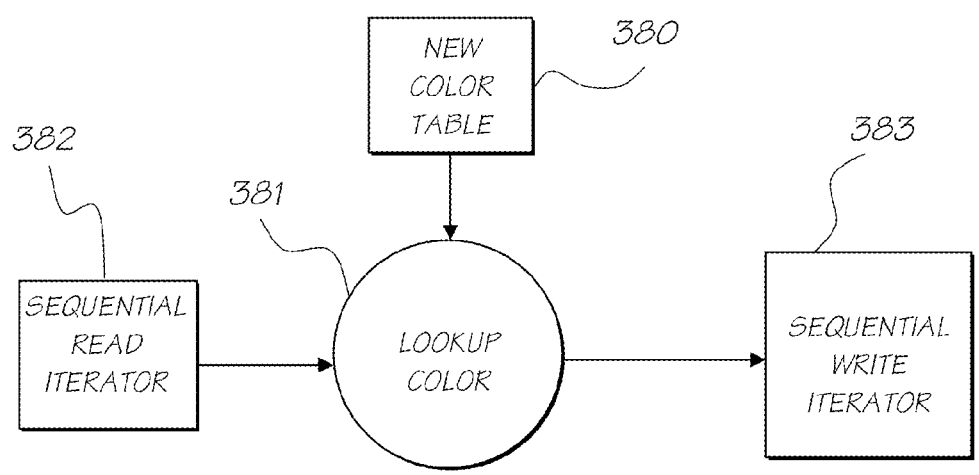
FIG. 93 illustrates the color transform process.

As shown in FIG. 92, since the histogram represents a summary of the entire image, a Sequential Read Iterator 378 is sufficient for the input. The histogram itself can be completely cached, requiring 32 cache lines (1K).

The microcode has two passes: an initialization pass which sets all the counts to zero, and then a "count" stage that increments the appropriate counter for each pixel read from the image. The first stage requires the Address Unit and a single Adder ALU, with the address of the histogram table 377 for initialising.

| Relative Microcode Address | Address Unit<br>A = Base address of histogram | Adder Unit 1 |
|---|---|---|
| 0 | Write 0 to<br>A + (Adder1.Out1 << 2) | Out1 = A<br>A = A − 1<br>BNZ 0 |
| 1 | Rest of processing | Rest of processing |

The second stage processes the actual pixels from the image, and uses 4 Adder ALUs:

| | Adder 1 | Adder 2 | Adder 3 | Adder 4 | Address Unit |
|---|---|---|---|---|---|
| 1 | A = 0 | | | A = −1 | |
| 2 | Out1 = A<br>BZ A = pixel 2 | A =<br>Adder1.Out1<br>Z = pixel −<br>Adder1.Out1 | A =<br>Adr.Out1 | A = A + 1 | Out1 = Read 4 bytes from: (A + (Adder1.Out1 << 2)) |
| 3 | | Out1 = A | Out1 = A | Out1 = A<br>A = Adder3.Out1 | Write Adder4.Out1 to: (A + (Adder2.Out << 2) |
| 4 | | | | | Write Adder4.Out1 to: (A + (Adder2.Out << 2)<br>Flush caches |

The Zero flag from Adder2 cycle 2 is used to stay at microcode address 2 for as long as the input pixel is the same. When it changes, the new count is written out in microcode address 3, and processing resumes at microcode address 2. Microcode address 4 is used at the end, when there are no more pixels to be read.

Stage 1 takes 256 cycles, or 2560 ns. Stage 2 varies according to the values of the pixels. The worst case time for lookup table replacement is 2 cycles per image pixel if every pixel is not the same as its neighbor. The time taken for a single color lookup is 0.03 s (1500×1000×2 cycle per pixel×10 ns per cycle=30,000,000 ns). The time taken for 3 color components is 3 times this amount, or 0.09 s.

Color Transform

Color transformation is achieved in two main ways:
 Lookup table replacement
 Color space conversion Lookup Table Replacement As illustrated in FIG. 86, one of the simplest ways to transform the color of a pixel is to encode an arbitrarily complex transform function into a lookup table 380. The component color value of the pixel is used to lookup 381 the new component value of the pixel. For each pixel read from a Sequential Read Iterator, its new value is read from the New Color Table 380, and written to a Sequential Write Iterator 383. The input image can be processed simultaneously in two halves to make effective use of memory bandwidth. The following lookup table is used:

| Lookup | Size | Details |
|---|---|---|
| LU$_1$ | 256 entries<br>8 bits per entry | Replacement[X]<br>Table indexed by the 8 highest significant bits of X.<br>Resultant 8 bits treated as fixed point 0:8 |

The total process requires 2 Sequential Read Iterators and 2 Sequential Write iterators. The 2 New Color Tables require 8 cache lines each to hold the 256 bytes (256 entries of 1 byte).

The average time for lookup table replacement is therefore ½ cycle per image pixel. The time taken for a single color lookup is 0.0075 s (1500×1000×½ cycle per pixel×10 ns per cycle=7,500,000 ns). The time taken for 3 color components is 3 times this amount, or 0.0225 s. Each color component has to be processed one after the other under control of software.

Color Space Conversion

Figure 94:
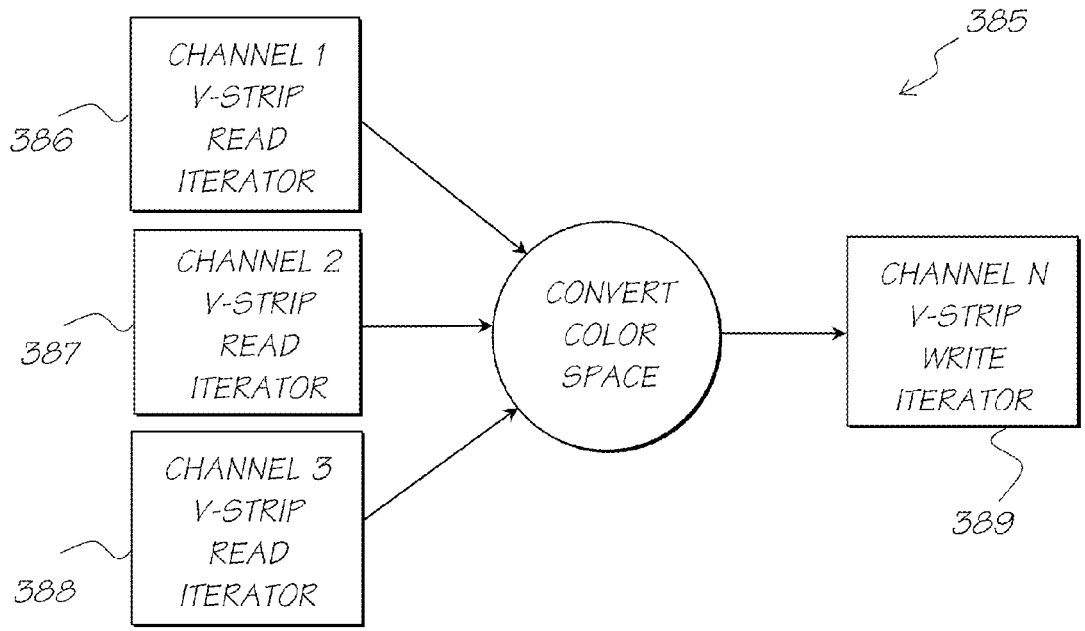
FIG. 94 illustrates the color conversion process.

Color Space conversion is only required when moving between color spaces. The CCD images are captured in RGB color space, and printing occurs in CMY color space, while clients of the ACP 31 likely process images in the Lab color space. All of the input color space channels are typically required as input to determine each output channel's component value. Thus the logical process is as illustrated 385 in FIG. 94.

Simply, conversion between Lab, RGB, and CMY is fairly straightforward. However the individual color profile of a particular device can vary considerably. Consequently, to allow future CCDs, inks, and printers, the ACP 31 performs color space conversion by means of tri-linear interpolation from color space conversion lookup tables.

Color coherence tends to be area based rather than line based. To aid cache coherence during tri-linear interpolation lookups, it is best to process an image in vertical strips. Thus the read 386-388 and write 389 iterators would be Vertical-Strip Iterators.

Tri-Linear Color Space Conversion

For each output color component, a single 3D table mapping the input color space to the output color component is required. For example, to convert CCD images from RGB to Lab, 3 tables calibrated to the physical characteristics of the CCD are required:

RGB->L
RGB->a
RGB->b

To convert from Lab to CMY, 3 tables calibrated to the physical characteristics of the ink/printer are required:

Lab->C
Lab->M
Lab->Y

The 8-bit input color components are treated as fixed-point numbers (3:5) in order to index into the conversion tables. The 3 bits of integer give the index, and the 5 bits of fraction are used for interpolation. Since 3 bits gives 8 values, 3 dimensions gives 512 entries (8×8×8). The size of each entry is 1 byte, requiring 512 bytes per table.

Figure 95:
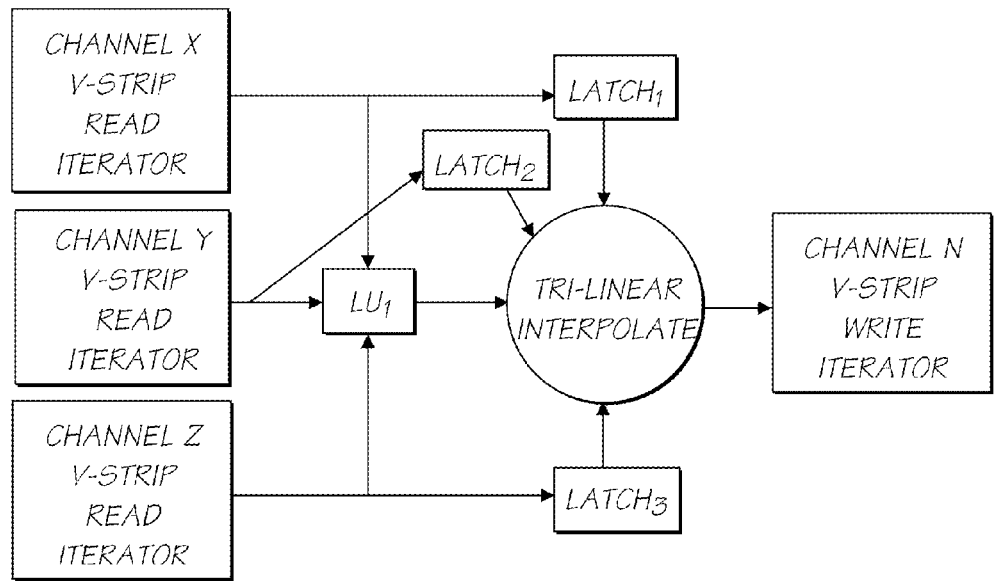
FIG. 95 illustrates the color space conversion process in more detail.

The Convert Color Space process can therefore be implemented as shown in FIG. 95 and the following lookup table is used:

| Lookup | Size | Details |
|---|---|---|
| LU$_1$ | 8 × 8 × 8 entries | Convert[X, Y, Z] |
| | | Table indexed by the 3 highest bits of X, Y, and Z. |
| | 512 entries | 8 entries returned from Tri-linear index address unit |
| | 8 bits per entry | Resultant 8 bits treated as fixed point 8:0 |
| | | Transfer time is 8 entries at 1 byte per entry |

Tri-linear interpolation returns interpolation between 8 values. Each 8 bit value takes 1 cycle to be returned from the lookup, for a total of 8 cycles. The tri-linear interpolation also takes 8 cycles when 2 Multiply ALUs are used per cycle. General tri-linear interpolation information is given in the ALU section of this document. The 512 bytes for the lookup table fits in 16 cache lines.

The time taken to convert a single color component of image is therefore 0.105 s (1500*1000*7 cycles*10 ns per cycle). To convert 3 components takes 0.415 s. Fortunately, the color space conversion for printout takes place on the fly during printout itself, so is not a perceived delay.

If color components are converted separately, they must not overwrite their input color space components since all color components from the input color space are required for converting each component.

Since only 1 multiply unit is used to perform the interpolation, it is alternatively possible to do the entire Lab->CMY conversion as a single pass. This would require 3 Vertical-Strip Read Iterators, 3 Vertical-Strip Write Iterators, and access to 3 conversion tables simultaneously. In that case, it is possible to write back onto the input image and thus use no extra memory. However, access to 3 conversion tables equals ⅓ of the caching for each, that could lead to high latency for the overall process.

Affine Transform

Prior to compositing an image with a photo, it may be necessary to rotate, scale and translate it. If the image is only being translated, it can be faster to use a direct sub-pixel translation function. However, rotation, scale-up and translation can all be incorporated into a single affine transform.

A general affine transform can be included as an accelerated function. Affine transforms are limited to 2D, and if scaling down, input images should be pre-scaled via the Scale function. Having a general affine transform function allows an output image to be constructed one block at a time, and can reduce the time taken to perform a number of transformations on an image since all can be applied at the same time.

A transformation matrix needs to be supplied by the client—the matrix should be the inverse matrix of the transformation desired i.e. applying the matrix to the output pixel coordinate will give the input coordinate.

A 2D matrix is usually represented as a 3×3 array:

$$\begin{bmatrix} a & b & 0 \\ c & d & 0 \\ e & f & 1 \end{bmatrix}$$

Since the 3$^{rd}$ column is always [0, 0, 1] clients do not need to specify it. Clients instead specify a, b, c, d, e, and f.

Given a coordinate in the output image (x, y) whose top left pixel coordinate is given as (0, 0), the input coordinate is specified by: (ax+cy+e, bx+dy+f). Once the input coordinate is determined, the input image is sampled to arrive at the pixel value. Bi-linear interpolation of input image pixels is used to determine the value of the pixel at the calculated coordinate. Since affine transforms preserve parallel lines, images are processed in output vertical strips of 32 pixels wide for best average input image cache coherence.

Three Multiply ALUs are required to perform the bi-linear interpolation in 2 cycles. Multiply ALUs 1 and 2 do linear interpolation in X for lines Y and Y+1 respectively, and Multiply ALU 3 does linear interpolation in Y between the values output by Multiply ALUs 1 and 2.

Figure 96:
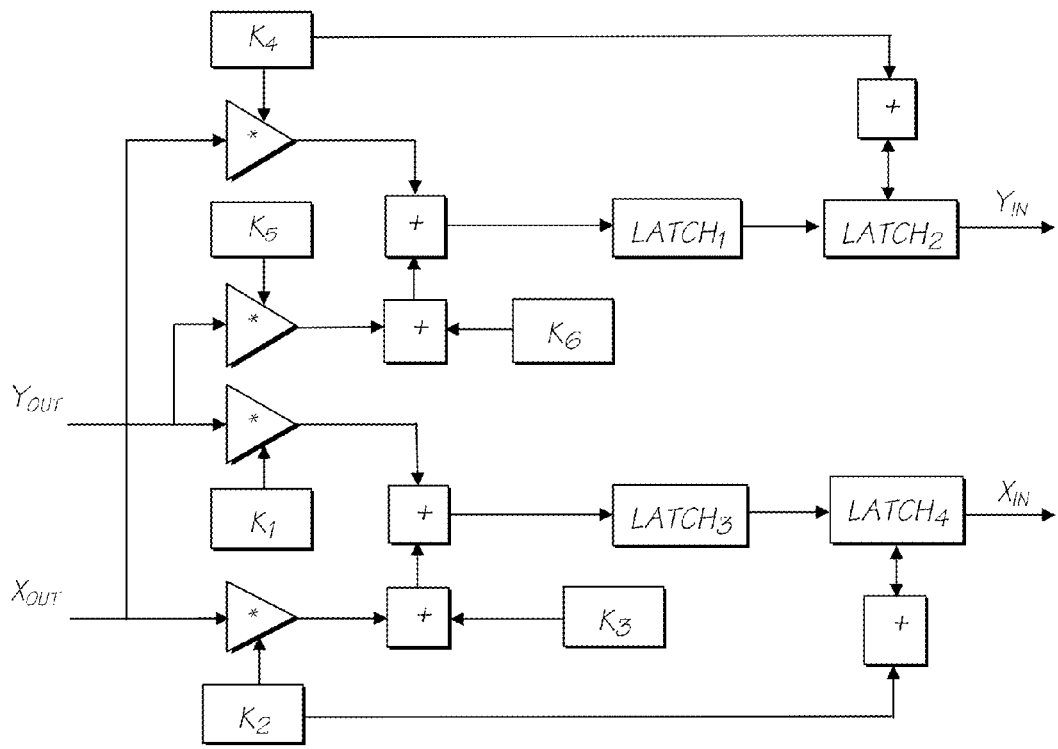
FIG. 96 illustrates the process of calculating an input coordinate.

As we move to the right across an output line in X, 2 Adder ALUs calculate the actual input image coordinates by adding 'a' to the current X value, and 'b' to the current Y value respectively. When we advance to the next line (either the next line in a vertical strip after processing a maximum of 32 pixels, or to the first line in a new vertical strip) we update X and Y to pre-calculated start coordinate values constants for the given block The process for calculating an input coordinate is given in FIG. 96 where the following constants are set by software:

Calculate Pixel

Figure 97:
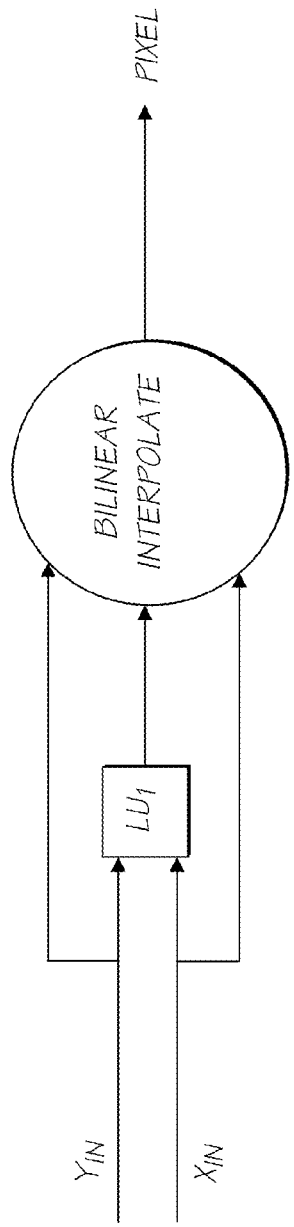
FIG. 97 illustrates the process of compositing with feedback.

Once we have the input image coordinates, the input image must be sampled. A lookup table is used to return the values at the specified coordinates in readiness for bilinear interpolation. The basic process is as indicated in FIG. 97 and the following lookup table is used:

| Lookup | Size | Details |
| --- | --- | --- |
| $LU_1$ | Image width by Image height 8 bits per entry | Bilinear Image lookup [X, Y] Table indexed by the integer part of X and Y. 4 entries returned from Bilinear index address unit, 2 per cycle. Each 8 bit entry treated as fixed point 8:0 Transfer time is 2 cycles (2 16 bit entries in FIFO hold the 4 8 bit entries) |

The affine transform requires all 4 Multiply Units and all 4 Adder ALUs, and with good cache coherence can perform an affine transform with an average of 2 cycles per output pixel. This timing assumes good cache coherence, which is true for non-skewed images. Worst case timings are severely skewed images, which meaningful Vark scripts are unlikely to contain.

The time taken to transform a 128×128 image is therefore 0.00033 seconds (32,768 cycles). If this is a clip image with 4 channels (including a channel), the total time taken is 0.00131 seconds (131,072 cycles).

A Vertical-Strip Write Iterator is required to output the pixels. No Read Iterator is required. However, since the affine transform accelerator is bound by time taken to access input image pixels, as many cache lines as possible should be allocated to the read of pixels from the input image. At least 32 should be available, and preferably 64 or more.

Scaling

Scaling is essentially a re-sampling of an image. Scale up of an image can be performed using the Affine Transform function. Generalized scaling of an image, including scale down, is performed by the hardware accelerated Scale function. Scaling is performed independently in X and Y, so different scale factors can be used in each dimension.

Figure 98:
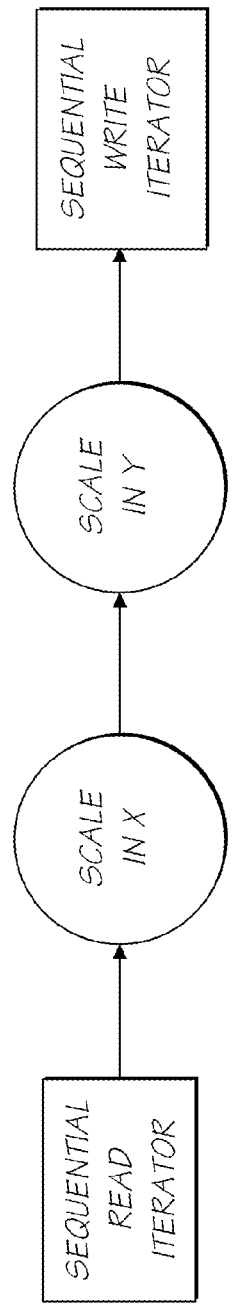
FIG. 98 illustrates the generalized scaling process.
Figure 99:
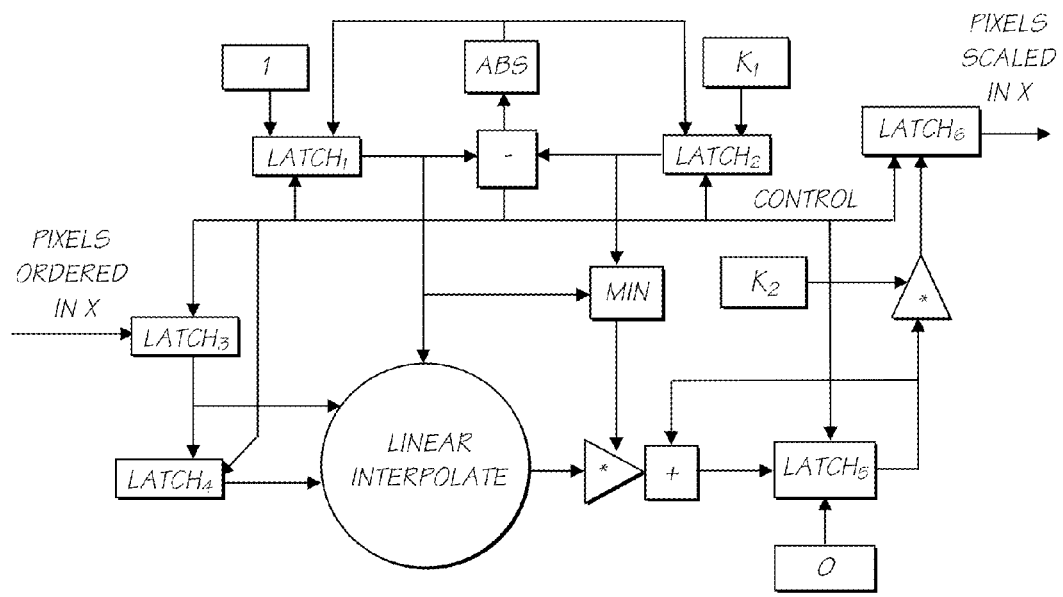
FIG. 99 illustrates the scale in X scaling process.

The generalized scale unit must match the Affine Transform scale function in terms of registration. The generalized scaling process is as illustrated in FIG. 98. The scale in X is accomplished by Fant's re-sampling algorithm as illustrated in FIG. 99.

Where the following constants are set by software:

| Constant | Value |
| --- | --- |
| $K_1$ | Number of input pixels that contribute to an output pixel in X |
| $K_2$ | $1/K_1$ |

The following registers are used to hold temporary variables:

| Variable | Value |
| --- | --- |
| $Latch_1$ | Amount of input pixel remaining unused (starts at 1 and decrements) |
| $Latch_2$ | Amount of input pixels remaining to contribute to current output pixel (starts at $K_1$ and decrements) |
| $Latch_3$ | Next pixel (in X) |
| $Latch_4$ | Current pixel |
| $Latch_5$ | Accumulator for output pixel (unscaled) |
| $Latch_6$ | Pixel Scaled in X (output) |

Figure 100:
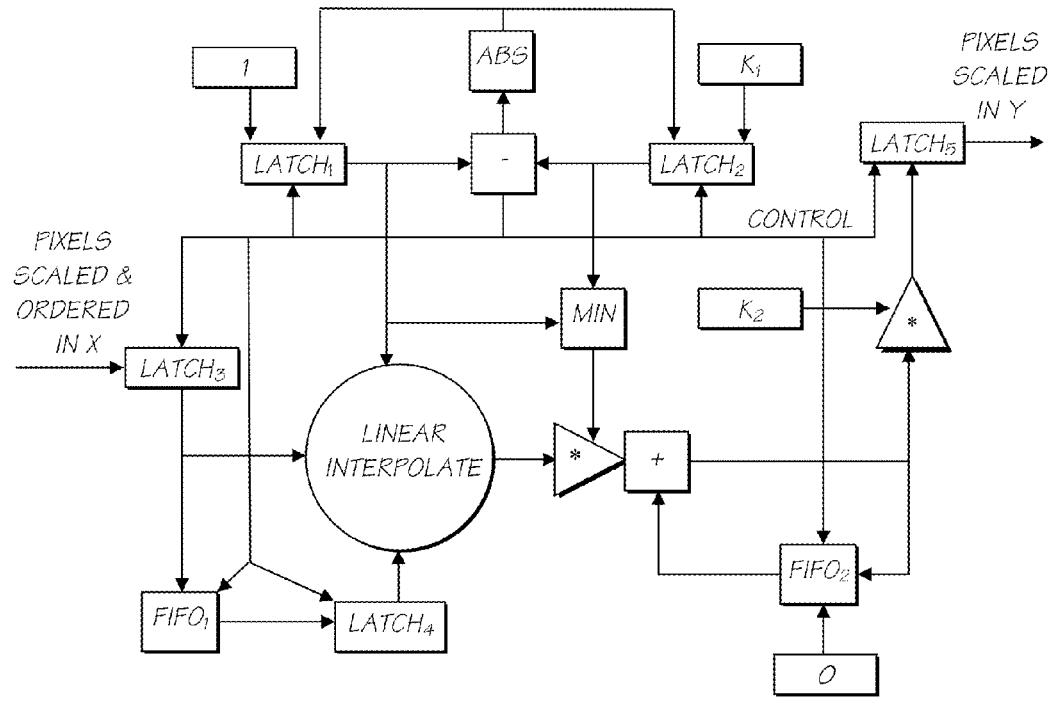
FIG. 100 illustrates the scale in Y scaling process.

The Scale in Y process is illustrated in FIG. 100 and is also accomplished by a slightly altered version of Fant's re-sampling algorithm to account for processing in order of X pixels.

Where the following constants are set by software:

| Constant | Value |
| --- | --- |
| $K_1$ | Number of input pixels that contribute to an output pixel in Y |
| $K_2$ | $1/K_1$ |

The following registers are used to hold temporary variables:

| Variable | Value |
| --- | --- |
| $Latch_1$ | Amount of input pixel remaining unused (starts at 1 and decrements) |
| $Latch_2$ | Amount of input pixels remaining to contribute to current output pixel (starts at $K_1$ and decrements) |
| $Latch_3$ | Next pixel (in Y) |
| $Latch_4$ | Current pixel |
| $Latch_5$ | Pixel Scaled in Y (output) |

The following DRAM FIFOs are used:

| Lookup | Size | Details |
| --- | --- | --- |
| $FIFO_1$ | ImageWidth$_{OUT}$ entries 8 bits per entry | 1 row of image pixels already scaled in X 1 cycle transfer time |
| $FIFO_2$ | ImageWidth$_{OUT}$ entries 16 bits per entry | 1 row of image pixels already scaled in X 2 cycles transfer time (1 byte per cycle) |

Tessellate Image

Tessellation of an image is a form of tiling. It involves copying a specially designed "tile" multiple times horizontally and vertically into a second (usually larger) image space. When tessellated, the small tile forms a seamless picture. One example of this is a small tile of a section of a brick wall. It is designed so that when tessellated, it forms a full brick wall. Note that there is no scaling or sub-pixel translation involved in tessellation.

The most cache-coherent way to perform tessellation is to output the image sequentially line by line, and to repeat the same line of the input image for the duration of the line. When we finish the line, the input image must also advance to the next line (and repeat it multiple times across the output line).

Figure 101:
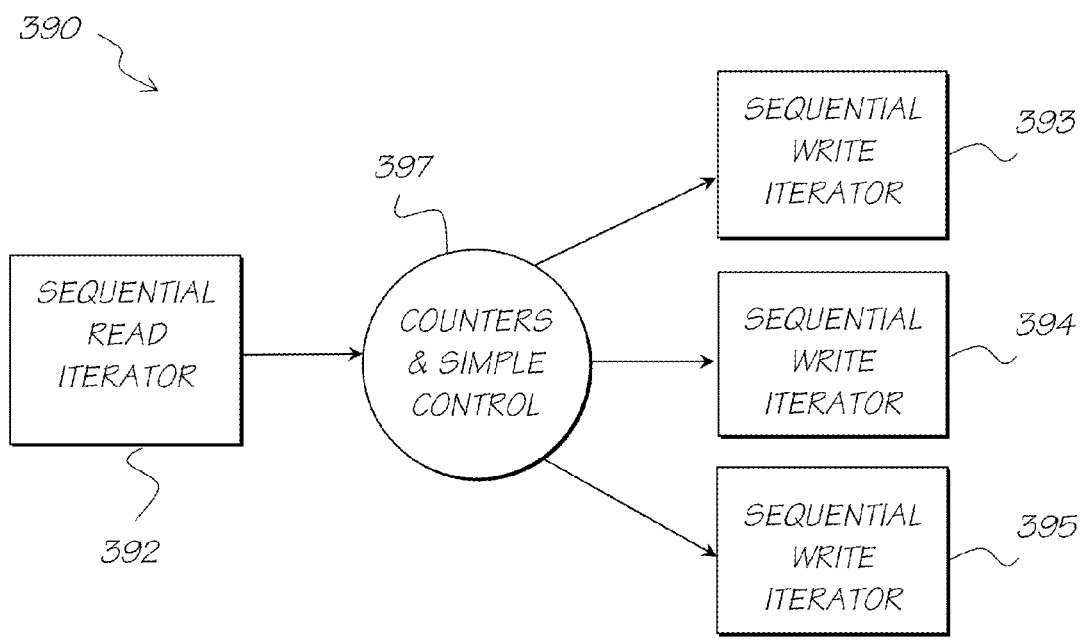
FIG. 101 illustrates the tessellation process.

An overview of the tessellation function is illustrated 390 in FIG. 101. The Sequential Read Iterator 392 is set up to continuously read a single line of the input tile (StartLine would be 0 and EndLine would be 1). Each input pixel is written to all 3 of the Write Iterators 393-395. A counter 397 in an Adder ALU counts down the number of pixels in an output line, terminating the sequence at the end of the line.

At the end of processing a line, a small software routine updates the Sequential Read Iterator's StartLine and EndLine registers before restarting the microcode and the Sequential Read Iterator (which clears the FIFO and repeats line 2 of the tile). The Write Iterators 393-395 are not updated, and simply keep on writing out to their respective parts of the output image. The net effect is that the tile has one line repeated across an output line, and then the tile is repeated vertically too.

This process does not fully use the memory bandwidth since we get good cache coherence in the input image, but it does allow the tessellation to function with tiles of any size. The process uses 1 Adder ALU. If the 3 Write Iterators 393-395 each write to ⅓ of the image (breaking the image on tile sized boundaries), then the entire tessellation process takes place at an average speed of ⅓ cycle per output image pixel. For an image of 1500×1000, this equates to 0.005 seconds (5,000,000 ns).

Sub-Pixel Translator

Before compositing an image with a background, it may be necessary to translate it by a sub-pixel amount in both X and Y. Sub-pixel transforms can increase an image's size by 1 pixel in each dimension. The value of the region outside the image can be client determined, such as a constant value (e.g. black), or edge pixel replication. Typically it will be better to use black.

Figure 102:
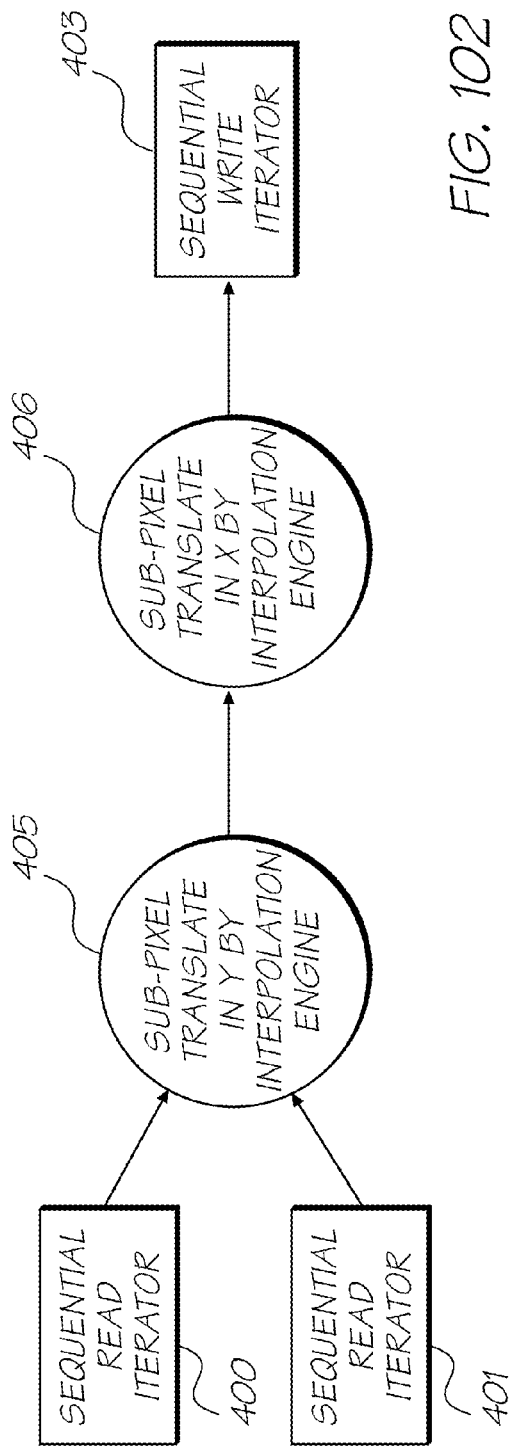
FIG. 102 illustrates the sub-pixel translation process.

The sub-pixel translation process is as illustrated in FIG. 102. Sub-pixel translation in a given dimension is defined by:

$$Pixel_{out}=Pixel_{in}*(1-Translation)+Pixel_{in-1}*Translation$$

It can also be represented as a form of interpolation:

$$Pixel_{out}=Pixel_{in-1}+(Pixel_{in}-Pixel_{in-1})*Translation$$

Implementation of a single (on average) cycle interpolation engine using a single Multiply ALU and a single Adder ALU in conjunction is straightforward. Sub-pixel translation in both X & Y requires 2 interpolation engines.

In order to sub-pixel translate in Y, 2 Sequential Read Iterators 400, 401 are required (one is reading a line ahead of the other from the same image), and a single Sequential Write Iterator 403 is required.

The first interpolation engine (interpolation in Y) accepts pairs of data from 2 streams, and linearly interpolates between them. The second interpolation engine (interpolation in X) accepts its data as a single 1 dimensional stream and linearly interpolates between values. Both engines interpolate in 1 cycle on average.

Each interpolation engine 405, 406 is capable of performing the sub-pixel translation in 1 cycle per output pixel on average. The overall time is therefore 1 cycle per output pixel, with requirements of 2 Multiply ALUs and 2 Adder ALUs.

The time taken to output 32 pixels from the sub-pixel translate function is on average 320 ns (32 cycles). This is enough time for 4 full cache-line accesses to DRAM, so the use of 3 Sequential Iterators is well within timing limits.

The total time taken to sub-pixel translate an image is therefore 1 cycle per pixel of the output image. A typical image to be sub-pixel translated is a tile of size 128*128. The output image size is 129*129. The process takes 129*129*10 ns=166,410 ns.

The Image Tiler function also makes use of the sub-pixel translation algorithm, but does not require the writing out of the sub-pixel-translated data, but rather processes it further.

Image Tiler

The high level algorithm for tiling an image is carried out in software. Once the placement of the tile has been determined, the appropriate colored tile must be composited. The actual compositing of each tile onto an image is carried out in hardware via the microcoded ALUs. Compositing a tile involves both a texture application and a color application to a background image. In some cases it is desirable to compare the actual amount of texture added to the background in relation to the intended amount of texture, and use this to scale the color being applied. In these cases the texture must be applied first.

Since color application functionality and texture application functionality are somewhat independent, they are separated into sub-functions.

The number of cycles per 4-channel tile composite for the different texture styles and coloring styles is summarised in the following table:

|  | Constant color | Pixel color |
|---|---|---|
| Replace texture | 4 | 4.75 |
| 25% background + tile texture | 4 | 4.75 |
| Average height algorithm | 5 | 5.75 |
| Average height algorithm with feedback | 5.75 | 6.5 |

Tile Coloring and Compositing

A tile is set to have either a constant color (for the whole tile), or takes each pixel value from an input image. Both of these cases may also have feedback from a texturing stage to scale the opacity (similar to thinning paint).

The steps for the 4 cases can be summarised as:
Sub-pixel translate the tile's opacity values,
Optionally scale the tile's opacity (if feedback from texture application is enabled).
Determine the color of the pixel (constant or from an image map).
Composite the pixel onto the background image.

Each of the 4 cases is treated separately, in order to minimize the time taken to perform the function. The summary of time per color compositing style for a single color channel is described in the following table:

| Tiling color style | No feedback from texture (cycles per pixel) | Feedback from texture (cycles per pixel) |
|---|---|---|
| Tile has constant color per pixel | 1 | 2 |
| Tile has per pixel color from input image | 1.25 | 2 |

Constant Color

In this case, the tile has a constant color, determined by software. While the ACP 31 is placing down one tile, the software can be determining the placement and coloring of the next tile.

The color of the tile can be determined by bi-linear interpolation into a scaled version of the image being tiled. The scaled version of the image can be created and stored in place of the image pyramid, and needs only to be performed once per entire tile operation. If the tile size is 128×128, then the image can be scaled down by 128:1 in each dimension.

Without Feedback

When there is no feedback from the texturing of a tile, the tile is simply placed at the specified coordinates. The tile color is used for each pixel's color, and the opacity for the composite comes from the tile's sub-pixel translated opacity channel. In this case color channels and the texture channel can be processed completely independently between tiling passes.

Figure 103:
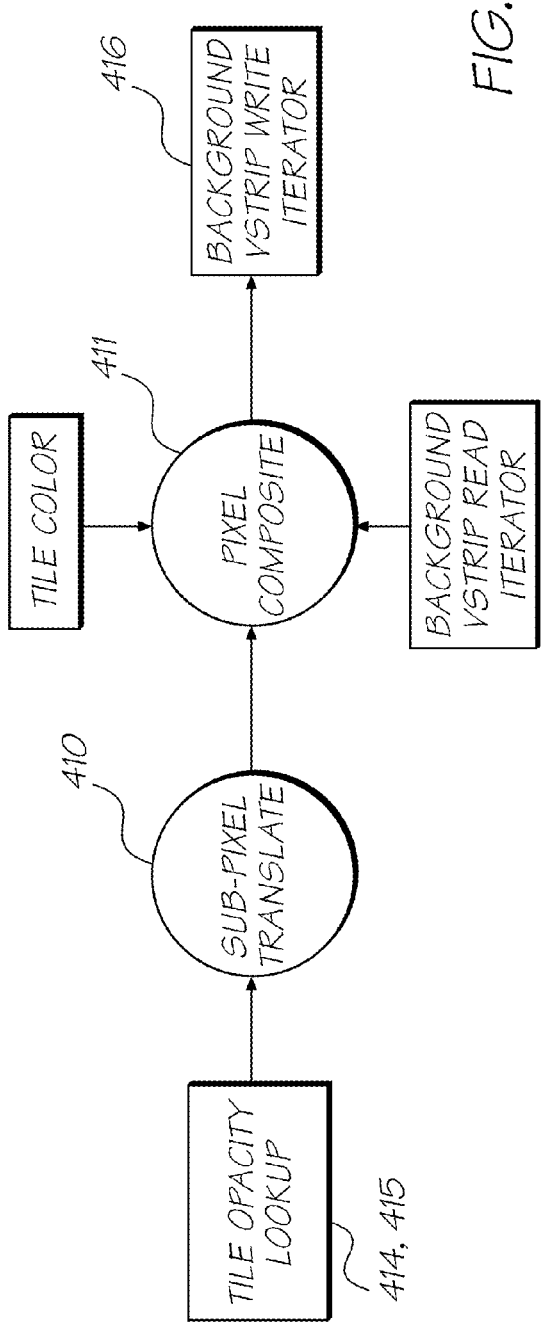
FIG. 103 illustrates the compositing process.
Figure 104:
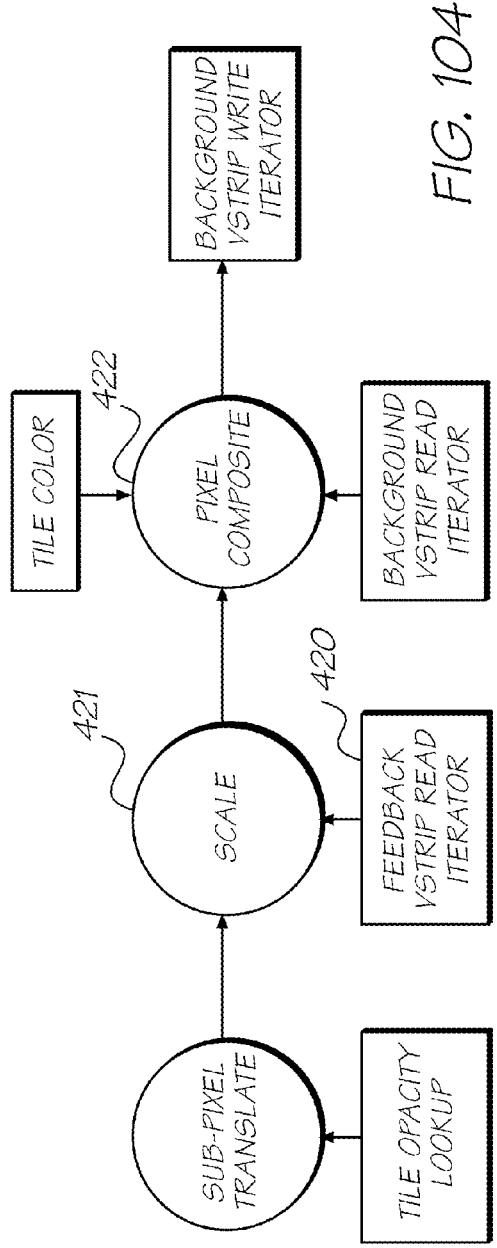
FIG. 104 illustrates the process of compositing with feedback.

The overview of the process is illustrated in FIG. 103. Sub-pixel translation 410 of a tile can be accomplished using 2 Multiply ALUs and 2 Adder ALUs in an average time of 1 cycle per output pixel. The output from the sub-pixel translation is the mask to be used in compositing 411 the constant tile color 412 with the background image from background sequential Read Iterator.

Compositing can be performed using 1 Multiply ALU and 1 Adder ALU in an average time of 1 cycle per composite. Requirements are therefore 3 Multiply ALUs and 3 Adder ALUs. 4 Sequential Iterators 413-416 are required, taking 320 ns to read or write their contents. With an average number of cycles of 1 per pixel to sub-pixel translate and composite, there is sufficient time to read and write the buffers.

With Feedback

When there is feedback from the texturing of a tile, the tile is placed at the specified coordinates. The tile color is used for each pixel's color, and the opacity for the composite comes from the tile's sub-pixel translated opacity channel scaled by the feedback parameter. Thus the texture values must be calculated before the color value is applied.

The overview of the process is illustrated in FIG. 97. Sub-pixel translation of a tile can be accomplished using 2 Multiply ALUs and 2 Adder ALUs in an average time of 1 cycle per output pixel. The output from the sub-pixel translation is the mask to be scaled according to the feedback read from the Feedback Sequential Read Iterator 420. The feedback is passed it to a Scaler (1 Multiply ALU) 421.

Compositing 422 can be performed using 1 Multiply ALU and 1 Adder ALU in an average time of 1 cycle per composite. Requirements are therefore 4 Multiply ALUs and all 4 Adder ALUs. Although the entire process can be accomplished in 1 cycle on average, the bottleneck is the memory access, since 5 Sequential Iterators are required. With sufficient buffering, the average time is 1.25 cycles per pixel.

Color from Input Image

One way of coloring pixels in a tile is to take the color from pixels in an input image. Again, there are two possibilities for compositing: with and without feedback from the texturing.

Without Feedback

In this case, the tile color simply comes from the relative pixel in the input image. The opacity for compositing comes from the tile's opacity channel sub-pixel shifted.

Figure 105:
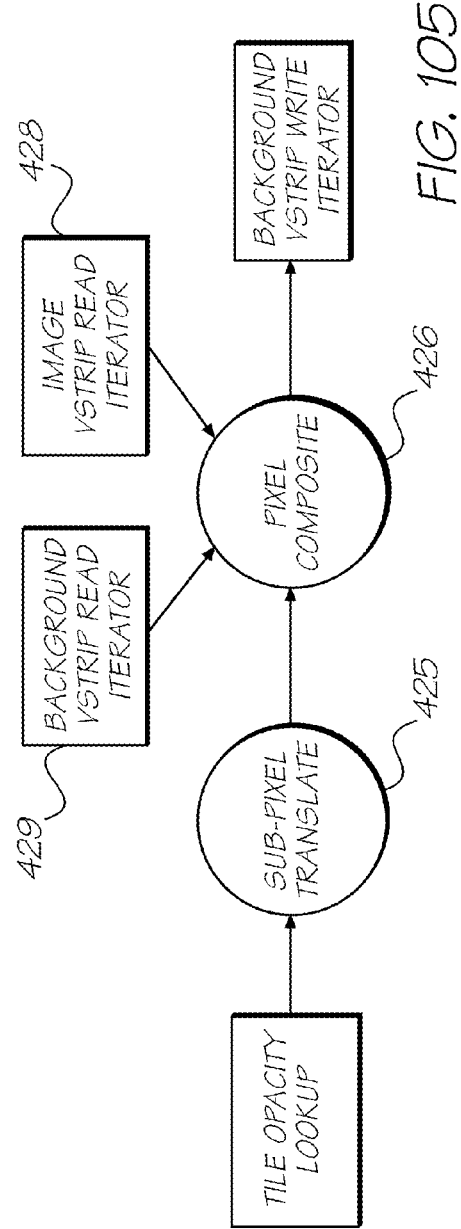
FIG. 105 illustrates the process of tiling with color from the input image.

The overview of the process is illustrated in FIG. 105. Sub-pixel translation 425 of a tile can be accomplished using 2 Multiply ALUs and 2 Adder ALUs in an average time of 1 cycle per output pixel. The output from the sub-pixel translation is the mask to be used in compositing 426 the tile's pixel color (read from the input image 428) with the background image 429.

Compositing 426 can be performed using 1 Multiply ALU and 1 Adder ALU in an average time of 1 cycle per composite. Requirements are therefore 3 Multiply ALUs and 3 Adder ALUs. Although the entire process can be accomplished in 1 cycle on average, the bottleneck is the memory access, since 5 Sequential Iterators are required. With sufficient buffering, the average time is 1.25 cycles per pixel.

With Feedback

In this case, the tile color still comes from the relative pixel in the input image, but the opacity for compositing is affected by the relative amount of texture height actually applied during the texturing pass. This process is as illustrated in FIG. 106.

Sub-pixel translation 431 of a tile can be accomplished using 2 Multiply ALUs and 2 Adder ALUs in an average time of 1 cycle per output pixel. The output from the sub-pixel translation is the mask to be scaled 431 according to the feedback read from the Feedback Sequential Read Iterator 432. The feedback is passed to a Scaler (1 Multiply ALU) 431.

Compositing 434 can be performed using 1 Multiply ALU and 1 Adder ALU in an average time of 1 cycle per composite.

Requirements are therefore all 4 Multiply ALUs and 3 Adder ALUs. Although the entire process can be accomplished in 1 cycle on average, the bottleneck is the memory access, since 6 Sequential Iterators are required. With sufficient buffering, the average time is 1.5 cycles per pixel.

Tile Texturing

Each tile has a surface texture defined by its texture channel. The texture must be sub-pixel translated and then applied to the output image. There are 3 styles of texture compositing:

Replace texture
25% background+tile's texture
Average height algorithm

In addition, the Average height algorithm can save feedback parameters for color compositing.

The time taken per texture compositing style is summarised in the following table:

| Tiling color style | Cycles per pixel (no feedback from texture) | Cycles per pixel (feedback from texture) |
|---|---|---|
| Replace texture | 1 | — |
| 25% background + tile texture value | 1 | — |
| Average height algorithm | 2 | 2 |

Replace Texture

In this instance, the texture from the tile replaces the texture channel of the image, as illustrated in FIG. 107. Sub-pixel translation 436 of a tile's texture can be accomplished using 2 Multiply ALUs and 2 Adder ALUs in an average time of 1 cycle per output pixel. The output from this sub-pixel translation is fed directly to the Sequential Write Iterator 437.

The time taken for replace texture compositing is 1 cycle per pixel. There is no feedback, since 100% of the texture value is always applied to the background. There is therefore no requirement for processing the channels in any particular order.

25% Background+Tile's Texture

Figure 108:
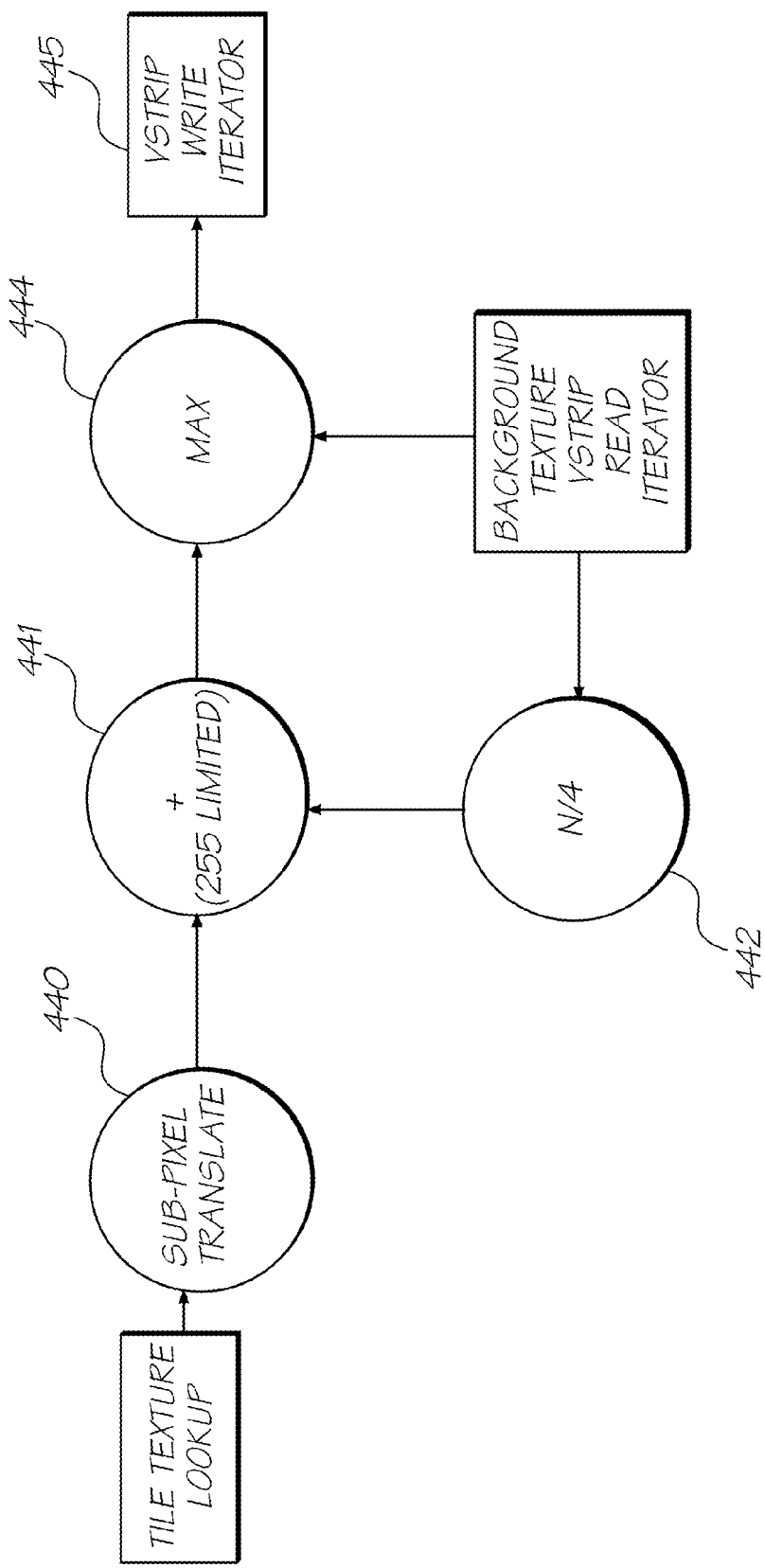
FIG. 108 illustrates the process of tiling with color from the input image.

In this instance, the texture from the tile is added to 25% of the existing texture value. The new value must be greater than or equal to the original value. In addition, the new texture value must be clipped at 255 since the texture channel is only 8 bits. The process utilised is illustrated in FIG. 108.

Sub-pixel translation 440 of a tile's texture can be accomplished using 2 Multiply ALUs and 2 Adder ALUs in an average time of 1 cycle per output pixel. The output from this sub-pixel translation 440 is fed to an adder 441 where it is added to ¼ 442 of the background texture value. Min and Max functions 444 are provided by the 2 adders not used for sub-pixel translation and the output written to a Sequential Write Iterator 445.

The time taken for this style of texture compositing is 1 cycle per pixel. There is no feedback, since 100% of the texture value is considered to have been applied to the background (even if clipping at 255 occurred). There is therefore no requirement for processing the channels in any particular order.

Average Height Algorithm

In this texture application algorithm, the average height under the tile is computed, and each pixel's height is compared to the average height. If the pixel's height is less than the average, the stroke height is added to the background height. If the pixel's height is greater than or equal to the average, then the stroke height is added to the average height. Thus background peaks thin the stroke. The height is constrained to increase by a minimum amount to prevent the background from thinning the stroke application to 0 (the minimum amount can be 0 however). The height is also clipped at 255 due to the 8-bit resolution of the texture channel.

There can be feedback of the difference in texture applied versus the expected amount applied. The feedback amount can be used as a scale factor in the application of the tile's color.

In both cases, the average texture is provided by software, calculated by performing a bi-level interpolation on a scaled version of the texture map. Software determines the next tile's average texture height while the current tile is being applied. Software must also provide the minimum thickness for addition, which is typically constant for the entire tiling process.

Without Feedback

Figure 109:
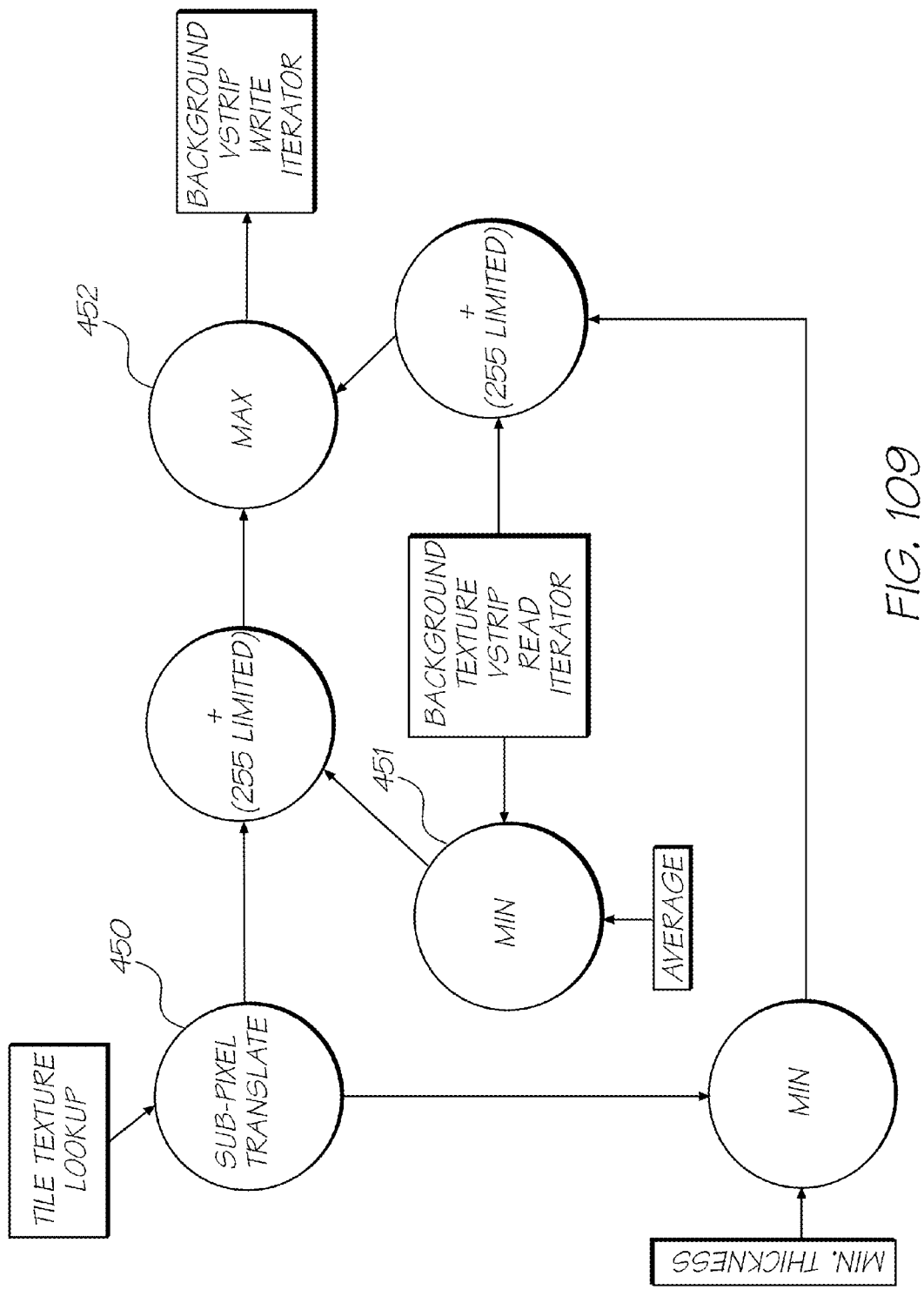
FIG. 109 illustrates the process of applying a texture without feedback.

With no feedback, the texture is simply applied to the background texture, as shown in FIG. 109.

4 Sequential Iterators are required, which means that if the process can be pipelined for 1 cycle, the memory is fast enough to keep up.

Sub-pixel translation 450 of a tile's texture can be accomplished using 2 Multiply ALUs and 2 Adder ALUs in an average time of 1 cycle per output pixel. Each Min & Max function 451,452 requires a separate Adder ALU in order to complete the entire operation in 1 cycle. Since 2 are already used by the sub-pixel translation of the texture, there are not enough remaining for a 1 cycle average time.

The average time for processing 1 pixel's texture is therefore 2 cycles. Note that there is no feedback, and hence the color channel order of compositing is irrelevant.

With Feedback

Figure 110:
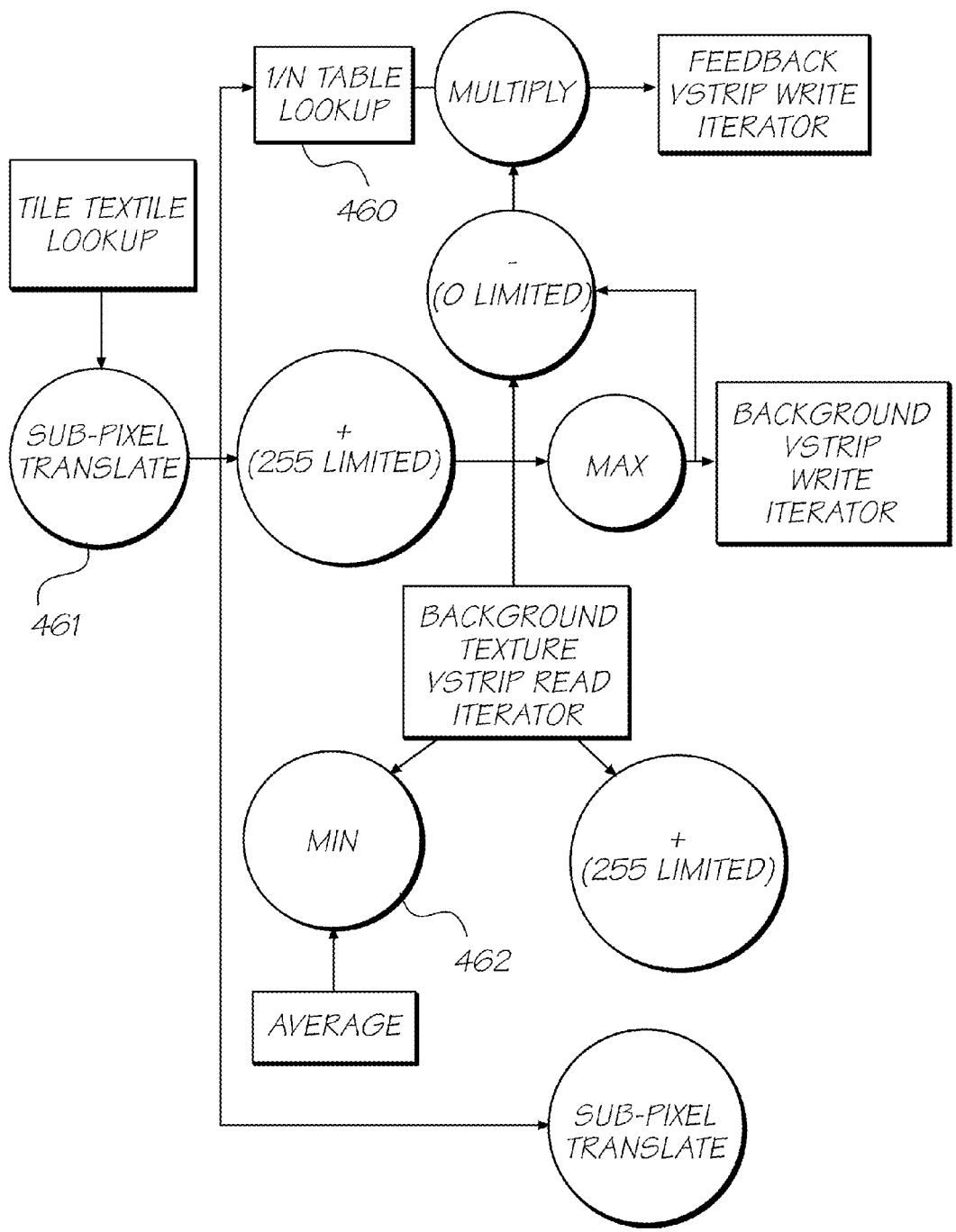
FIG. 110 illustrates the process of applying a texture with feedback.

This is conceptually the same as the case without feedback, except that in addition to the standard processing of the texture application algorithm, it is necessary to also record the proportion of the texture actually applied. The proportion can be used as a scale factor for subsequent compositing of the tile's color onto the background image. A flow diagram is illustrated in FIG. 110 and the following lookup table is used:

| Lookup | Size | Details |
| --- | --- | --- |
| LU$_1$ | 256 entries<br>16 bits per entry | 1/N<br>Table indexed by N (range 0-255)<br>Resultant 16 bits treated as fixed point 0:16 |

Each of the 256 entries in the software provided 1/N table 460 is 16 bits, thus requiring 16 cache lines to hold continuously.

Sub-pixel translation 461 of a tile's texture can be accomplished using 2 Multiply ALUs and 2 Adder ALUs in an average time of 1 cycle per output pixel. Each Min 462 & Max 463 function requires a separate Adder ALU in order to complete the entire operation in 1 cycle. Since 2 are already used by the sub-pixel translation of the texture, there are not enough remaining for a 1 cycle average time.

The average time for processing 1 pixel's texture is therefore 2 cycles. Sufficient space must be allocated for the feedback data area (a tile sized image channel). The texture must be applied before the tile's color is applied, since the feedback is used in scaling the tile's opacity.

CCD Image Interpolator

Figure 111:
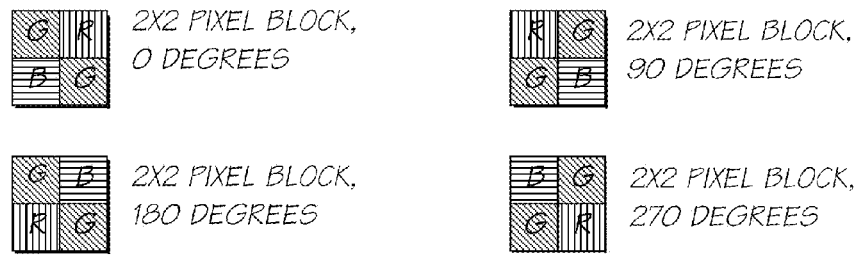
FIG. 111 illustrates the process of rotation of CCD pixels.

Images obtained from the CCD via the ISI 83 (FIG. 3) are 750×500 pixels. When the image is captured via the ISI, the orientation of the camera is used to rotate the pixels by 0, 90, 180, or 270 degrees so that the top of the image corresponds to 'up'. Since every pixel only has an R, G, or B color component (rather than all 3), the fact that these have been rotated must be taken into account when interpreting the pixel values. Depending on the orientation of the camera, each 2×2 pixel block has one of the configurations illustrated in FIG. 111:

Several processes need to be performed on the CCD captured image in order to transform it into a useful form for processing:

Up-interpolation of low-sample rate color components in CCD image (interpreting correct orientation of pixels)
Color Conversion from RGB to the Internal Color Space
Scaling of the internal space image from 750×500 to 1500× 1000.
Writing out the image in a planar format The entire channel of an image is required to be available at the same time in order to allow warping. In a low memory model (8 MB), there is only enough space to hold a single channel at full resolution as a temporary object. Thus the color conversion is to a single color channel. The limiting factor on the process is the color conversion, as it involves tri-linear interpolation from RGB to the internal color space, a process that takes 0.026 ns per channel (750×500×7 cycles per pixel×10 ns per cycle=26,250,000 ns).

It is important to perform the color conversion before scaling of the internal color space image as this reduces the number of pixels scaled (and hence the overall process time) by a factor of 4.

The requirements for all of the transformations may not fit in the ALU scheme. The transformations are therefore broken into two phases:

Phase 1: Up-Interpolation of Low-Sample Rate Color Components in CCD Image (Interpreting Correct Orientation of Pixels)
Color Conversion from RGB to the Internal Color Space
Writing Out the Image in a Planar Format
Phase 2: Scaling of the Internal Space Image from 750×500 to 1500×1000

Separating out the scale function implies that the small color converted image must be in memory at the same time as the large one. The output from Phase 1 (0.5 MB) can be safely written to the memory area usually kept for the image pyramid (1 MB). The output from Phase 2 can be the general expanded CCD image. Separation of the scaling also allows the scaling to be accomplished by the Affine Transform, and also allows for a different CCD resolution that may not be a simple 1:2 expansion.

Phase 1: Up-Interpolation of Low-Sample Rate Color Components.

Each of the 3 color components (R, G, and B) needs to be up interpolated in order for color conversion to take place for a given pixel. We have 7 cycles to perform the interpolation per pixel since the color conversion takes 7 cycles.

Figure 112:
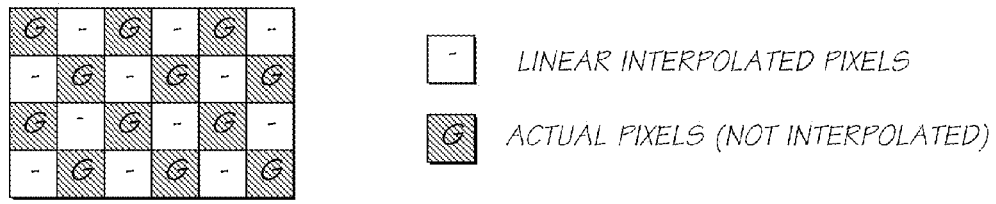
FIG. 112 illustrates the process of interpolation of Green subpixels.
Figure 113:
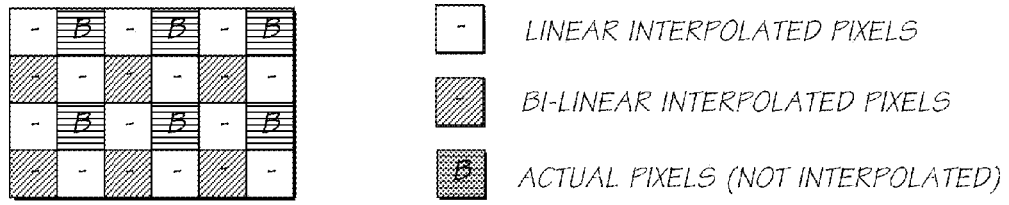
FIG. 113 illustrates the process of interpolation of Blue subpixels.
Figure 114:
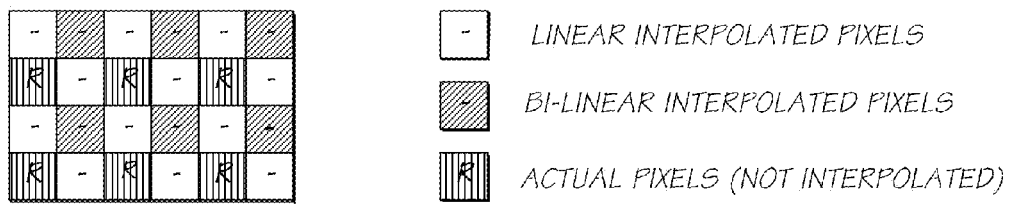
FIG. 114 illustrates the process of interpolation of Red subpixels.

Interpolation of G is straightforward and is illustrated in FIG. 112. Depending on orientation, the actual pixel value G alternates between odd pixels on odd lines & even pixels on even lines, and odd pixels on even lines & even pixels on odd lines. In both cases, linear interpolation is all that is required. Interpolation of R and B components as illustrated in FIG. 113 and FIG. 113, is more complicated, since in the horizontal and vertical directions, as can be seen from the diagrams, access to 3 rows of pixels simultaneously is required, so 3 Sequential Read Iterators are required, each one offset by a single row. In addition, we have access to the previous pixel on the same row via a latch for each row.

Each pixel therefore contains one component from the CCD, and the other 2 up-interpolated. When one component is being bi-linearly interpolated, the other is being linearly interpolated. Since the interpolation factor is a constant 0.5, interpolation can be calculated by an add and a shift 1 bit right (in 1 cycle), and bi-linear interpolation of factor 0.5 can be calculated by 3 adds and a shift 2 bits right (3 cycles). The total number of cycles required is therefore 4, using a single multiply ALU.

Figure 115:
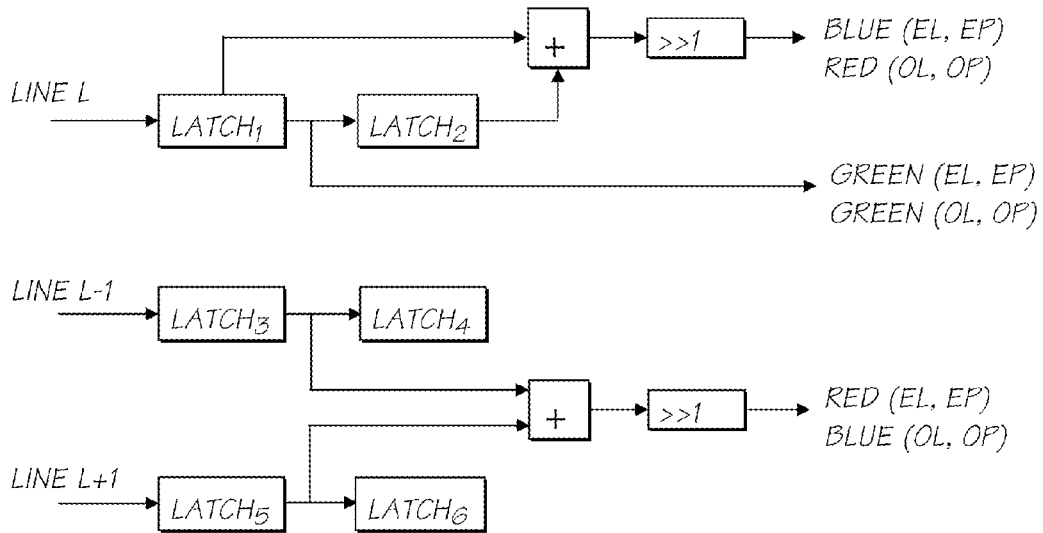
FIG. 115 illustrates the process of CCD pixel interpolation with 0 degree rotation for odd pixel lines.
Figure 116:
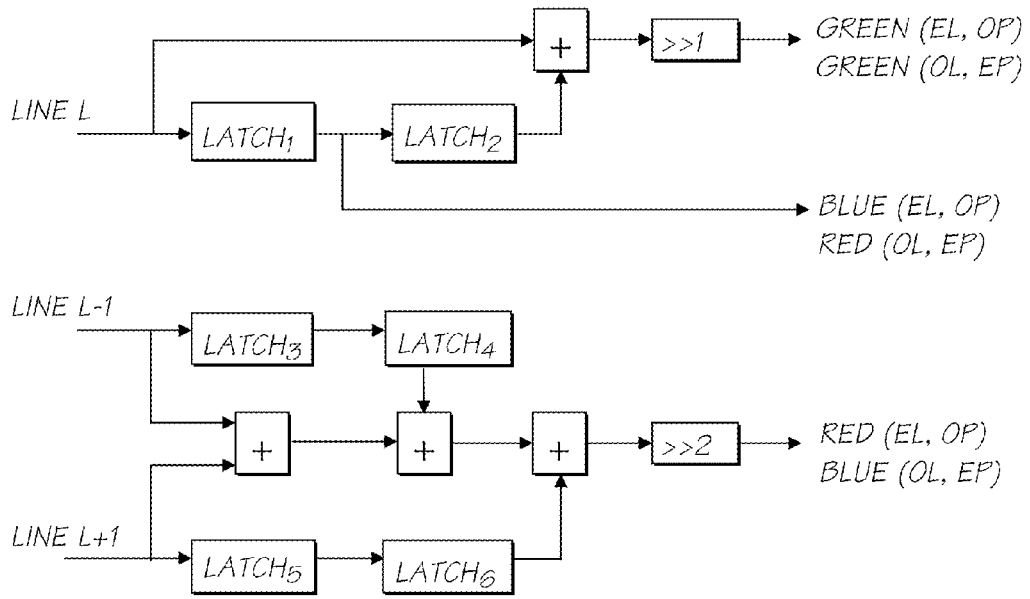
FIG. 116 illustrates the process of CCD pixel interpolation with 0 degree rotation for even pixel lines.

FIG. 115 illustrates the case for rotation 0 even line even pixel (EL, EP), and odd line odd pixel (OL, OP) and FIG. 116 illustrates the case for rotation 0 line odd pixel (EL, OP), and odd line even pixel (OL, EP). The other rotations are simply different forms of these two expressions.

Color Conversion

Figure 117:
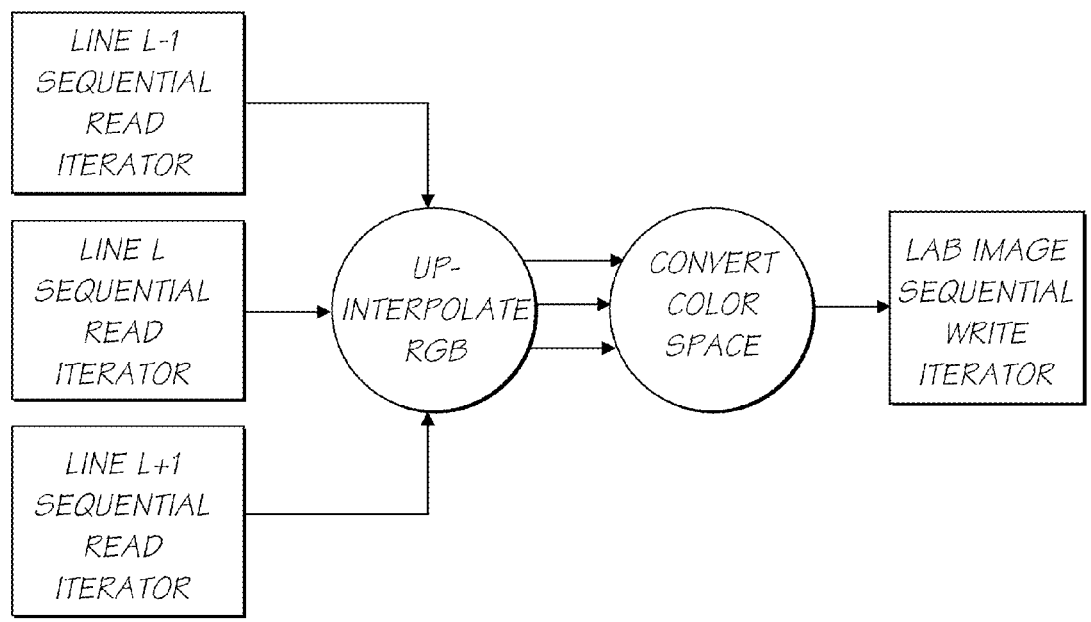
FIG. 117 illustrates the process of color conversion to Lab color space.
Figure 118:
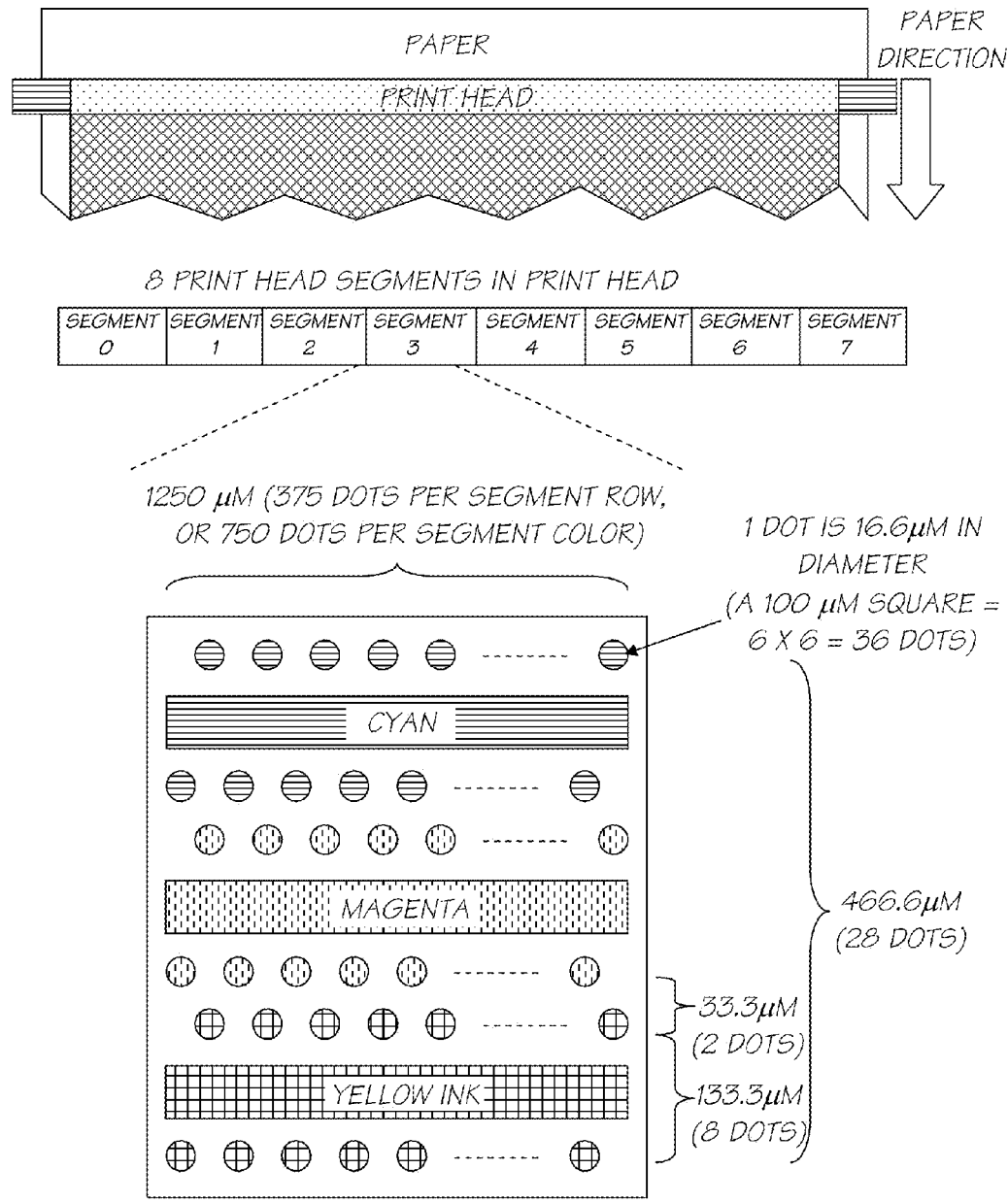
FIG. 118 illustrates the logical layout of a single printhead.

Color space conversion from RGB to Lab is achieved using the same method as that described in the general Color Space Convert function, a process that takes 8 cycles per pixel. Phase 1 processing can be described with reference to FIG. 117.

The up-interpolate of the RGB takes 4 cycles (1 Multiply ALU), but the conversion of the color space takes 8 cycles per pixel (2 Multiply ALUs) due to the lookup transfer time.

Phase 2

Scaling the Image

This phase is concerned with up-interpolating the image from the CCD resolution (750×500) to the working photo resolution (1500×1000). Scaling is accomplished by running the Affine transform with a scale of 1:2. The timing of a general affine transform is 2 cycles per output pixel, which in this case means an elapsed scaling time of 0.03 seconds.

Print Head 44

FIG. 153 illustrates the logical layout of a single print Head which logically consists of 8 segments, each printing bi-level cyan, magenta, and yellow onto a portion of the page.

Loading a Segment for Printing

Before anything can be printed, each of the 8 segments in the Print Head must be loaded with 6 rows of data corresponding to the following relative rows in the final output image:

Row 0=Line N, Yellow, even dots 0, 2, 4, 6, 8, . . . .
Row 1=Line N+8, Yellow, odd dots 1, 3, 5, 7, . . . .
Row 2=Line N+10, Magenta, even dots 0, 2, 4, 6, 8, . . . .
Row 3=Line N+18, Magenta, odd dots 1, 3, 5, 7, . . . .
Row 4=Line N+20, Cyan, even dots 0, 2, 4, 6, 8, . . . .
Row 5=Line N+28, Cyan, odd dots 1, 3, 5, 7, . . . .

Each of the segments prints dots over different parts of the page. Each segment prints 750 dots of one color, 375 even dots on one row, and 375 odd dots on another. The 8 segments have dots corresponding to positions:

| Segment | First dot | Last dot |
|---|---|---|
| 0 | 0 | 749 |
| 1 | 750 | 1499 |
| 2 | 1500 | 2249 |
| 3 | 2250 | 2999 |
| 4 | 3000 | 3749 |
| 5 | 3750 | 4499 |
| 6 | 4500 | 5249 |
| 7 | 5250 | 5999 |

Each dot is represented in the Print Head segment by a single bit. The data must be loaded 1 bit at a time by placing the data on the segment's BitValue pin, and clocked in to a shift register in the segment according to a BitClock. Since the data is loaded into a shift register, the order of loading bits must be correct. Data can be clocked in to the Print Head at a maximum rate of 10 MHz.

Once all the bits have been loaded, they must be transferred in parallel to the Print Head output buffer, ready for printing. The transfer is accomplished by a single pulse on the segment's ParallelXferClock pin.

Controlling the Print

In order to conserve power, not all the dots of the Print Head have to be printed simultaneously. A set of control lines enables the printing of specific dots. An external controller, such as the ACP, can change the number of dots printed at once, as well as the duration of the print pulse in accordance with speed and/or power requirements.

Each segment has 5 NozzleSelect lines, which are decoded to select 32 sets of nozzles per row. Since each row has 375 nozzles, each set contains 12 nozzles. There are also 2 BankEnable lines, one for each of the odd and even rows of color. Finally, each segment has 3 ColorEnable lines, one for each of C, M, and Y colors. A pulse on one of the ColorEnable lines causes the specified nozzles of the color's specified rows to be printed. A pulse is typically about 2 s in duration.

If all the segments are controlled by the same set of NozzleSelect, BankEnable and ColorEnable lines (wired externally to the print head), the following is true:

If both odd and even banks print simultaneously (both BankEnable bits are set), 24 nozzles fire simultaneously per segment, 192 nozzles in all, consuming 5.7 Watts.

If odd and even banks print independently, only 12 nozzles fire simultaneously per segment, 96 in all, consuming 2.85 Watts.

Print Head Interface 62

The Print Head Interface 62 connects the ACP to the Print Head, providing both data and appropriate signals to the external Print Head. The Print Head Interface 62 works in conjunction with both a VLIW processor 74 and a software algorithm running on the CPU in order to print a photo in approximately 2 seconds.

An overview of the inputs and outputs to the Print Head Interface is shown in FIG. 119. The Address and Data Buses are used by the CPU to address the various registers in the Print Head Interface. A single BitClock output line connects to all 8 segments on the print head. The 8 DataBits lines lead one to each segment, and are clocked in to the 8 segments on the print head simultaneously (on a BitClock pulse). For example, dot 0 is transferred to segment$_0$, dot 750 is transferred to segment$_1$, dot 1500 to segment$_2$ etc. simultaneously.

The VLIW Output FIFO contains the dithered bi-level C, M, and Y 6000×9000 resolution print image in the correct order for output to the 8 DataBits. The ParallelXferClock is connected to each of the 8 segments on the print head, so that on a single pulse, all segments transfer their bits at the same time. Finally, the NozzleSelect, BankEnable and ColorEnable lines are connected to each of the 8 segments, allowing the Print Head Interface to control the duration of the C, M, and Y drop pulses as well as how many drops are printed with each pulse. Registers in the Print Head Interface allow the specification of pulse durations between 0 and 6 μs, with a typical duration of 2 μs.

Printing an Image

There are 2 phases that must occur before an image is in the hand of the Artcam user:
 1. Preparation of the image to be printed
 2. Printing the prepared image Preparation of an image only needs to be performed once. Printing the image can be performed as many times as desired.

Prepare the Image

Preparing an image for printing involves:
 1. Convert the Photo Image into a Print Image
 2. Rotation of the Print Image (internal color space) to align the output for the orientation of the printer
 3. Up-interpolation of compressed channels (if necessary)
 4. Color conversion from the internal color space to the CMY color space appropriate to the specific printer and ink At the end of image preparation, a 4.5 MB correctly oriented 1000×1500 CMY image is ready to be printed.

Convert Photo Image to Print Image

The conversion of a Photo Image into a Print Image requires the execution of a Vark script to perform image processing. The script is either a default image enhancement script or a Vark script taken from the currently inserted Artcard. The Vark script is executed via the CPU, accelerated by functions performed by the VLIW Vector Processor.

Rotate the Print Image

The image in memory is originally oriented to be top upwards. This allows for straightforward Vark processing. Before the image is printed, it must be aligned with the print roll's orientation. The re-alignment only needs to be done once. Subsequent Prints of a Print Image will already have been rotated appropriately.

The transformation to be applied is simply the inverse of that applied during capture from the CCD when the user pressed the "Image Capture" button on the Artcam. If the original rotation was 0, then no transformation needs to take place. If the original rotation was +90 degrees, then the rotation before printing needs to be −90 degrees (same as 270 degrees). The method used to apply the rotation is the Vark accelerated Affine Transform function. The Affine Transform engine can be called to rotate each color channel independently. Note that the color channels cannot be rotated in place. Instead, they can make use of the space previously used for the expanded single channel (1.5 MB).

FIG. 120 shows an example of rotation of a Lab image where the a and b channels are compressed 4:1. The L channel is rotated into the space no longer required (the single channel area), then the a channel can be rotated into the space left vacant by L, and finally the b channel can be rotated. The total time to rotate the 3 channels is 0.09 seconds. It is an acceptable period of time to elapse before the first print image. Subsequent prints do not incur this overhead.

Up Interpolate and Color Convert

The Lab image must be converted to CMY before printing. Different processing occurs depending on whether the a and b channels of the Lab image is compressed. If the Lab image is compressed, the a and b channels must be decompressed before the color conversion occurs. If the Lab image is not compressed, the color conversion is the only necessary step. The Lab image must be up interpolated (if the a and b channels are compressed) and converted into a CMY image. A single VLIW process combining scale and color transform can be used.

The method used to perform the color conversion is the Vark accelerated Color Convert function. The Affine Transform engine can be called to rotate each color channel independently. The color channels cannot be rotated in place. Instead, they can make use of the space previously used for the expanded single channel (1.5 MB).

Print the Image

Printing an image is concerned with taking a correctly oriented 1000×1500 CMY image, and generating data and signals to be sent to the external Print Head. The process involves the CPU working in conjunction with a VLIW process and the Print Head Interface.

Figure 121:
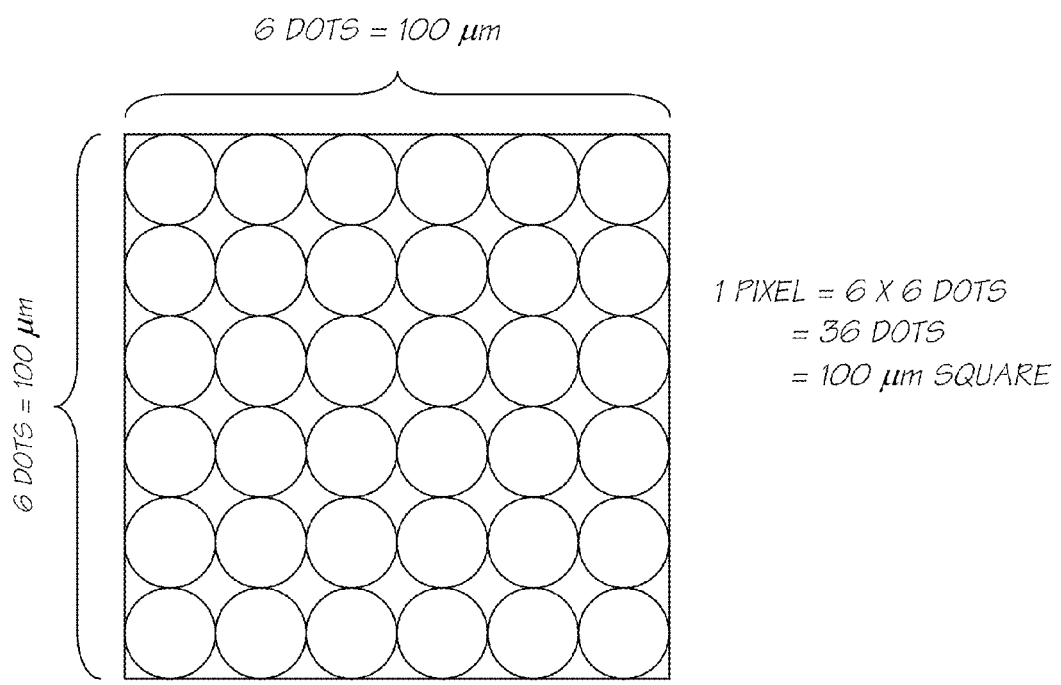
FIG. 121 illustrates the format of a pixel of the printed image.

The resolution of the image in the Artcam is 1000×1500. The printed image has a resolution of 6000×9000 dots, which makes for a very straightforward relationship: 1 pixel=6× 6=36 dots. As shown in FIG. 121 since each dot is 16.6 µm, the 6×6 dot square is 100 µm square. Since each of the dots is bi-level, the output must be dithered.

The image should be printed in approximately 2 seconds. For 9000 rows of dots this implies a time of 222 µs time between printing each row. The Print Head Interface must generate the 6000 dots in this time, an average of 37 ns per dot. However, each dot comprises 3 colors, so the Print Head Interface must generate each color component in approximately 12 ns, or 1 clock cycle of the ACP (10 ns at 100 MHz). One VLIW process is responsible for calculating the next line of 6000 dots to be printed. The odd and even C, M, and Y dots are generated by dithering input from 6 different 1000×1500 CMY image lines. The second VLIW process is responsible for taking the previously calculated line of 6000 dots, and correctly generating the 8 bits of data for the 8 segments to be transferred by the Print Head Interface to the Print Head in a single transfer.

A CPU process updates registers in the first VLIW process 3 times per print line (once per color component=27000 times in 2 seconds0, and in the 2nd VLIW process once every print line (9000 times in 2 seconds). The CPU works one line ahead of the VLIW process in order to do this.

Finally, the Print Head Interface takes the 8 bit data from the VLIW Output FIFO, and outputs it unchanged to the Print Head, producing the BitClock signals appropriately. Once all the data has been transferred a ParallelXferClock signal is generated to load the data for the next print line. In conjunction with transferring the data to the Print Head, a separate timer is generating the signals for the different print cycles of the Print Head using the NozzleSelect, ColorEnable, and BankEnable lines a specified by Print Head Interface internal registers.

The CPU also controls the various motors and guillotine via the parallel interface during the print process.

Generate C, M, and Y Dots

Figure 122:
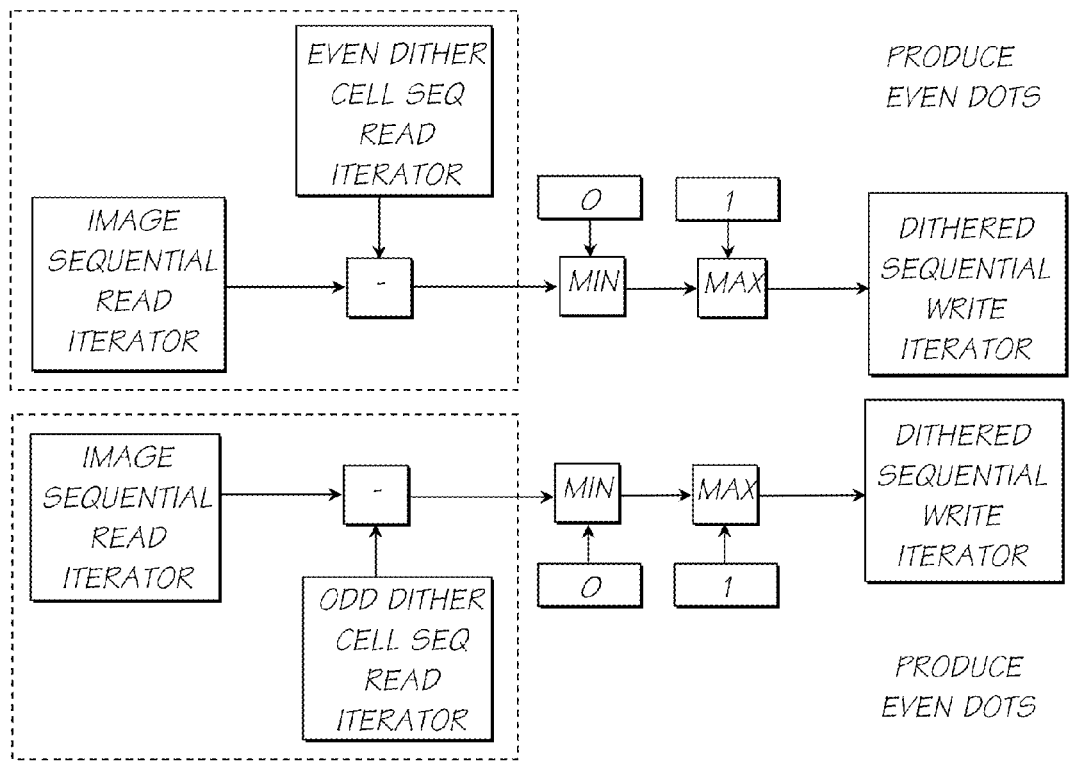
FIG. 122 illustrates the dithering process.

The input to this process is a 1000×1500 CMY image correctly oriented for printing. The image is not compressed in any way. As illustrated in FIG. 122, a VLIW microcode program takes the CMY image, and generates the C, M, and Y pixels required by the Print Head Interface to be dithered.

The process is run 3 times, once for each of the 3 color components. The process consists of 2 sub-processes run in parallel—one for producing even dots, and the other for producing odd dots. Each sub-process takes one pixel from the input image, and produces 3 output dots (since one pixel=6 output dots, and each sub-process is concerned with either even or odd dots). Thus one output dot is generated each cycle, but an input pixel is only read once every 3 cycles.

The original dither cell is a 64×64 cell, with each entry 8 bits. This original cell is divided into an odd cell and an even cell, so that each is still 64 high, but only 32 entries wide. The even dither cell contains original dither cell pixels 0, 2, 4 etc., while the odd contains original dither cell pixels 1, 3, 5 etc. Since a dither cell repeats across a line, a single 32 byte line of each of the 2 dither cells is required during an entire line, and can therefore be completely cached. The odd and even lines of a single process line are staggered 8 dot lines apart, so it is convenient to rotate the odd dither cell's lines by 8 lines. Therefore the same offset into both odd and even dither cells can be used. Consequently the even dither cell's line corresponds to the even entries of line L in the original dither cell, and the even dither cell's line corresponds to the odd entries of line L+8 in the original dither cell.

The process is run 3 times, once for each of the color components. The CPU software routine must ensure that the Sequential Read Iterators for odd and even lines are pointing to the correct image lines corresponding to the print heads. For example, to produce one set of 18,000 dots (3 sets of 6000 dots):

Yellow even dot line=0, therefore input Yellow image line=0/6=0

Yellow odd dot line=8, therefore input Yellow image line=8/6=1

Magenta even line=10, therefore input Magenta image line=10/6=1

Magenta odd line=18, therefore input Magenta image line=18/6=3

Cyan even line=20, therefore input Cyan image line=20/6=3

Cyan odd line=28, therefore input Cyan image line=28/6=4

Subsequent sets of input image lines are:

Y=[0, 1], M=[1, 3], C=[3, 4]
Y=[0, 1], M=[1, 3], C=[3, 4]
Y=[0, 1], M=[2, 3], C=[3, 5]
Y=[0, 1], M=[2, 3], C=[3, 5]
Y=[0, 2], M=[2, 3], C=[4, 5]

The dither cell data however, does not need to be updated for each color component. The dither cell for the 3 colors becomes the same, but offset by 2 dot lines for each component.

The Dithered Output is written to a Sequential Write Iterator, with odd and even dithered dots written to 2 separate outputs. The same two Write Iterators are used for all 3 color components, so that they are contiguous within the break-up of odd and even dots.

While one set of dots is being generated for a print line, the previously generated set of dots is being merged by a second VLIW process as described in the next section.

Generate Merged 8 Bit Dot Output

Figure 123:
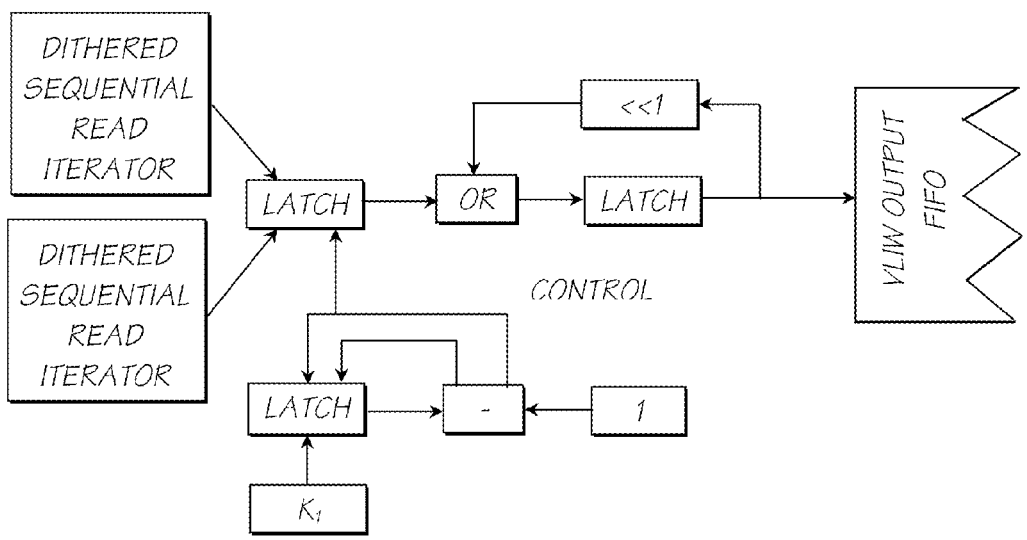
FIG. 123 illustrates the process of generating an 8 bit dot output.

This process, as illustrated in FIG. 123, takes a single line of dithered dots and generates the 8 bit data stream for output to the Print Head Interface via the VLIW Output FIFO. The process requires the entire line to have been prepared, since it requires semi-random access to most of the dithered line at once. The following constant is set by software:

| Constant | Value |
|---|---|
| $K_1$ | 375 |

The Sequential Read Iterators point to the line of previously generated dots, with the Iterator registers set up to limit access to a single color component. The distance between subsequent pixels is 375, and the distance between one line and the next is given to be 1 byte. Consequently 8 entries are read for each "line". A single "line" corresponds to the 8 bits to be loaded on the print head. The total number of "lines" in the image is set to be 375. With at least 8 cache lines assigned to the Sequential Read Iterator, complete cache coherence is maintained. Instead of counting the 8 bits, 8 Microcode steps count implicitly.

The generation process first reads all the entries from the even dots, combining 8 entries into a single byte which is then output to the VLIW Output FIFO. Once all 3000 even dots have been read, the 3000 odd dots are read and processed. A software routine must update the address of the dots in the odd and even Sequential Read Iterators once per color component, which equates to 3 times per line. The two VLIW processes require all 8 ALUs and the VLIW Output FIFO. As long as the CPU is able to update the registers as described in the two processes, the VLIW processor can generate the dithered image dots fast enough to keep up with the printer.

Data Card Reader

Figure 124:
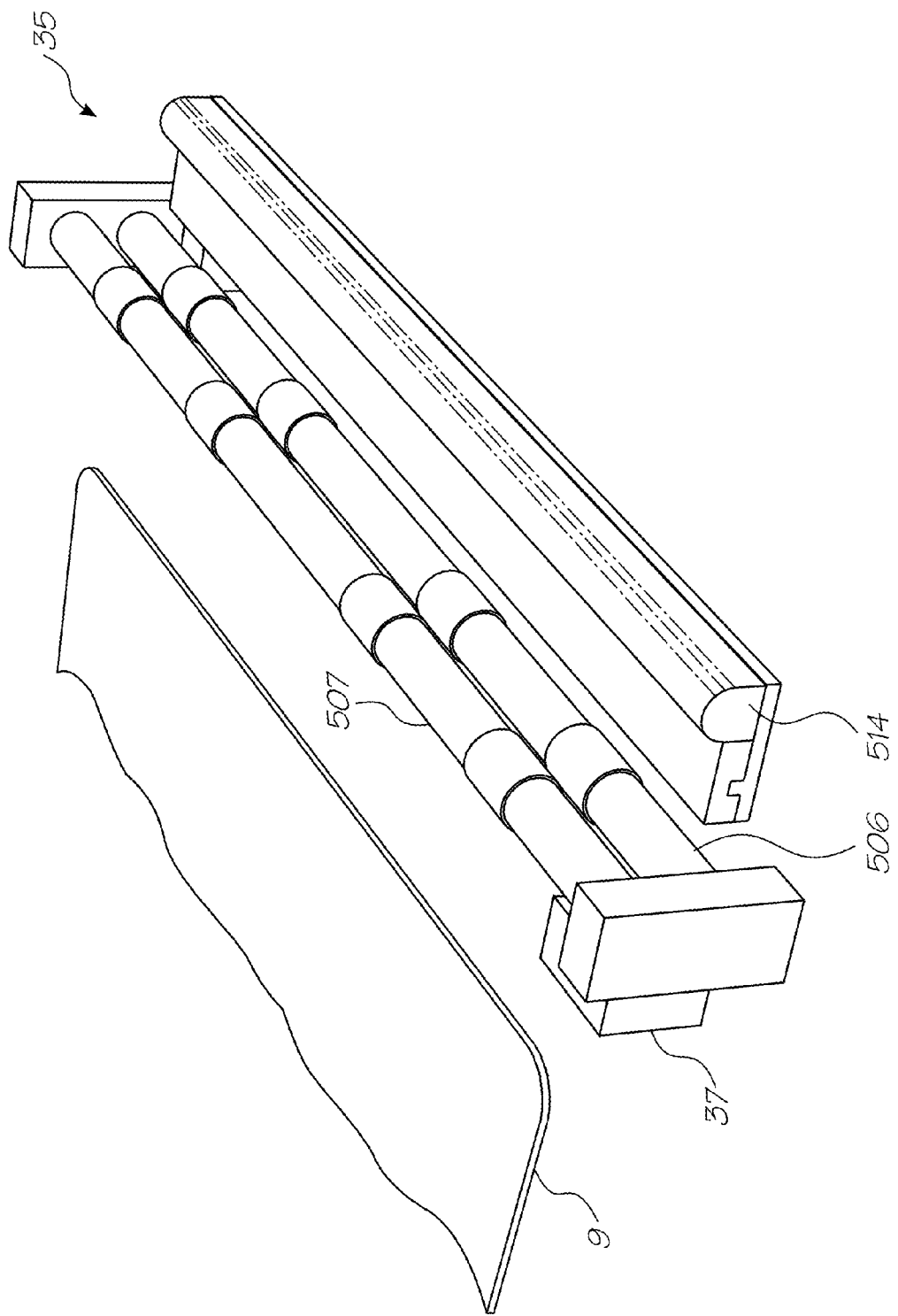
FIG. 124 illustrates a perspective view of the card reader.

FIG. 124, there is illustrated on form of card reader 500 which allows for the insertion of Artcards 9 for reading. FIG. 123 shows an exploded perspective of the reader of FIG. 124. Cardreader is interconnected to a computer system and includes a CCD reading mechanism 35. The cardreader includes pinch rollers 506, 507 for pinching an inserted Artcard 9. One of the roller e.g. 506 is driven by an Artcard motor 37 for the advancement of the card 9 between the two rollers 506 and 507 at a uniformed speed. The Artcard 9 is passed over a series of LED lights 512 which are encased within a clear plastic mould 514 having a semi circular cross section. The cross section focuses the light from the LEDs eg 512 onto the surface of the card 9 as it passes by the LEDs 512. From the surface it is reflected to a high resolution linear CCD 34 which is constructed to a resolution of approximately 480 dpi. The surface of the Artcard 9 is encoded to the level of approximately 1600 dpi hence, the linear CCD 34 supersamples the Artcard surface with an approximately three times multiplier. The Artcard 9 is further driven at a speed such that the linear CCD 34 is able to supersample in the direction of Artcard movement at a rate of approximately 4800 readings per inch. The scanned Artcard CCD data is forwarded from the Artcard reader to ACP 31 for processing. A sensor 49, which can comprise a light sensor acts to detect of the presence of the card 13.

The CCD reader includes a bottom substrate 516, a top substrate 514 which comprises a transparent molded plastic. In between the two substrates is inserted the linear CCD array 34 which comprises a thin long linear CCD array constructed by means of semi-conductor manufacturing processes.

Figure 125:
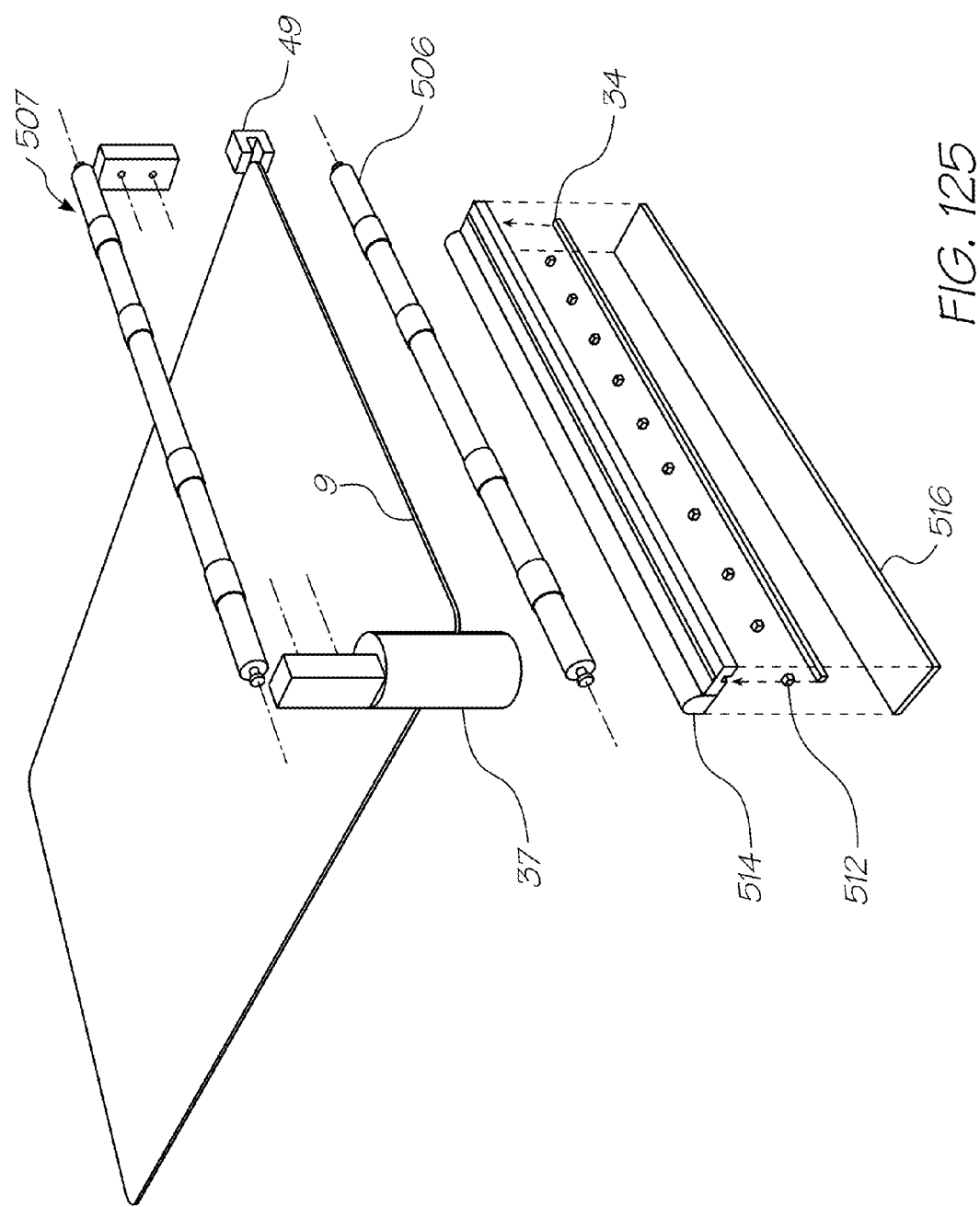
FIG. 125 illustrates an exploded perspective of a card reader.
Figure 126:
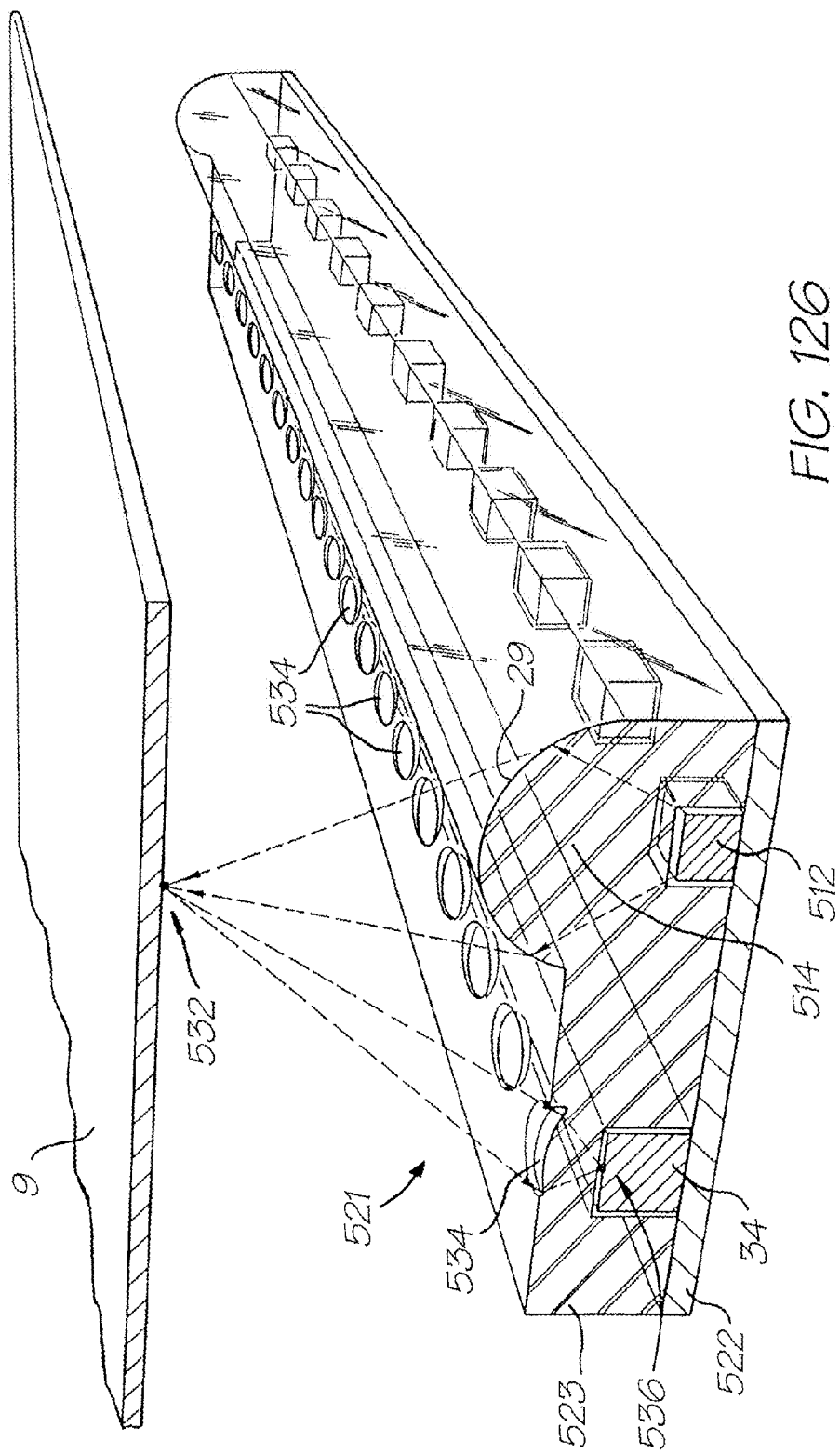
FIG. 126 illustrates a close up view of the Artcard reader.

Turning to FIG. 125, there is illustrated a side perspective view, partly in section, of an example construction of the CCD reader unit. The series of LEDs eg. 512 are operated to emit light when a card 9 is passing across the surface of the CCD reader 34. The emitted light is transmitted through a portion of the top substrate 523. The substrate includes a portion eg. 529 having a curved circumference so as to focus light emitted from LED 512 to a point eg. 532 on the surface of the card 9. The focused light is reflected from the point 532 towards the CCD array 34. A series of microlenses eg. 534, shown in exaggerated form, are formed on the surface of the top substrate 523. The microlenses 523 act to focus light received across the surface to the focused down to a point 536 which corresponds to point on the surface of the CCD reader 34 for sensing of light falling on the light sensing portion of the CCD array 34.

A number of refinements of the above arrangement are possible. For example, the sensing devices on the linear CCD 34 may be staggered. The corresponding microlenses 34 can also be correspondingly formed as to focus light into a staggered series of spots so as to correspond to the staggered CCD sensors.

To assist reading, the data surface area of the Artcard 9 is modulated with a checkerboard pattern as previously discussed with reference to FIG. 38. Other forms of high frequency modulation may be possible however.

It will be evident that an Artcard printer can be provided as for the printing out of data on storage Artcard. Hence, the Artcard system can be utilized as a general form of information distribution outside of the Artcam device. An Artcard printer can prints out Artcards on high quality print surfaces and multiple Artcards can be printed on same sheets and later separated. On a second surface of the Artcard 9 can be printed information relating to the files etc. stored on the Artcard 9 for subsequent storage.

Hence, the Artcard system allows for a simplified form of storage which is suitable for use in place of other forms of storage such as CD ROMs, magnetic disks etc. The Artcards 9 can also be mass produced and thereby produced in a substantially inexpensive form for redistribution.

Software Modules—Artcam Application 902

The Artcam Application implements the high-level functionality of the Artcam device. This normally involves capturing an image, applying an artistic effect to the image, and then printing the image. In a camera-oriented Artcam device, the image is captured via the Camera Manager 903. In a printer-oriented Artcam device, the image is captured via the Network Manager 904, perhaps as the result of the image being "squirted" by another device.

Artistic effects are found within the unified file system managed by the File Manager 905. An artistic effect consist of a script file and a set of resources. The script is interpreted and applied to the image via the Image Processing Manager 906. Scripts are normally shipped on ArtCards known as Artcards. By default the application uses the script contained on the currently mounted Artcard.

The image is printed via the Printer Manager 908.

When the Artcam device starts up, the bootstrap process starts the various manager processes before starting the application. This allows the application to immediately request services from the various managers when it starts.

On initialization the application 902 registers itself as the handler for the events listed below. When it receives an event, it performs the action described in the table.

| User interface event | Action |
|---|---|
| Lock Focus | Perform any automatic pre-capture setup via the Camera Manager. This includes auto-focussing, auto-adjusting exposure, and charging the flash. This is normally initiated by the user pressing the Take button halfway. |
| Take | Capture an image via the Camera Manager. |
| Self-Timer | Capture an image in self-timed mode via the Camera Manager. |
| Flash Mode | Update the Camera Manager to use the next flash mode. Update the Status Display to show the new flash mode. |
| Print | Print the current image via the Printer Manager. Apply an artistic effect to the image via the Image Processing Manager if there is a current script. Update the remaining prints count on the Status Display (see Print Roll Inserted below). |
| Hold | Apply an artistic effect to the current image via the Image Processing Manager if there is a current script, but don't print the image. |
| Eject ArtCards | Eject the currently inserted ArtCards via the File Manager. |
| Print Roll Inserted | Calculate the number of prints remaining based on the Print Manager's remaining media length and the Camera Manager's aspect ratio. Update the remaining prints count on the Status display. |
| Print Roll Removed | Update the Status Display to indicate there is no print roll present. |

Where the camera includes a display, the application also constructs a graphical user interface via the User Interface Manager 910 which allows the user to edit the current date and time, and other editable camera parameters. The application saves all persistent parameters in flash memory.

Real-Time Microkernel 911

The Real-Time Microkernel schedules processes preemptively on the basis of interrupts and process priority. It provides integrated inter-process communication and timer services, as these are closely tied to process scheduling. All other operating system functions are implemented outside the microkernel.

Camera Manager 903

The Camera Manager provides image capture services. It controls the camera hardware embedded in the Artcam. It provides an abstract camera control interface which allows camera parameters to be queried and set, and images captured. This abstract interface decouples the application from details of camera implementation. The Camera Manager utilizes the following input/output parameters and commands:

| output parameters | domains |
|---|---|
| focus range | real, real |
| zoom range | real, real |
| aperture range | real, real |
| shutter speed range | real, real |

| input parameters | domains |
|---|---|
| focus | real |
| zoom | real |
| aperture | real |
| shutter speed | real |
| aspect ratio | classic, HDTV, panoramic |
| focus control mode | multi-point auto, single-point auto, manual |
| exposure control mode | auto, aperture priority, shutter priority, manual |
| flash mode | auto, auto with red-eye removal, fill, off |
| view scene mode | on, off |

| commands | return value domains |
|---|---|
| Lock Focus | none |
| Self-Timed Capture | Raw Image |
| Capture Image | Raw Image |

Figure 128:
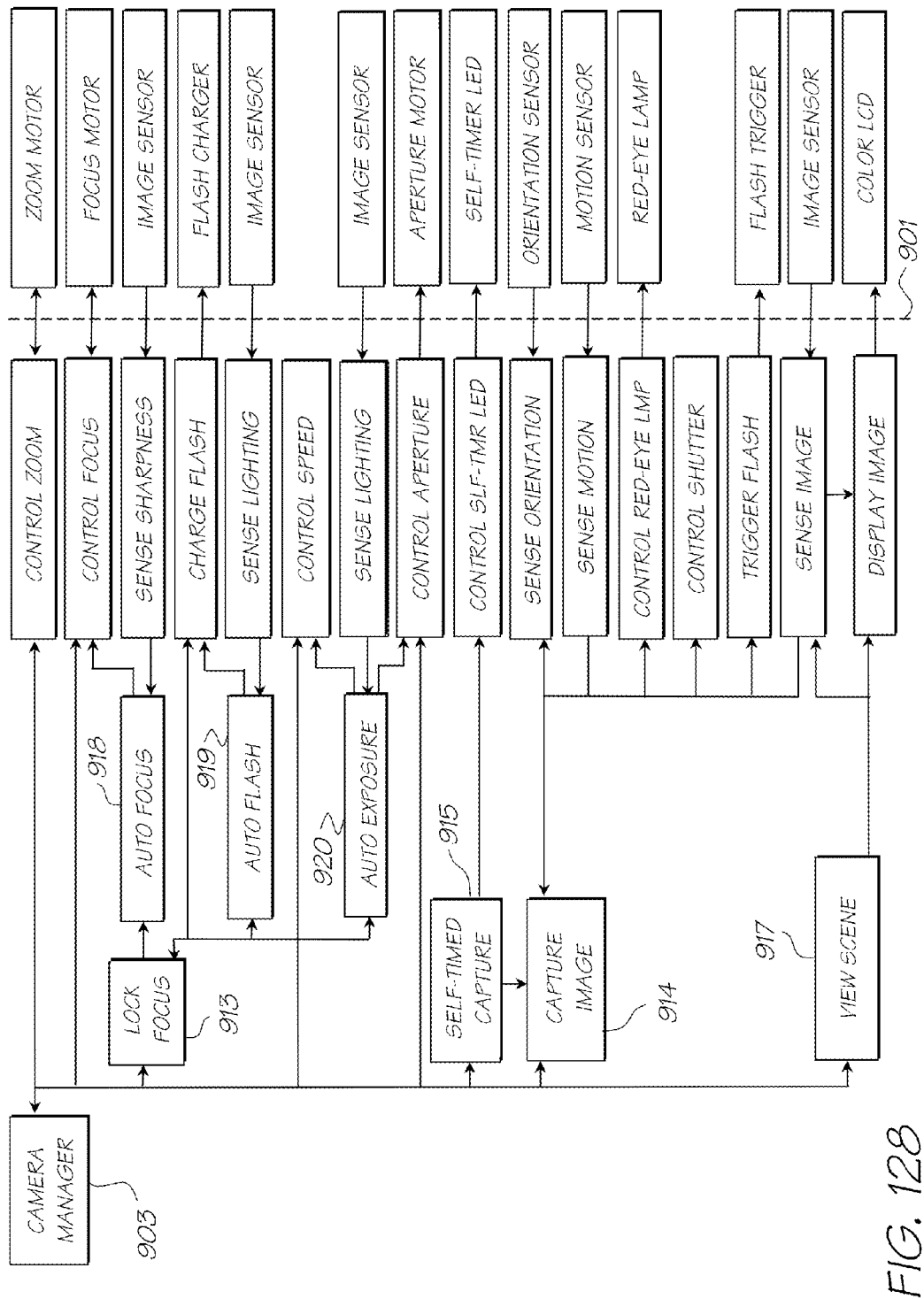
FIG. 128 illustrates a layout of the software/hardware modules of the Camera Manager.

The Camera Manager runs as an asynchronous event-driven process. It contains a set of linked state machines, one for each asynchronous operation. These include auto focussing, charging the flash, counting down the self-timer, and capturing the image. On initialization the Camera Manager sets the camera hardware to a known state. This includes setting a normal focal distance and retracting the zoom. The software structure of the Camera Manager is illustrated in FIG. 128. The software components are described in the following subsections:

Lock Focus 913

Lock Focus automatically adjusts focus and exposure for the current scene, and enables the flash if necessary, depending on the focus control mode, exposure control mode and flash mode. Lock Focus is normally initiated in response to the user pressing the Take button halfway. It is part of the normal image capture sequence, but may be separated in time from the actual capture of the image, if the user holds the take button halfway depressed. This allows the user to do spot focusing and spot metering.

Capture Image 914

Capture Image captures an image of the current scene. It lights a red-eye lamp if the flash mode includes red-eye removal, controls the shutter, triggers the flash if enabled, and senses the image through the image sensor. It determines the orientation of the camera, and hence the captured image, so that the image can be properly oriented during later image processing. It also determines the presence of camera motion during image capture, to trigger deblurring during later image processing.

Self-Timed Capture 915

Self-Timed Capture captures an image of the current scene after counting down a 20 s timer. It gives the user feedback during the countdown via the self-timer LED. During the first 15 s it can light the LED. During the last 5 s it flashes the LED.

View Scene 917

View Scene periodically senses the current scene through the image sensor and displays it on the color LCD, giving the user an LCD-based viewfinder.

Auto Focus 918

Auto Focus changes the focal length until selected regions of the image are sufficiently sharp to signify that they are in focus. It assumes the regions are in focus if an image sharpness metric derived from specified regions of the image sensor is above a fixed threshold. It finds the optimal focal length by performing a gradient descent on the derivative of sharpness by focal length, changing direction and stepsize as required. If the focus control mode is multi point auto, then three regions are used, arranged horizontally across the field of view. If the focus control mode is single-point auto, then one region is used, in the center of the field of view. Auto Focus works within the available focal length range as indicated by the focus controller. In fixed-focus devices it is therefore effectively disabled.

Auto Flash 919

Auto Flash determines if scene lighting is dim enough to require the flash. It assumes the lighting is dim enough if the scene lighting is below a fixed threshold. The scene lighting is obtained from the lighting sensor, which derives a lighting metric from a central region of the image sensor. If the flash is required, then it charges the flash.

Auto Exposure 920

The combination of scene lighting, aperture, and shutter speed determine the exposure of the captured image. The desired exposure is a fixed value. If the exposure control mode is auto, Auto Exposure determines a combined aperture and shutter speed which yields the desired exposure for the given scene lighting. If the exposure control mode is aperture priority, Auto Exposure determines a shutter speed which yields the desired exposure for the given scene lighting and current aperture. If the exposure control mode is shutter priority, Auto Exposure determines an aperture which yields the desired exposure for the given scene lighting and current shutter speed. The scene lighting is obtained from the lighting sensor, which derives a lighting metric from a central region of the image sensor.

Auto Exposure works within the available aperture range and shutter speed range as indicated by the aperture controller and shutter speed controller. The shutter speed controller and shutter controller hide the absence of a mechanical shutter in most Artcam devices.

If the flash is enabled, either manually or by Auto Flash, then the effective shutter speed is the duration of the flash, which is typically in the range $\frac{1}{1000}$ s to $\frac{1}{10000}$ s.

Figure 127:
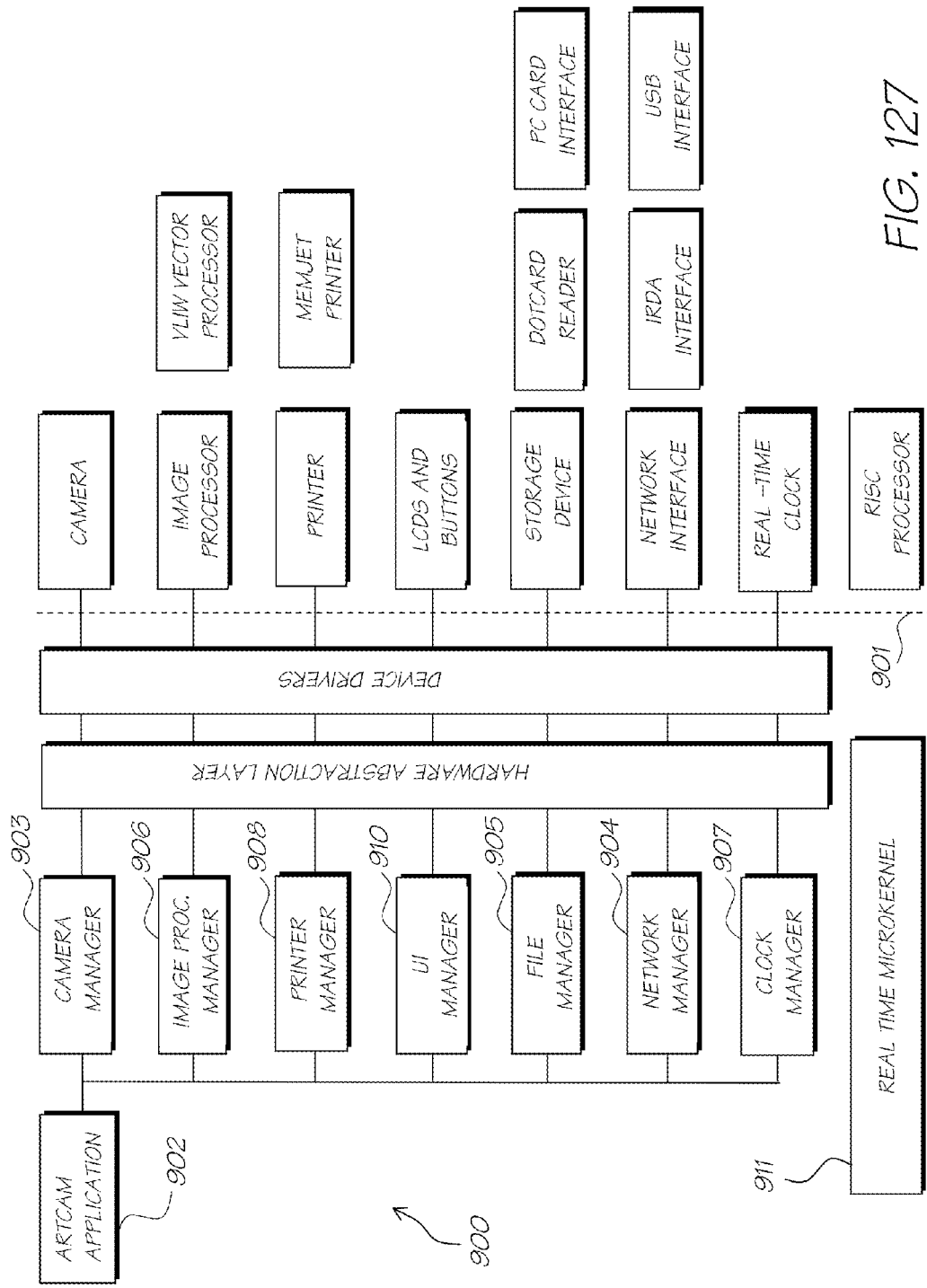
FIG. 127 illustrates a layout of the software/hardware modules of the overall Artcam application.

Image Processing Manager 906 (FIG. 127

Figure 129:
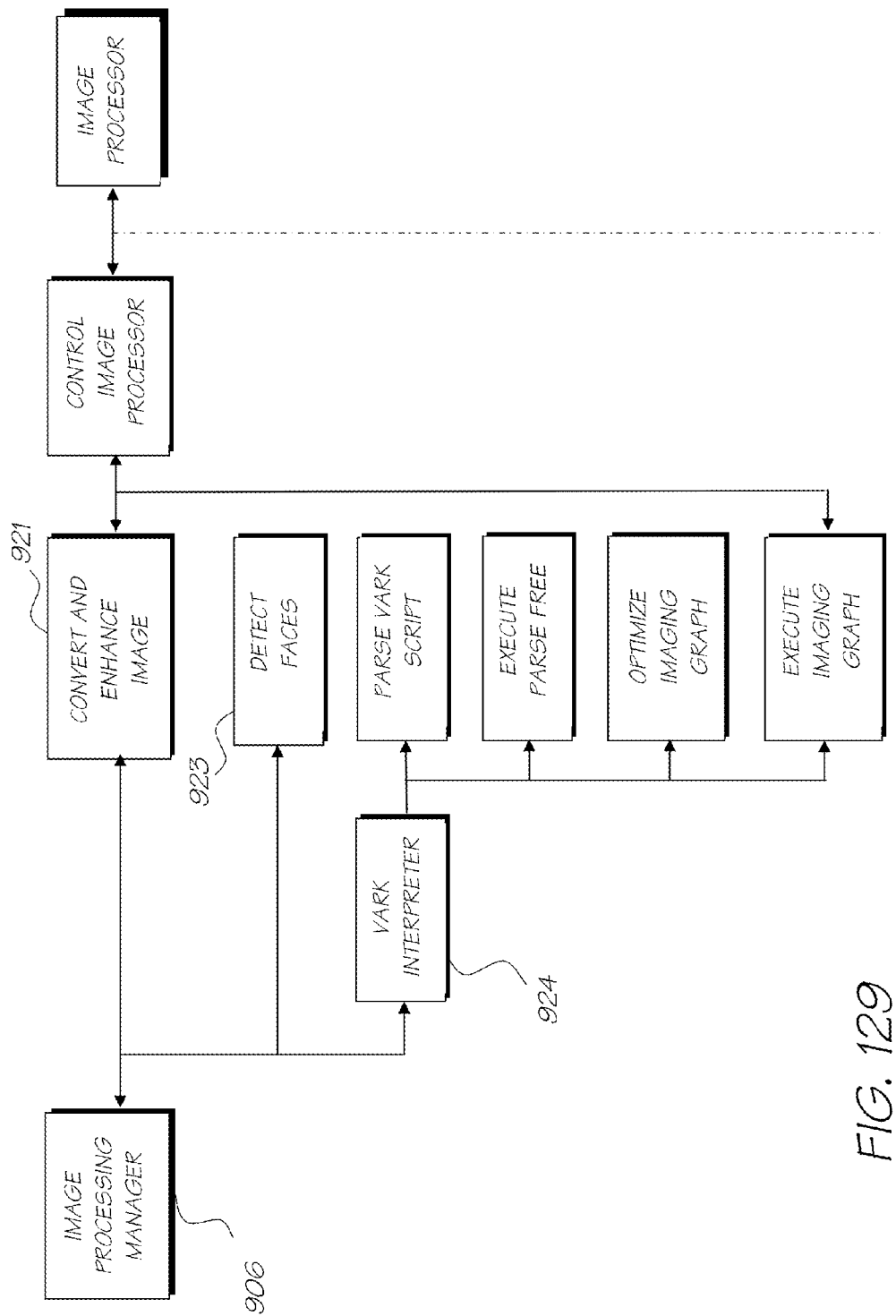
FIG. 129 illustrates a layout of the software/hardware modules of the Image Processing Manager.

The Image Processing Manager provides image processing and artistic effects services. It utilises the VLIW Vector Processor embedded in the Artcam to perform high-speed image processing. The Image Processing Manager contains an interpreter for scripts written in the Vark image processing language. An artistic effect therefore consists of a Vark script file and related resources such as fonts, clip images etc. The software structure of the Image Processing Manager is illustrated in more detail in FIG. 129 and include the following modules:

Convert and Enhance Image 921

The Image Processing Manager performs image processing in the device-independent CIE LAB color space, at a resolution which suits the reproduction capabilities of the Artcam printer hardware. The captured image is first enhanced by filtering out noise. It is optionally processed to remove motion-induced blur. The image is then converted from its device-dependent RGB color space to the CIE LAB color space. It is also rotated to undo the effect of any camera rotation at the time of image capture, and scaled to the working image resolution. The image is further enhanced by scaling its dynamic range to the available dynamic range.

Detect Faces 923

Faces are detected in the captured image based on hue and local feature analysis. The list of detected face regions is used by the Vark script for applying face-specific effects such as warping and positioning speech balloons.

Vark Image Processing Language Interpreter 924

Vark consists of a general-purpose programming language with a rich set of image processing extensions. It provides a range of primitive data types (integer, real, boolean, character), a range of aggregate data types for constructing more complex types (array, string, record), a rich set of arithmetic and relational operators, conditional and iterative control flow (if-then-else, while-do), and recursive functions and procedures. It also provides a range of image-processing data types (image, clip image, matte, color, color lookup table, palette, dither matrix, convolution kernel, etc.), graphics data types (font, text, path), a set of image-processing functions (color transformations, compositing, filtering, spatial transformations and warping, illumination, text setting and rendering), and a set of higher-level artistic functions (tiling, painting and stroking).

A Vark program is portable in two senses. Because it is interpreted, it is independent of the CPU and image processing engines of its host. Because it uses a device-independent model space and a device-independent color space, it is independent of the input color characteristics and resolution of the host input device, and the output color characteristics and resolution of the host output device.

The Vark Interpreter 924 parses the source statements which make up the Vark script and produces a parse tree which represents the semantics of the script. Nodes in the parse tree correspond to statements, expressions, sub-expressions, variables and constants in the program. The root node corresponds to the main procedure statement list.

The interpreter executes the program by executing the root statement in the parse tree. Each node of the parse tree asks its children to evaluate or execute themselves appropriately. An if statement node, for example, has three children—a condition expression node, a then statement node, and an else statement node. The if statement asks the condition expression node to evaluate itself, and depending on the boolean value returned asks the then statement or the else statement to execute itself. It knows nothing about the actual condition expression or the actual statements.

While operations on most data types are executed during execution of the parse tree, operations on image data types are deferred until after execution of the parse tree. This allows imaging operations to be optimized so that only those intermediate pixels which contribute to the final image are computed. It also allows the final image to be computed in multiple passes by spatial subdivision, to reduce the amount of memory required.

During execution of the parse tree, each imaging function simply returns an imaging graph—a graph whose nodes are imaging operators and whose leaves are images—constructed with its corresponding imaging operator as the root and its image parameters as the root's children. The image parameters are of course themselves image graphs. Thus each successive imaging function returns a deeper imaging graph.

After execution of the parse tree, an imaging graph is obtained which corresponds to the final image. This imaging graph is then executed in a depth-first manner (like any expression tree), with the following two optimizations: (1) only those pixels which contribute to the final image are computed at a given node, and (2) the children of a node are executed in the order which minimizes the amount of memory required. The imaging operators in the imaging graph are executed in the optimized order to produce the final image. Compute-intensive imaging operators are accelerated using the VLIW Processor embedded in the Artcam device. If the amount of memory required to execute the imaging graph exceeds available memory, then the final image region is subdivided until the required memory no longer exceeds available memory.

For a well-constructed Vark program the first optimization is unlikely to provide much benefit per se. However, if the final image region is subdivided, then the optimization is likely to provide considerable benefit. It is precisely this optimization, then, that allows subdivision to be used as an effective technique for reducing memory requirements. One of the consequences of deferred execution of imaging operations is that program control flow cannot depend on image content, since image content is not known during parse tree execution. In practice this is not a severe restriction, but nonetheless must be borne in mind during language design.

The notion of deferred execution (or lazy evaluation) of imaging operations is described by Guibas and Stolfi (Guibas, L. J., and J. Stolfi, "A Language for Bitmap Manipulation", *ACM Transactions on Graphics*, Vol. 1, No. 3, July 1982, pp. 191-214). They likewise construct an imaging graph during the execution of a program, and during subsequent graph evaluation propagate the result region backwards to avoid computing pixels which do not contribute to the final image. Shantzis additionally propagates regions of available pixels forwards during imaging graph evaluation (Shantzis, M. A., "A Model for Efficient and Flexible Image Computing", *Computer Graphics Proceedings, Annual Conference Series*, 1994, pp. 147-154). The Vark Interpreter uses the more sophisticated multi-pass bi-directional region propagation scheme described by Cameron (Cameron, S., "Efficient Bounds in Constructive Solid Geometry", *IEEE Computer Graphics & Applications*, Vol. 11, No. 3, May 1991, pp. 68-74). The optimization of execution order to minimise memory usage is due to Shantzis, but is based on standard compiler theory (Aho, A. V., R. Sethi, and J. D. Ullman, "Generating Code from DAGs", in *Compilers: Principles, Techniques, and Tools*, Addison-Wesley, 1986, pp. 557-567). The Vark Interpreter uses a more sophisticated scheme than Shantzis, however, to support variable-sized image buffers. The subdivision of the result region in conjunction with region propagation to reduce memory usage is also due to Shantzis.

Printer Manager 908 (FIG. 127)

The Printer Manager provides image printing services. It controls the Ink Jet printer hardware embedded in the Artcam. It provides an abstract printer control interface which allows printer parameters to be queried and set, and images printed. This abstract interface decouples the application from details of printer implementation and includes the following variables:

| output parameters | domains |
|---|---|
| media is present | bool |
| media has fixed page size | bool |
| media width | real |
| remaining media length | real |
| fixed page size | real, real |

| input parameters | domains |
|---|---|
| page size | real, real |

| commands | return value domains |
|---|---|
| Print Image | none |

| output events |
|---|
| invalid media |
| media exhausted |
| media inserted |
| media removed |

Figure 130:
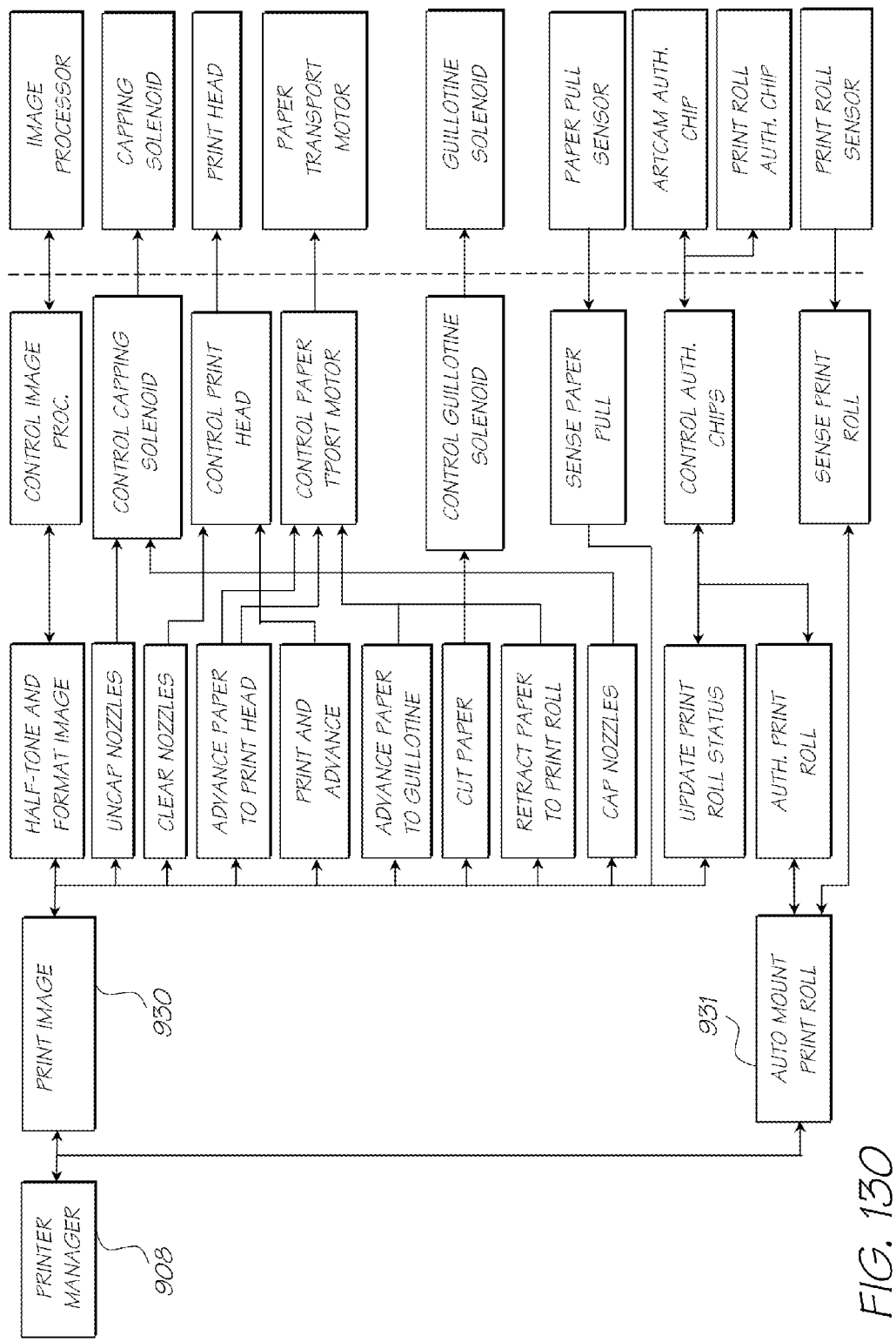
FIG. 130 illustrates a layout of the software/hardware modules of the Printer Manager.

The Printer Manager runs as an asynchronous event-driven process. It contains a set of linked state machines, one for each asynchronous operation. These include printing the image and auto mounting the print roll. The software structure of the Printer Manager is illustrated in FIG. 130. The software components are described in the following description:

Print Image 930

Print Image prints the supplied image. It uses the VLIW Processor to prepare the image for printing. This includes converting the image color space to device-specific CMY and producing half-toned bi-level data in the format expected by the print head.

Between prints, the paper is retracted to the lip of the print roll to allow print roll removal, and the nozzles can be capped to prevent ink leakage and drying. Before actual printing starts, therefore, the nozzles are uncapped and cleared, and the paper is advanced to the print head. Printing itself consists of transferring line data from the VLIW processor, printing the line data, and advancing the paper, until the image is completely printed. After printing is complete, the paper is cut with the guillotine and retracted to the print roll, and the nozzles are capped. The remaining media length is then updated in the print roll.

Auto Mount Print Roll 131

Auto Mount Print Roll responds to the insertion and removal of the print roll. It generates print roll insertion and removal events which are handled by the application and used to update the status display. The print roll is authenticated according to a protocol between the authentication chip embedded in the print roll and the authentication chip embedded in Artcam. If the print roll fails authentication then it is rejected. Various information is extracted from the print roll. Paper and ink characteristics are used during the printing process. The remaining media length and the fixed page size of the media, if any, are published by the Print Manager and are used by the application.

User Interface Manager 910 (FIG. 127)

Figure 131:
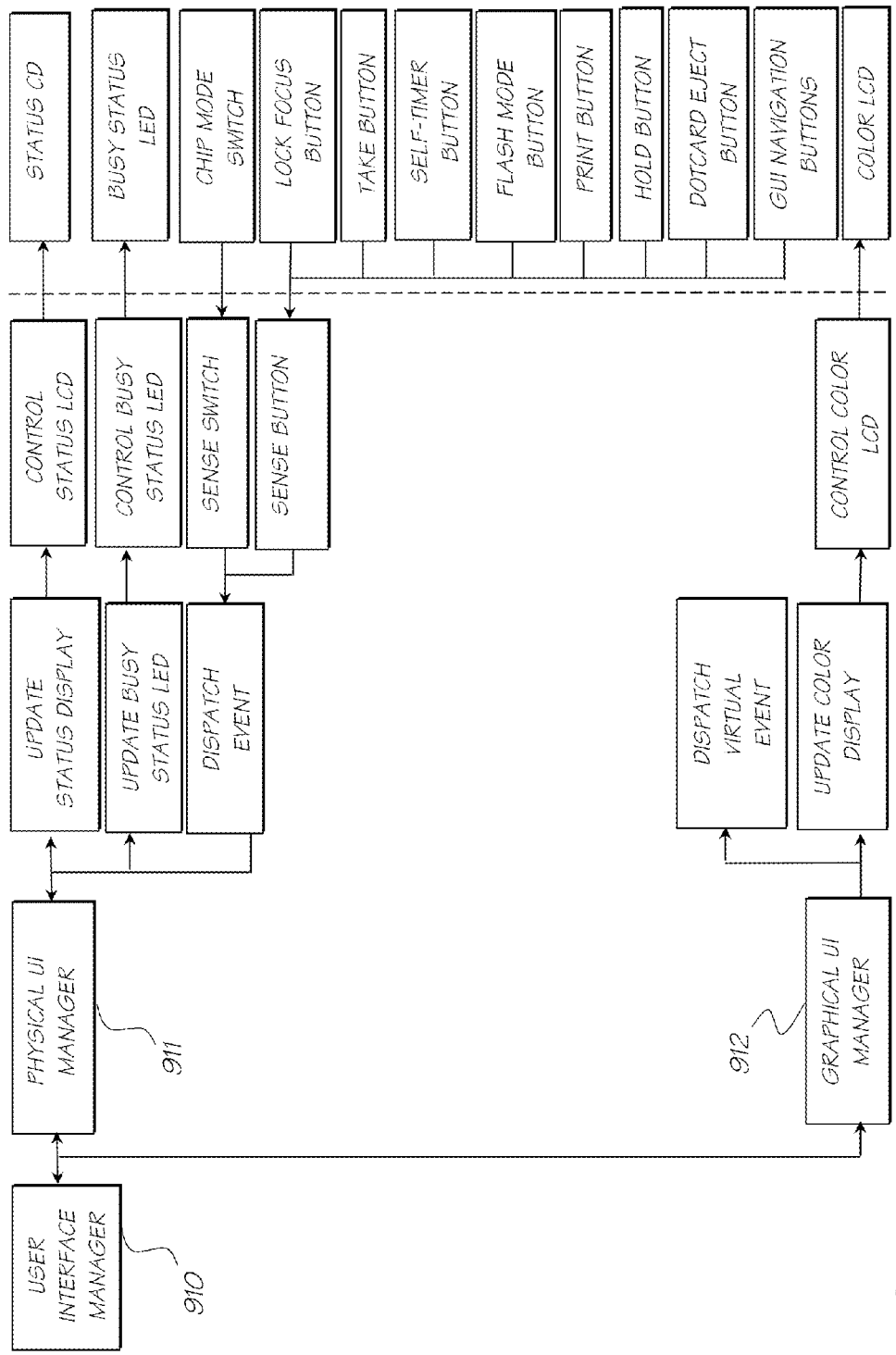
FIG. 131 illustrates a layout of the software/hardware modules of the Image Processing Manager.

The User Interface Manager is illustrated in more detail if FIG. 131 and provides user interface management services. It consists of a Physical User Interface Manager 911, which controls status display and input hardware, and a Graphical User Interface Manager 912, which manages a virtual graphical user interface on the color display. The User Interface Manager translates virtual and physical inputs into events. Each event is placed in the event queue of the process registered for that event.

File Manager 905 (FIG. 128)

Figure 132:
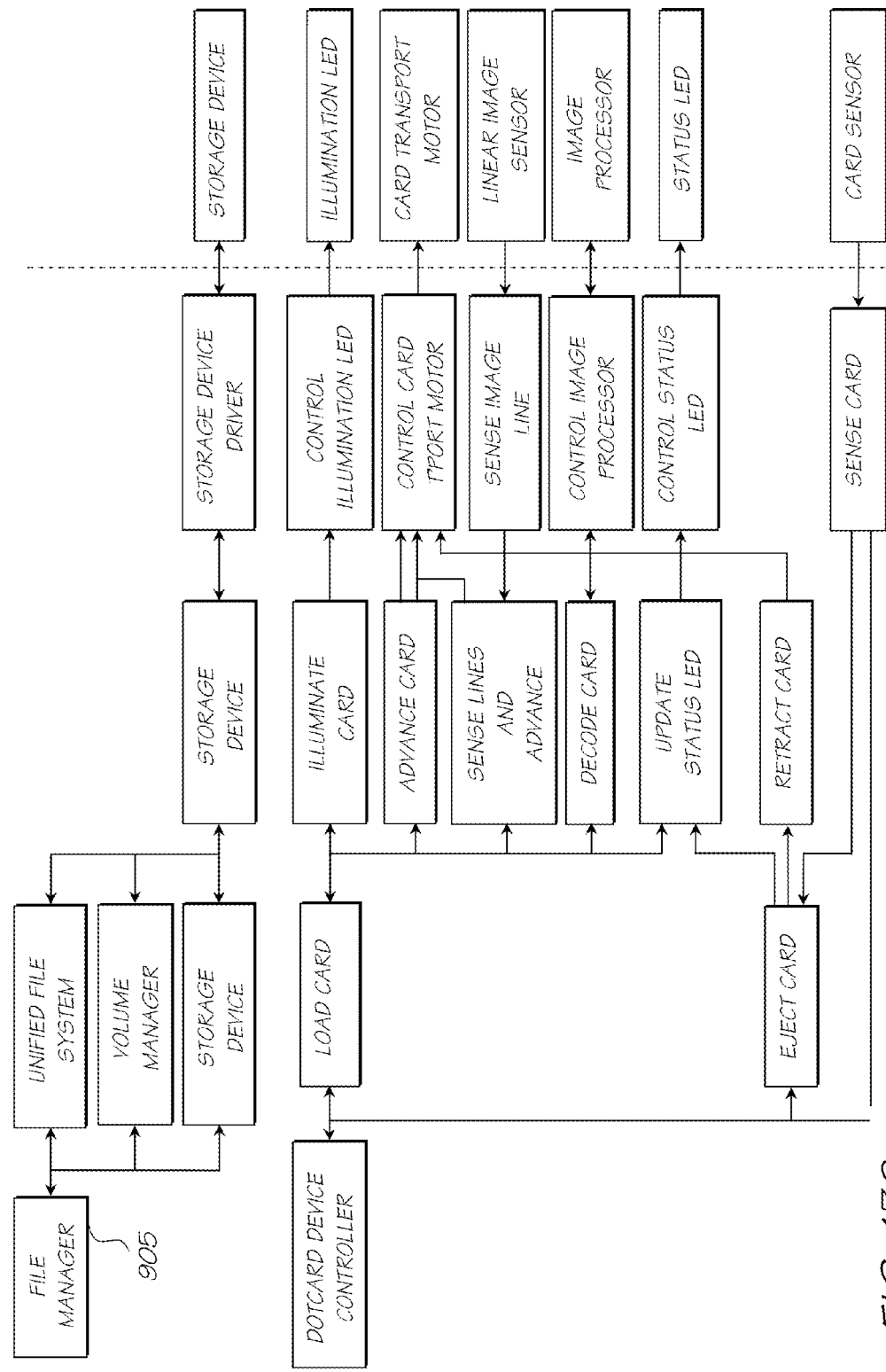
FIG. 132 illustrates a layout of the software/hardware modules of the File Manager.

The File Manager provides file management services. It provides a unified hierarchical file system within which the file systems of all mounted volumes appear. The primary removable storage medium used in the Artcam is the ArtCards. A ArtCards is printed at high resolution with blocks of bi-level dots which directly represents error-tolerant Reed-Solomon-encoded binary data. The block structure supports append and append-rewrite in suitable read-write ArtCards devices (not initially used in Artcam). At a higher level a ArtCards can contain an extended append-rewriteable ISO9660 CD-ROM file system. The software structure of the File Manager, and the ArtCards Device Controller in particular, can be as illustrated in FIG. 132.

Network Manager 904 (FIG. 128)

The Network Manager provides "appliance" networking services across various interfaces including infra-red (IrDA) and universal serial bus (USB). This allows the Artcam to share captured images, and receive images for printing.

Clock Manager 907 (FIG. 128)

The Clock Manager provides date and time-of-day clock services. It utilises the battery-backed real-time clock embedded in the Artcam, and controls it to the extent that it automatically adjusts for clock drift, based on auto-calibration carried out when the user sets the time.

Power Management

When the system is idle it enters a quiescent power state during which only periodic scanning for input events occurs. Input events include the press of a button or the insertion of a ArtCards. As soon as an input event is detected the Artcam device re-enters an active power state. The system then handles the input event in the usual way.

Even when the system is in an active power state, the hardware associated with individual modules is typically in a quiescent power state. This reduces overall power consumption, and allows particularly draining hardware components such as the printer's paper cutting guillotine to monopolise the power source when they are operating. A camera-oriented Artcam device is, by default, in image capture mode. This means that the camera is active, and other modules, such as the printer, are quiescent. This means that when non-camera functions are initiated, the application must explicitly suspend the camera module. Other modules naturally suspend themselves when they become idle.

I claim:

1. An electronic device, comprising:
    an image sensor;
    a display for displaying an image sensed by the image sensor; and
    a central processor having:
        an image sensor interface for receiving data from the image sensor,
        multiple processing units configured for operating in parallel to simultaneously process the data,
        an input FIFO (first in, first out) for receiving the data from the image sensor interface and inputting the data to the multiple processing units,
        an interface for receiving image encoding data in a machine readable form and decoding the image encoding data into image processing instructions executed by the multiple processing units,
        an output FIFO for receiving data processed by the multiple processing units, and
        an image display interface for transmitting the data processed by the multiple processing units to the display.

2. The electronic device according to claim 1, wherein the central processor further comprises a crossbar switch for connecting each of the multiple processing units.

3. The electronic device according to claim 1, wherein the central processor further comprises:
    a central processing unit, and
    a data bus connecting the central processing unit to the input FIFO and the output FIFO, the central processing unit providing a processing core to operatively control the multiple processing units.

4. The electronic device according to claim 3, wherein the central processor further comprises a data cache to store the data processed by the multiple processing units until required by the central processing unit.

5. The electronic device according to claim 1, wherein the multiple processing units are configured to perform one or more processing tasks selected from:
    rotating the data from the image sensor;
    color converting the data from the image sensor; and
    dithering the data from the image sensor.

6. The electronic device according to claim 4, wherein the image display interface is connected to the data cache for reading the data processed by the multiple processing units and transmitting the data processed by the multiple processing units to the display.

7. The electronic device according to claim 1, wherein each of the multiple processing units includes at least one address generator.

8. The electronic device according to claim 1, wherein each of the multiple processing units includes RAM (random access memory) for microcode to operatively control the processing unit.

9. The electronic device according to claim 8, wherein the central processor further comprises a keyboard interface for user input of instructions to rewrite the microcode in the RAM within each of the multiple processing units.

10. The electronic device according to claim 1, further comprising a USB port for communication with an external device, wherein the central processor further comprises a USB interface.

11. The electronic device according to claim 1, further comprising a 3 Volt battery.

12. A processing device, comprising:
    an image sensor interface for receiving input image data from an image sensor;
    multiple processing units configured for operating in parallel to simultaneously process the input image data;
    an input FIFO (first in, first out) for receiving the input image data from the image sensor interface and inputting the input image data to the multiple processing units;
    an interface for receiving image encoding data in a machine readable form and decoding the image encoding data into image processing instructions executed by the multiple processing units;
    an output FIFO for receiving data processed by the multiple processing units; and
    an image display interface for transmitting the data processed by the multiple processing units data to a display.

13. The processing device according to claim 12, wherein the processing device is included in an electronic device that includes a camera.

14. The processing device according to claim 12, further comprising:
    a central processing unit that operatively controls the multiple processing units; and
    a data bus connecting the central processing unit to the input FIFO and the output FIFO.

15. The processing device according to claim 12, further comprising a crossbar switch for interconnecting each of the multiple processing units.

16. The processing device according to claim 12, further comprising a data cache to store the data processed by the multiple processing units.

17. The processing device according to claim 12, wherein the multiple processing units perform one or more processing tasks selected from:
    rotating the input image data;
    color converting the input image data; and
    dithering the input image data.

18. The processing device according to claim 12, wherein each of the multiple processing units includes a RAM (random access memory) for microcode to operatively control the processing unit.

19. The processing device according to claim 18, further comprising a keyboard interface for user input of instructions to rewrite the microcode in the RAM within each of the multiple processing units.

* * * * *